US012671727B2

(12) United States Patent
Craparo et al.

(10) Patent No.: US 12,671,727 B2
(45) Date of Patent: *Jun. 30, 2026

(54) METHODS AND SYSTEMS FOR MULTIMEDIA COMMUNICATION WHILE ACCESSING NETWORK RESOURCES

(71) Applicant: Hovr Inc., Lansdale, PA (US)

(72) Inventors: Jason Tyler Craparo, Lansdale, PA (US); Andrew Dale Colagreco, Phoenixville, PA (US); Rachel Ann Costantino, Evanston, IL (US); Nolan William Perkins, Tampa, FL (US)

(73) Assignee: Hovr Inc., Lansdale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,356

(22) Filed: May 28, 2024

(65) Prior Publication Data

US 2025/0168213 A1 May 22, 2025

Related U.S. Application Data

(63) Continuation of application No. 18/301,950, filed on Apr. 17, 2023, now Pat. No. 12,003,555, which is a (Continued)

(51) Int. Cl.
*H04L 65/4038* (2022.01)
*H04L 65/1016* (2022.01)
(Continued)

(52) U.S. Cl.
CPC ...... *H04L 65/4038* (2013.01); *H04L 65/1016* (2013.01); *H04L 65/1069* (2013.01); *H04L 65/1089* (2013.01); *H04L 65/1093* (2013.01)

(58) Field of Classification Search
CPC ........................ H04L 65/1069; H04L 65/1089
(Continued)

(56) References Cited

U.S. PATENT DOCUMENTS 8,370,766 B2 2/2013 Selig
8,756,501 B1 6/2014 Karam
(Continued)

OTHER PUBLICATIONS

PCT Search Report and Written Opinion mailed Aug. 23, 2023 regarding International Application No. PCT/US2023/020243.
(Continued)

*Primary Examiner* — Lan Dai T Truong
(74) *Attorney, Agent, or Firm* — Knobbe, Martens, Olson & Bear LLP

(57) ABSTRACT

Systems and methods are configured to receive an indication that a moment, such as an anchor, is to be positioned at a first location on a webpage, via code embedded in the webpage. A content specification associated with the anchor is received. An interaction rule associated with the anchor is received that specifies that content specified by the content specification is to be displayed at least partly in response to a specified user interaction with the webpage. Code is automatically generated configured to cause the anchor to be located at the first location when accessed by a user browser, wherein, at least partly in response to a user browser accessing the first webpage, and the first user interacting with the webpage in a manner that satisfies the interaction rule, the content specified by the content specification is rendered.

16 Claims, 148 Drawing Sheets

Related U.S. Application Data continuation-in-part of application No. 18/059,927, filed on Nov. 29, 2022, now Pat. No. 11,962,630, which is a continuation of application No. 17/663,633, filed on May 16, 2022, now Pat. No. 11,522,927, which is a continuation-in-part of application No. 17/457,115, filed on Dec. 1, 2021, now abandoned, which is a continuation of application No. 17/178,934, filed on Feb. 18, 2021, now Pat. No. 11,201,900.

(60) Provisional application No. 63/125,894, filed on Dec. 15, 2020.

(51) Int. Cl.
*H04L 65/1069* (2022.01)
*H04L 65/1089* (2022.01)
*H04L 65/1093* (2022.01)

(58) Field of Classification Search
USPC .......................................................... 709/204
See application file for complete search history.

(56) References Cited

U.S. PATENT DOCUMENTS

| | | | | |
|---|---|---|---|---|
| 8,924,338 | B1 | 12/2014 | Sheng | |
| 9,813,440 | B1 | 11/2017 | Hoover | |
| 10,331,948 | B1 * | 6/2019 | Flament | G06N 5/025 |
| 10,353,997 | B1 | 7/2019 | Tobias | |
| 10,620,973 | B1 | 4/2020 | Gailoux | |
| 11,200,073 | B1 | 12/2021 | Voicu | |
| 11,201,900 | B1 | 12/2021 | Craparo | |
| 11,368,726 | B1 | 6/2022 | Saez Cerda | |
| 11,522,927 | B2 | 12/2022 | Craparo et al. | |
| 11,726,447 | B2 | 8/2023 | Kidd | |
| 11,741,191 | B1 | 8/2023 | Zilka | |
| 12,354,029 | B2 | 7/2025 | Ma | |
| 2004/0066410 | A1 | 4/2004 | Lindhorst et al. | |
| 2004/0205547 | A1 | 10/2004 | Feldt | |
| 2004/0215719 | A1 | 10/2004 | Altshuler | |
| 2008/0024593 | A1 | 1/2008 | Tsirinsky et al. | |
| 2009/0015659 | A1 | 1/2009 | Choi | |
| 2010/0066804 | A1 | 3/2010 | Shoemake et al. | |
| 2010/0211860 | A1 | 8/2010 | O'Dell-Alexander | |
| 2011/0161802 | A1 | 6/2011 | Jia | |
| 2012/0317483 | A1 | 12/2012 | Shapiro et al. | |
| 2013/0169742 | A1 | 7/2013 | Wu | |
| 2013/0185368 | A1 | 7/2013 | Nordstrom | |
| 2013/0212192 | A1 | 8/2013 | Yerli | |
| 2014/0108078 | A1 | 4/2014 | Davis | |
| 2014/0229270 | A1 | 8/2014 | Rashwan | |
| 2014/0253665 | A1 | 9/2014 | Nietfeld et al. | |
| 2014/0313282 | A1 | 10/2014 | Ma et al. | |
| 2015/0195490 | A1 | 7/2015 | Oyman | |
| 2015/0278359 | A1 | 10/2015 | Tang | |
| 2015/0319203 | A1 | 11/2015 | Jeremias | |
| 2015/0365359 | A1 | 12/2015 | Hasan | |
| 2016/0065505 | A1 | 3/2016 | Iskander | |
| 2016/0149956 | A1 | 5/2016 | Birnbaum | |
| 2017/0099456 | A1 | 4/2017 | Tang et al. | |
| 2017/0116339 | A1 | 4/2017 | Stein | |
| 2017/0311368 | A1 | 10/2017 | Kandur Raja | |
| 2018/0013980 | A1 | 1/2018 | Oyman | |
| 2019/0364133 | A1 | 11/2019 | Dong | |
| 2020/0133967 | A1 | 4/2020 | Shukla | |
| 2020/0162796 | A1 | 5/2020 | Azuolas | |
| 2020/0175104 | A1 | 6/2020 | Doganata | |
| 2020/0221190 | A1 | 7/2020 | Bhattacharjee | |
| 2021/0035204 | A1 | 2/2021 | Verma | |
| 2021/0076003 | A1 | 3/2021 | Jiang et al. | |
| 2021/0110802 | A1 | 4/2021 | Estes | |
| 2021/0141845 | A1 | 5/2021 | Lv | |
| 2021/0304121 | A1 | 9/2021 | Lee | |
| 2021/0304473 | A1 | 9/2021 | Kelly | |
| 2021/0365465 | A1 | 11/2021 | Li | |
| 2022/0070504 | A1 | 3/2022 | Hartnett | |
| 2022/0076514 | A1 | 3/2022 | Lingala | |
| 2022/0129509 | A1 * | 4/2022 | Yu | G06F 16/958 |
| 2022/0303323 | A1 | 9/2022 | Craparo et al. | |
| 2022/0319219 | A1 | 10/2022 | Tsibulevskiy | |

OTHER PUBLICATIONS

European Extended Search Reported dated Feb. 17, 2026, received in European Patent Application No. 23808062.6, in 13 pages.

* cited by examiner

Site Map

| Network / Connect | Chat / Discussions | Tables |
|---|---|---|

Here Now

- List of People Online Now

Open Threads/Forums

- List of Channels Directed by the Admin
- Want to Include 5 Standard Channels (New Tech, Open Positions, Etc TBD)
- Number Refers to Number of Total Posts or Comments (to Illustrate the Amount of Activity)

Open Tables Now

- Jump into a Live Video Chat of 2, 4, 6, or 8 People
- Currently on Event Software

Recent

- People who have Visited the Site in the Last 24 hrs but aren't Currently on the Site
- Feature Focused on Community Building

Direct Messages

- Compilation of all Hio Interactions
- Could the DM Rules be Platform Specific? (i.e. Chamber of Commerce only Maintains the DMs – Future Facing not Necessarily a Problem to Solve

Upcoming Tables

- Host Moderated Events?
- Standing Tables at Certain Times of Day?
- Do Tables have Themes for Topics or Discussions?

Connections

- List of People that User has Already Connected with

| Announcements | FAQs & Tutorials |
|---|---|

| Sales / News / Releases / Updates | FAQ's |
|---|---|

Groups

Co-Browsing

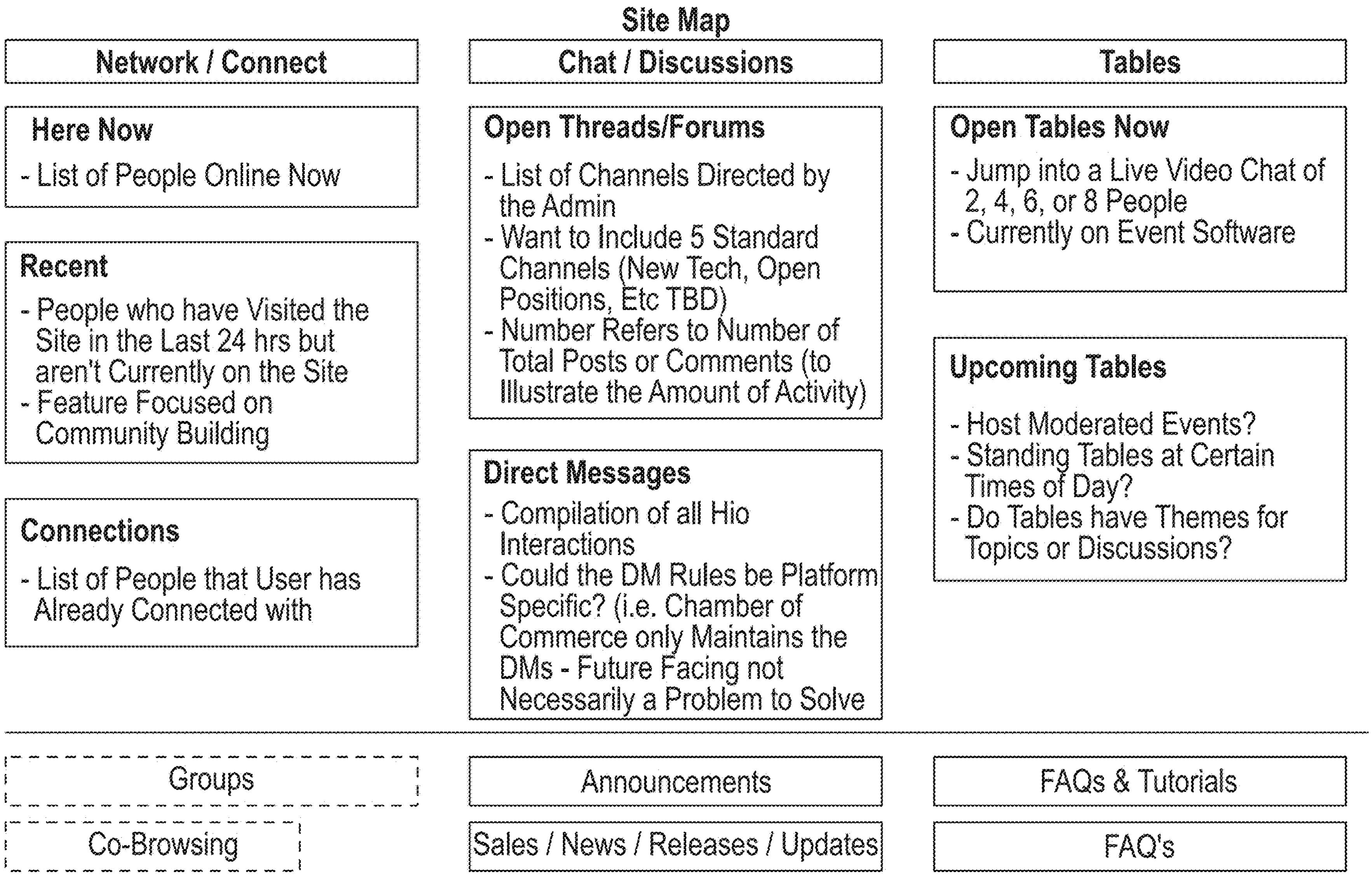

FIG. 4A

Chat / Discussions    *Back Button

Home

Forums
- List of Channels Directed by the Admin
- Want to Include 5 Standard Channels (New Tech, Open Positions, Etc TBD)

- Name of Forum (Currently w/ Hashtags)
- Number of Posts (Not Including Threaded Comments)
- Channels Filter W/, "More" Icon for Dropdown (?)
* In Need of a Search Field?

Menu Options
- Mute Notifications
- Create New Forum
* Search

Direct Messages
- Compilation of all Hio Interactions
- Could the DM Rules be Platform Specific? (i.e. Chamber of Commerce only Maintains the DMs - Future not Necessarily a Problem to Solve Yet.)

- Avatar
- Name
- Preview of Conversation
- Number of New Messages
* Any Indicator of Connection vs New?

Menu Options
- Mute Notifications
- Start New DM
- Filter Messages (Including Archived)
* Search Check on Forum   (A)

Add Forum   (+)

Search Channels   (+)

Clicks on Person's Name   (B)

Is Hover an Action ?   (+)

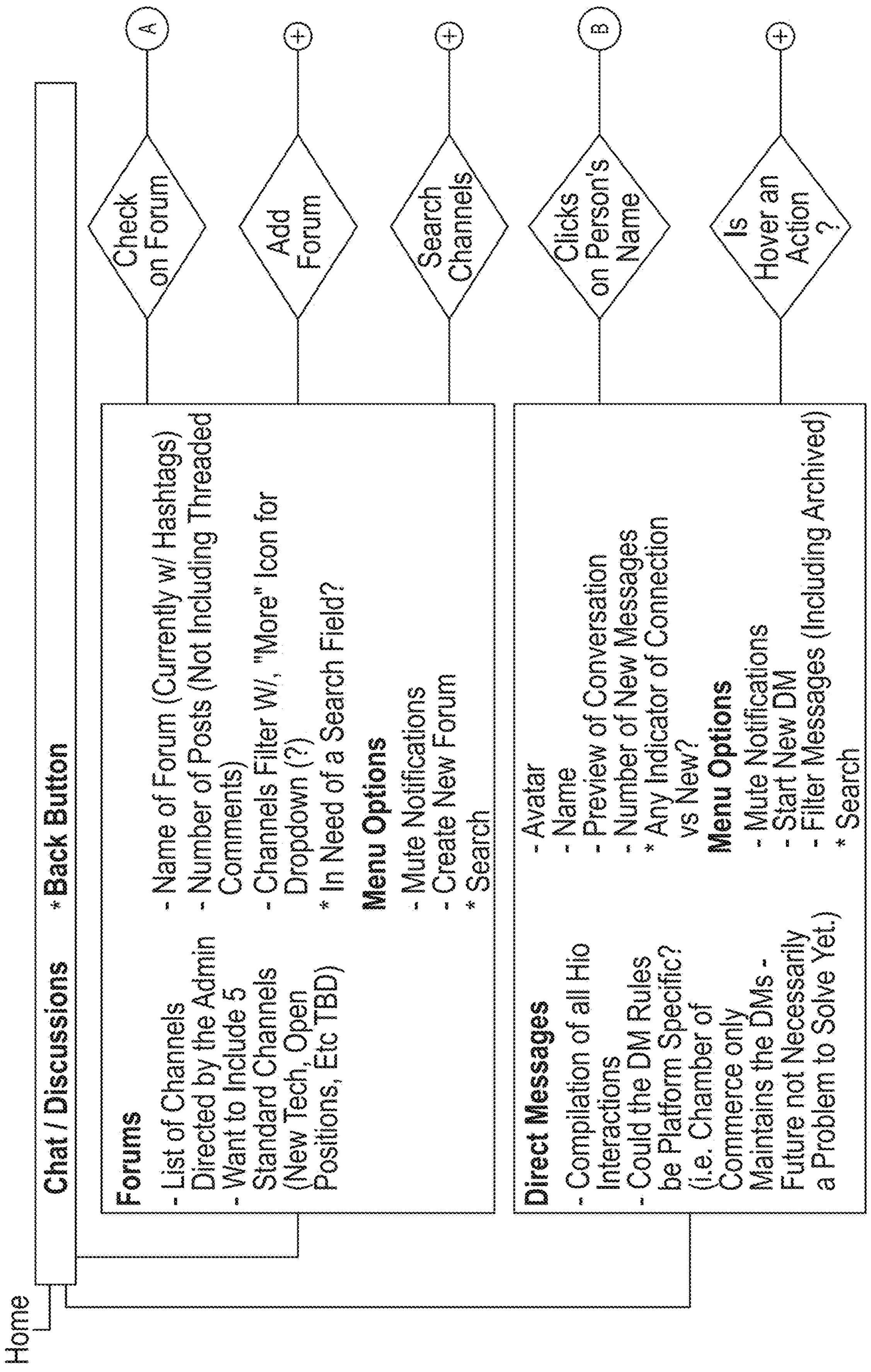

FIG. 4B

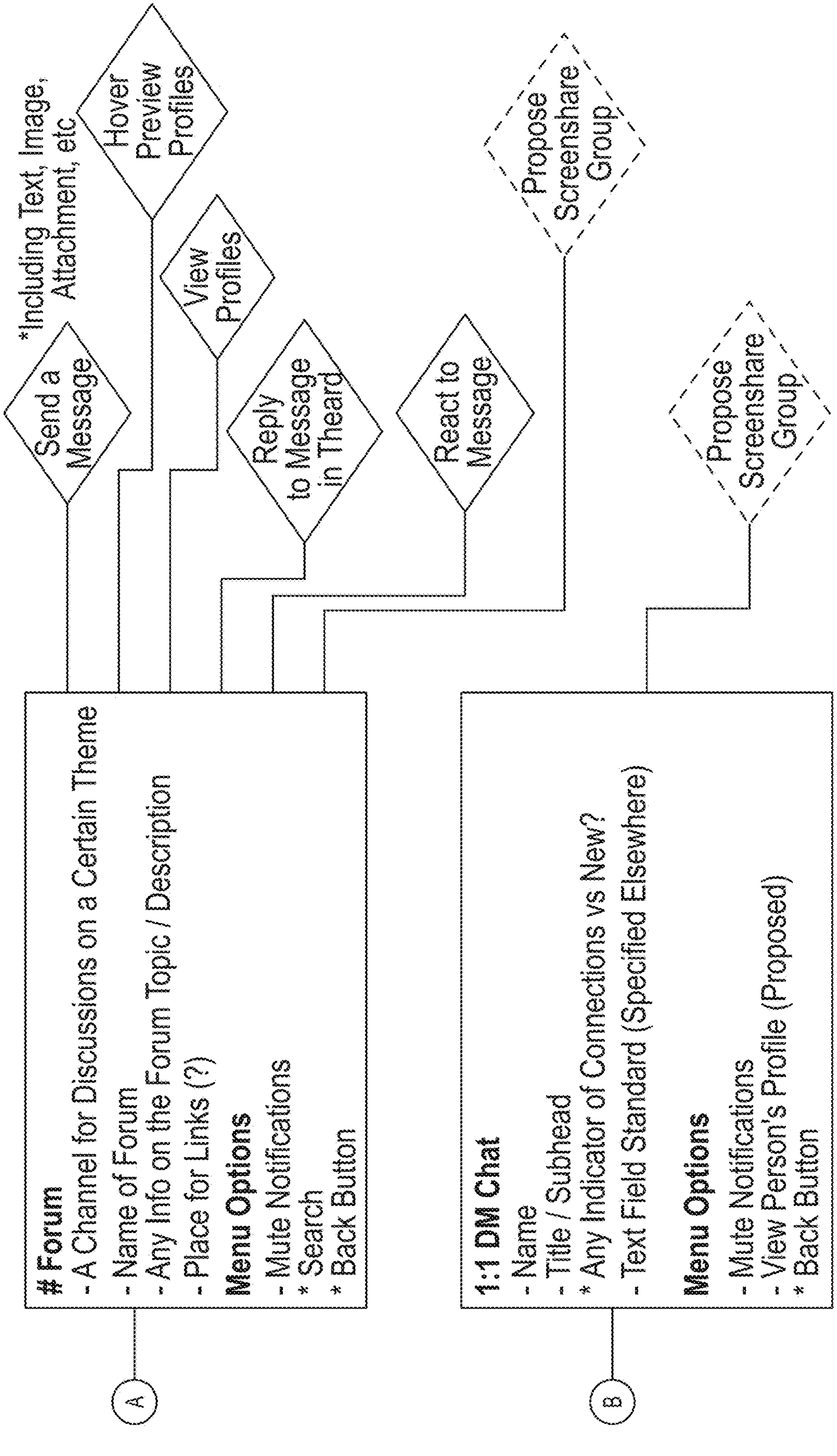
FIG. 4B1

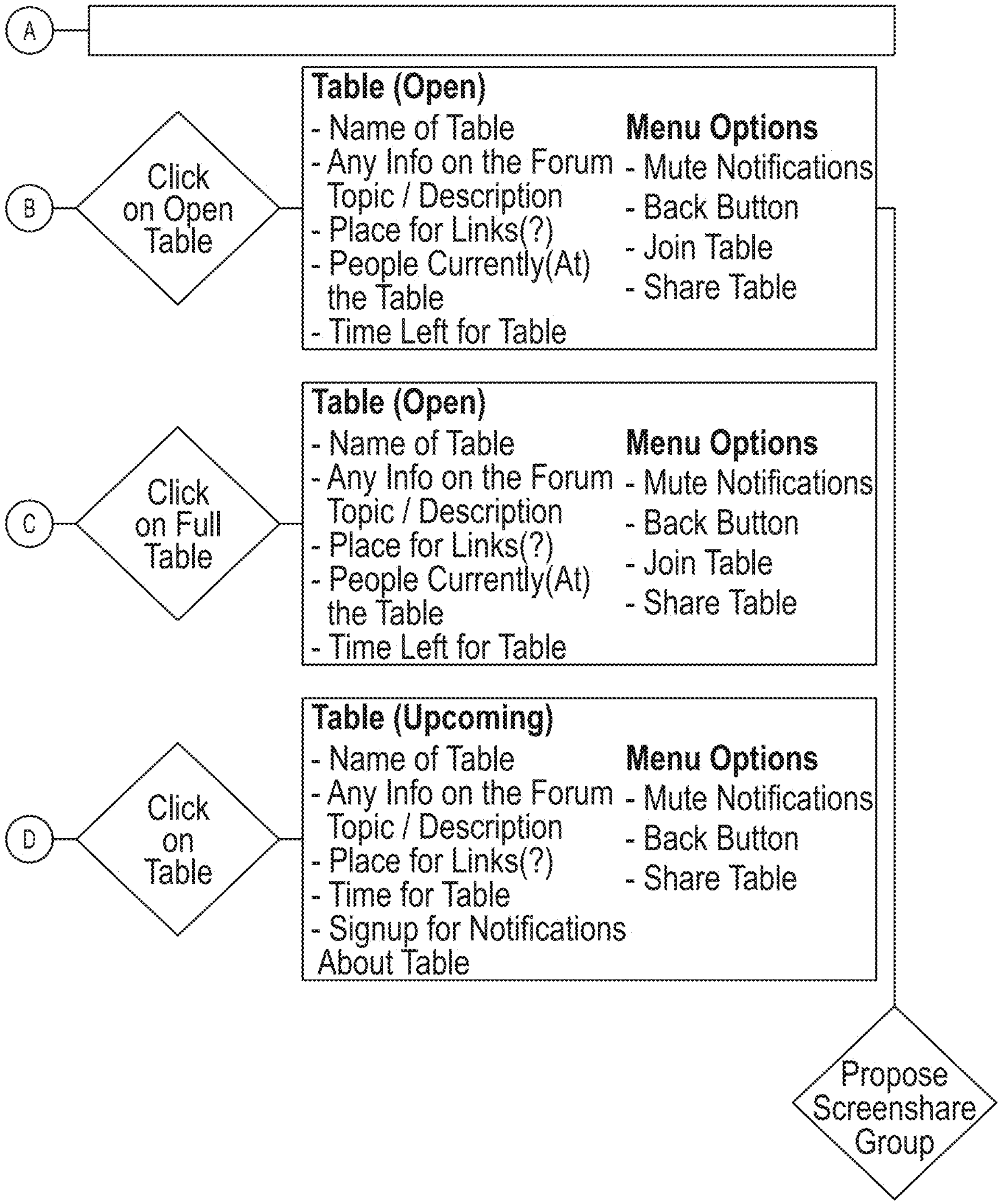
FIG. 4C1

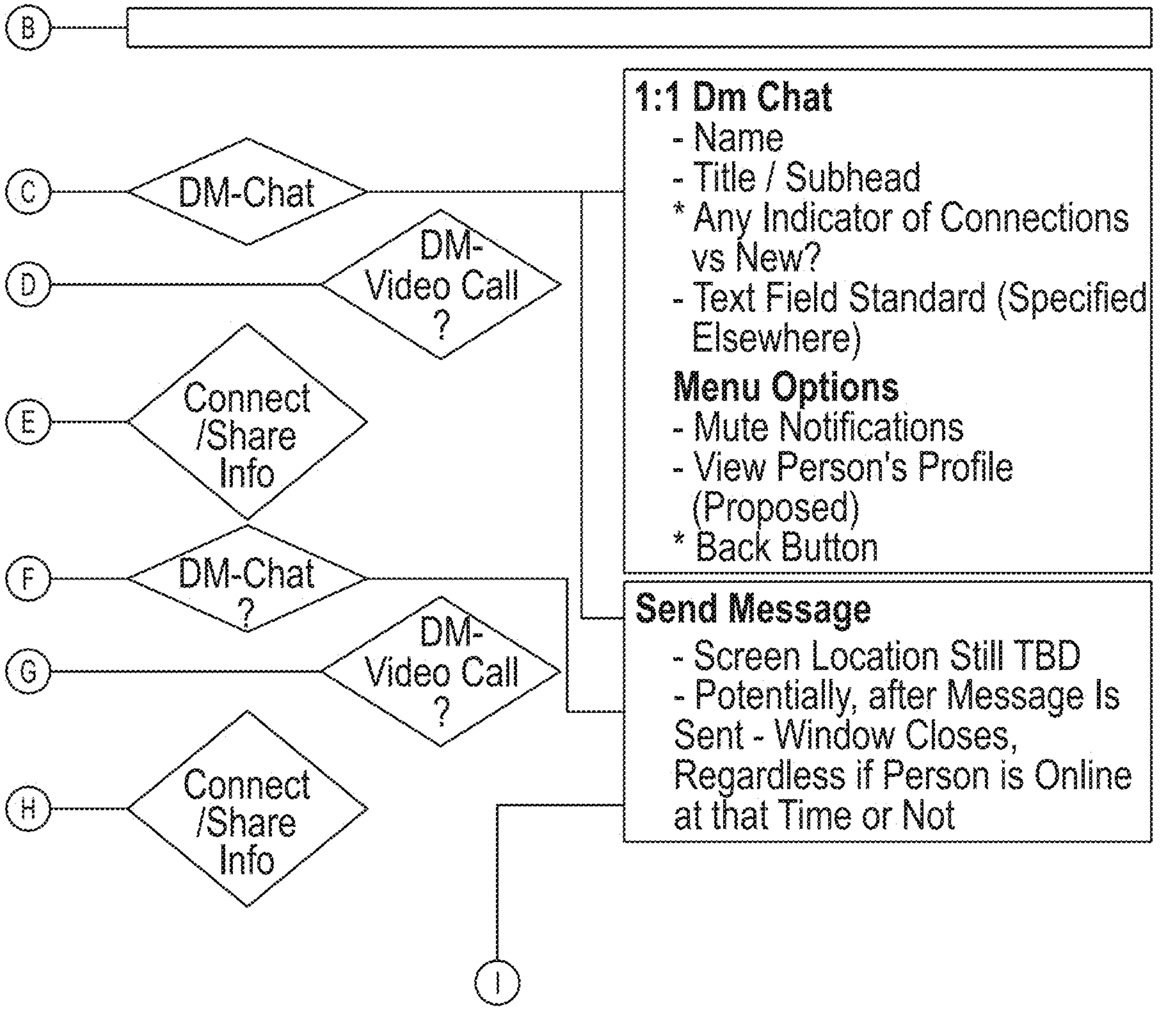

FIG. 4D1

1:1 Dm Chat
- Name
  - Title / Subhead
- Any Indicator of Connections vs New?
- Text Field Standard (Specified Elsewhere)

Menu Options
- Mute Notifications
- View Person's Profile (Proposed)
- Back Button

Send Message
- Screen Location Still TBD
- Potentially, after Message is Sent - Window Closes, Regardless if Person is Online at that Time or Not DM-Chat DM-Video Call ?

Connect /Share Info

DM-Chat ?

DM-Video Call ?

Connect /Share Info

B

C

D

E

F

G

H

I

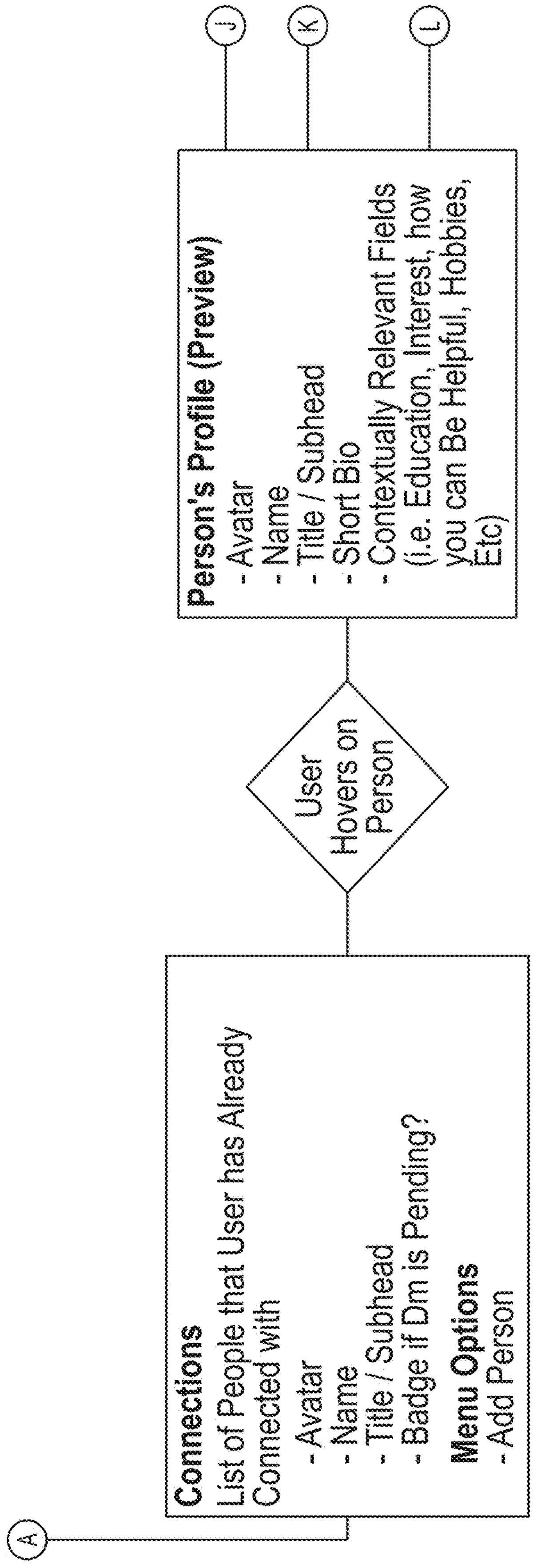
FIG. 4D2

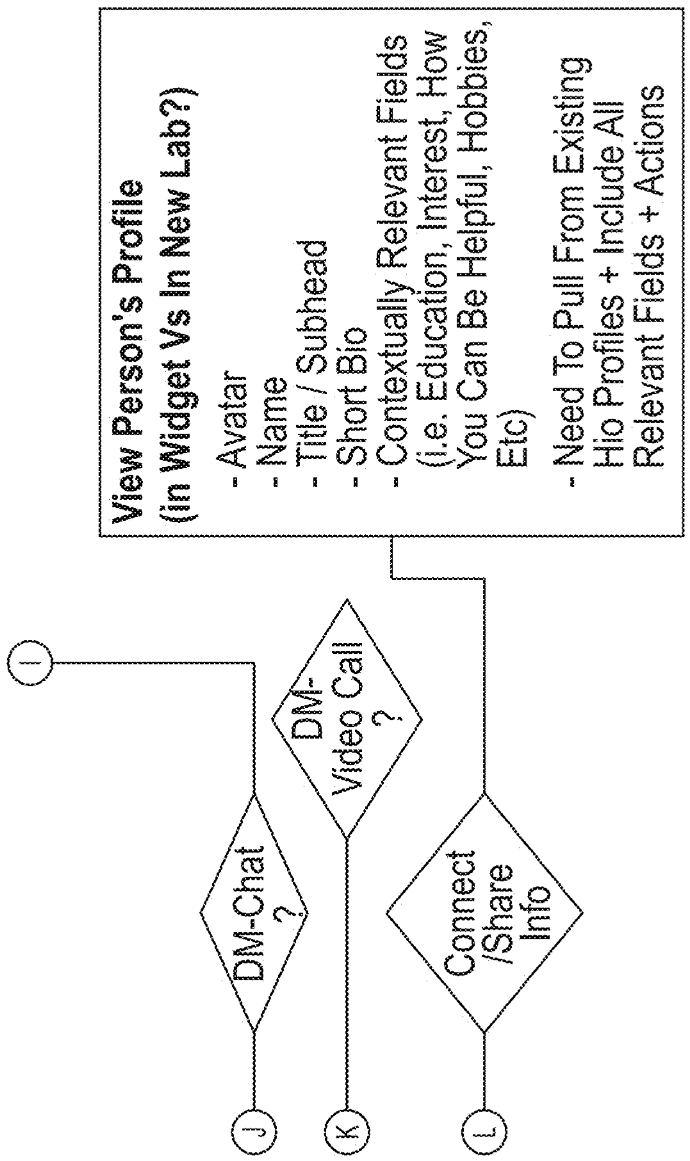
FIG. 4D3

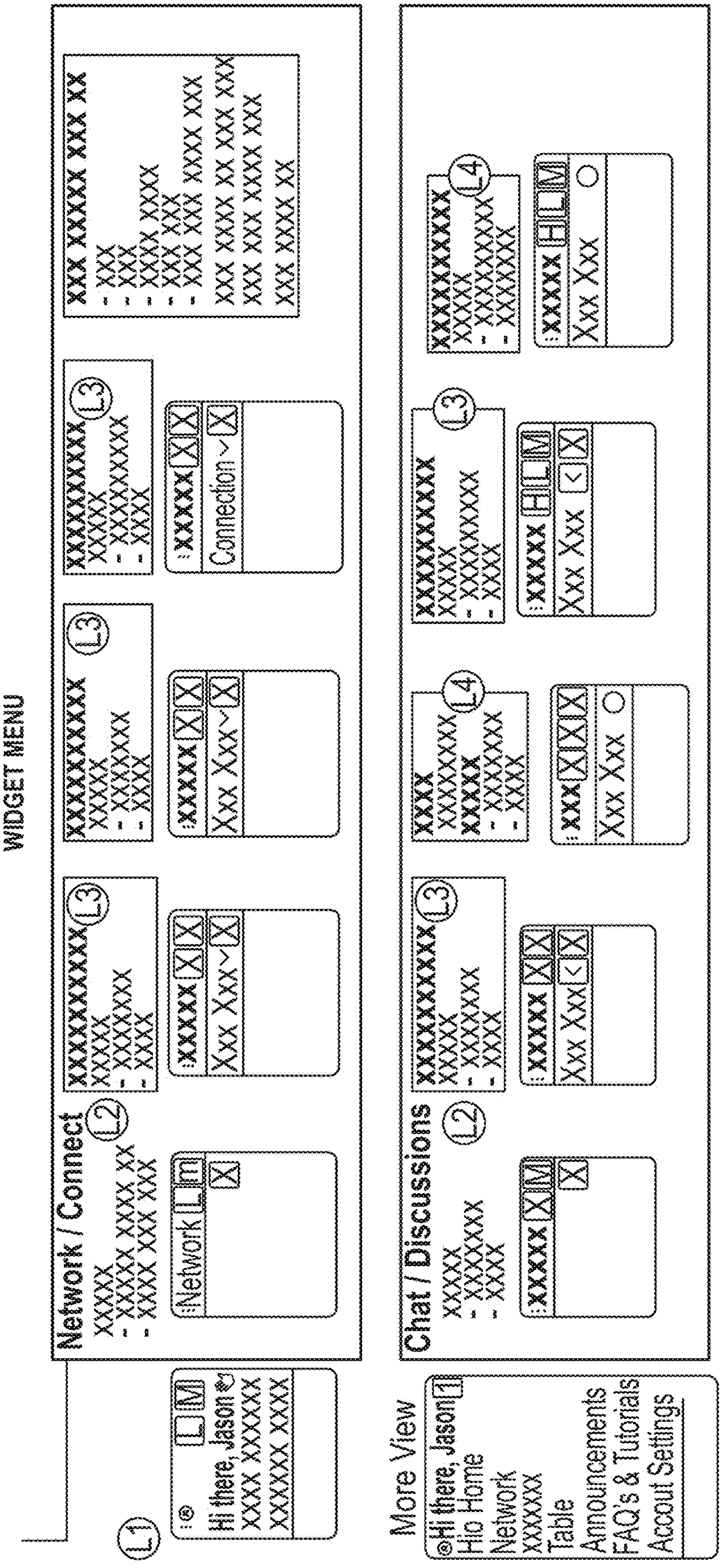
FIG. 4E1

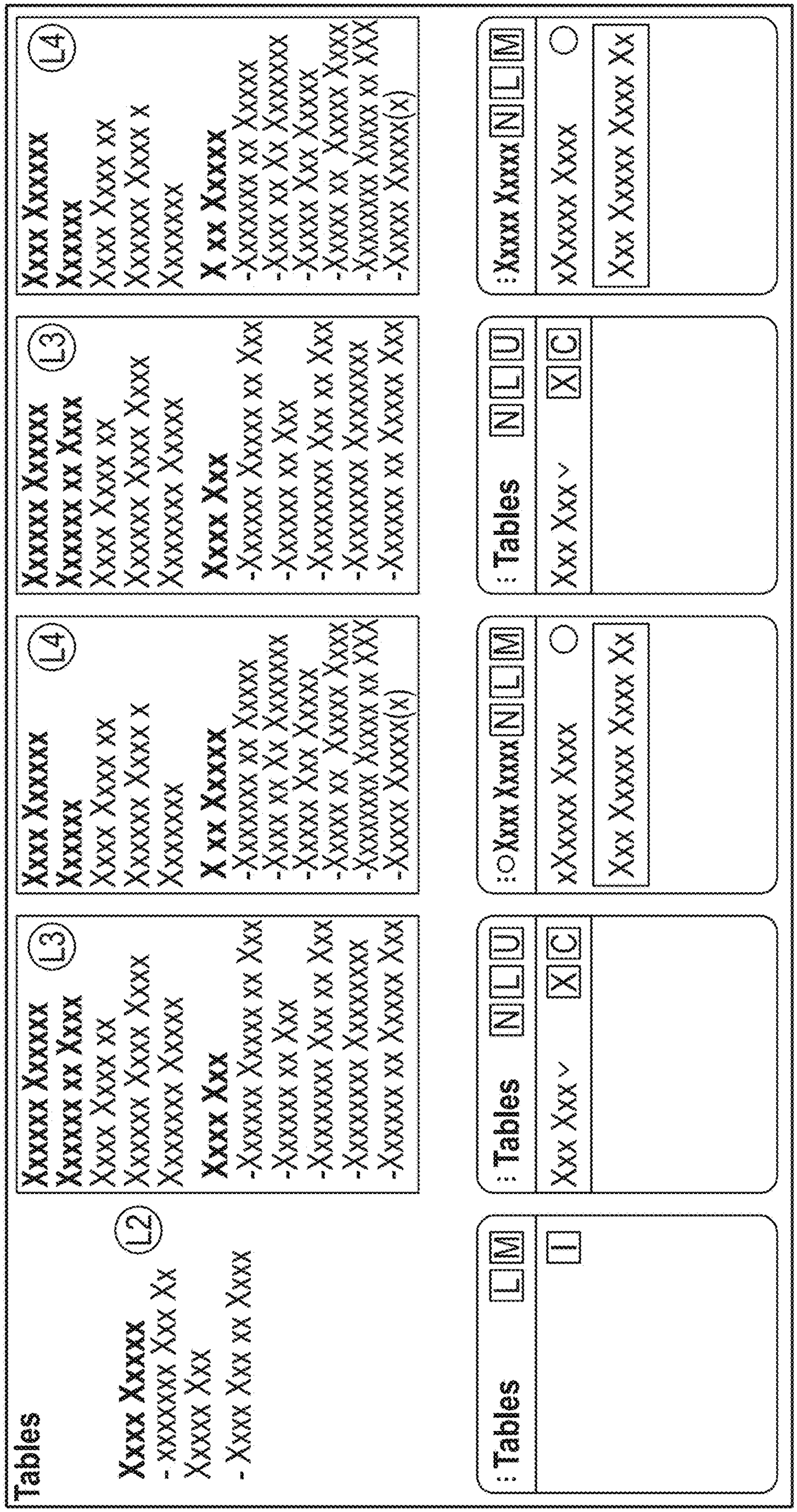
WIDGET MENU
FIG. 4E2

FIG. 5B
Hi there, Jason
Only 3 more days until NAME OF EVENT starts, but start connecting with other attendees now!
Network
View all →
Connect with other attendees, share your social profiles, and get the conversation going even before the event starts.
6 online now
Connections 5
View all →
As you attend events and meet more people, stay in touch with them!
Direct Messages 3
View all →
Stay in touch with those you meet at different events.
FAQs & Privacy
Learn more →
Want to learn more about Hio and how it works? Check out FAQs and learn more about how we prioritize protecting your data.
Powered by Hio
Close

FIG. 5D
Your profile
Jason Craparo
CEO @ Hio
Email: bobhoover@gmail.com
Linkedin: Linkedin.com/bobhoover
Phone: 555-555-5555
Bio:
Experienced sales executive, heping companies drive their top line revenue
Industry:
Technology
Interests:
Travel
Foodie
Wine & Chocolate
Investing
Dog Walking
Technology
Technology
Foodie
Investing
Powered by Hio
Close

FIG. 6C
Network
Recent
FPO
There haven't been any
recent visitors.
But people are online now!
Start making new connections
Powered by Hio
Close

FIG. 6D
Network
Here now
FPO
No one is currently online.
But there have been some recent visitors.
Check out who was online recently
Powered by Hio
Close

FIG. 8C
Direct messages
No direct messages yet
Get the conversation rolling with someone new!
Go to Network
Powered by Hio
Close

FIG. 8F
Juliet O'Hara
Chief Adventurer @ Santa Barbara PD
Get the conversation Started!
Write a message
Isla is typing...
Direct messages
Amelia Earhart
That's great news! we will have co...
Charlie Lindbergh
I hadn't heard of that before. would y...
Isla Fisher
Can't wait to hear what you think!
Bob Newport
Ha! good point.
Lisa Crawley
Yeah, similar to the website.
Izan Merta
Let me know if you ever want to conn...

FIG. 9E
Accept
Ignore
Jason Craparo
CEO @ Hio
After accepting Jason's request, you will also see their shared contact information:
Email:
Phone:
LinkedIn:
Bio
Experienced sales executive, heping companies drive their top line revenue.
Industry:
Technology
Interests:
Travel
Foodie
Wine & Chocolate
Investing
Dog Walking
Technology
Technology
Foodie
Hi Bob. I thought you made some great points at the event today. Also, I love travel as well! Looking forward to connecting. -Jason
Powered by Hio
Close

First time visit to chat

First time visit to chat, after at least one
message has been sent

Event Chat

Hio uses profanity blockers amongst other
tools aimed to ensure a safe experience
for you. To learn more, go here.         ✕

Patrick Edwards  12:22PM
Hi everyone, I'm Patrick, excited to hear
Mickey speak next week.
5  4  2

Harold Pierce   12:22PM
Hey all. I signed up for this lecture
because I'm doing a research study on
LEGO's. I can't wait to hear more about the
recent developments with the new piece.
5  4  2
↳ 2 replies Pick a conversation starter            ⌃

Write a message                      ☺ ⊕

3 online

Powered by Hio                    Close

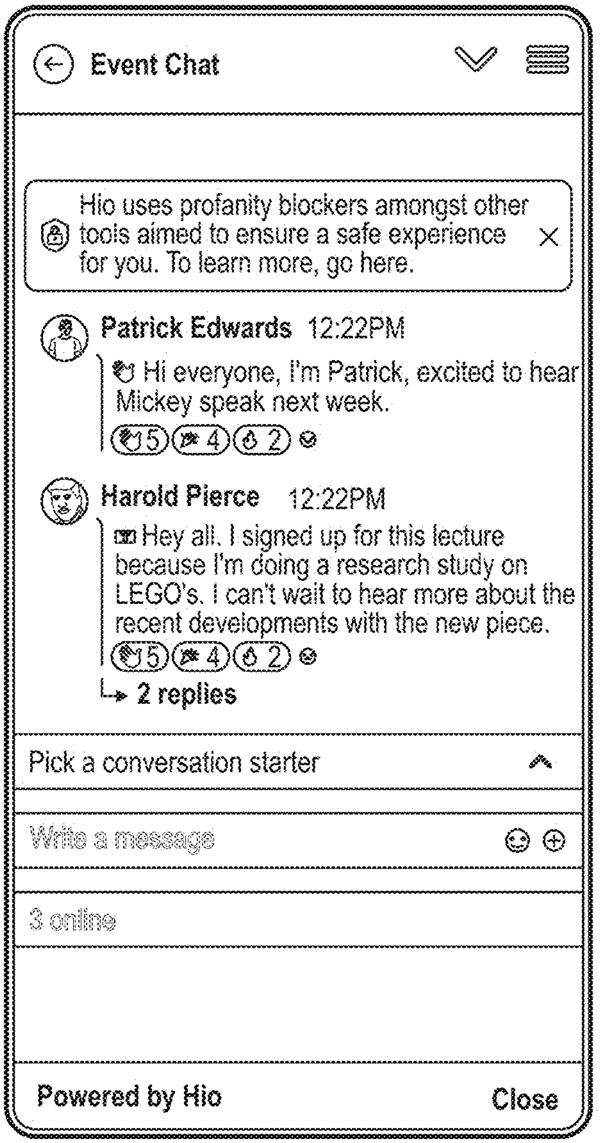

FIG. 10C openpositions 🏁          Report issue          ✕

─────────────────── Friday, October 30

👤 Patrick Edwards  12:22PM
  ✋ Hi everyone, I'm Patrick, excited to hear Mickey speak next week.

👤 Harold Pierce   12:22PM
  Hey all. I signed up for this lecture because I'm doing a research study on LEGO's. I can't wait to hear more about the recent developments with the new piece.
  ↳ 2 replies

Write a message                    ☺ ⊕
                    Isla is Typing...

---

← Forums          ⌄ ☰

Search Forums          🔍 inthenews ☐ crazyideas ♀ openpositions 🏁 introduceyourself 🖐

Powered by Hio                    Close

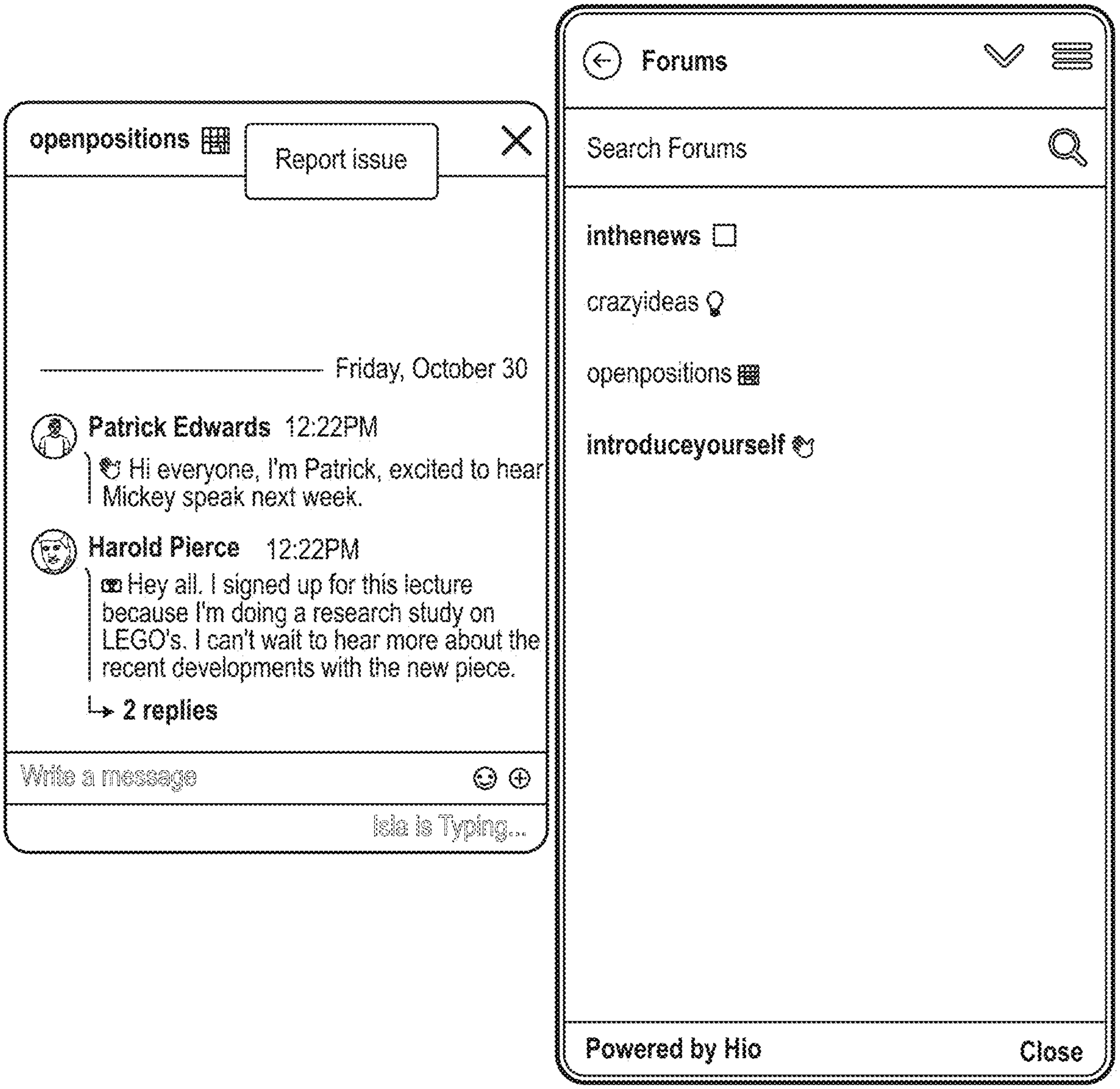

FIG. 10D

Basic information

Hovr name          My Hovr                                    ∧

Hovr URL           https://myhovrisamazing.com                ∧

Hovr type          Engagement                                 ∧

Brand Color        �damaging                                   ∧

Code snippet

```
<script id= "hio - script-identifier" defer src= "https ://plugin.hiosocial.com/
bundle.js" data-id="1"></script>
```

Copy code

1401G1

1402H

1402Q

INFORMATION UTILIZED TO LOCATE ELEMENT

| Stored information to find elements | |
|---|---|
| Attribute Map | map of HTML attributes for user selected HMTL node we want to attach to |
| Attribute Map for Mobile | map of HTML attributes for user selected HMTL node we want to attach to on mobile |
| Attribute Map for closest strongest element | map of HTML attributes for an element that we programmatically determine is an element that is easier for us to locate via node id or another unique attribute |
| Attribute Map for closest strongest element mobile | map of HTML attributes for a mobile element that we programmatically determine is an element that is easier for us to locate via node id or another unique attribute |
| class name | css class name of the HTML node the user selected |
| class name mobile | css class name of the mobile HTML node the user selected |
| class name closest strongest element | css class name of the HTML node we determine as element that we programmatically determine is an element that is easier for us to locate via node id or another unique attribute |
| class name closest strongest mobile element | css class name of the mobile HTML node we determine as element that we programmatically determine is an element that is easier for us to locate via node id or another unique attribute |
| local Name | A string representing the local part of the element's qualified name of the HTML node the user selected |
| local Name | A string representing the local part of the element's qualified name of the HTML node the user selected |
| local Name Mobile | A string representing the local part of the element's qualified name of the Mobile HTML node the user selected |
| localname closest strongest element | A string representing the local part of the element's qualified name of the HTML node we determine as element that we programmatically determine is an element that is easier for us to locate via node id or another unique attribute |
| localName closest strongest mobile element | A string representing the local part of the element's qualified nameof the mobile HTML node we determine as element that we programmatically determine is an element that is easier for us to locate via node id or another unique attribute |
| node id | Unique id of the HTML node the user selected |
| node id mobile | Unique id of the mobile HTML node the user selected |
| node id for closest strongest element | Unique id of the HTML node we determine as element that we programmatically determine is an element that is easier for us to locate via node id or another unique attribute |
| node id for closest strongest mobile element | Unique id of the mobile HTML node we determine as element that we programmatically determine is an element that is easier for us to locate via node id or another unique attribute |
| tag name | Type of tag of the HTML node the user selected |

FIG. 15A

| | |
|---|---|
| tag name mobile | Type of tag of the mobile HTML node the user selected |
| tag name for closest strongest element | Type of tag of the HTML node we determine as element that we programmatically determine is an element that is easier for us to locate via node id or another unique attribute |
| tag name for closest strongest mobile element | Type of tag of the mobile HTML node we determine as element that we programmatically determine is an element that is easier for us to locate via node id or another unique attribute |
| xPath to element | xPath from the HTML node the user selected to the very top of the HTML document |
| xPath to mobile element | xPath from the mobile HTML node the user selected to the very top of the HTML document |
| xPath from closest strongest element | xPath from the HTML node the user selected to the HTML node we determine as element that we programmatically determine is an element that is easier for us to locate via node id or another unique attribute |
| xPath from closest strongest mobile element | xPath from the mobile HTML node the user selected to the mobile HTML node we determine as element that we programmatically determine is an element that is easier for us to locate via node id or another unique attribute |

FIG. 15B

TRIGGERS

1802
ENABLE AND RECEIVE SELECTION OF ELEMENT TO BE USED AS TRIGGER POINT

Image 3A

1804
ENABLE AND RECEIVE CONTENT SELECTION

Image 3B

1806
STORE CONFIGURATION DATA

1808
ADD OBSERVER TO ELEMENT

1810
RENDER CONTENT IN RESPONSE TO TRIGGER ACTIVATION

Image 3C

Anchors

1902
ENABLE AND RECEIVE SELECTION
OF ELEMENT TO BE USED AS
ANCHOR POINT

Image 1D

1904
ENABLE AND RECEIVE
CONTENT SELECTION

Image 1D

1906
ENABLE AND RECEIVE
CUSTOMIZATIONS

Image 1E

1908
STORE CONFIGURATION DATA

1910
ADD CUSTOM ELEMENT(S) TO
HTML NODE AND DETERMINE
POSITION OF CUSTOM ELEMENT(S)

1912
RENDER CONTENT IN
RESPONSE TO USER
INTERACTION WITH ANCHOR

Image 4A

MOBILE PREVIEW

2002
Admin user A wants to preview what moments look like on mobile - clicks mobile device preview option 2004
API call to our backend to run puppeteer - a library to server side render the current website that we are on 2006
Once loaded on server side - copy the HTML of the website and serve it onto a URL that we can access from our frontend 2008
URL gets passed back to front end and iframed in as mobile experience Image 5A

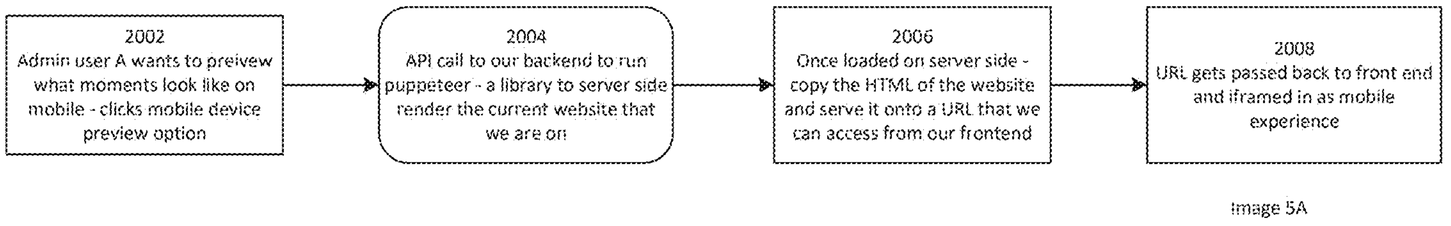

FIG. 20

PRODUCT ANCHORS

2102
USE API TO INGEST PRODUCT IDENTIFIERS AND ASSOCIATE PRODUCT IDENTIFIERS WITH PRODUCT IMAGE URLS

2104
RECEIVE TEMPLATE DEFINITION

Image 6A

2106
IDENTIFY IMAGE URLS THAT MATCH TEMPLATE AND UTILIZE TEMPLATE TO DELIVER CONTENT

Image 6B

FIG. 29
hovr
THE POWER OF YOUTUBE ON YOUR WEBSITE
Create powerful moments with your site visitors.
Book your demo today

METHODS AND SYSTEMS FOR MULTIMEDIA COMMUNICATION WHILE ACCESSING NETWORK RESOURCES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to enabling users accessing a network resource to communicate with each other.

Description of the Related Art

Users accessing a network resource, such as a website, often do so in isolation. To the extent that a website may enable users to collaborate, such collaboration often necessitates prior scheduling among participants. Further, each website that offers such collaboration conventionally requires its own collaboration system, each with their own user experience, making it challenging for users to adapt to and adequately utilize such collaboration and associated communication tools. Further, conventional collaboration tools lack many desirable communication features.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a communication system configured to enable users to communicate with each, the communication system comprising: a network interface; at least one processing device operable to: detect, via data received from a first user device over a network using the network interface, when a first user is accessing via a first browser a third party website operated a first entity different than the entity operating the communication system; detect, via data received from a second user device using the network interface, when a second user is accessing via a second browser the third party website concurrently with the first user accessing the third party website; transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device; transmit data to the second user device configured to cause, at least in part, an interface to be displayed on the second user device indicating that the first user is currently accessing the third party website and enabling the second user to initiate a transmission of a text, image, and/or video communication to the first user device; at least partly in response to the first user activating the first communication control, cause, at least in part, a communication channel to be established between the first user device and the second user device and enable the first user and the second user to communicate using the communication channel established between the first user device and the second user device; detect, via data received from a third user device using the network interface, when a third user is accessing via a third browser a second website operated a second entity different than the entity operating the communication system and different than the first entity; detect, via data received from a fourth user device using the network interface, when a fourth user is accessing via a fourth browser the second website concurrently with the third user accessing the second website; transmit data to the third user device configured to cause, at least in part, an interface to be displayed on the third user device indicating that the fourth user is currently accessing the second website and enabling the third user to initiate, via a third communication control, a transmission of a text, image, and/or video communication to the fourth user device; transmit data to the fourth user device configured to cause, at least in part, an interface to be displayed on the fourth user device indicating that the third user is currently accessing the second website and enabling the fourth user to initiate a transmission of a text, image, and/or video communication to the third user device; and at least partly in response to the third user activating the third communication control, cause, at least in part, a communication channel to be established between the third user device and the fourth user device and enable the third user and the fourth user to communicate using the communication channel established between the third user device and the fourth user device.

An aspect of the present disclosure relates to a computerized method, the method comprising: detecting at a computer system, via data received from a first user device over a network, when a first user is accessing via a first browser a third party website operated a first entity different than the entity operating the computer system; detecting using the computer system, via data received from a second user device over the network, when a second user is accessing via a second browser the third party website concurrently with the first user accessing the third party website; transmitting data using the computer system to the first user device configured to cause, at least in part, an interface to be displayed on the first user device indicating that the second user is currently accessing the third party website and enabling the first user to initiate, via a first communication control, a transmission of a text, image, and/or video communication to the second user device; transmitting data using the computer system to the second user device configured to cause, at least in part, an interface to be displayed on the second user device indicating that the first user is currently accessing the third party website and enabling the second user to initiate a transmission of a text, image, and/or video communication to the first user device; and at least partly in response to the first user activating the first communication control, enabling the first user and the second user to electronically communicate over the network.

An aspect of the present disclosure relates to a non-transitory computer readable memory having program instructions stored thereon that when executed by a computer system device cause the computer system to performing operations comprising: detect, via data received from a first user device, when a first user is accessing, via a first browser, a third party website; detect, via data received from a second user device, when a second user is accessing via a second browser the third party website concurrently with the first user accessing the third party website; transmit data to the first user device configured to cause, at least in part, an interface to be displayed on the first user device indicating that the second user is currently accessing the third party website and enabling the first user to initiate, via a first communication control, a transmission of a text, image, and/or video communication to the second user device; transmit data to the second user device configured to cause, at least in part, an interface to be displayed on the second user device indicating that the first user is currently accessing the third party website and enabling the second user to initiate a transmission of a text, image, and/or video communication to the first user device; and at least partly in response to the first user activating the first communication control, enable the first user and the second user to electronically communicate.

An aspect of the present disclosure relates to a system comprising a network interface; at least one processing device operable to: receive an indication that an anchor is to be positioned at a first location on a first webpage; receive a content specification associated with the anchor; receive an interaction rule associated with the anchor, wherein the interaction rule comprises a rule that content specified by the content specification is to be displayed at least partly in response to the first webpage being scrolled to a first position; receive a timing rule associated with the anchor; render a preview of the first webpage with the anchor at the first location of the previewed first webpage; automatically generate code configured to cause the anchor to be visible in accordance with the timing rule at the first location of the first webpage when accessed by a user browser; and at least partly in response to activation of a publication control, enable the code to be embedded in the first webpage, wherein the first webpage is a preexisting webpage; wherein, at least partly in response to a first user browser of a first user device accessing the first webpage, and the first user scrolling the webpage to the first position, the content specified by the content specification is rendered. Optionally, the automatically generated code comprises a script id and an src. Optionally, the first location comprises an HTML element. Optionally, the first location is offset in a specific direction by a specific amount from an HTML element. Optionally, the operations further comprise: automatically generating second code configured to be embedded in a second webpage, the automatically generated code configured to display a user interface in conjunction with the second webpage, the user interface providing: access to a first content library defined by a first entity; a notification regarding a timing of a real-time audio-video broadcast; a view of the real-time audio-video broadcast; an identification of other users viewing the real-time audio-video broadcast; and a communication interface enabling the user to engage in real time communication with one or more of the other users viewing the real-time audio-video broadcast. Optionally, the operations further comprise: enabling a user interface to be displayed in conjunction with a second webpage, the user interface providing: a notification regarding a timing of a real-time audio-video broadcast; a view of the real-time audio-video broadcast; an identification of other users viewing the real-time audio-video broadcast; and a communication interface enabling the user to engage in real time communication with one or more of the other users viewing the real-time audio-video broadcast. Optionally, the operations further comprise: enabling a user interface to be displayed in conjunction with a second webpage, the user interface enabling: a host to conduct a real-time audio-video broadcast, wherein the real-time audio-video broadcast is configured to be broadcast to a plurality of receiving devices; the host to view users associated with the plurality of receiving devices; the host to designate at least one of the users associated with the plurality of receiving devices as a co-host; and enable the co-host to unmute the co-host's microphone and to stream, within the real-time audio-video broadcast, speech of the co-host.

An aspect of the present disclosure relates to a computerized method, the method comprising: receiving an indication that an anchor is to be positioned at a first location on a first webpage; receiving a content specification associated with the anchor; receiving an interaction rule associated with the anchor, wherein the interaction rule comprises a rule that content specified by the content specification is to be displayed at least partly in response to the first webpage being scrolled to a first position; rendering a preview of the first webpage with the anchor at the first location of the previewed first webpage; automatically generating code configured to cause the anchor to be visible at the first location of the first webpage when accessed by a user browser; and at least partly in response to activation of a publication control, enabling the code to be embedded in the first webpage; wherein, at least partly in response to a first user browser of a first user device accessing the first webpage, and the first user scrolling the webpage to the first position, the content specified by the content specification is rendered. Optionally, the automatically generated code comprises a script id and an src. Optionally, the first location comprises an HTML element. Optionally, the first location is offset in a specific direction by a specific amount from an HTML element. Optionally, the method further comprises: automatically generating second code configured to be embedded in a second webpage, the automatically generated code configured to display a user interface in conjunction with the second webpage, the user interface providing: access to a first content library defined by a first entity; a notification regarding a timing of a real-time audio-video broadcast; a view of the real-time audio-video broadcast; an identification of other users viewing the real-time audio-video broadcast; and a communication interface enabling the user to engage in real time communication with one or more of the other users viewing the real-time audio-video broadcast. Optionally, the method further comprises: enabling a user interface to be displayed in conjunction with a second webpage, the user interface providing: a notification regarding a timing of a real-time audio-video broadcast; a view of the real-time audio-video broadcast; an identification of other users viewing the real-time audio-video broadcast; and a communication interface enabling the user to engage in real time communication with one or more of the other users viewing the real-time audio-video broadcast. Optionally, the method further comprises: enabling a user interface to be displayed in conjunction with a second webpage, the user interface enabling: a host to conduct a real-time audio-video broadcast, wherein the real-time audio-video broadcast is configured to be broadcast to a plurality of receiving devices; the host to view users associated with the plurality of receiving devices; the host to designate at least one of the users associated with the plurality of receiving devices as a co-host; and enable the co-host to unmute the co-host's microphone and to stream, within the real-time audio-video broadcast, speech of the co-host.

An aspect of the present disclosure relates to a non-transitory computer readable memory having program instructions stored thereon that when executed by a computer system device cause the computer system to performing operations comprising: receiving an indication that an anchor is to be positioned at a first location on a first webpage; receiving a content specification associated with the anchor; receiving an interaction rule associated with the anchor, wherein the interaction rule comprises a rule that content specified by the content specification is to be displayed at least partly in response to the first webpage being scrolled to a first position; rendering a preview of the first webpage with the anchor at the first location of the previewed first webpage; automatically generating code configured to cause the anchor to be visible at the first location of the first webpage when accessed by a user browser; and at least partly in response to activation of a publication control, enabling the code to be embedded in the first webpage; wherein, at least partly in response to a first user browser of a first user device accessing the first webpage, and the first user scrolling the webpage to the first position, the content specified by the content specification is rendered. Optionally, the automatically generated code comprises a script id and an src. Optionally, the first location comprises an HTML element. Optionally, the first location is offset in a specific direction by a specific amount from an HTML element. Optionally, the operations further comprise: generating second code configured to be embedded in a second webpage, the automatically generated code configured to display a user interface in conjunction with the second webpage, the user interface providing: access to a first content library defined by a first entity; a notification regarding a timing of a real-time audio-video broadcast; a view of the real-time audio-video broadcast; an identification of other users viewing the real-time audio-video broadcast; and a communication interface enabling the user to engage in real time communication with one or more of the other users viewing the real-time audio-video broadcast. Optionally, the operations further comprise: enabling a user interface to be displayed in conjunction with a second webpage, the user interface providing: a notification regarding a timing of a real-time audio-video broadcast; a view of the real-time audio-video broadcast; an identification of other users viewing the real-time audio-video broadcast; and a communication interface enabling the user to engage in real time communication with one or more of the other users viewing the real-time audio-video broadcast. Optionally, the operations further comprise: enabling a user interface to be displayed in conjunction with a second webpage, the user interface enabling: a host to conduct a real-time audio-video broadcast, wherein the real-time audio-video broadcast is configured to be broadcast to a plurality of receiving devices; the host to view users associated with the plurality of receiving devices; the host to designate at least one of the users associated with the plurality of receiving devices as a co-host; and enable the co-host to unmute the co-host's microphone and to stream, within the real-time audio-video broadcast, speech of the co-host.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIGS. 4A-4E2 illustrates various aspects of systems, applications, and processes.

FIGS. 15A-15B illustrate an example table of information that may be utilized to locate a webpage element.

FIGS. 16-23B illustrate example processes.

DETAILED DESCRIPTION

Figure 1A:
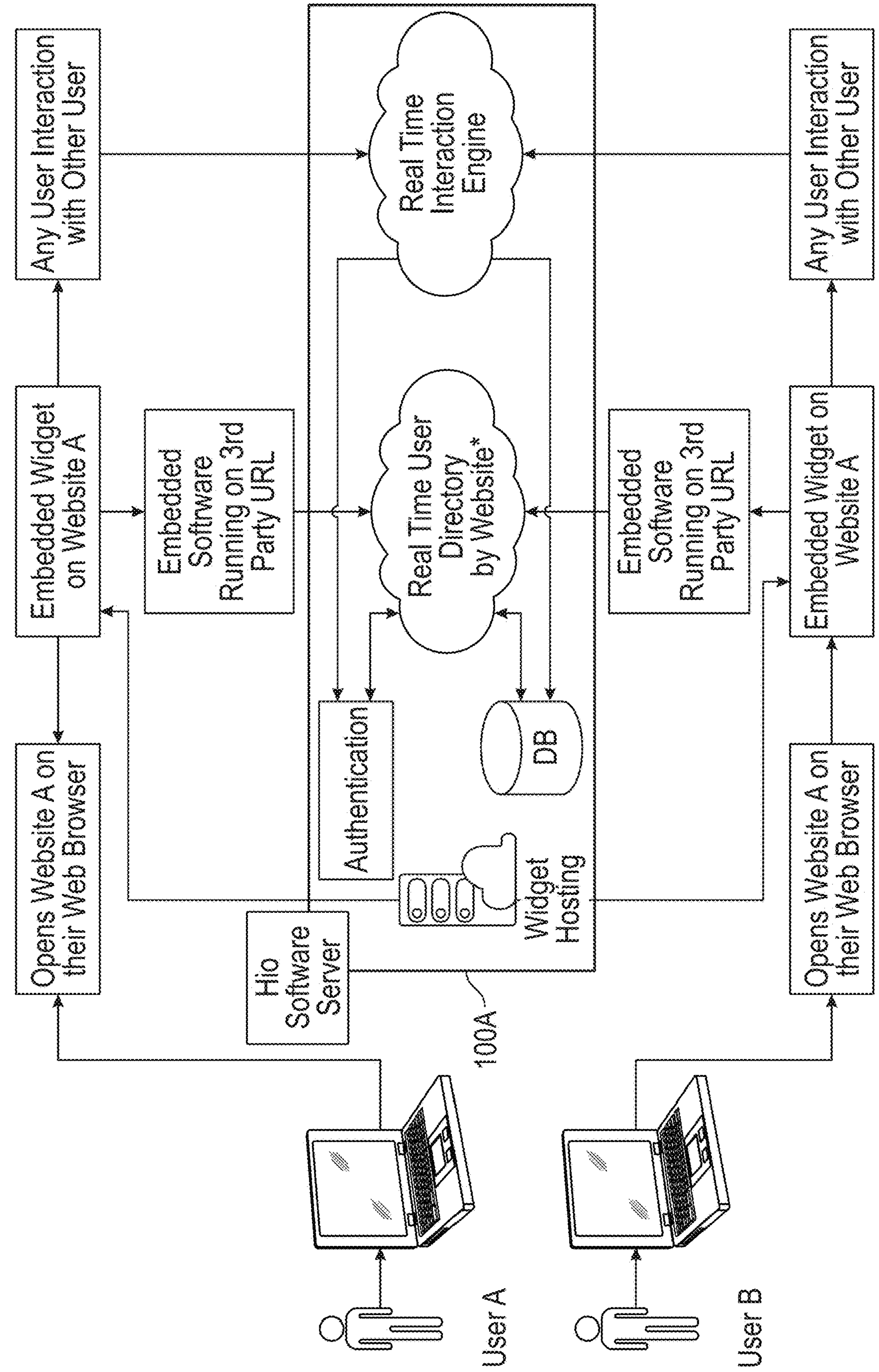
FIG. 1A illustrates an example architecture.

An aspect of the present disclosure relates to enhancing network resource (e.g., website) real time engagement, content streaming, navigation, communication, and online communities.

As described herein, optionally a customizable web experience can be defined by an administrator or other authorized entity without manual coding. An aspect of the present disclosure relates to improving user registration rates to thereby further enhance such real time engagement, navigation, content streaming, and communication. An aspect of the present disclosure relates to generating analytics using registration data (e.g., age, location, income, education, other demographic data, user specified subject preferences, brand preferences, and/or other user preferences), user engagement data, user navigation data, and/or user communication data. For example, such analytics may include time on webpage, time on website, number of page views, purchase intent, retention, brand affinity, and/or the like.

An aspect of the present disclosure relates to a user interface that may optionally be accessed by a given third party website via the insertion/embedding of code (e.g., automatically generated code). Such code may be used to generate other user interfaces and provide functionality described herein. The user interface may be accessed by an end user device (e.g., a desktop computer, laptop computer, smart phone, networked television, networked game console, networked wearable device, and/or the like) via a webpage of the website, where the webpage may be accessed and presented by a browser hosted on the user device. Such user interface enables the third party to stream live and/or prerecorded video, audio, and/or text via the user interface to a user accessing a preexisting webpage, optionally without have to manually write any new code). The content may be pushed to the user via a user notification (e.g., a pop-up, scrolling text, highlighting of content, and/or otherwise) and/or via an automatic presentation of the content to the user. Optionally, a natural language machine learning engine may analyze chat sentiment in a community chat and use such sentiment to select and push relevant content.

Such push operation may optionally be performed in response to the user scrolling to/through a visible or non-visible anchor specified by an authorized entity or any user if so permitted by the website operator. Optionally, a given anchor (sometimes referred to herein as a breadcrumb or digital breadcrumb) may be associated with an application programming interface (API) which pulls data from a content source, such as a social media site, microblogging site, video content sharing site, audio content sharing site, or other source specified by the authorized entity.

Optionally, an anchor may have a specified start time and/or end time, wherein the associated content will only be pushed and/or be accessible within the specified start time and end time, or if an end time is not specified, any time after the specified start time unless such anchor is removed. Such anchor may ensure that the pushed content is provided in a useful context, such as ensuring the pushed content is directly related to webpage content currently being displayed to the user. Such context will enhance the user experience and make it more likely the user will further engage with the webpage and website.

Optionally, an anchor may be associated with one or more rules which may control which content is displayed to which viewer. Hence, a given user may be provided with a customized engagement experience when accessing a webpage. For example, a rule may specify that a given item of content is to be pushed to a user having certain subject and/or brand preferences and optionally not to other users. In addition or instead, a rule may specify that a given item of content is to be pushed to a user having certain demographics (e.g., a certain age range, certain locations, certain estimated income, certain family situation, etc.) and optionally not to other users.

Optionally, an anchor may be displayed (e.g., as a graphic, text, photograph, a highlighting of webpage text or graphic/image content, or otherwise) on a webpage, optionally independent of a user's interaction with the webpage. Optionally, an anchor may be displayed in response to a user hovering a cursor over or clicking on/selecting a specified area (e.g., where the anchor is positioned) or webpage HTML element. Optionally, more than one anchor may be defined for and displayed by a given webpage.

Optionally, a user interface may be provided which enables an entity setting the anchor to specify a location on a webpage at which the anchor is to be located. Optionally, the user interface enables a user to drag and drop an anchor from an anchor menu to any desired location on the webpage. Optionally, the user interface may enable the user to drop the anchor on a webpage HTML element (e.g., an element defined by a start tag, some content, and an end tag). Optionally, the user interface may enable the user to drop the anchor on a webpage HTML element with a specified left, right, top, or bottom offset, wherein the anchor may be placed in accordance with the specified offset(s) from the HTML element.

Optionally access may be provided to a search engine. A user interface search field may be provided to a user device via which a user can enter a search term to search for an item of content. The search engine may compare the search term with tags associated with items of content (e.g., in a content library) to identify matches. The matching items of content may be displayed on the user device via a search results user interface in ranked order. The user may then associate an anchor on a webpage with a selected item of content identified in the search results by activating a corresponding control (e.g., a control that causes the anchor to be linked to the selected item of content). The selected item of content may then be displayed in context as discussed above.

Optionally, the anchor may be caused to be displayed in a webpage via automatically generated code that is embedded in the webpage.

An aspect of the present disclosure relates to a content library that may be accessed via a user interface overlaying a website webpage. The user interface may be generated by the embedded automatically generated code discussed herein. For example, the user interface may overlay a webpage presented by a browser on an end user device. Optionally, a live content presentation (e.g., a video, audio, and/or text content presentation) may be archived and tagged and included in a library of content associated with the third party. Optionally, a library user interface may be provided on/overlaying the webpage via which the user can scroll through the content library and/or search the content library, and access and play back a selected item of content from the content library. For example, the content library may be specified by the owner of the website or of a brand.

Optionally, a control may be provided that enables a user to share an item of pushed content (e.g., via email, short messaging, social media, or otherwise)

An aspect of the present disclosure relates to a system that tracks which users currently are accessing, via their respective user devices, a given item of such pushed content. A user interface (e.g., generated using the embedded code) may be displayed on a given user device that indicates how many and/or which other users are currently accessing the content. For example, the user interface may display names, aliases, photographs, and/or avatars of other users currently having the content streamed to their devices and/or of content speakers and moderators. A user interface (e.g., generated using the embedded code) is optionally provided that identifies who is on a speaker panel for a given item of content. A chat user interface (e.g., generated using the embedded code) is optionally provided via which users can view and/or engage in chat with other content consuming users and/or with a speaker/moderator. Optionally, controls are provided (e.g., generated using the embedded code) via which a user can rate (e.g., on a scale of 1-5) or provide a like or dislike indication regarding an item of content. Optionally, such rating and/or indication may be displayed on other users currently accessing the content or to later users (e.g., accessing a content library in which the rated content is stored).

Optionally, the user interface(s) provided via the automatically generated code are displayed on a user device even as the user navigates to different webpages of the website.

An aspect of the present disclosure relates to an activity feed user interface via which users may communicate with each other (e.g., via video, audio, and/or text communications, such as via direct messaging) and/or share existing (e.g., prerecorded) video, audio, and/or text content. Optionally, a control may be provided via which an administrator may enable or disable inter-user communication (e.g., via direct messaging) and/or a control may be provided via which an end user may inhibit or enable other end users to communicate with (e.g., send a direct message) to the end user.

An aspect of the present disclosure relates to enabling an authorized entity to specify custom user interface tiles to be displayed via the user interface overlaying the website webpages. For example, tiles may be specified via the custom tiles user interface that provide advertisements, coupons, how-to content, news content, and/or other content from a specified source. The content may be dynamic content and/or static content (such as an RSS (Really Simple Syndication) feed, content that refers to (e.g., links to) other content which will be displayed via the activity feed). The custom tile user interface enables the administrative user to edit and/or change cards that are in a content carousel, can specify a carousel rotation timing, to view all cards in the carousel at the same time (e.g., in a pop-up window or another pane). Optionally, a control may be provided via which the user may specify that an artificial intelligence learning engine is to be used to select content for a given tile or carousel based on the number of clicks on content, the number of views of content, user demographic data, user preferences and interests (e.g., hobbies, preferred types of literature, preferred clothing brands, preferred clothing styles, preferred movies, preferred sports, preferred sports teams, etc.), links (e.g., URLs) to one or more social networks presences/pages of the given user, user interaction or failure to interact with content or controls, and/or other data (e.g., which may be used to authenticate a user, to identify a user to other users, to determine a user's interests, and/or for other purposes).

An aspect of the present disclosure relates to systems and processes configured to identify when two or more users are accessing the same or similar network resources. By way of non-limiting example, the network resource may be a static or dynamic online document, such as a webpage, or webpages associated with the same second level domain of a website (although the webpages may be at different subdirectories or different sub domains). The identification that two or more users are accessing the same or similar network resources may be performed by a remote and/or different system (which may be at times referred to herein as a multimedia communication system) than the web server hosting the website being accessed by the users. The multimedia communication system may be operated by a different entity than the entity that operates the website.

The multimedia communication system may instantiate an application, such as a widget application, on a network resource.

Upon detecting that two or more users are concurrently accessing the same network resource (e.g., a website or a specific webpage on a website), the multimedia communication system may cause the widget on a given user device to display to the given user identifiers associated with the other users. The given user may access profile information associated with the other users, may direct message with the other users, may interact with other users view threaded conversations, and perform other functions described herein. As will be described, although a widget application may be used to provide certain functionality, other techniques may be used, such as a browser extension or direct integration into a website.

Optionally, upon detecting that two or more users are accessing the same network resource (using respective user devices, such as a desktop computer, laptop computer, smart phone, networked television, networked game console, networked wearable device, and/or the like), the multimedia communication system may transmit a communication to the users (e.g., via the widget application instantiated on respective user devices) requesting permission to inform the other users accessing the network resource of the concurrent access and requesting permission of a given user to enable communications with other users concurrently accessing the network resource. Optionally, a given user may prospectively grant permission to notify selected users or all users (e.g., during an account creation process or via a terms of use interface, which may include a corresponding opt-in interface) when they are concurrently accessing a network resource with the given user of such concurrent access and may grant permission to enable communications with the given user.

Where the multimedia communication system enables a given user to selectively specify which other users are to be informed that the given user is concurrently accessing a network resource (as opposed to all users), the system optionally may enable the given user to upload identification, contact and/or other data of other users for which such permissions are being granted. The uploaded data may include a unique identifier generated by or on behalf of the multimedia communication system, where the multimedia communication system may transmit respective unique identifiers to the corresponding users. The users may in turn share their unique identifier with other users, who may utilize received unique permissions to grant the foregoing permissions.

Optionally, a given user may grant such permissions to other users that the given user is connected to (e.g., friends with, linked to, etc.) on or more specified social media or content sharing websites. For example, a given user may grant the multimedia communication system access to the given user's connections on one or more platforms, and the multimedia communication system may access and utilize such connections in determining who may be informed that the given user is concurrently accessing a network resource.

Optionally, when a user accesses a network resource, the user may be prompted to grant the foregoing permissions with respect to any other users concurrently accessing the network resource.

Once permission has been granted (where permission may be affirmatively granted as discussed above or granted by simply accessing the network resource or the communication services), the multimedia communication system may enable corresponding users concurrently accessing a network resource to communicate via one or more communication channels using interfaces provided via a widget application. Such communication channels may include video, audio, text, and/or screen sharing. For example, users may be enabled by the multimedia communication system to initiate and conduct video chat conferences with multiple selected other users, where an audio/video feed (e.g., of the user's voice and face) from a microphone and camera of a user device (e.g., a front facing phone, laptop, tablet, or desktop computer) may be streamed to devices of other users for video and/audio playback. In addition or instead, users may be enabled to communicate via text and/or graphics (e.g., emojis) and/or just with voice. Further, users may be enabled to share content (e.g., documents, such as text documents, video content, audio content, still images, links, etc.) with each other.

Optionally, each user concurrently accessing a common network resource is provided (e.g., via the widget application) identity information for the other users (where the identity information may include a corresponding user name, alias, photograph, avatar, email address, phone number, device name, and/or the like). Such identification information may be transmitted to the user devices and presented in a list (e.g., using a widget interface).

Optionally, a user can be prompted to view content or to register to enable user communication widget features based on one or more criteria. The prompt may be triggered based on user characteristics and/or user navigation behavior.

Examples of navigation triggers may be detecting the a user has been on a certain webpage for at least a threshold period of time (e.g., 3 seconds, 5 seconds, 10 seconds, 30 seconds, or other threshold period of time), that the user has scrolled at least to a first position in the webpage, that the user is exiting the webpage or website, that the user has clicked on (or otherwise selected) a content item on the webpage, a previous site or webpage visited by the user, and/or the like.

Example user characteristics may include whether the user is a registered user of the website operator or is not a registered user of the website operator. Further example user characteristics may include the user's physical location. By way of example, the user's location which may be determined: using a geolocation application programming interface (API) where the user is prompted to provide the user's location; the user's Internet Protocol (IP) address; by detecting the user's time zone using a JavaScript Intl API; and/or otherwise. Other user characteristics may include determined demographic data (e.g., age, income, education) and interests.

By way of illustration, in response to a detected trigger, a pop-up or other notification may be presented, indicating that a person (e.g., a celebrity, an actor, an athlete) that is determined to be of possible or likely interest to the user (which interest may be determined based on the user's characteristics) will be conducting a text, audio, or audio/video online chat with users of the communication widget of the website at a specified time (e.g., in the next 5 minutes). The notification may include a countdown timer which counts down to the chat event. The chat event may be accessible via the communication widget for the website. Optionally, the user may be prompted to or required to become a registered user in order to access and participate in the chat.

Other examples of content that may be provided include pre-recorded or live one-way text, audio, and/or audio video content.

The detection of a user's access of a website may be performed using access detection and communication code (e.g., JavaScript) embedded in a website's webpage. For example, optionally the same operational access detection and communication code may be embedded in different webpages of different websites operated by different, unrelated entities (although the code may be modified for each website to include a unique identifier associated with the website) and may optionally provide a functionally common interface with respect to the different websites (although each website may optionally have its own branding and may disable or enable certain functions).

Optionally, in addition or instead, a browser extension may be added to a user's browser (e.g., by the user accessing and installing the extension from a browser extension library or otherwise) that detects when a user is accessing a given website or webpage and that enables user communication over one or more channels and other functionality described herein. Optionally in addition or instead, a dedicated application (which may be referred to as an app) may be downloaded (e.g., from an app store) to a user device that detects when a user is accessing a given website or webpage and that enables user communication over one or more channels and other functionality described herein. Optionally, the functionality may be integrated into a given website.

Advantageously, to further enhance security, optionally the third party website may be inhibited from accessing authentication data associated with the multimedia communication system, and the multimedia communication system may be inhibited from accessing the authentication data associated with a third party website.

In order to further enhance and promote communication among users concurrently accessing a network resource, such as a website, user profile information may be shared. Optionally, a user profile may be generated which may include user identification data (e.g., first name, last name; first name and just first letter of last name; an alias; an avatar or photograph, etc.), a user's mobile/cell phone number, user biographical information (e.g., career data, educational institutions attended, etc.), background data, location, demographic data (e.g., gender, age, income, level of education, marital status, number of children, etc.), user preferences and interests (e.g., hobbies, preferred types of literature, preferred clothing brands, preferred clothing styles, preferred movies, preferred sports, preferred sports teams, etc.), links (e.g., URLs) to one or more social networks presences/pages of the given user, and/or other data (e.g., which may be used to authenticate a user, to identify a user to other users, to determine a user's interests, and/or for other purposes). The user may specify which user profile data may be shared with other users as a public profile.

When a given user accessing a network resource is detected, some or all of the given user's data may be presented to other users concurrently accessing the network resource (e.g., all users, those permitted by the given user to access the given user's data, those that have opted in to receive such data, etc.). For example, initially, an identifier of the given user (e.g., first name and first letter of last name, alias, etc.) may be displayed on respective devices of other users. A user viewing such identifier may indicate that additional information is desired (e.g., by pointing at the identifier, such as my touching the identifier if the identifier is displayed via a user device touch display, or by hovering over or clicking the identifier using a cursor being navigated using a mouse, trackpad, stylus, or other pointing device). For example, such additional information may include biographical data, background data, location data, interest data, and/or the like. The additional information may include some or all of the profile data in the public profile defined by the given user. Optionally a user may request that the given user permit access to specified other data of the given user (e.g., location information or when the given user intends to access a given network resource), which the given user may grant or deny.

Optionally, rather than storing user profile information and the like, a user may provide the multimedia communication system with a link to such information accessible on a third party site (e.g., a publicly accessible social media page of the user). The multimedia communication system may then share the link with other users concurrently accessing a network resource, via which such other users may access and view the user profile information.

Optionally, a user or system generated password is not used to authenticate a user (e.g., when accessing the given user' account, creating or editing the given user's profile, etc.). Instead, the given user's mobile phone number may be used to authenticate the given user.

Optionally, when users concurrently accessing a network resource want to share content, rather than passing actual content (e.g., documents) to each other, users can share a link to such content (e.g., where such content is hosted on a cloud system or elsewhere).

Thus, security may be enhanced by optionally avoiding the storage of very sensitive user information (such as user or system generated passwords) on the multimedia communication system. Further, rather than storing user documents and/or user profile information, the multimedia communication system may transmit links to such user documents and user profile information stored on third party systems (e.g., social networking systems, cloud-based document sharing systems, etc.), thereby further enhancing security. Thus, even if a hacker gained improper access to the multimedia communication system, the hacker would not find user or system generated passwords, documents, and/or user profile information stored on the multimedia communication system.

As will be described, the multimedia communication system may enable users to establish preferred network connections with selected other users, where non-public data may be shared amongst preferred network connections. Further, as will be described, threaded communication channels may be established for different subjects that enable users to post messages and access such posted messages.

Certain aspects will now be discussed with reference to the figures.

FIG. 1A illustrates an example architecture. A multimedia communication server system 100A may include a widget hosting service that hosts the widget code discussed elsewhere herein that provides services and user interfaces described herein. When a user accesses a third party website webpage (associated with a corresponding URL) via a client on a user device, the user may be authenticated and the corresponding widget may be embedded on the accessed third party webpage to provide the user interfaces and functionality described herein. The embedded widget may also communicate with embedded software running on the third party URL. A real time third party user directory may identify users that are concurrently accessing the website and/or the specific webpage. Such a user directory may be used to indicate to a given user other users that are concurrently accessing the website and/or the specific webpage, and may identify which of such other users are "connected" to the given user. The real time directory may access data discussed herein from a database and/or may store data in the database.

A real time interaction engine may detect users' interactions with the widget and widget user interfaces (such as those described herein), and take appropriate action, such as the actions described herein. For example, the real time interaction engine may detect and act on requests by one user to be connected to another user, may communicate direct messages from one user to another user, may post a user's message to a thread specified by the user, may access and provide archived messages in response to a user request, may access and provide user profile information is response to the given user pointing at a corresponding user profile, and/or the like. The real time interaction engine may access data discussed herein from a database and/or may store data in the database.

The multimedia communication server system 100A may be implemented as a cloud-based system and the processes described herein may be performed in whole or in part by a secure hosted computing environment that includes a collection of physical computing resources that may be remotely accessible and may be rapidly provisioned as needed (sometimes referred to as a "cloud" computing environment). The multimedia communication system 100A may include additional or fewer components than illustrated in FIG. 1A. The database may optionally be hosted in a data store, such as a hosted storage environment that includes a collection of physical data storage devices that may be remotely accessible and may be rapidly provisioned as needed (sometimes referred to as "cloud" storage).

The multimedia communication server system 100A may communicate over a network with one or more user devices and third party websites. The network may include any wired network, wireless network, or combination thereof. For example, the network may be a personal area network, local area network, wide area network, over-the-air broadcast network (e.g., for radio or television), cable network, satellite network, cellular telephone network, or combination thereof. As a further example, the network may be a publicly accessible network of linked networks, possibly operated by various distinct parties, such as the Internet. The network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks. For example, the protocols used by the network may include Hypertext Transfer Protocol (HTTP), HTTP Secure (HTTPS), Message Queue Telemetry Transport (MQTT), Constrained Application Protocol (CoAP), and the like. The communication channels may be securely encrypted using private and public keys and/or other encryption techniques.

Although the embodiment illustrated in FIG. 1A utilizes a widget in providing user interfaces and certain services to a user, optionally in addition or instead, a browser extension may be added to a user's browser that detects when a user is accessing a given website or webpage and that enables communications between users, that enables posting to and access of subject threads, that provides profile information, and/or that performs other functions described herein. Optionally in addition or instead, a dedicated application may be downloaded (e.g., from an app store) to and installed on a user device that detects when a user is accessing a given website or webpage and that enables communications between users, that enables posting to and access of subject threads, that provides profile information, and/or that performs other functions described herein. Optionally, the functionality may be integrated into a given website.

Figure 1B:
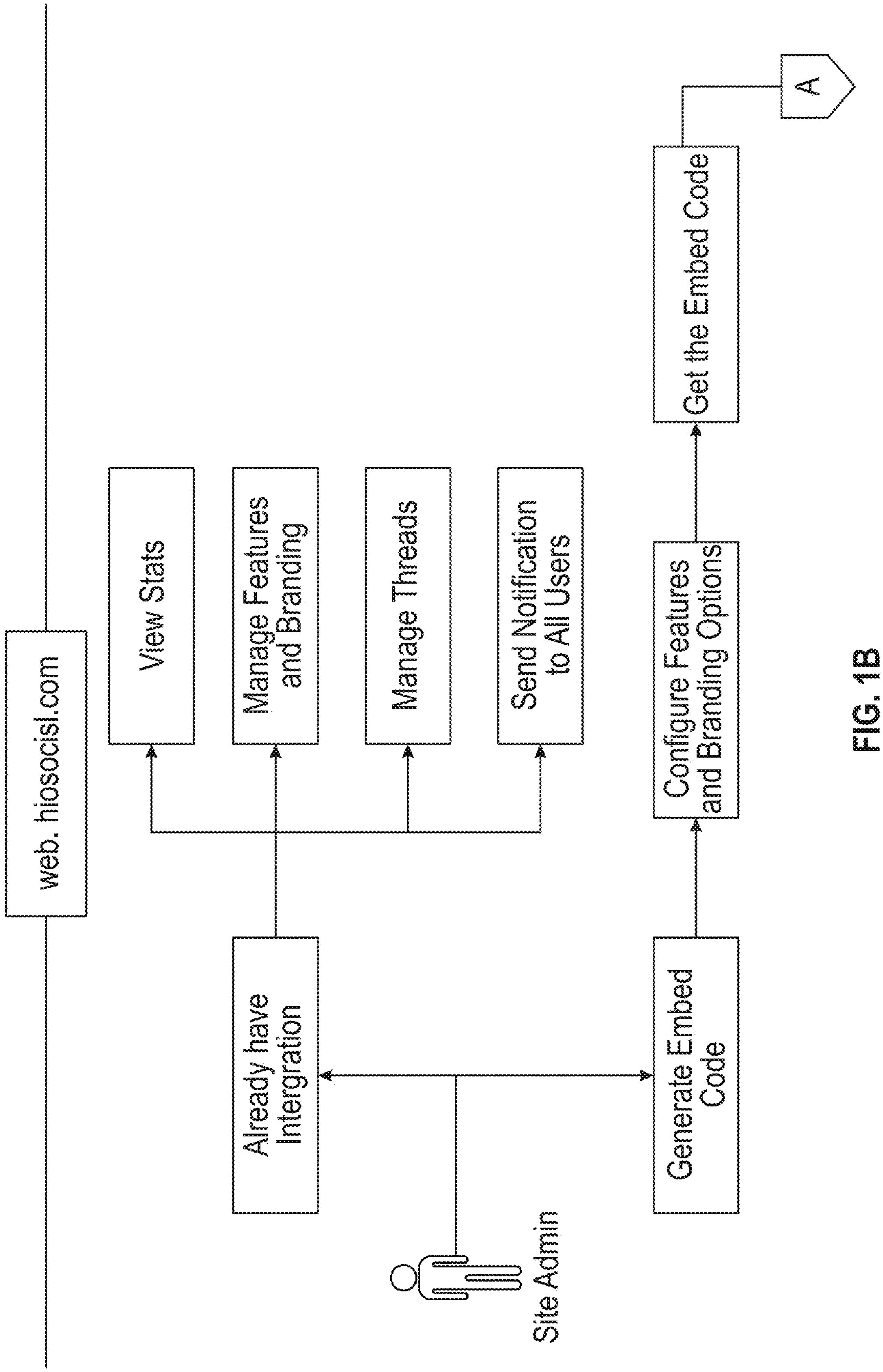
FIGS. 1B-1D illustrate example process flows.
Figure 1C:
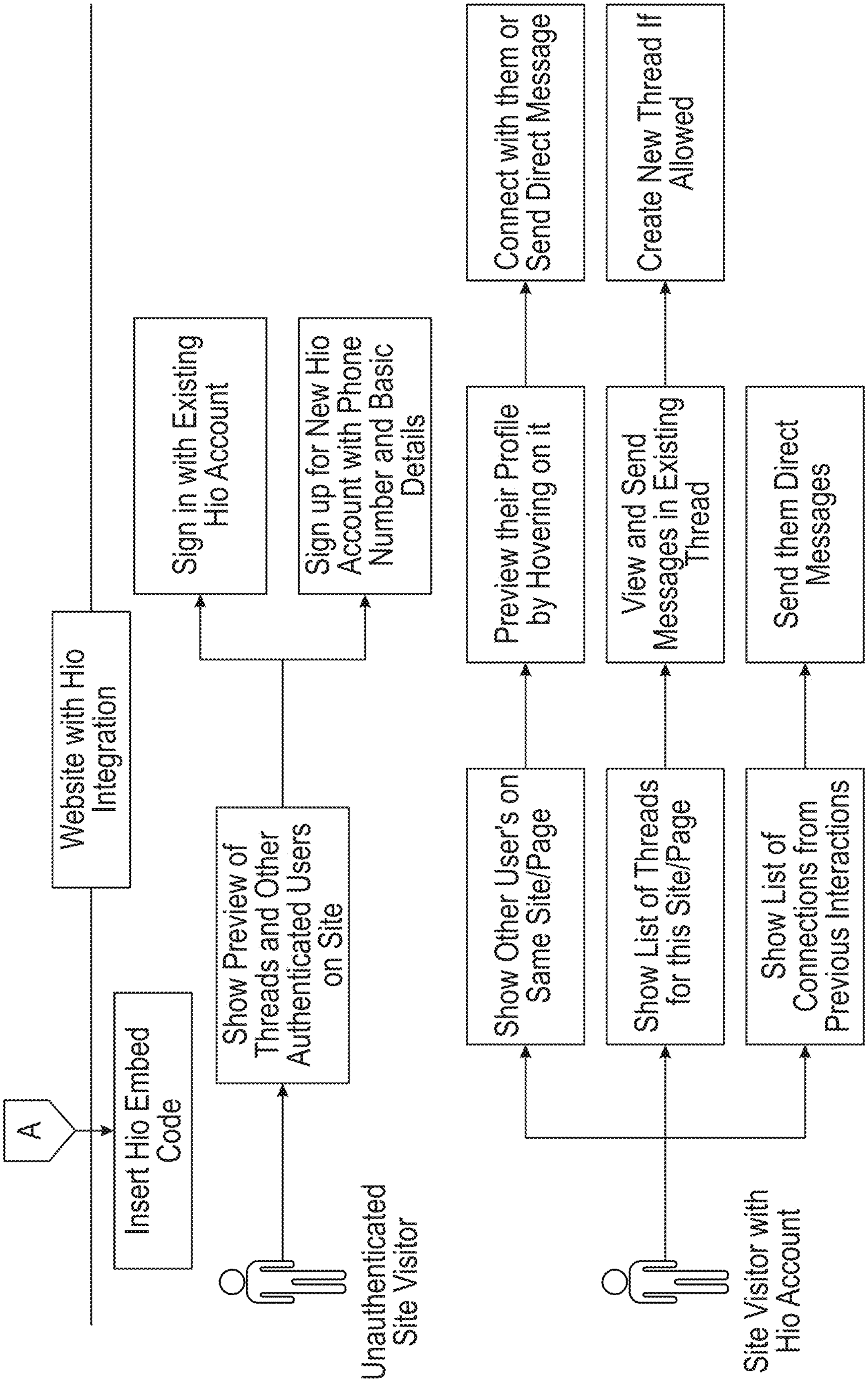

FIGS. 1B-1C illustrate an example process flow. An authorized user of the multimedia communication system (e.g., an administrator) may determine for a given third party site whether the site is already integrated with functionality described herein. If not, then communication code may be generated to be embedded in the site's website (e.g., in the HTML code of one or more web pages) to enable functionality described herein. The code may be used to access widget code configured with one or more feature options.

For example, an operator of a website may enable or disable the making of user connections, enable or disable one or more (e.g., all) chat channels (e.g., video chat, text chat, etc.), enable or disable the provision of subject threads, define and name subject threads, post updates and offers (e.g., operational features, coupons, discounts, etc.), and/or the like.

As discussed elsewhere herein, the multimedia communication may optionally generate and provide code (which may be as little as one line of code) to be included on webpages of a given website. The code may include a unique identifier associated with the website. When an authenticated user accesses the website via a user device, the code may be used to initiate a message from the user device to the multimedia communication system, the message including the unique website identifier. A larger code set (e.g., widget application code) may be accessed which may be configured in accordance with the feature options and branding website. The code set may then be downloaded to the user device and the interfaces and branding will be accordingly configured by the user device and may be presented via a widget application. Optionally, different websites may use the same or essentially the same corresponding widget code set, with each configured to operate and provide widget interfaces in accordance with their corresponding feature option configuration. Thus, different websites operated by different entities may utilize at least a subset of functionally the same user interfaces provided via the multimedia communication system, but each may have their own branding to make the user interfaces appear even better integrated with the website.

If the third party website is integrated with functionality described herein (e.g., already has the communication code embedded), the administrator may view various statistics for any actions performed using the functionality provided and tracked via the multimedia communication system.

For example the statics may relate to overall aggregate statistics or statistics for a specific period of time (e.g., a specific start/stop date and/or time) for visiting users that have been authenticated by or have accounts with the multimedia communication system, such as: how many visiting users are accessing the website concurrently or overall, the amount of time a given visiting user was accessing the website for a given browsing session, the average amount of time visiting users were accessing the website for a given browsing session, the number and type (e.g., video messages, text messages, direct messages, public/group messages, etc.) of messages transmitted between users concurrently accessing the website, the average length of video call chats, common profile characteristics of users having similar communication patterns, peak visit times, peak communication/messaging times, how many connection requests were transmitted, how many connection requests were accepted, demographic information for visiting users, and/or other such information.

In addition, the administrator may manage which features are to be activated or deactivated for the website, and branding for the user interfaces for the website, as similarly discussed elsewhere herein. For example, user interfaces may be provided that enables a user to quickly and accurately specify which features discussed herein are activated or deactivated. Further, user interfaces may be provided that enables a user to configure the operations of features. By way of illustration, the user may specify the website URL, branding, HTML/hex color codes for a primary color and/or colors, what type of user networking is enabled, whether there is to be a single or multiple forum threads, and/or other functions and features. The system may then automatically generate code enabling/disabling and configuring the features and appearance accordingly. The generated code may then be embedded on the website/webpage and provide and execute the features accordingly via a customized widget. The disclosed technology may advantageously reduce the amount of computer process, memory, and network resources that would otherwise be necessary if each website operator had to develop their own widget.

Visiting users accessing the third party website may be unauthenticated (e.g., do not have an account with the multimedia communication system or are not identified as having an account) or may be authenticated (e.g., logged into their account or otherwise identified). If a visiting user is not authenticated, the visiting user may sign into their existing account, if they have one, or may sign up for a new account. For example, in creating their account, the user may be prompted to provide their phone number, and a code may then be transmitted to the phone number. The user may be prompted to enter the code, and if the user enters the code, the user is authenticated and the account may be created.

The user may also be prompted to provide certain information for their profile, which may then be stored in the user's account. For example, a user may provide information, such as hobbies, preferred types of literature, preferred clothing brands, preferred clothing styles, preferred movies, preferred sports, preferred sports teams, preferred websites, preferred shopping destination, links (e.g., URLs) to one or more social networks presences/pages of the user, other profile data described herein, and/or other data.

If the visiting user has an account with the multimedia communication system, the user may cause a preview of communication threads on one or more subjects to be presented and may identify other users concurrently visiting the site (e.g., causing their names and/or other identifiers to be displayed). In response to the user pointing at a given user identifier (such as my touching the identifier if the identifier is displayed via a user device touch display, or by hovering over or clicking the identifier using a cursor being navigated using a mouse, trackpad, stylus, or other pointing device), profile data for the given user may be presented. Optionally, the profile data may be limited to profile data that the given user has agreed to share with other users (e.g., a public profile for non-connected users and a private profile for connected users). A messaging interface may be provided that enables the user to communicate with the given user via a direct message using a selected communication channel (e.g., text, video, audio).

In addition or instead, the user may connect with the given user. For example, a user may send another user (who may be referred to as the recipient) that is concurrently accessing a website a connection request. By way of illustration, the user may be presented in a list of users concurrently accessing the website, and the user may select the recipient from the list, and activate a connection request control. The multimedia communication may receive the selection and connection request control activation, and may transmit the connection request to the recipient.

The recipient may elect to accept or deny the connection request. If the recipient accepts the connection request, profile information designated by the requesting users as shareable with connections (where such profile information is not to be shared with non-connections and which may be referred to as non-public data or a private profile, which may include location information, phone number, email address, social media links, demographic information, and/or other information) may then be shared with the recipient that accepted the connection request. If the recipient refuses the connection request, then the recipient will not be provided with access to such private profile of the requester.

For example, a given user may point at an identifier of another user that is a connection, in one of the user interfaces described herein, and some or all of the foregoing non-public profile information of the connection may be presented. In addition, a user may specify that certain content (e.g., documents, videos, audio recordings, photographs, content links, etc.) may be shared with connections, but not with non-connections.

Optionally, the acceptance of a connection is one-way, in that if the request is accepted, the requester's private profile may be shared with the recipient, but the recipient's private profile is not shared with the requester. Thus, in order for the requester to have access to the recipient's private profile, the recipient may be required to affirmatively grant such access. For example, the recipient may send a reply connection request to the original requester, and if the original requester accepts the reply connection request, then the recipient's private profile may be shared with the original requester.

Optionally instead, if a recipient accepts the connection, then the recipient's private profile is automatically shared or shareable with the requester.

In addition, a user interface may be displayed to the visiting user that lists communication subject threads for the current webpage and/or website. The visiting user can select a subject communication thread, and messages in the thread may be accessed from memory and displayed on the user device. In addition, the visiting user may post a message within the thread. Optionally, the visiting user may create and name a new thread if such creation privilege has been granted to the given user (or to users in general).

A user interface may be displayed to the visiting user that lists user connections created from previous interactions and that enables the visiting user to transmit direct communications to such connections.

The example user interfaces described herein may be generated displayed via code (e.g., widget application code) received from the multimedia communication system, via a browser extension, via a dedicated downloaded application installed on the user device, or via services integrated in a website, as described elsewhere herein.

Figure 2A:
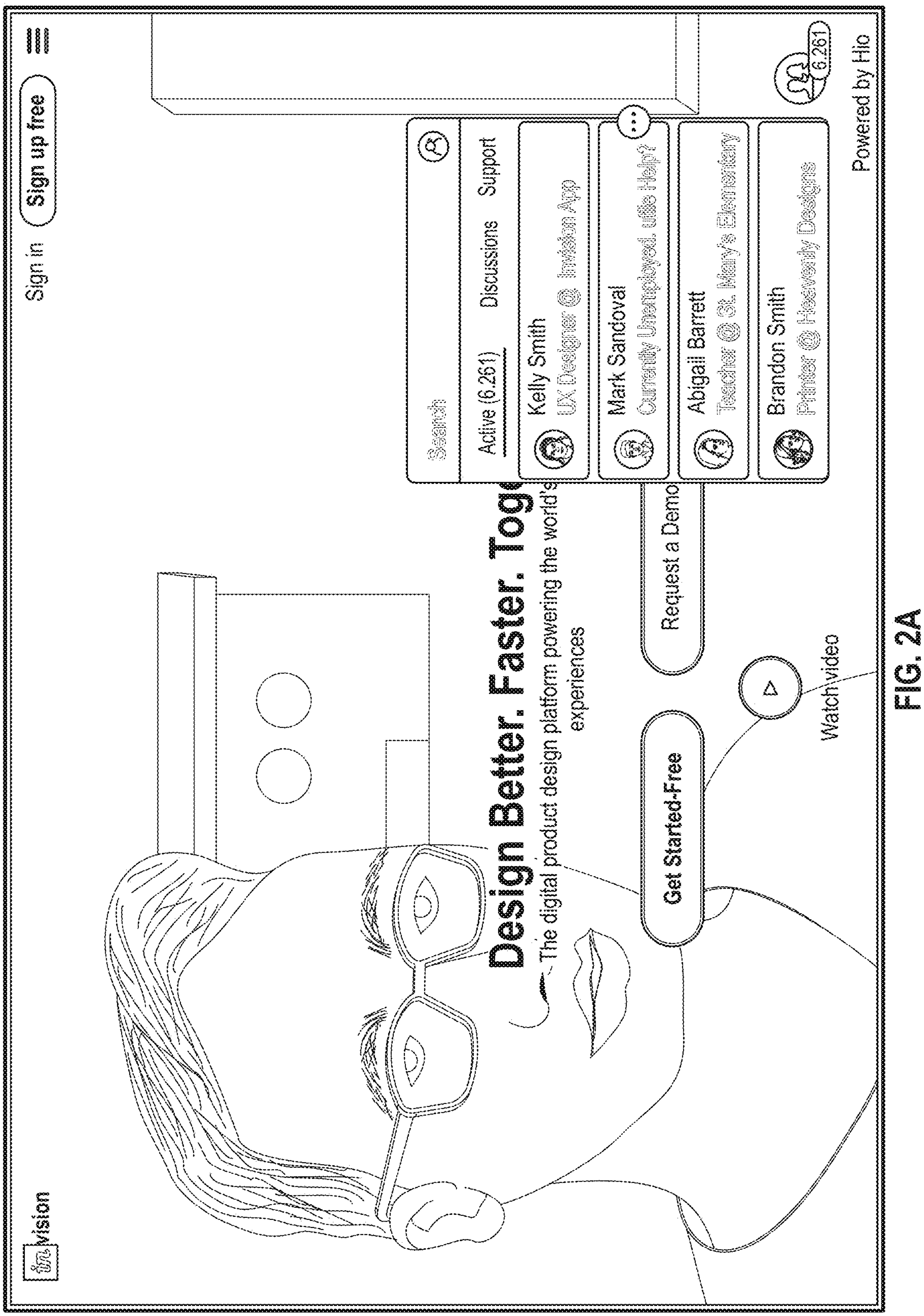
FIGS. 2A-3P illustrate example user interfaces.

FIG. 2A illustrates an example user interface with links to active participants (optionally listing the number of active participants and/or discussions, discussions, and support). Active participants may be those who have interacted with the website and/or the multimedia communication system via the website within a threshold period of time (e.g., the last 15 seconds, 30 second, or other threshold period of time). This technique avoids identifying users that have terminated their session or been disconnected in the participant list, and so the users still on the website can avoid attempting to interact with such inactive users.

Figure 2B:
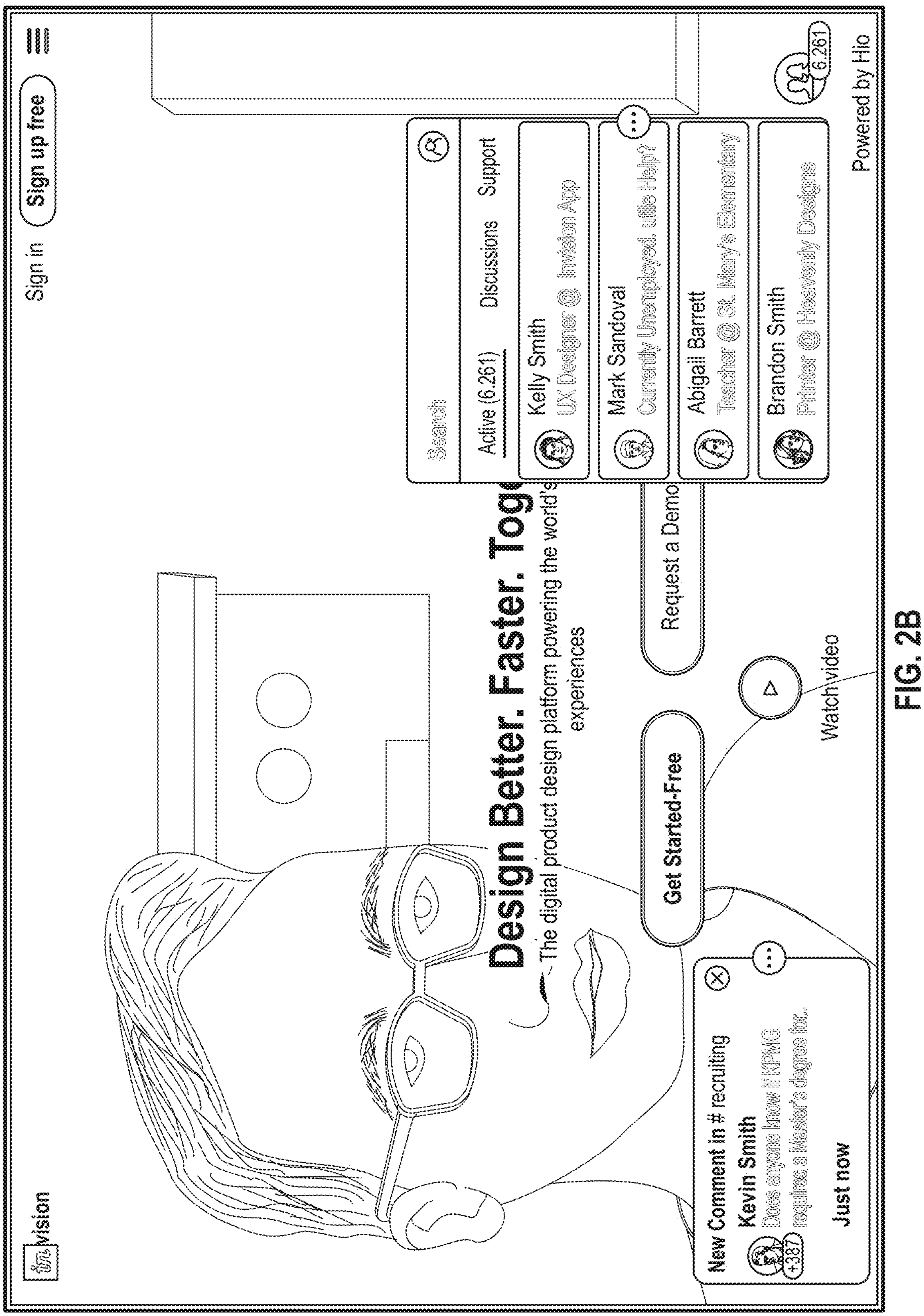
Figure 2C:
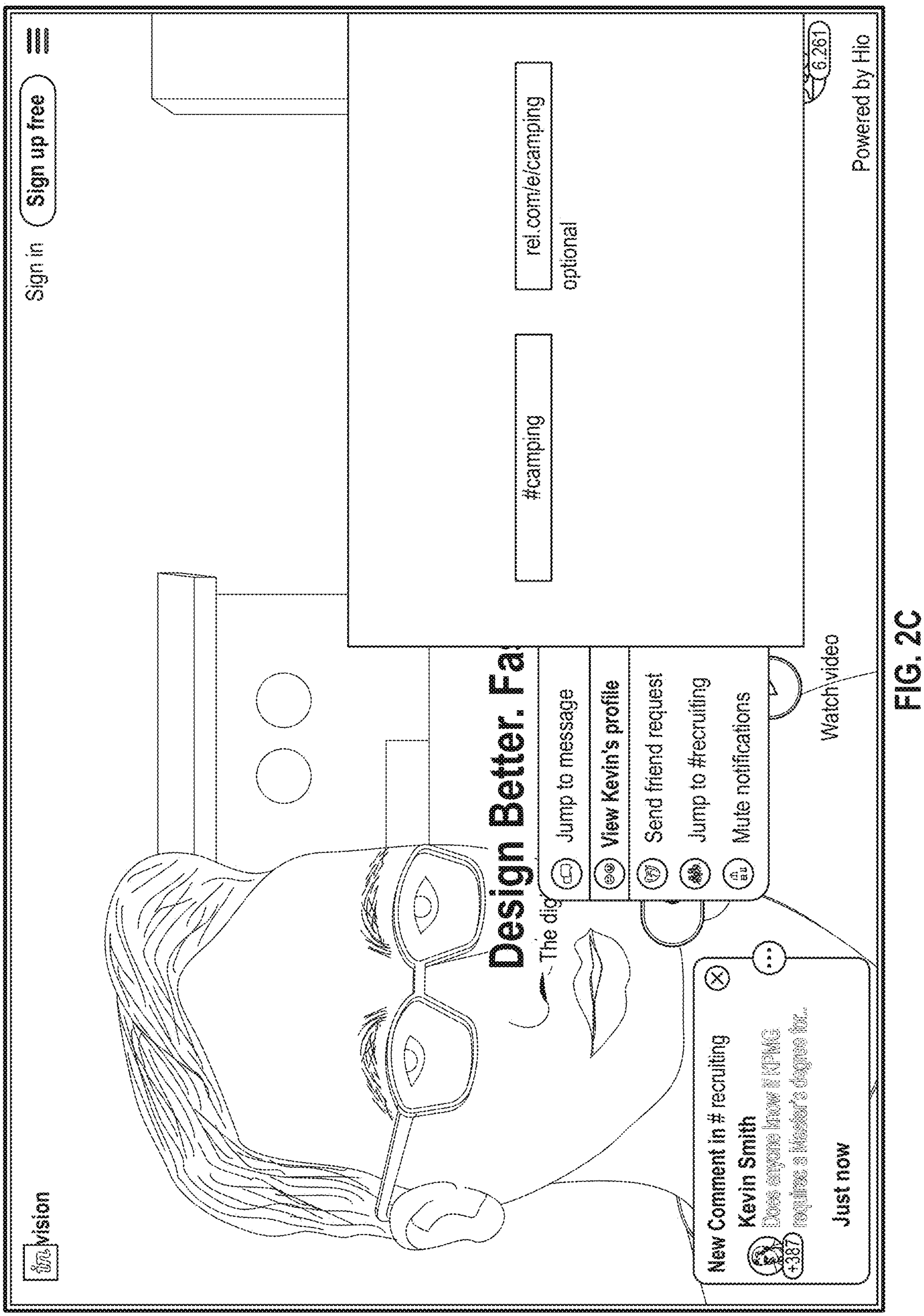
Figure 2D:
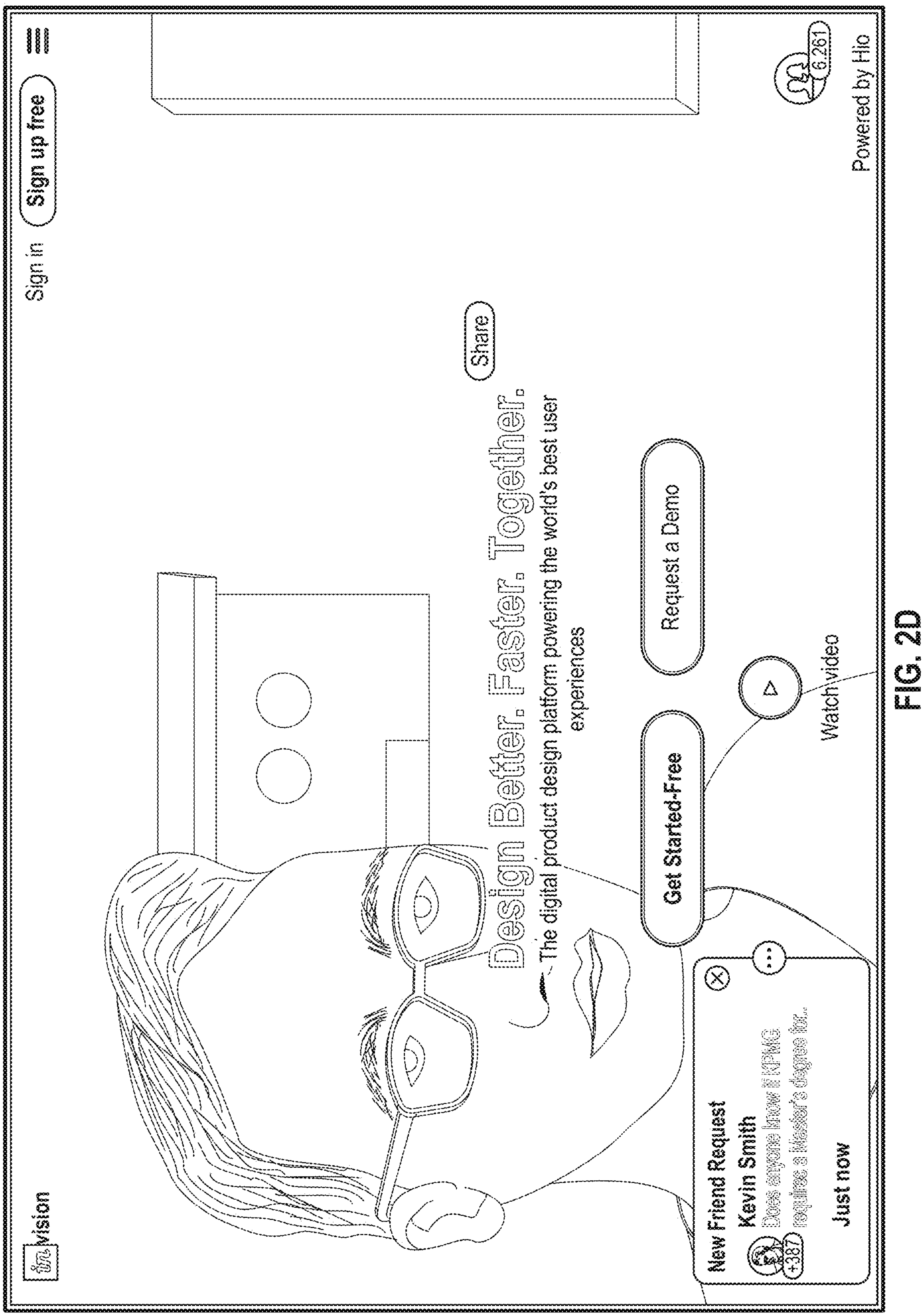
Figure 2E:
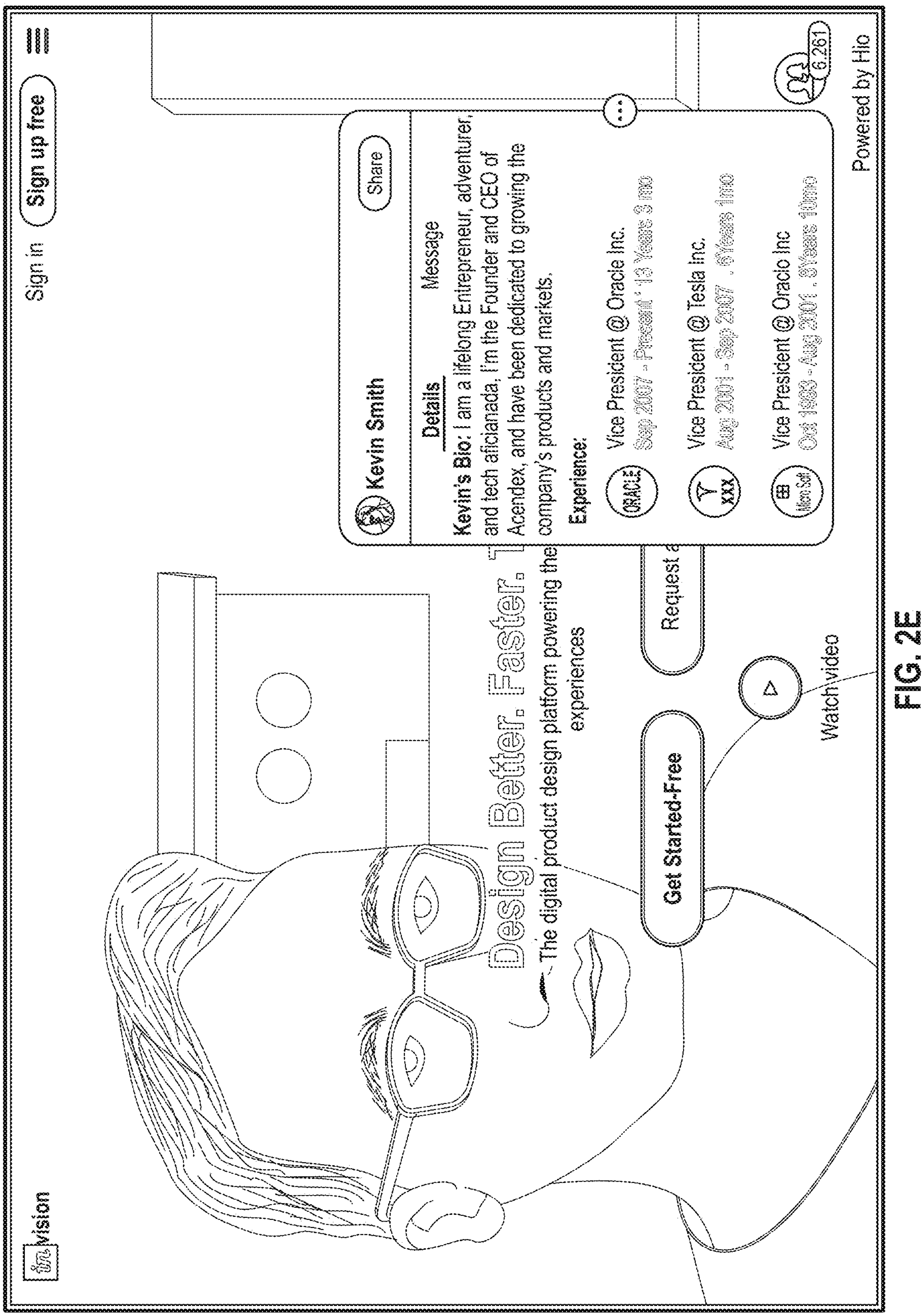

In the illustrated example, active participants are listed. FIG. 2B illustrates the user interface of FIG. 2A, with a popup of a recent posting in a given subject thread channel (e.g., recruiting). FIG. 2C illustrates the user interface of FIG. 2B, with a popup of action controls for responding to the recent posting in the given subject thread channel. For example, the action controls may include a "jump to message" control, a view selected user's profile control, a send friend (also referred to as a connection) request control, a jump to a specified thread (e.g., #clubs) control, and a mute notifications control. FIG. 2D illustrates a new friend request pop-up notification, including an image of the user making the request, the name of the user making the request, a job title, and a company name. The user can click on a link in the request, and additional information about the requester may be presented, as illustrated in FIG. 2E.

Certain additional example user interfaces will now be discussed. While the example user interfaces may illustrate or refer to text communications (e.g., text messages), the user interfaces may be similarly adapted to video and voice-only communications. The user interfaces may be presented overlaying or adjacent to a network resource (e.g., a webpage) being accessed by a user device.

Figure 3A:
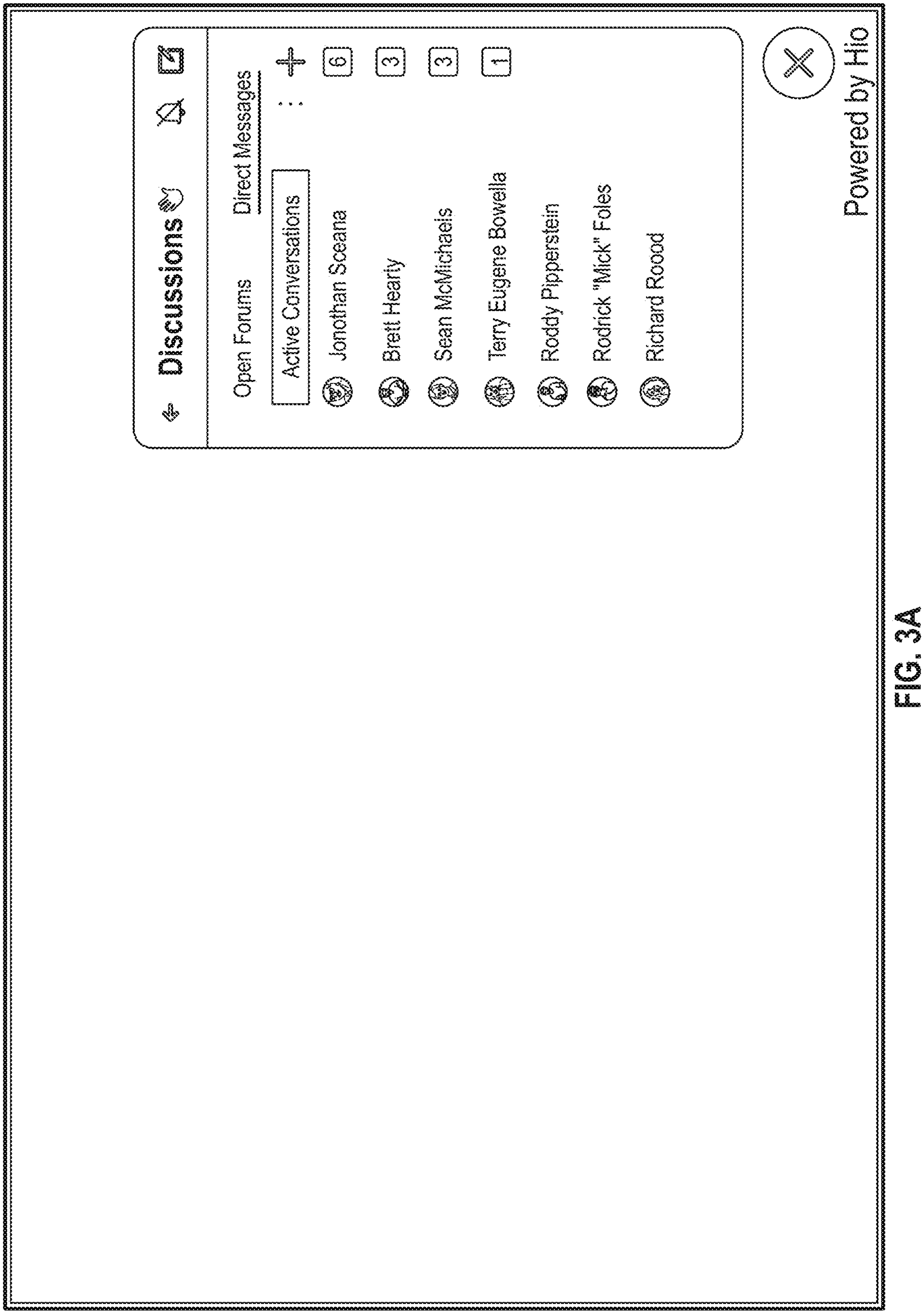

Referring now to FIG. 3A, an example one-to-one direct message chat interface is illustrated, where the multimedia communication system causes a list of those users that are engaged in active conversations to be displayed on a device of a given user accessing a network resource (e.g., users that have communicated with the given user during the current session of accessing a network resource and/or that have communicated with the given user within a threshold period of time). The list may optionally include an image (e.g., a photograph or graphic avatar) of each user and a text identifier (e.g., first and last name, first name and first initial of last name, an alias, etc.). The given user can select another user from the list (e.g., by clicking on the user entry in the list) and transmit a direct communication to the selected user, which other users are inhibited from viewing.

Figure 3B:
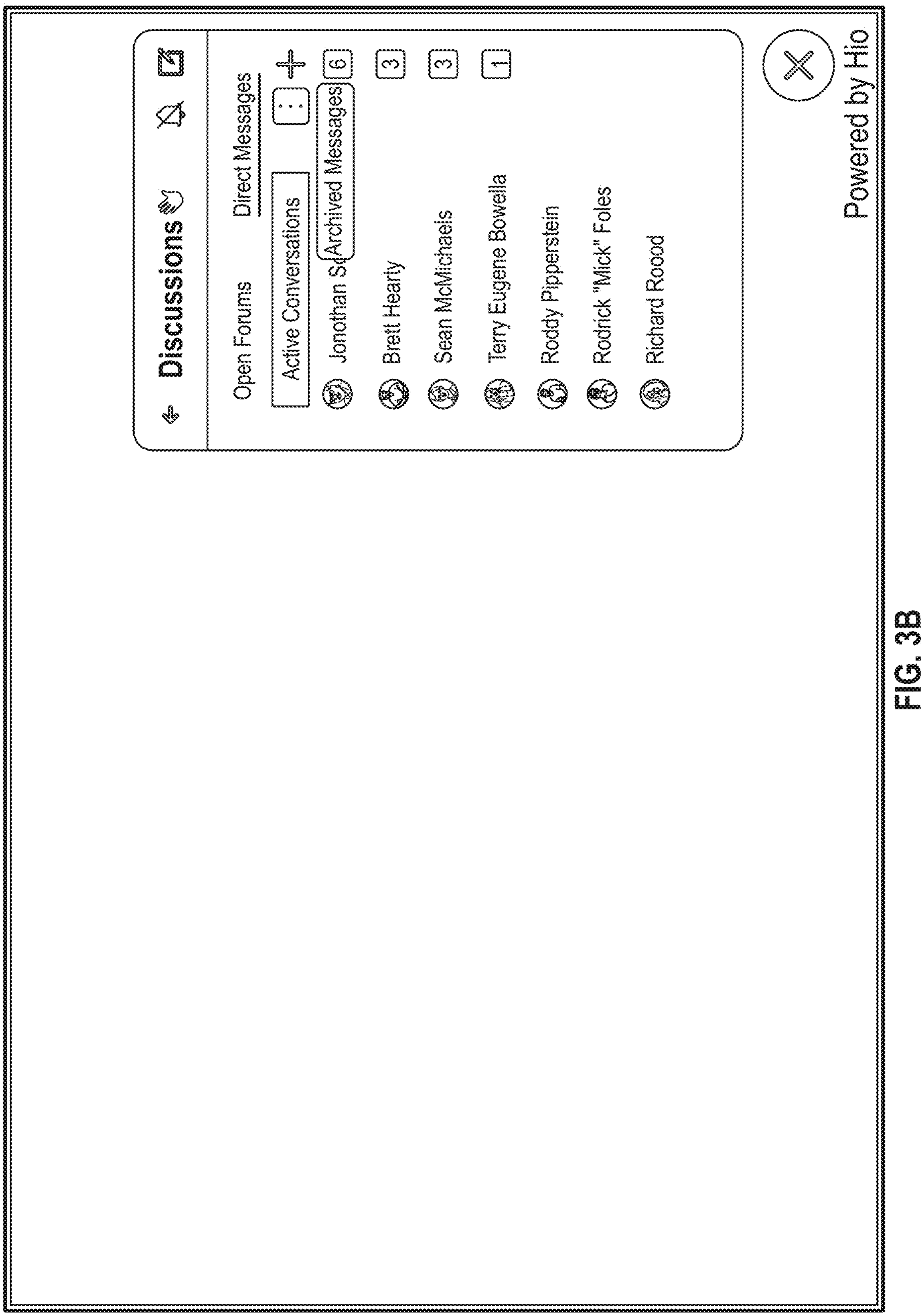

In addition, if the given user points at a user entry in the active conversations list (e.g., or hovering over the user entry in the list using a cursor being navigated using a mouse, trackpad, stylus, or other pointing device), a control, such as an archived messages control, may be presented as illustrated in FIG. 3B. In response to the given user selecting the archived messages control associated with the listed user, archived messages from prior conversations between the listed user and the given user may be accessed from system memory and transmitted to the given user's device for display, as illustrated in FIG. 3D. A field may be provided via which the given user can enter and transmit a new message to the listed user.

Figure 3C:
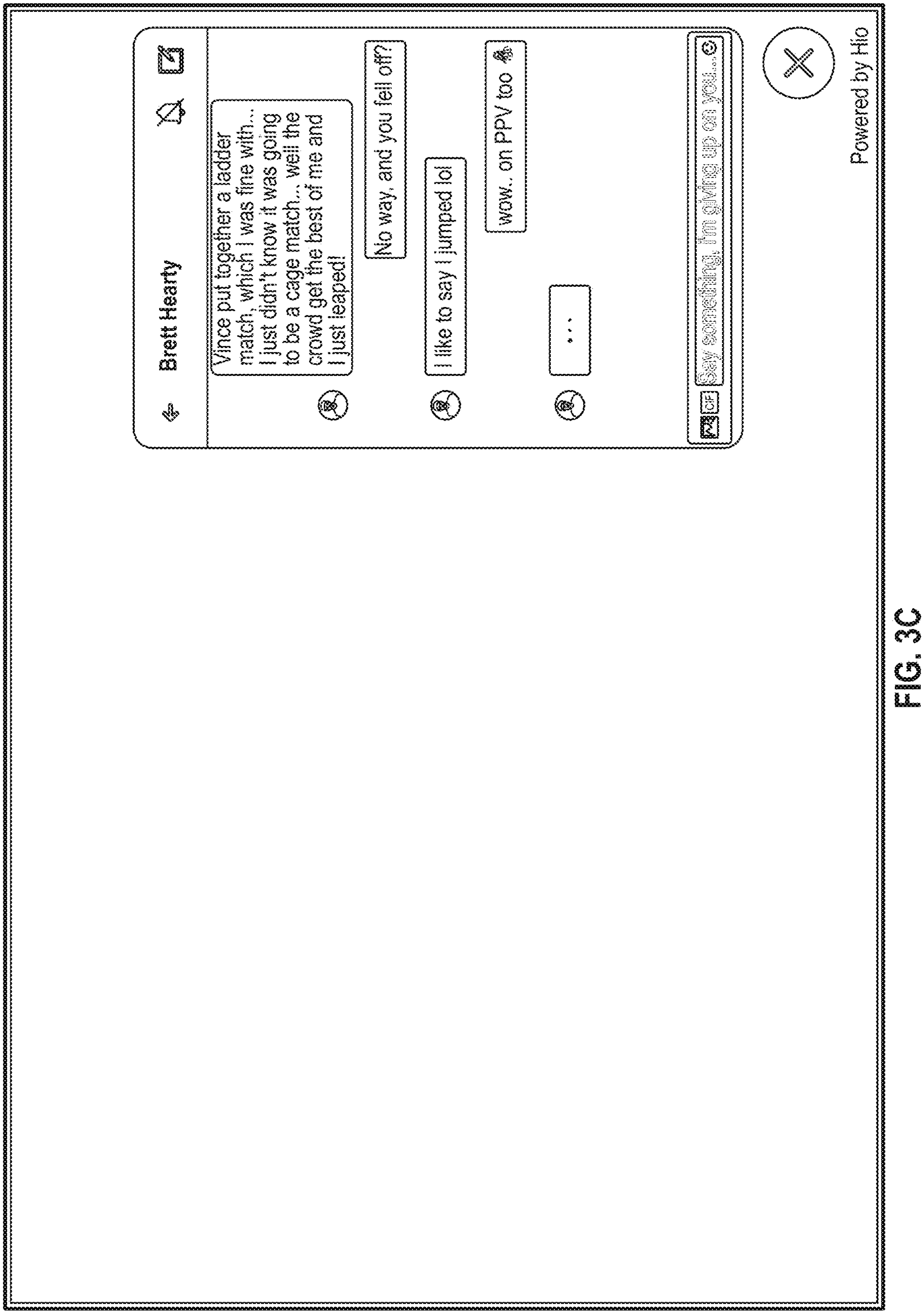
Figure 3D:
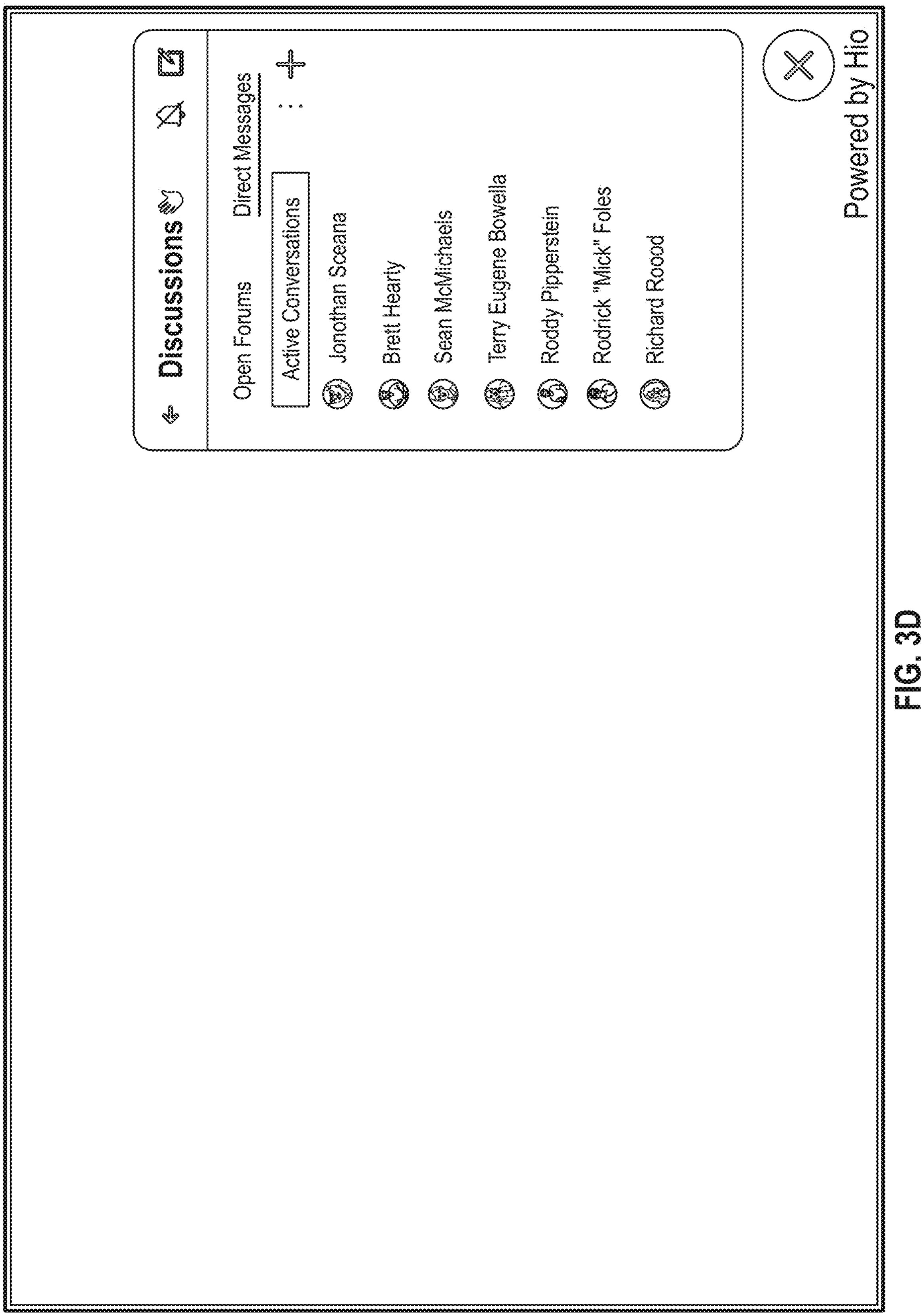

FIG. 3C illustrates a detailed chat conversation user interface depicting a chat conducted by the given user with a user selected from the conversation list. The detailed chat conversation user interface may include the name of the selected user at the top of the detailed chat conversation user interface, and an image associated with the selected user presented in association with messages composed by the selected user (where the message text may be displayed in a message frame, such as a bubble). Different colors or shadings may be used to distinguish the selected user's messages from the given user's messages. A field may be provided via which the given user can enter and transmit a new message to the selected user.

Figure 3E:
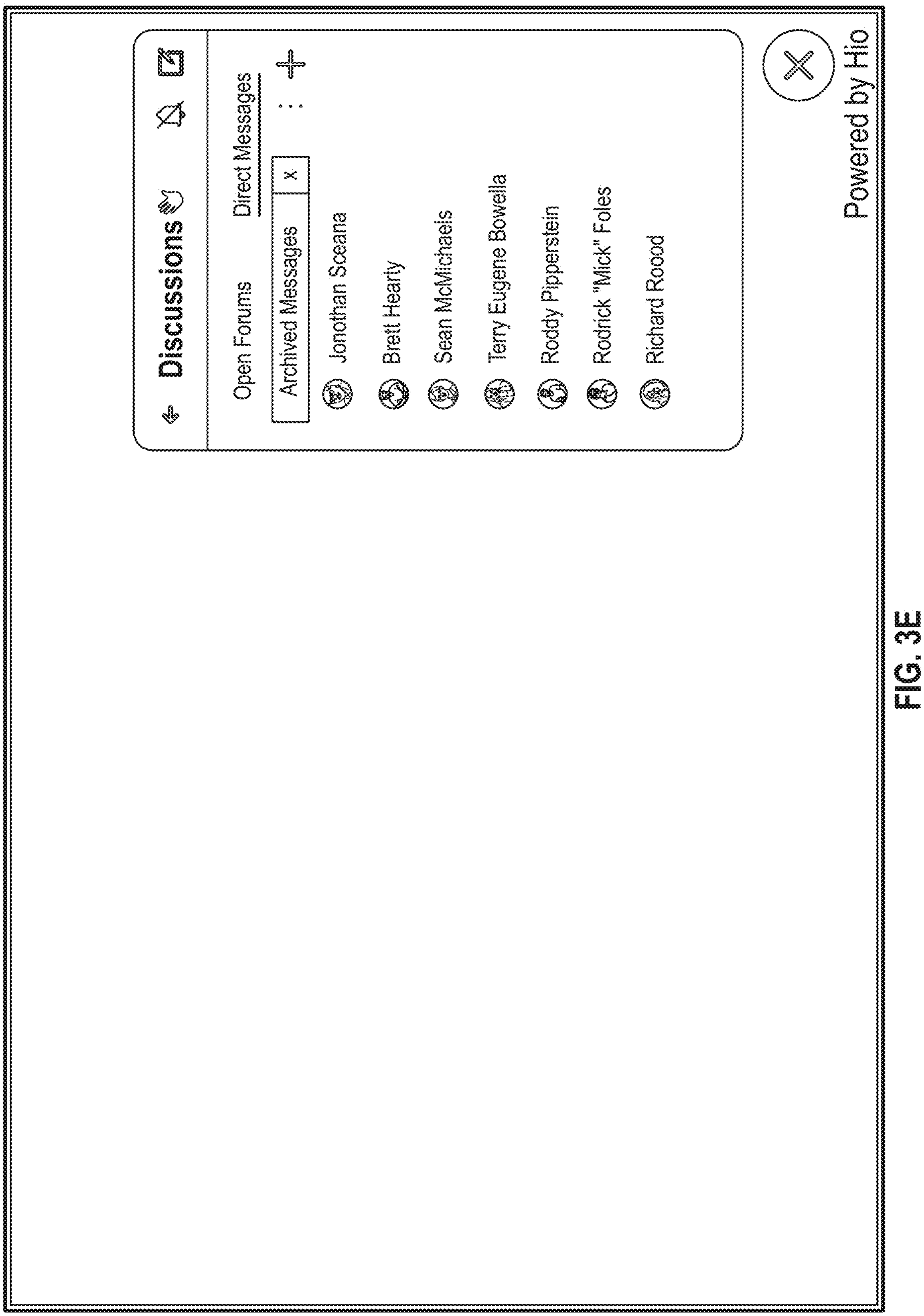

Referring to FIG. 3E, a list of users that have archived conversations with the given user may be displayed. Optionally the given user may select a listed user and delete archived conversation messages associated with the listed user or may delete of the user's archived messages.

Figure 3F:
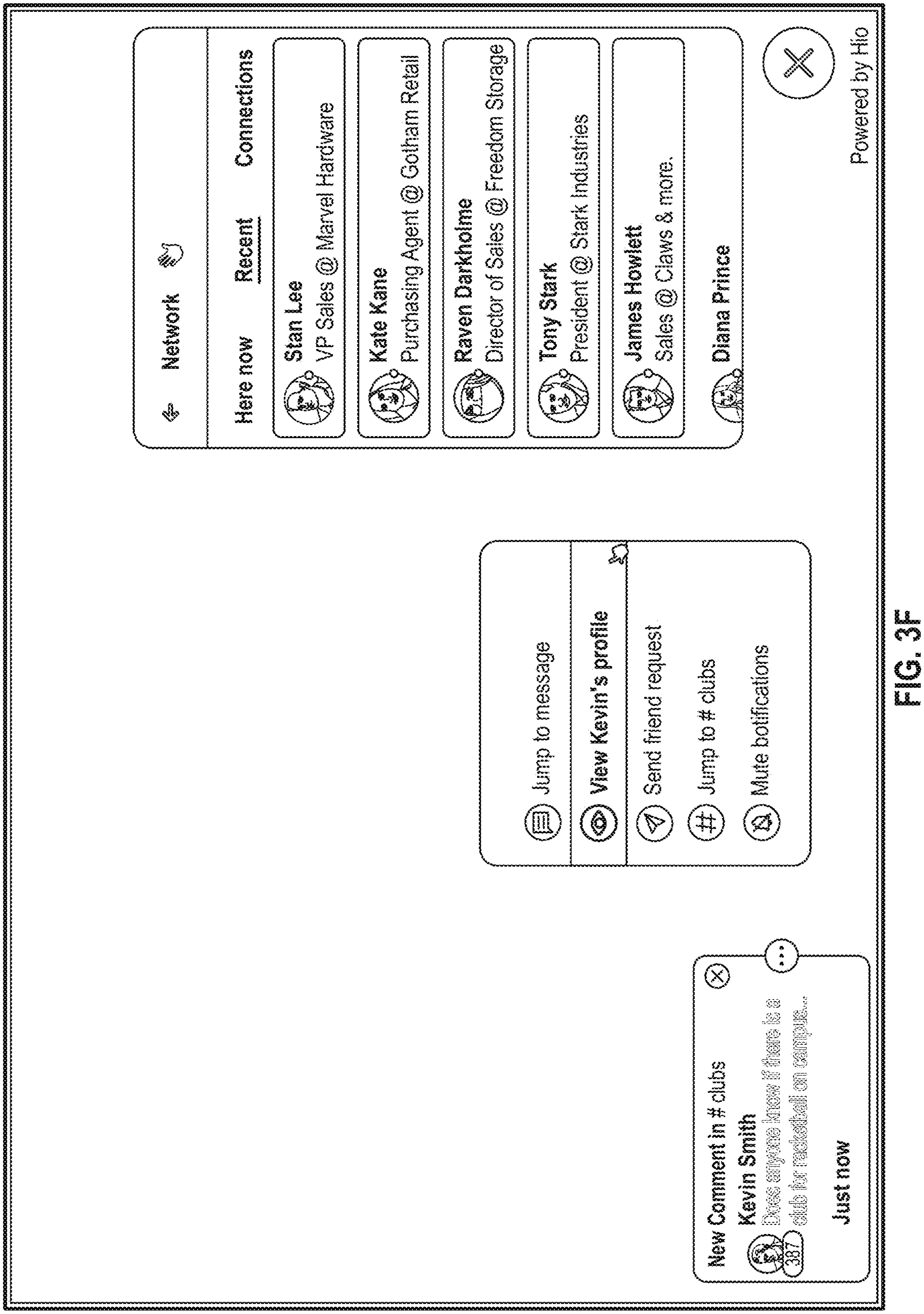

Referring to FIG. 3F, an example recent network connections user interface is illustrated. As illustrated, there are user-selectable links to a "here now" user interface and a "connections" user interface, which will be discussed elsewhere herein. The illustrated interface lists other users with whom the given user has recently made a connection. An image associated with a corresponding user, a text identifier (e.g., first and last name, first name and first initial of last name, an alias, etc.), and profile information (e.g., place of employment, job title, school currently attending, preferred pronouns, and/or other information) may be displayed. In addition, an action user interface including controls may be provided via which the user may initiate a corresponding action. For example, the action controls may include a "jump to message" control, a view selected user's profile control, a send friend request control, a jump to subject thread (e.g., #clubs) control, and a mute notifications control. The "here now" and "connections" interfaces present similar data regarding listed users and provide similar action controls.

Figure 3G:
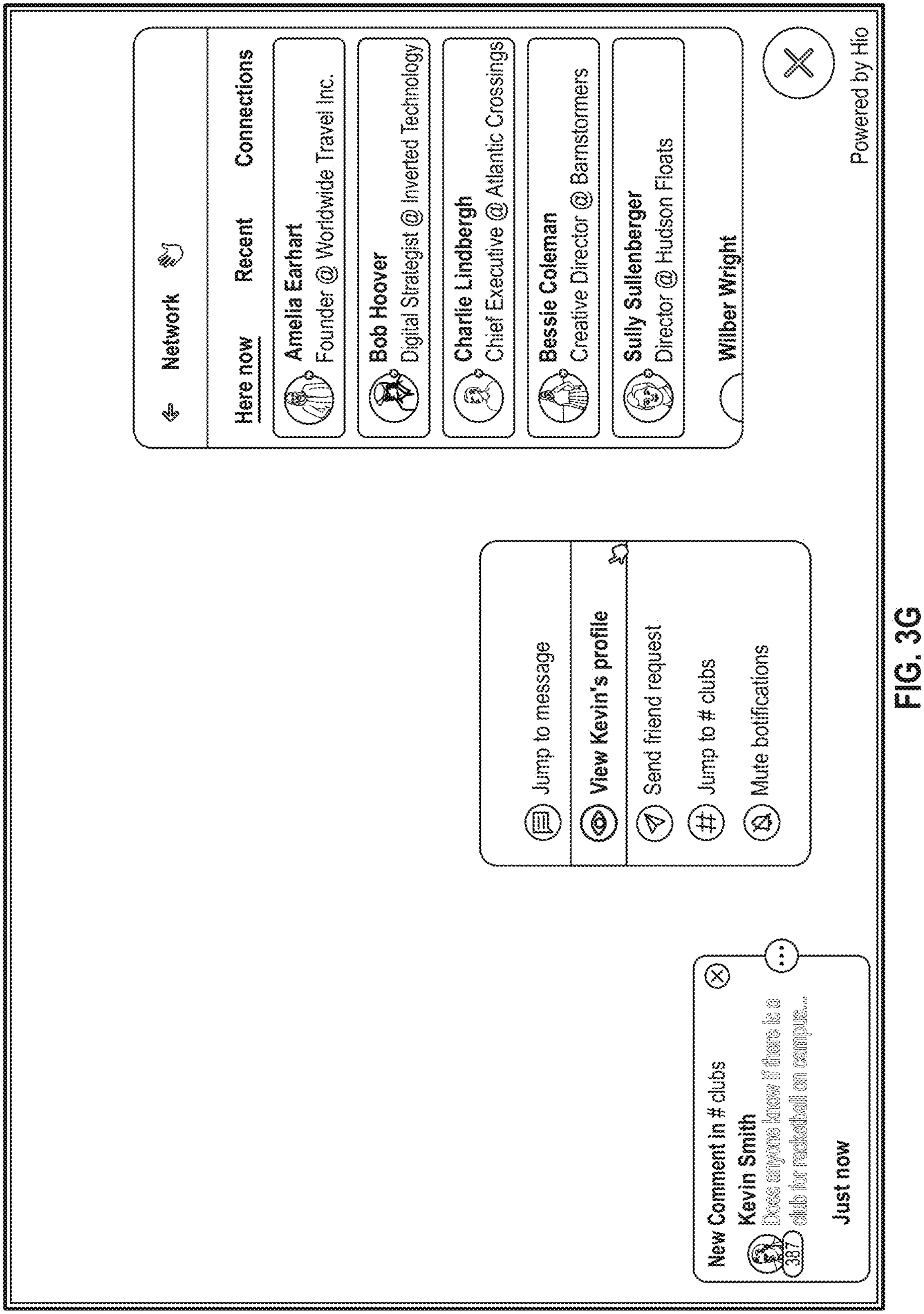

Referring to FIG. 3G, an example "here now" user interface is illustrated. The user interface may be accessed via the "here now" control/link discussed above. The interface lists users that are currently concurrently accessing the same network resource as the given user (active users). In addition, a pop up may display new comments posted by another user that the given user is networked with and/or for subject threads the given user has subscribed to.

Figure 3H:
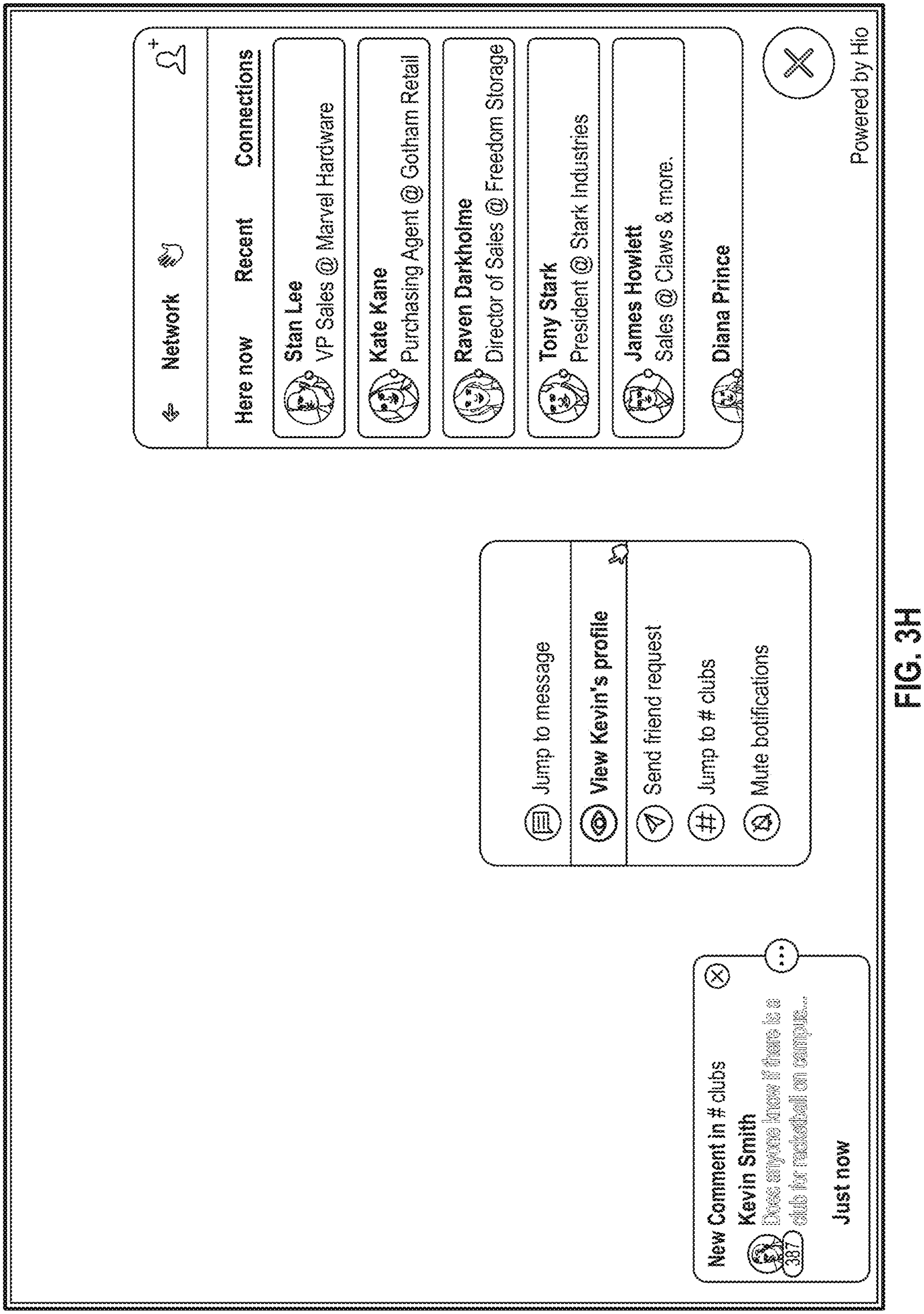
Figure 3I:
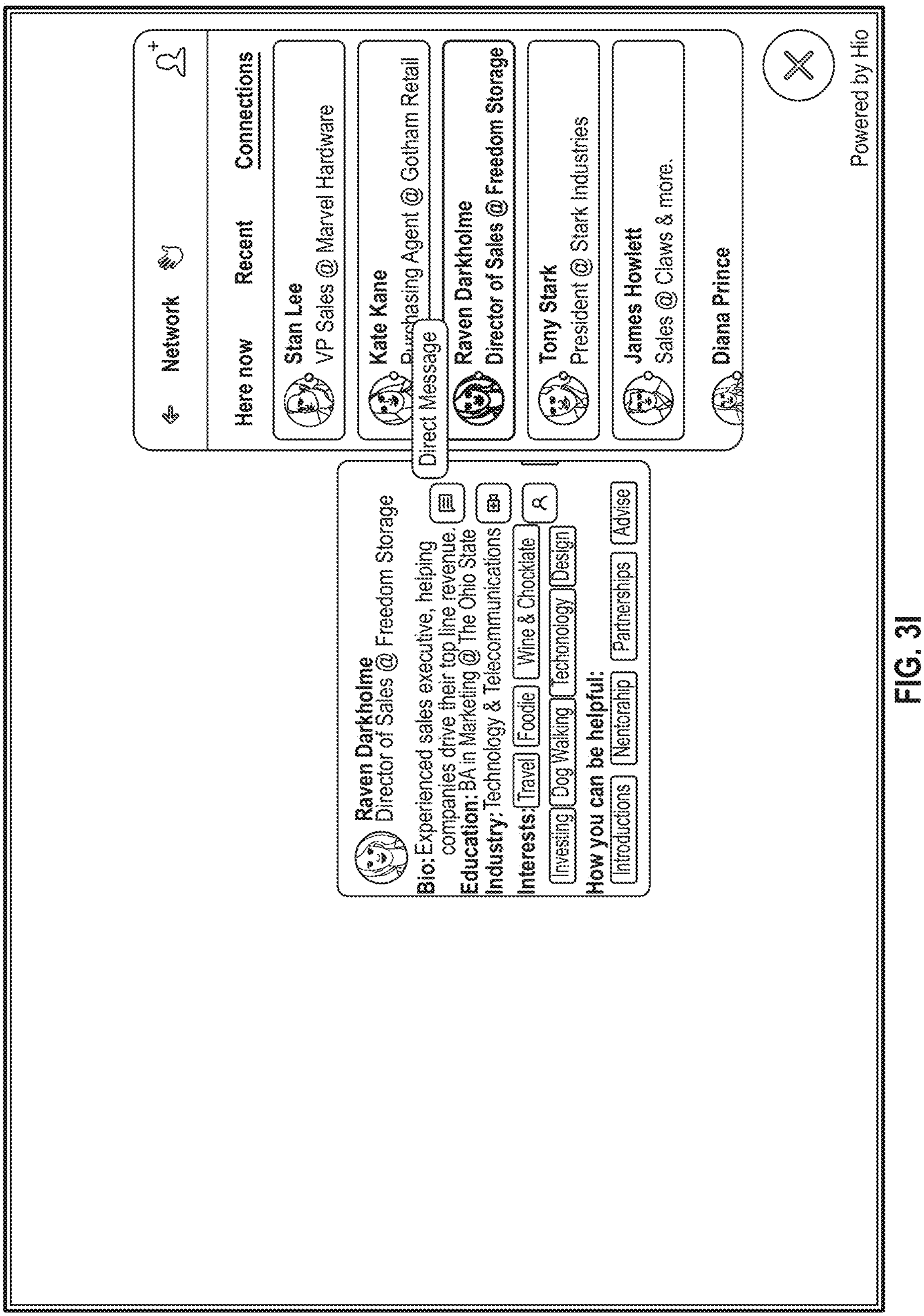

Referring to FIG. 3H, an example "connections" user interface is illustrated. The user interface may be accessed via the "connections" control/link. In addition, a pop up may display new comments posted by another user that the given user is networked with and/or for subject threads of which the given user has subscribed to.

Optionally, a user may subscribe to a subject thread via a subscribe control. The user may optionally specify whether the user is to be notified by the multimedia communication system of all new postings to the subject thread while the user is visiting the network resource/website, all new postings to the subject thread made by connections (and not non-connections), or is not to be provided with any posting notifications. Such notifications may then be provided by the system, and the user may access and view the postings corresponding to the notifications. Optionally, a subject thread may be configured so that the administrator needs to approve a subscription request, and if such approval is not provided the user may be selectively inhibited from accessing the thread or may be allowed to access the thread but may be prohibited from posting to the thread.

Figure 3J:
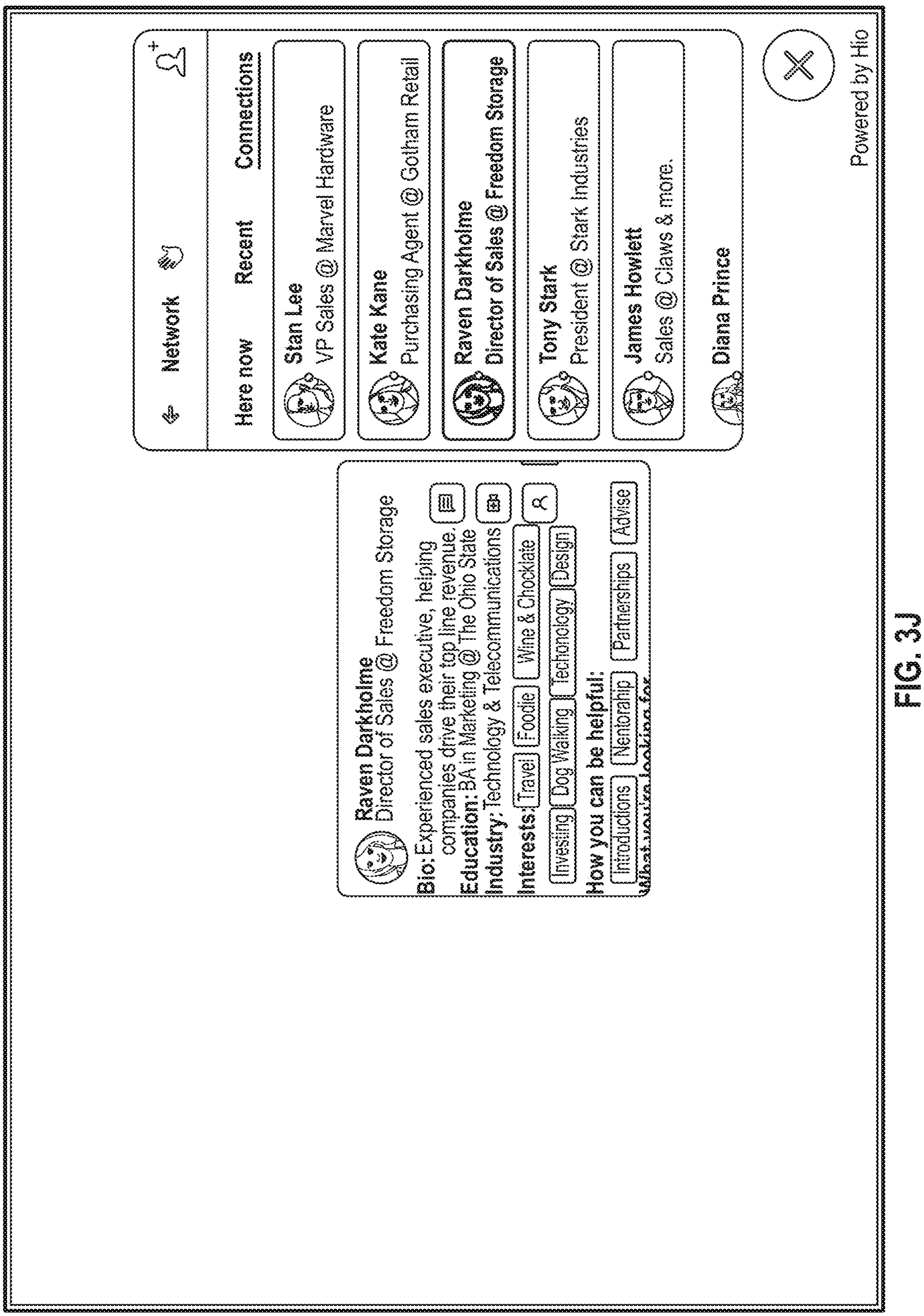

Referring to FIGS. 31 and 3J, an example "connections" user interface is illustrated, wherein in response to the given user selecting a user entry by pointing at a user entry in the connections list (e.g., or hovering over the user entry in the list using a cursor being navigated using a mouse, trackpad, stylus, or other pointing device), additional profile/content information may be presented (which may include private profile information not accessible by non-connections). For example, some or all of the following information may optionally be presented: name, image, place of employment, bio, education, interests (e.g., food, travel, wine, chocolate, sports, music, clothing, investing, design, pets, technology, cars, art, etc.), how the selected user can help others (e.g., provide business introductions, provide mentorship, provide advice, partnership, etc.), and/or other information. The given user, in viewing such context information may decide whether or not to enter into a communication with the selected user. Controls (e.g., a text chat control, a video chat control (which includes an audio channel), an audio chat control, etc.) may be provided via which the given user can initiate a conversation (e.g., via direct messaging) with the selected user via a desired communication channel. Optionally, the user may establish a communication session with multiple selected users (e.g., to establish a video conference).

Figure 3K:
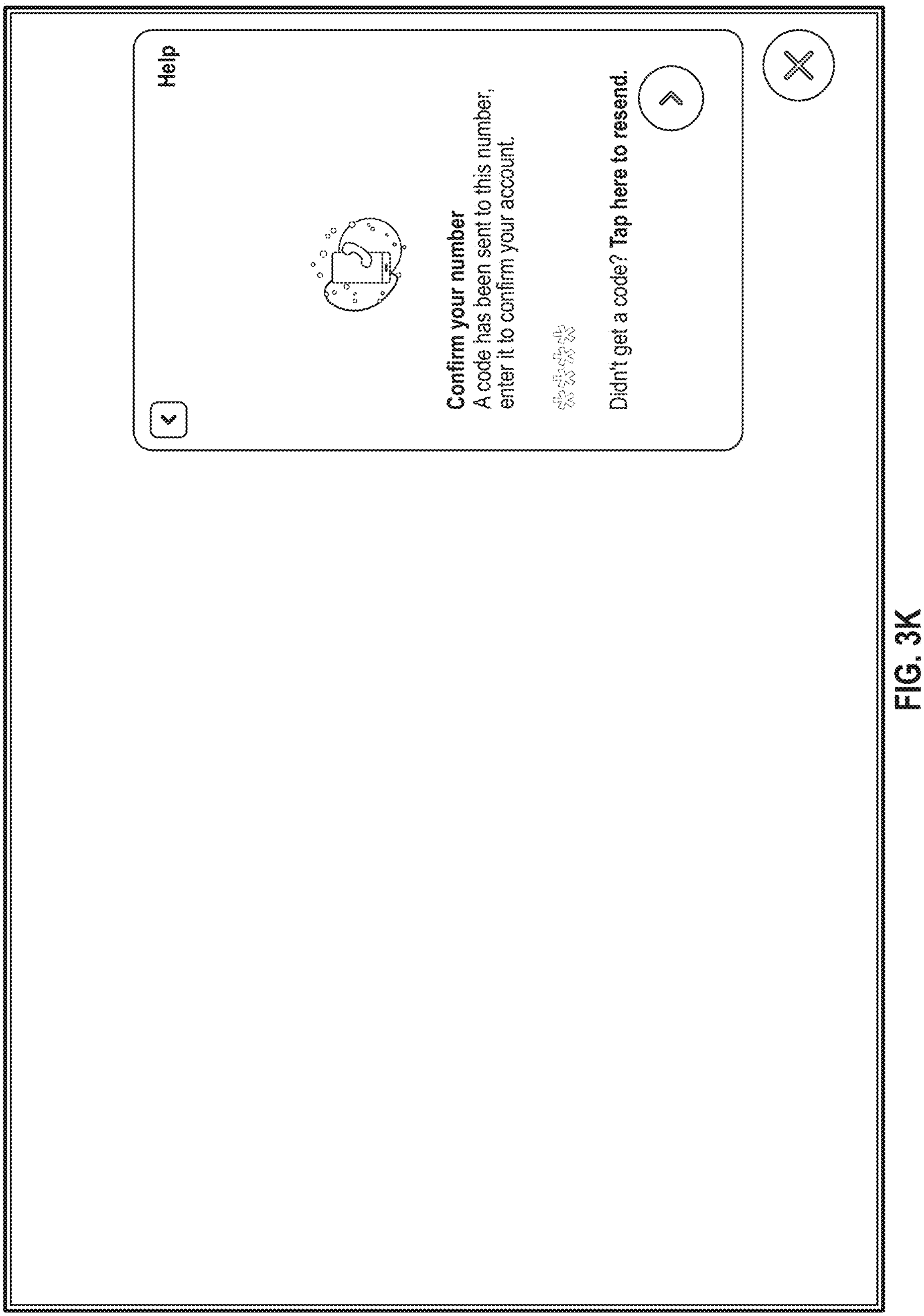
Figure 3L:
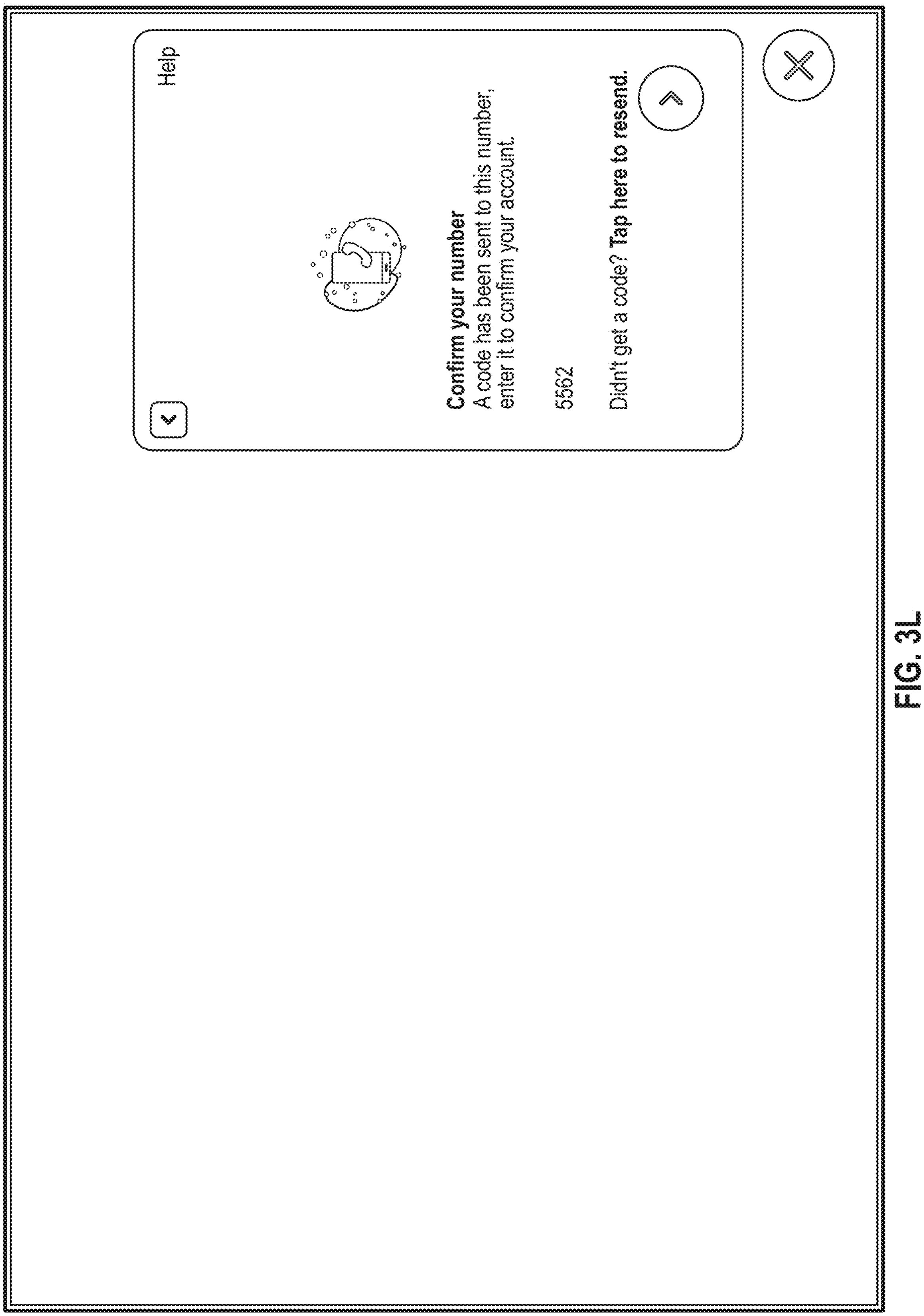

Referring to FIG. 3K, an example account confirmation user interface is illustrated. As discussed elsewhere herein, rather than using a password for authentication, a user may provide the user's phone number (via a user phone number field in a corresponding registration user interface) when creating or accessing an account. As depicted in FIG. 3K, a code may be transmitted as a text message to the phone number. The user then needs to enter the code via the user interface illustrated in FIG. 3K (as depicted in FIG. 3L) to confirm that the phone number actually belongs to the user. If the user enters the correct code, the user may be authenticated and the account may be created (or the user may be logged in to the user's existing account). Otherwise, the account may not be created or the user may be denied access to an existing account associated with the phone number.

Figure 3M:
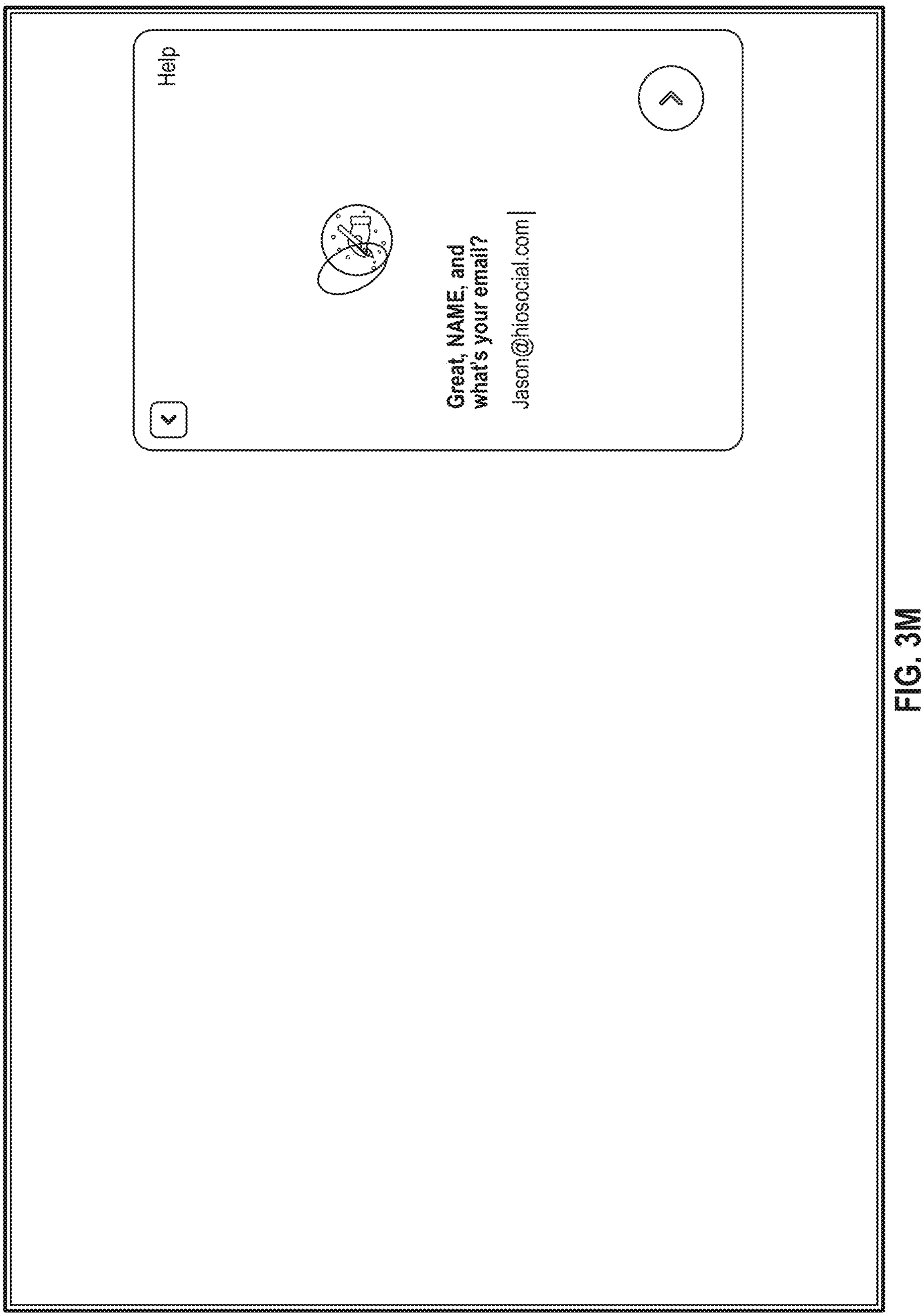

Once the user is authenticated, the user interface illustrated in FIG. 3M may be presented. The user interface may request additional information from the user, such as name and email address and provide fields for receiving such additional information (e.g., to establish an account record and user profile).

Figure 3N:
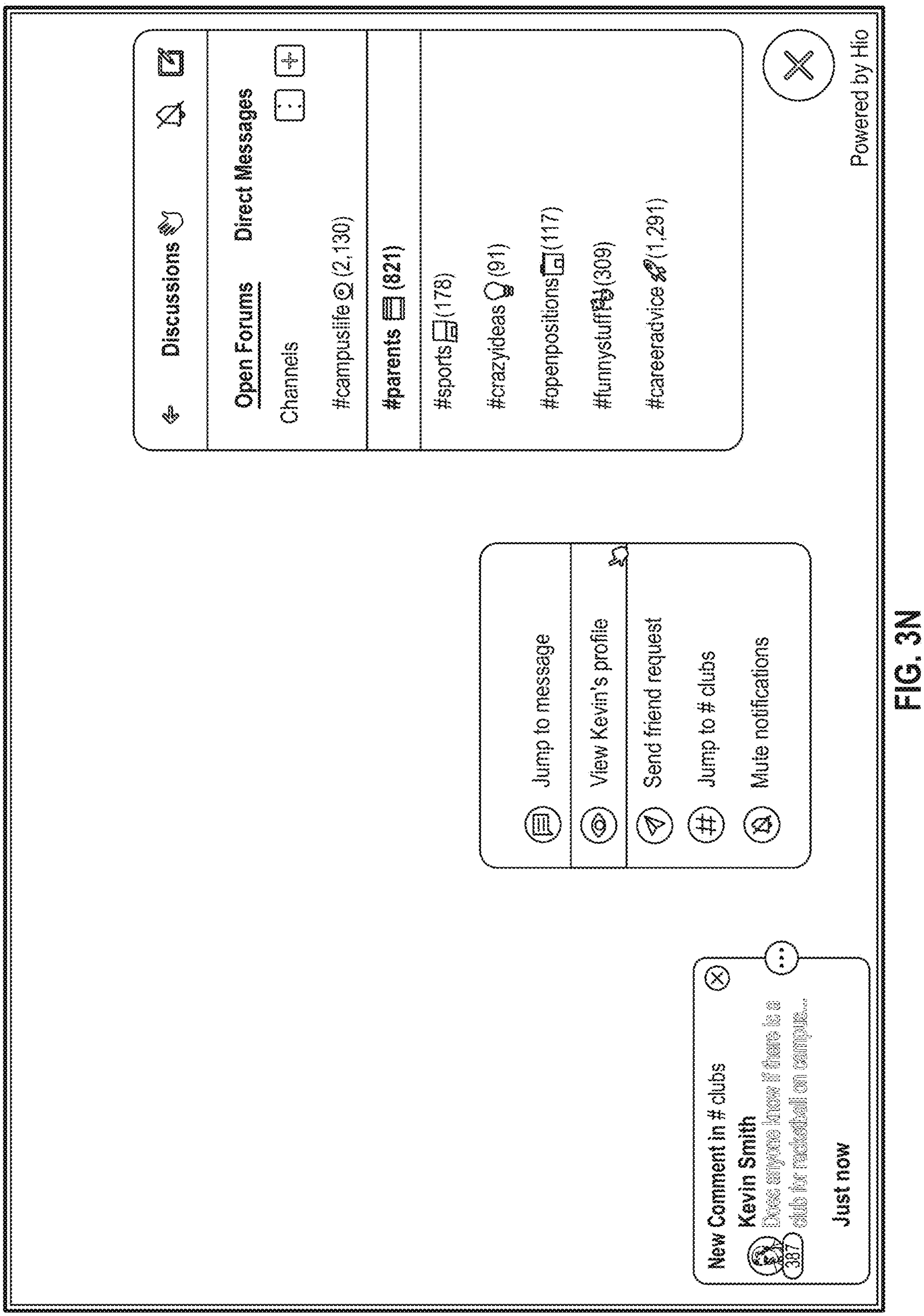
Figure 30:
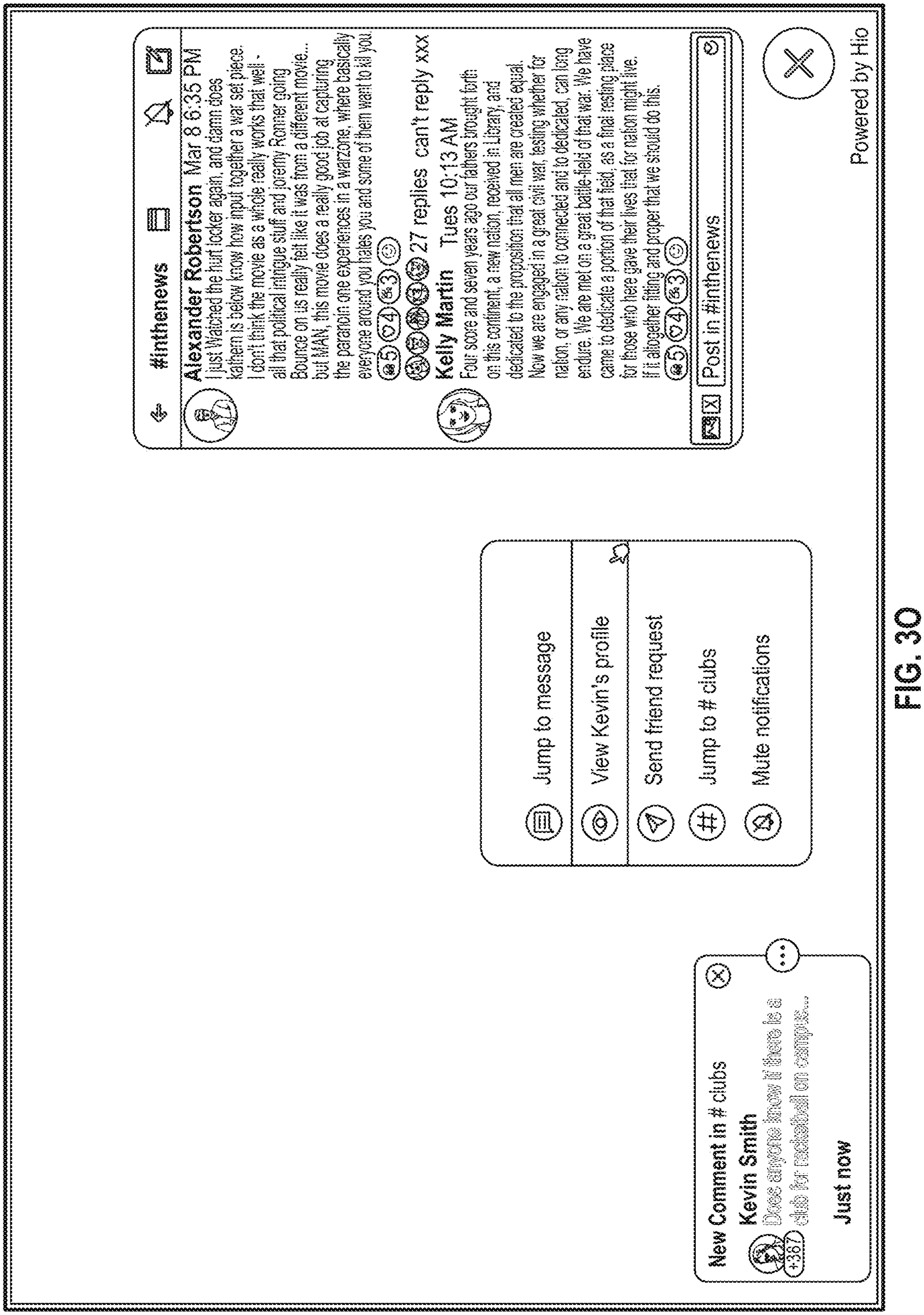
FIGS. 24A-30D illustrate example user interfaces and webpage rendition.

Referring to FIG. 3N, an example discussions user interface is illustrated. Available subject thread channels may be listed (where a given channel is directed to a corresponding subject, such as campus life, parents, sports, open positions, funny stuff, career advice, clothing advice, travel, pets, technology, etc.), including the number of participants and/or the number of postings (e.g., text, image, and/or video postings).

In response to the user pointing at or selecting a channel thread, the user interface illustrated in FIG. 3O may be presented, and corresponding recent posts (e.g., posts posted during the current browsing session, posts that the user has not yet viewed, posts posted within a threshold period of time, etc.) in the channel are displayed (e.g., in association with the number of reactions (e.g., likes, emoji postings, etc.), the number of replies, and/or other information). A field may be provided via which the user may enter and submit a post, which may be transmitted to the multimedia communication system and posted to the channel thread. As similarly discussed elsewhere herein, the action controls may be provided that include a "jump to message" control, a view selected user's profile control, a send friend (also referred to as a connection) request control, a jump to a specified thread (e.g., #clubs) control, and a mute notifications control.

Figure 3P:
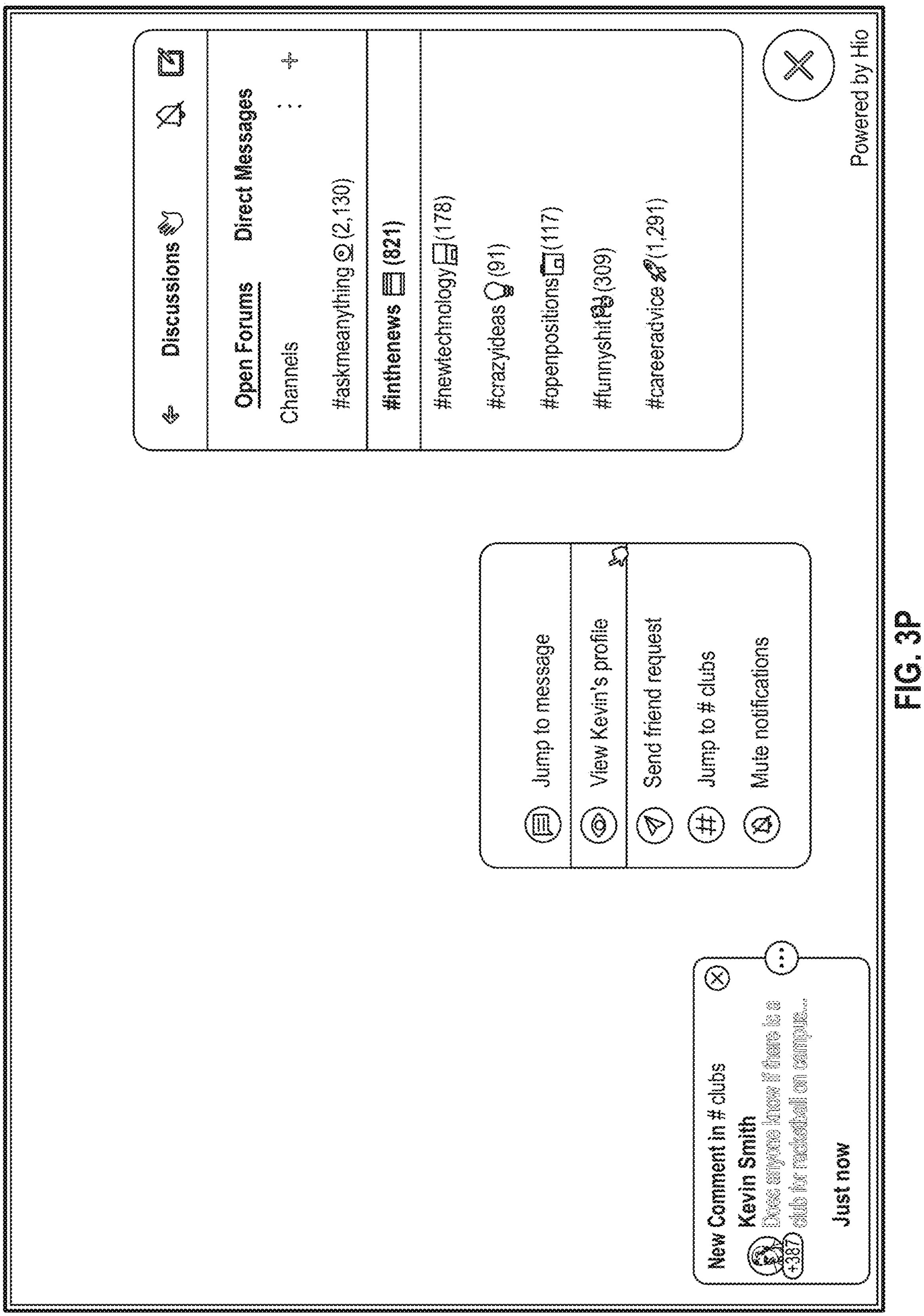

FIG. 3P illustrates a user interface listing open forum discussion threads (sometimes referred to as channels) and the number of posts for a given forum. The user may select, access, and view posts for a given open forum, and may enter and submit a post, which may be transmitted to the multimedia communication system and posted to the open forum thread.

In addition, the multimedia communication system may enable users to schedule a group visit to a website, where each user may view the same content (e.g., webpage) at the same time. Optionally, a member of the group or a website administrator may be designated as a group leader. The group leader may navigate to different content (e.g., webpages) on the website and the other group members may be presented with the same content via their respective browsers. Optionally, the group may be broken up into subgroups, where a group leader assigns members of the group to different subgroups or where a given group member can elect to join a subgroup. Optionally, different subgroups may be assigned or may elect their own subgroup leader. The different subgroups may separately navigate the website, so that different subgroups may be accessing different website webpages. Optionally, a user interface may be provided via the system (e.g., via the widget) to members of one group or subgroup showing what content (e.g., what website webpage) one or more other groups or subgroups are accessing. Optionally, the members of the group or subgroup may navigate to the content being accessed by one of the other group or subgroups. Optionally, the system provides a user interface showing an individual user, a subgroup, or a group showing what content (e.g., what website and/or webpage) one or more other groups or subgroups are accessing.

Figure 14A:
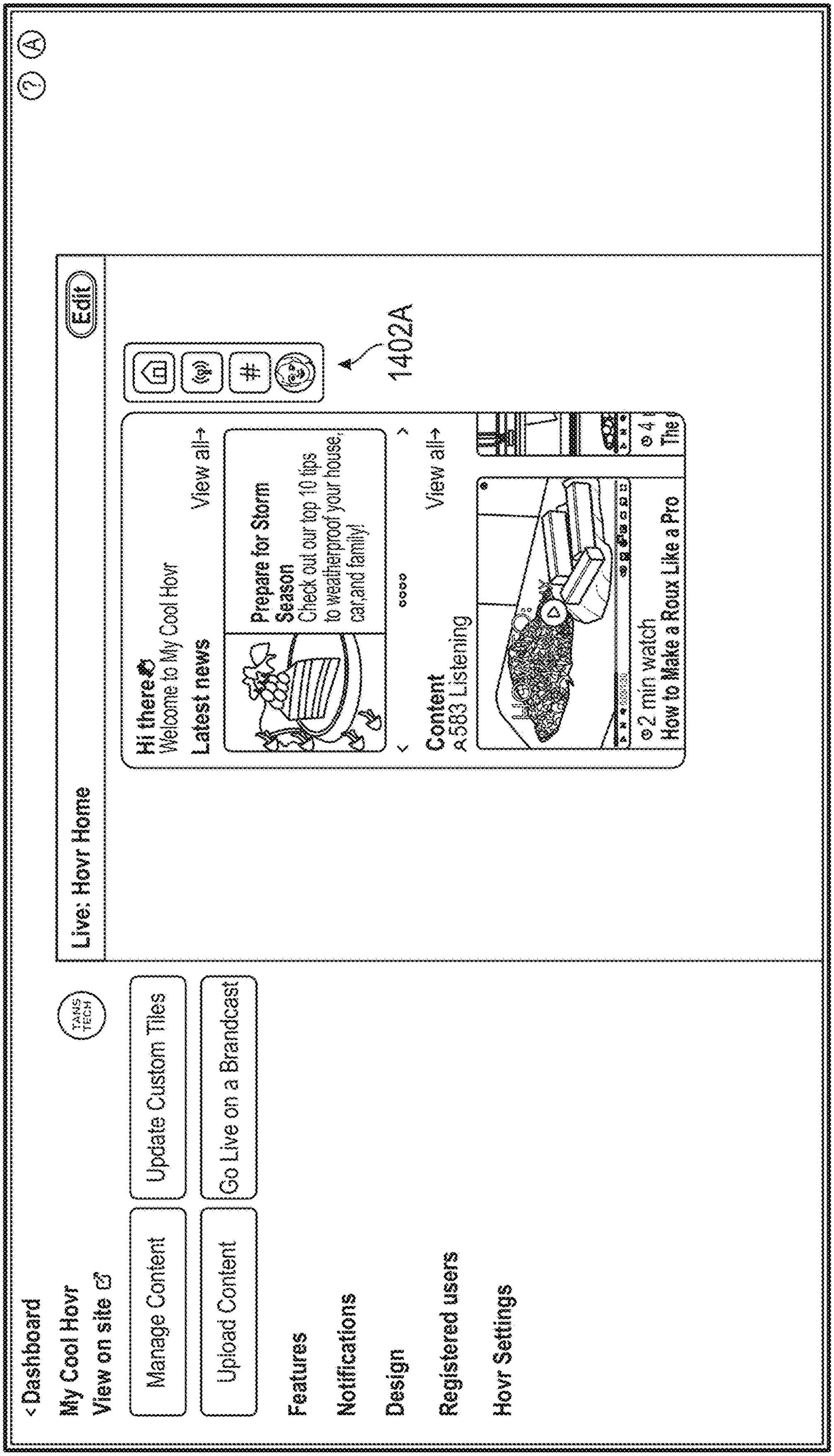
FIGS. 14A-14CC illustrate additional example user interfaces.
Figure 14B:
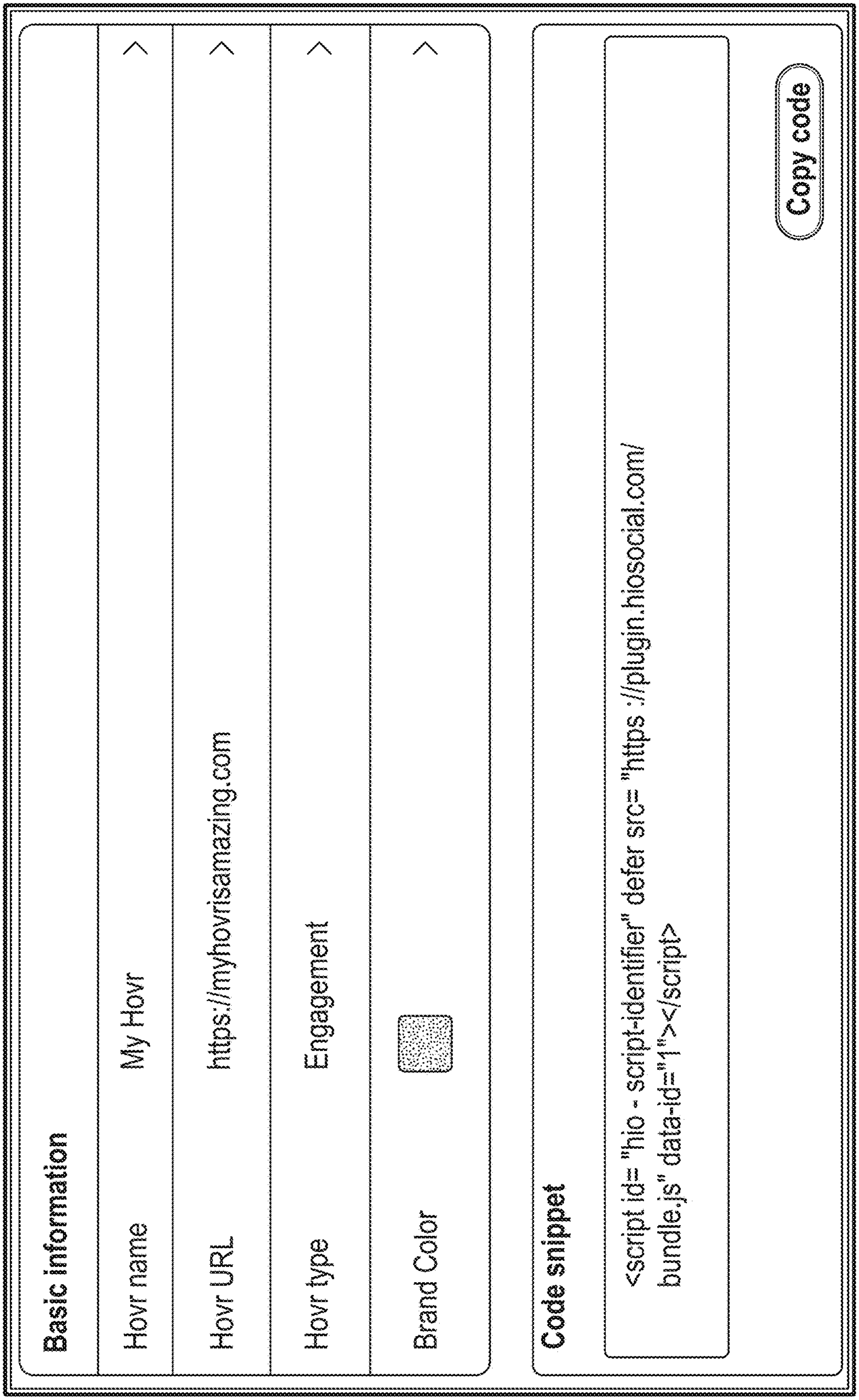
Figure 14C:
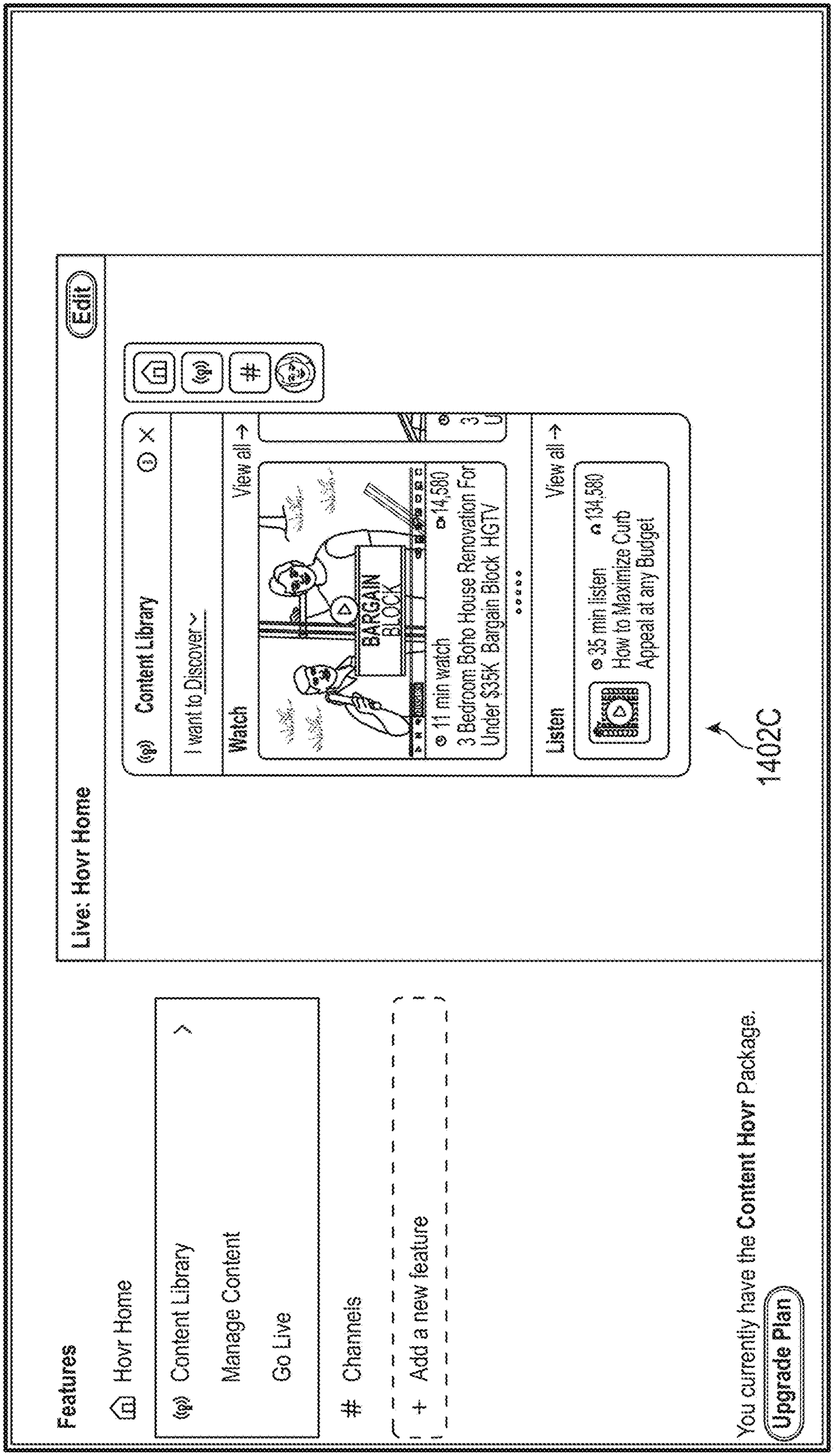
Figure 14D:
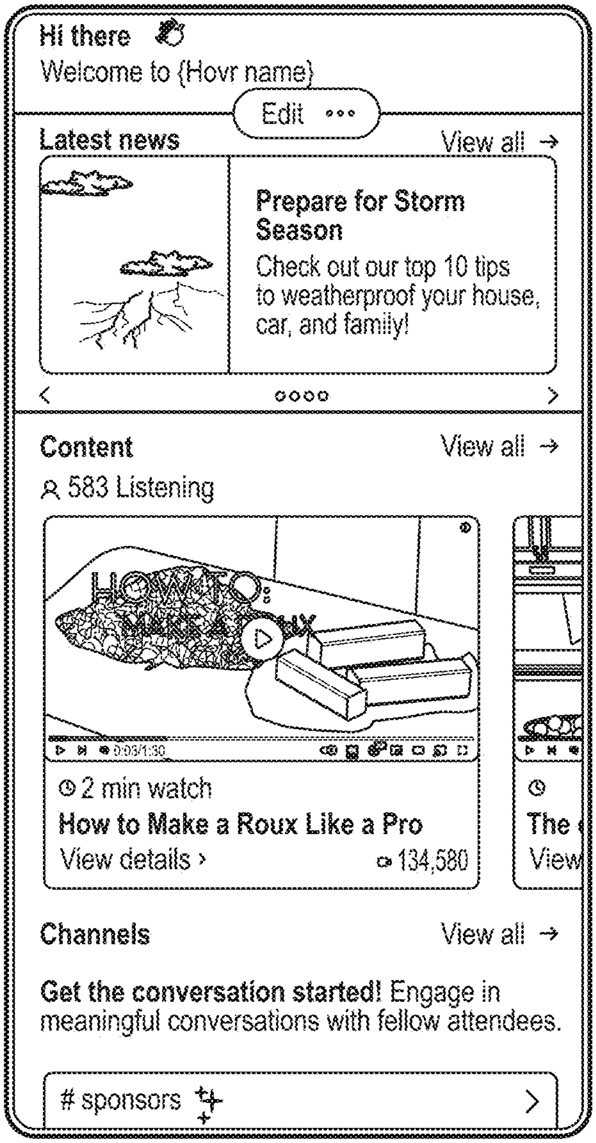
Figure 14E:
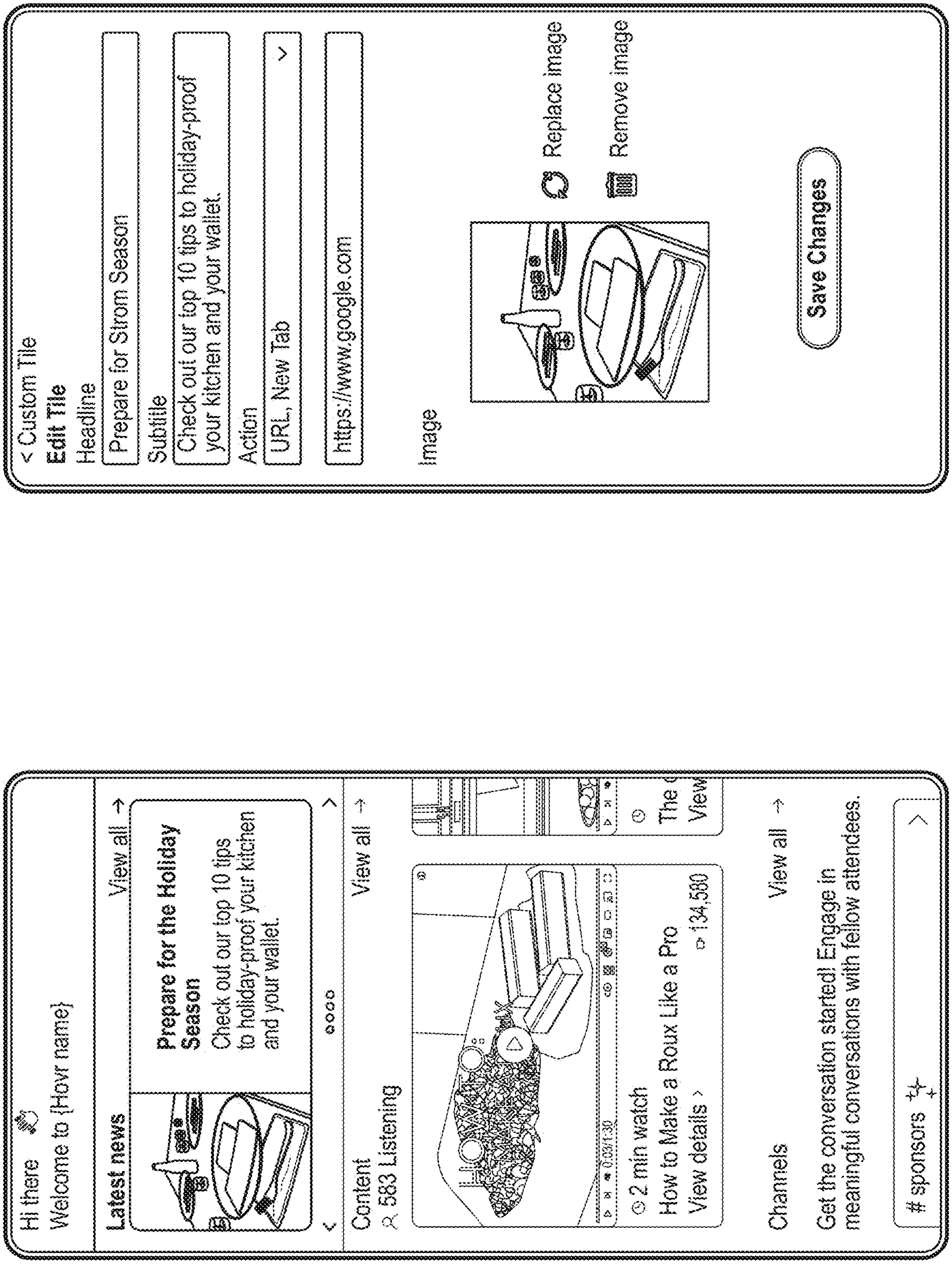
Figure 14F:
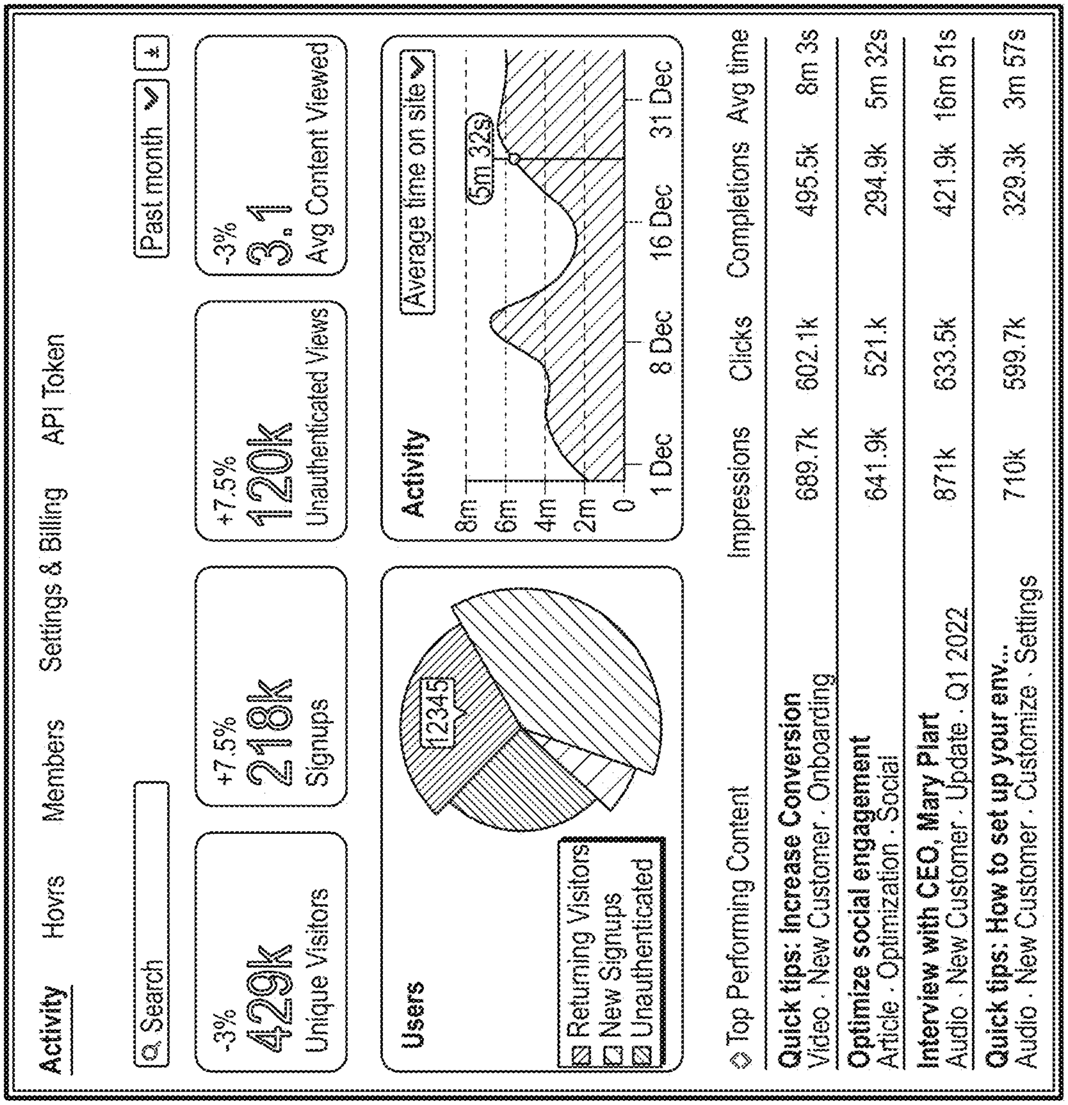
Figures 1, 14G:
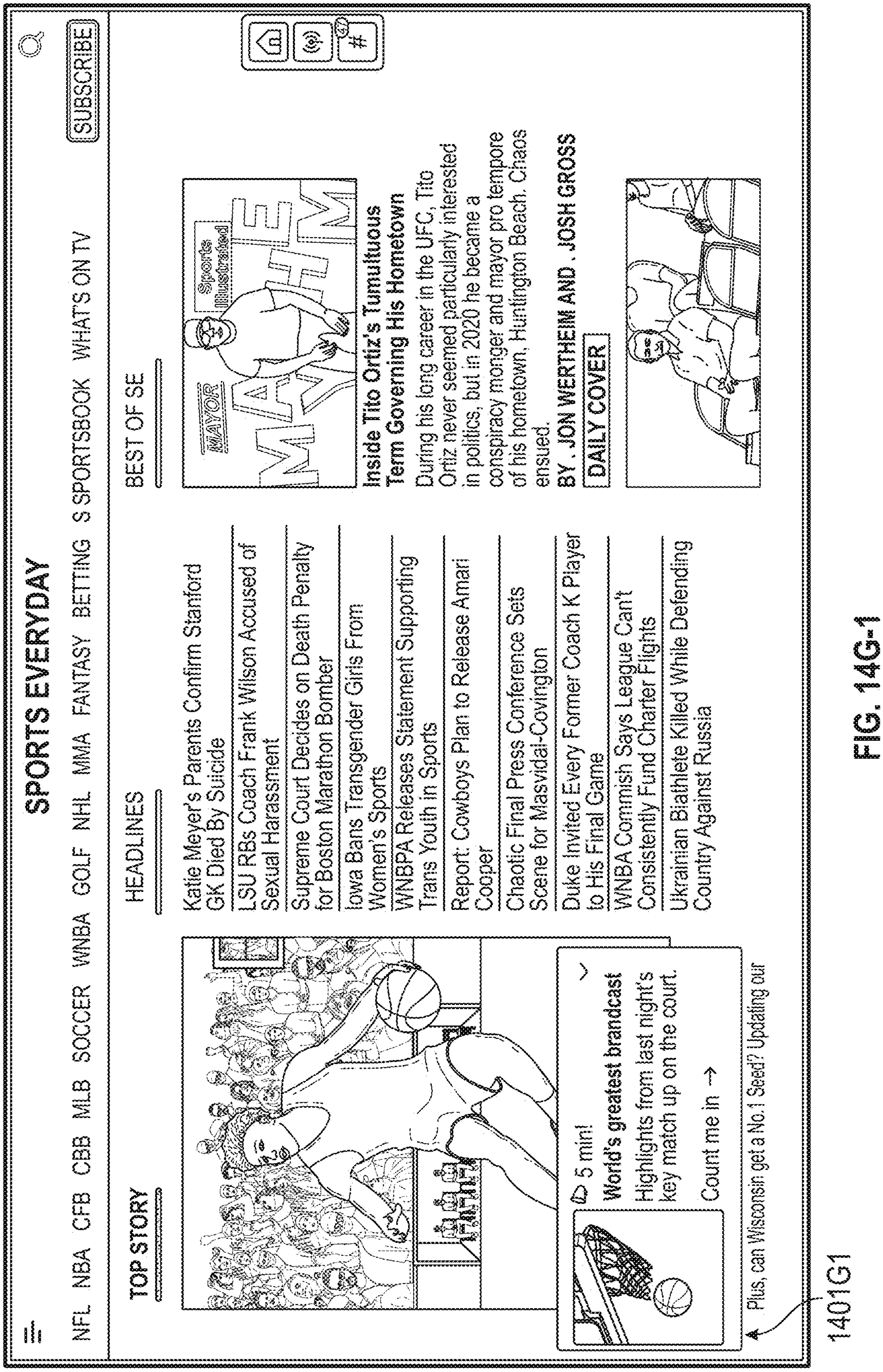
Figures 2, 14G:
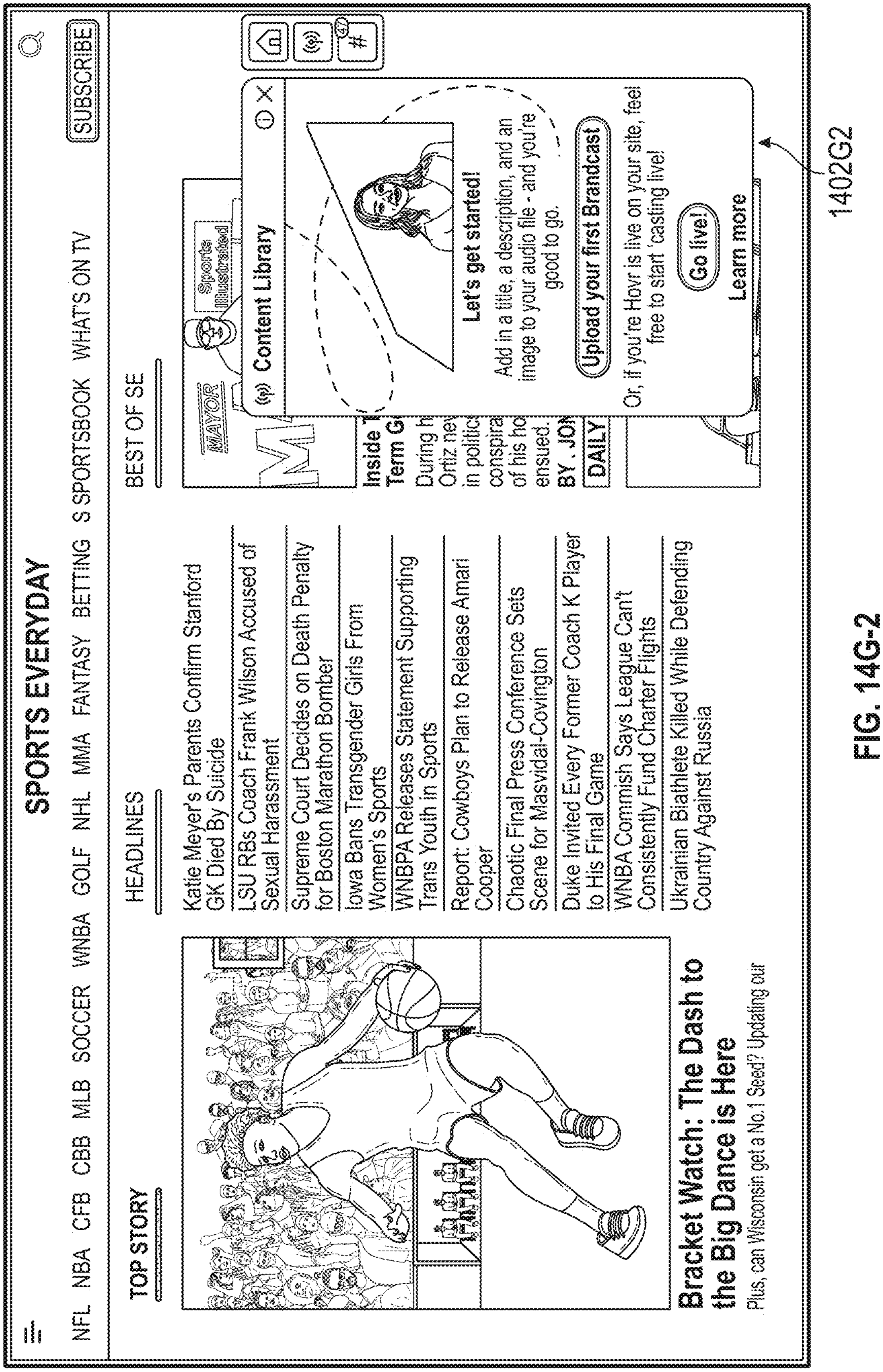

FIGS. 4A-4E2 illustrates various aspects of systems, applications, and processes. Referring to FIG. 4A, a functionality map is provided for certain services provided to users (e.g., via user interfaces presented via a widget, browser extension, or otherwise). The user network/connection function may provide: a "here now" user interface that provides a list of currently active, online users accessing a network resource (e.g., a website); a list of users that recently (e.g., within a threshold period of time, such as 12 hours, 24 hours, etc.) accessed the network resource but are not currently accessing the network resource; and/or a list of other users that the user has already established a connection with.

The user chat/discussion function may provide: a user interface listing channels (e.g., subject threads) which may be established and/or managed by an administrator associated with the network resource (where the number of posts or comments may be displayed in association with a given channel); and a direct message user interface which may list a compilation of some or all of the direct messages sent or received by the user via the system (where the direct messaging rules may be specific to a given website).

The tables function (which may also be referred to as a subgroup function, where multiple users may conduct a live chat session, such as a video chat session, and where the number of table participants may be limited to a specific maximum number) may provide: a list of currently available "tables" of a certain number of users (e.g., where a table may have 2, 4, 6, 8, or other number of users greater than 1) that the user may join (e.g., for a video, audio-only, and/or text chat session); and an upcoming tables user interface listing when the tables are scheduled for, and indication as to whether the table chat session will be moderated by a host, whether the tables have a specified discussion topic, etc.

The groups function provides a user interface that may enable users to co-browse a website (such functionality may be provided via the tables, direct messaging, and/or channels/threads functionality). The announcements function provides a user interface that enables the operator of the network resource (e.g., a website) to post information on news, releases, updates, sales, coupons, and/or the like for users to access and view. The FAQs and tutorial function may provide a user interface enabling a user to access and video answers to frequently asked user questions and to tutorials on the use of functionality described herein.

Figure 4C:
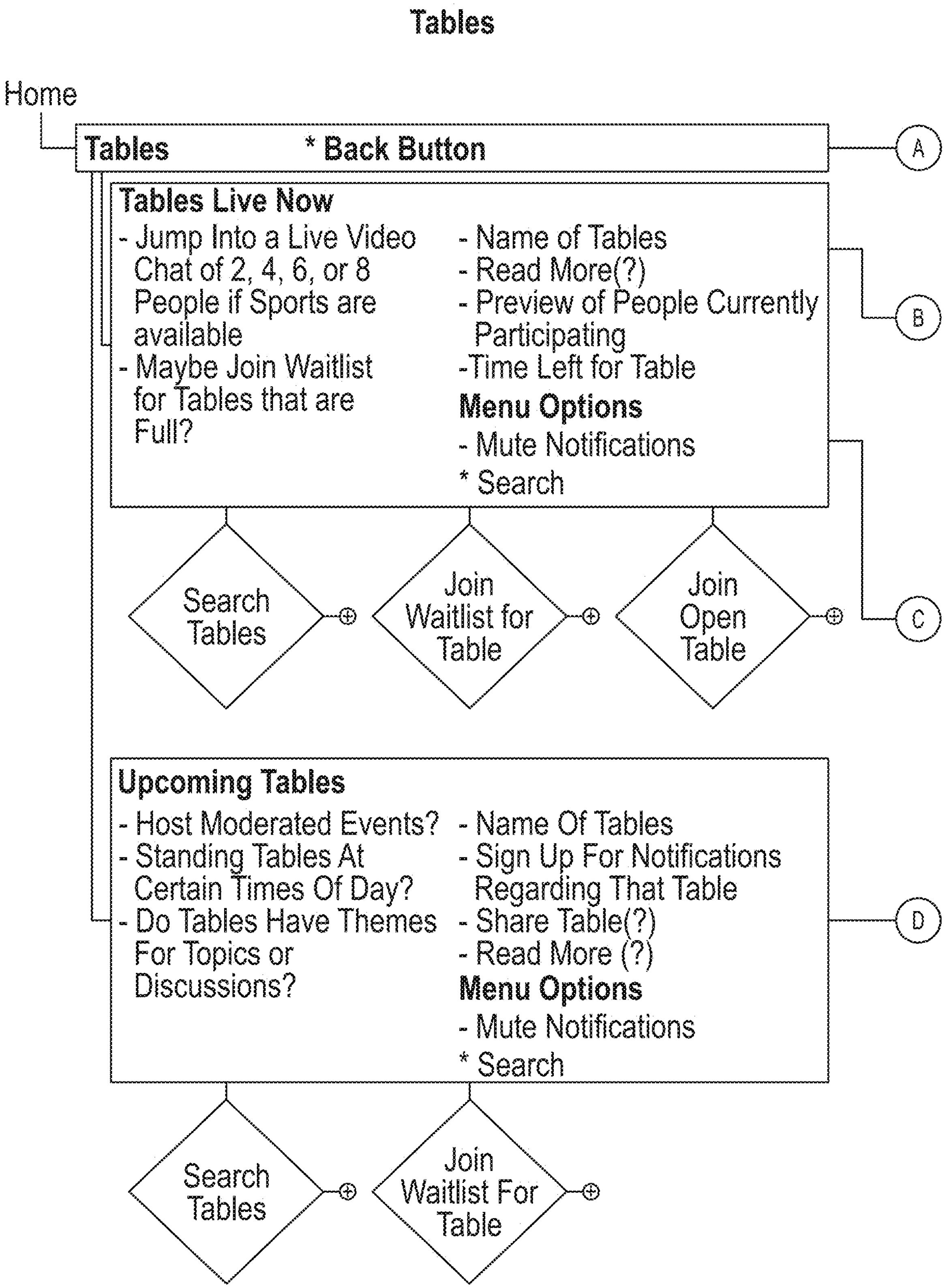
Figure 4D:
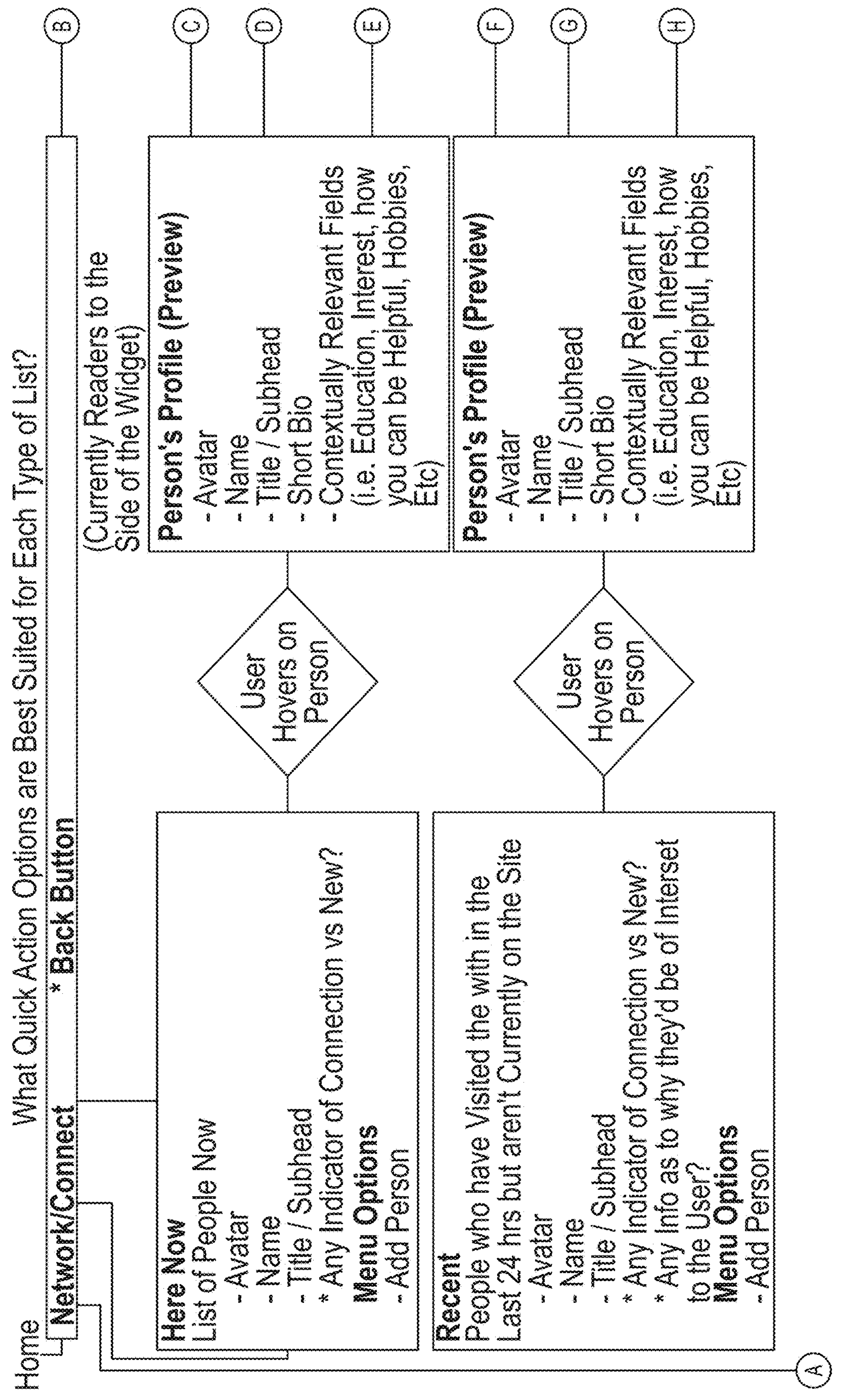

FIG. 4B illustrates the chat/discussion functionality in greater detail. FIG. 4C illustrates the tables functionality in greater detail. FIG. 4D illustrates the networking/connections functionality in greater detail. FIGS. 4E1-4E2 illustrate example widget user interface flows.

Additional user interfaces presented on a user device will now be described. Certain data in the user interfaces may be populated in real time by the multimedia communication server system and user inputs may be communicated from the user device to the multimedia communication server system which may store and process the user inputs.

Figure 5A:
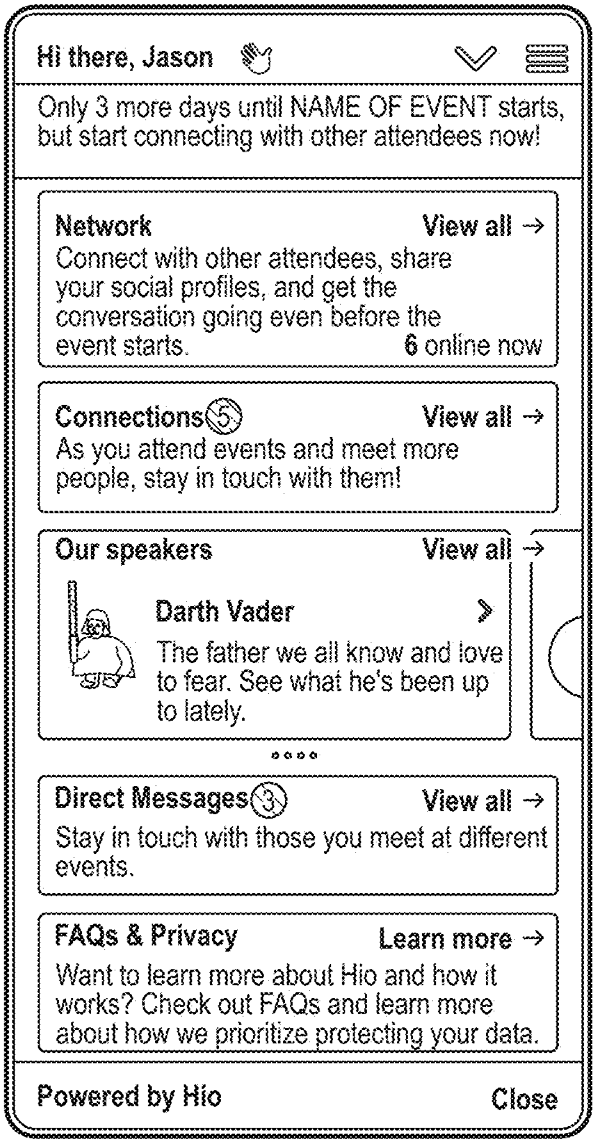
FIGS. 5A-12E illustrate additional example user interfaces.

FIG. 5A illustrates an example user interface providing a reminder to a user regarding an online event that the user has signed up for. The user interface may be populated with the number of days until the event (which may be populated using a remote or local electronic calendar) and the name of the online event.

A network module of the user interface enables the user to access a network user interface that enables the user to connect with other event attendees. The network module displays the number of event attendees currently online and available to network with. Such networking may include connecting with one or more of the online fellow online event attendees, communicating with one or more of the online fellow online event attendees (e.g., via text, video/audio, or audio only chat), and/or the sharing of social profiles from one or more social networking sites. A view all control, when activated, enables the user to access the network user interface and view which attendees are online.

A connections module of the user interface enables the user to access a connection user interface that enables the user to connect with the user's connections. The connections module displays the number of connections that are currently online. A view all control, when activated, enables the user to access the connections user interface and view which connections are online.

Figure 5B:

A speakers module lists one or more speakers for the online event, and provides a brief biography or curriculum vitae of one or more speakers and optionally includes a photograph or avatar of a given speaker. A view all control, when activated, enables the user to access a list and brief biography or curriculum vitae of all the scheduled event speakers. If there are no speakers at the event, the speaker module may be excluded, as illustrated in FIG. 5B.

A direct messages module provides access to a direct messaging user interface that enables the user to direct message other users, in a one-to-one fashion, that the user met at prior online events. The direct messages module displays the number of unread directed messages to the user. A view all control, when activated, enables the user to access direct messaging user interface and view the users that the user has attended events with.

A FAQs & privacy module provides access to frequently asked questions (FAQS) and answers thereto, and a privacy policy of the website operator.

Figure 5C:
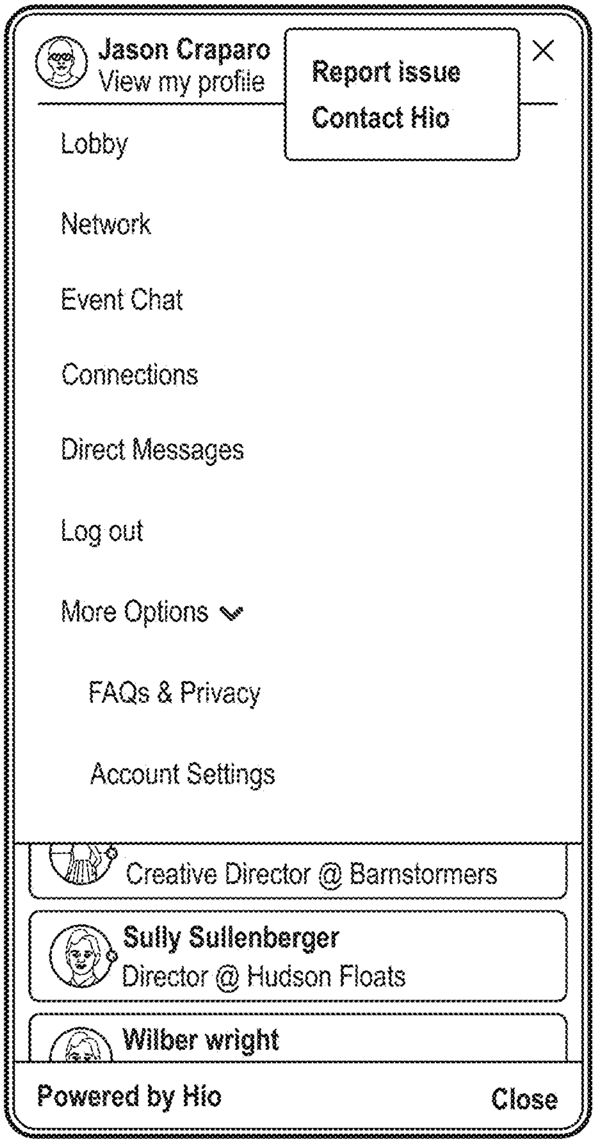

FIG. 5C illustrates an example network user interface that lists the event attendees currently online and available to network with (e.g., including name, job title, company at which the attendee is employed, and/or a photograph or avatar). A dropdown menu is provided via which the user can navigate to other user interfaces, such as those discussed herein.

A user interface may be provided enabling the user to access user interfaces corresponding to a virtual event virtual lobby, the network user interface, an event chat user interface, the connections user interface, the direct messages user interface, a log out user interface, the FAQs & privacy user interface, and the accounts setting user interface.

An interface may be provided that enables the user to report an issue or contact the operator.

Figure 5D:

FIG. 5D illustrates an example profile user interface including name, job title, company name, social media link(s), phone number, biography, industry-field, and interests.

Figure 5E:
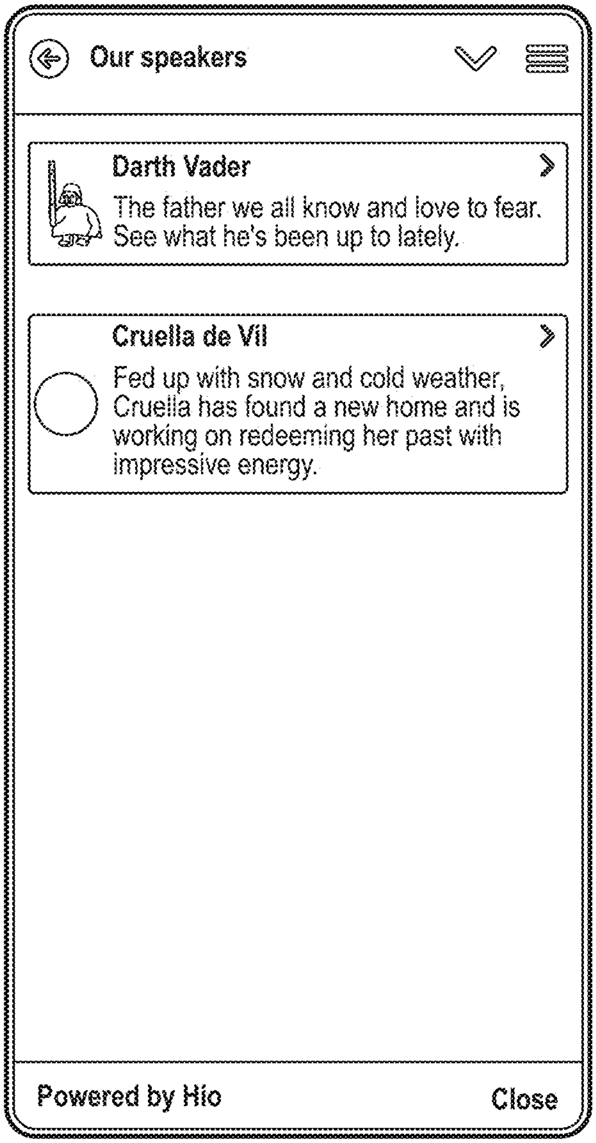

FIG. 5E illustrates an example speakers user interface, listing the names, images, and brief biography of the online event speakers. Controls may be provided in association with respective speaker entries, which when activated, navigates the user to a user interface that provides additional speaker information (e.g., a more extensive biography, contact information, and/or other data).

Figure 6A:
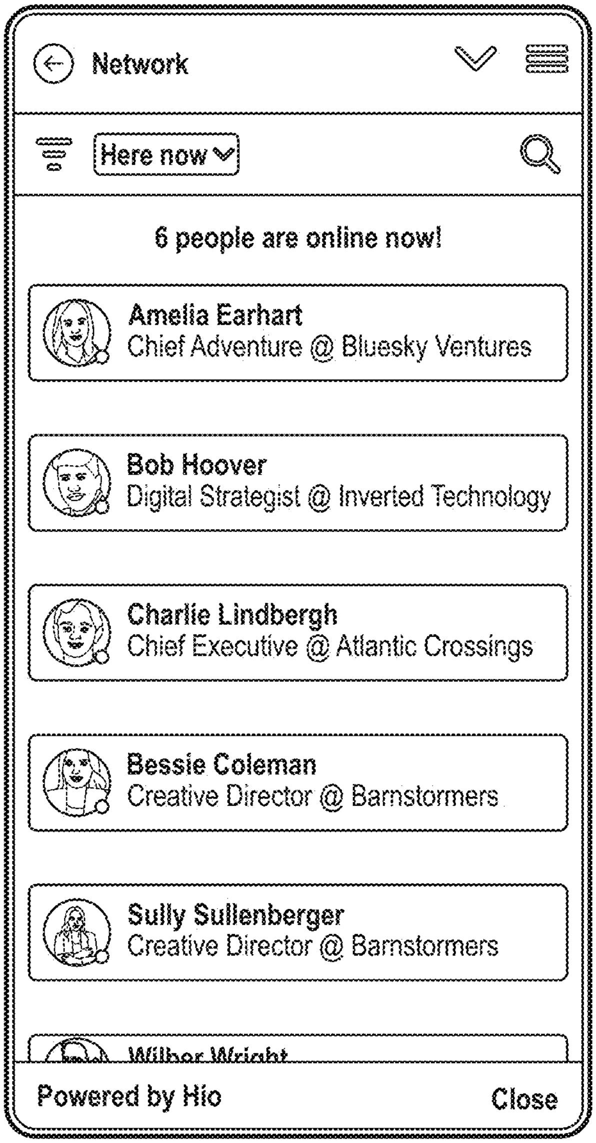

Referring to FIG. 6A, an example network user interface is illustrated. The network user interface is in a "here now" mode (where the mode may be selected via a mode user interface providing "here now", "recent", and "both" options) listing all event attendees that are currently online (e.g., including name, job title, company at which the attendee is employed, a photograph or avatar). The user may select a listed attendee, and additional attendee data may be presented, and controls may be provided via which the user may connect with and/or direct message the attendee.

Figure 6B:
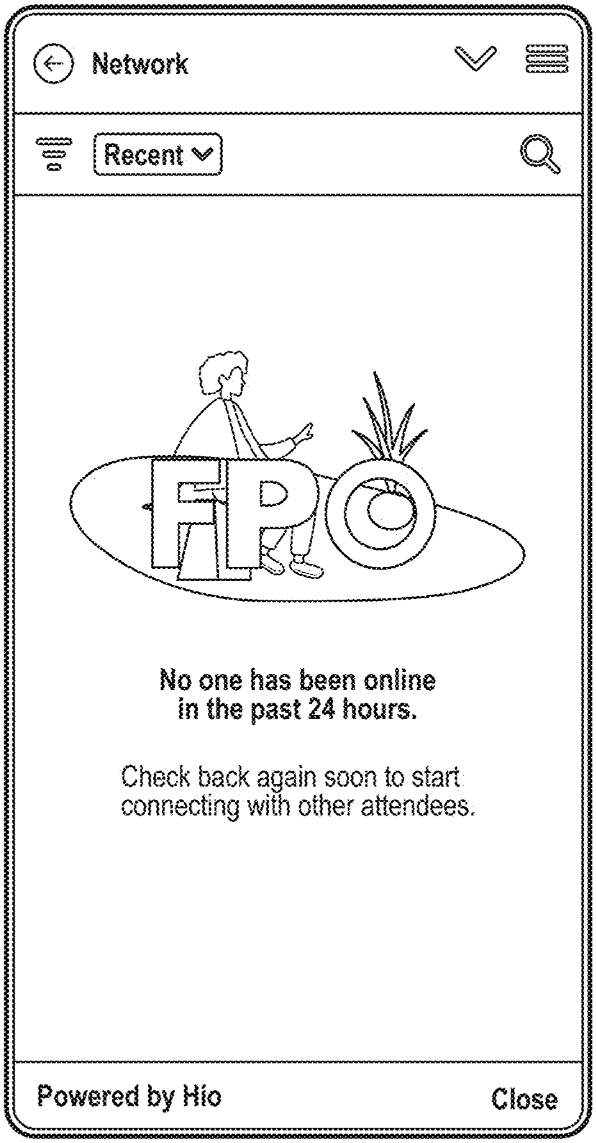

FIG. 6B illustrates the example user interface of 6A, with the mode set to "recent". The recent mode will list those attendees that were recently online (e.g., in the past 24 hours or other time period) but that are not currently online. In this example, the user interface reports that no attendee has been online in the past 24 hours.

Figure 6C:

FIG. 6C illustrates the example user interface of 6B, except in this example, although the user interface reports that there have been no recent visitors, it further reports that other users are currently online and available to make connections with.

Figure 6D:

FIG. 6D illustrates the example user interface of 6A, except in this example, although the user interface reports that no one is currently online, it further reports that there have been recent visitors.

Figure 6E:
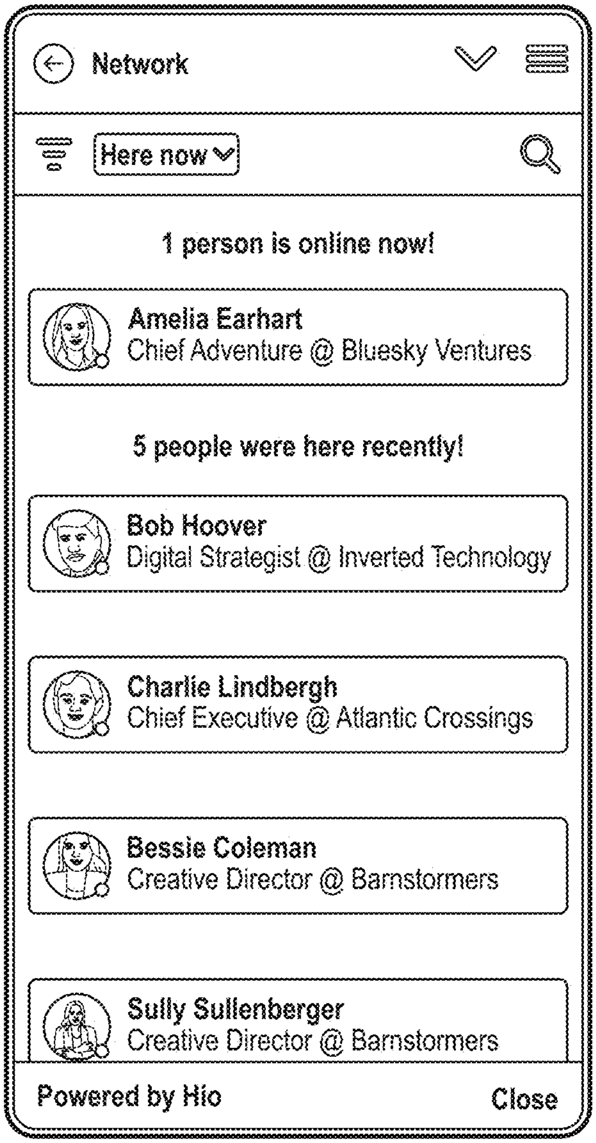

FIG. 6E illustrates the example user interface of 6A, identifying the attendees that are currently online (one person in this example), and further identifies attendees that have recently been online (e.g., including name, job title, company at which the attendee is employed, a photograph or avatar). Thus, the example user interface provides both the users that are "here now" and that were "recent."

Figure 6F:
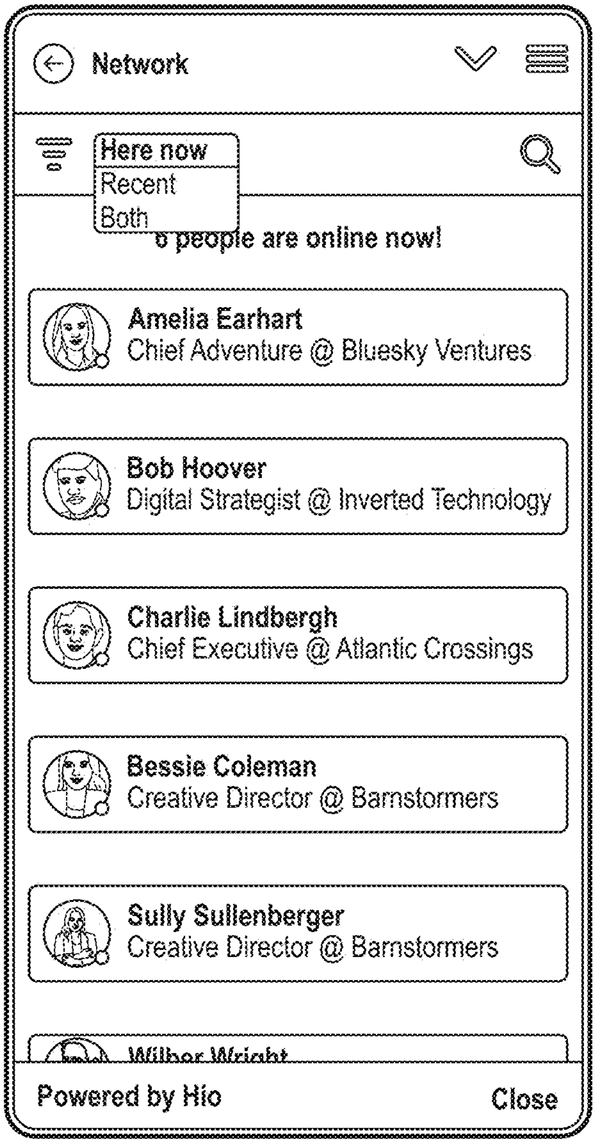

FIG. 6F illustrates a drop down menu enabling a user to select which types of users are to be displayed: those who are currently online at the website ("here now"), those that were recently online at the website but are no longer online at the website ("recent"), or both ("both").

Figure 6G:
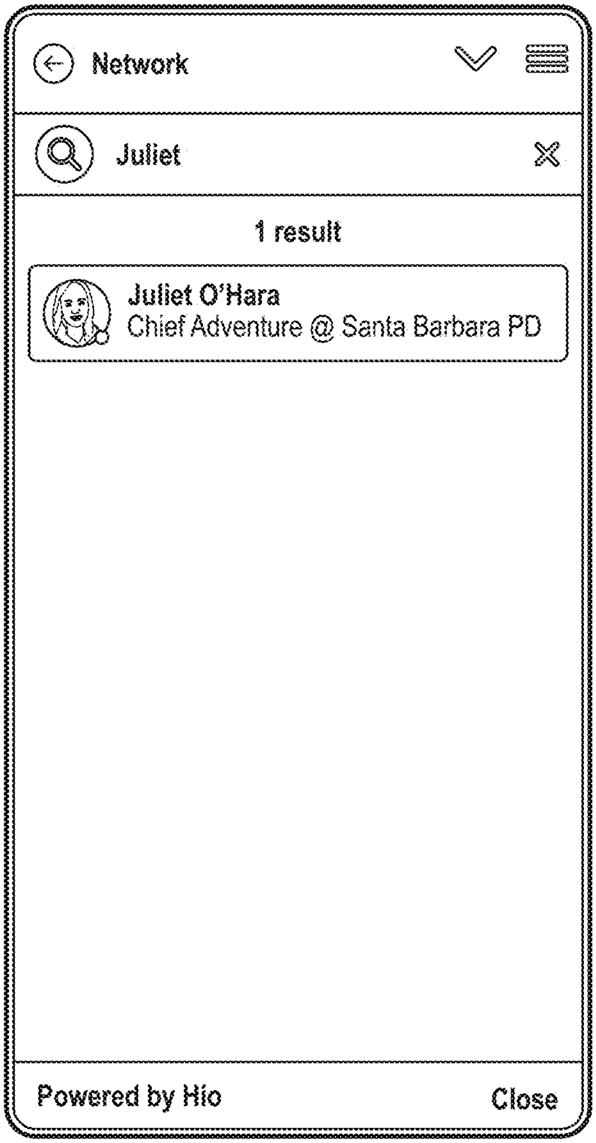

FIG. 6G illustrates an example search network user interface that enables a user to submit a search query term, which is received by a search engine remote from the user device which identifies matching users in the network, and returns search results comprising the matching users, ranked in accordance with the closeness of the match. Optionally, the search engine may perform an incremental search, where, as the user is typing search term characters the search engine identifies matches in real time and present search results, where the search results may be modified with each character entered by the user. In the illustrated example, a single search result is found, and the search result includes the name, job title, company, and a photograph or avatar of the matching user.

Figure 6H:
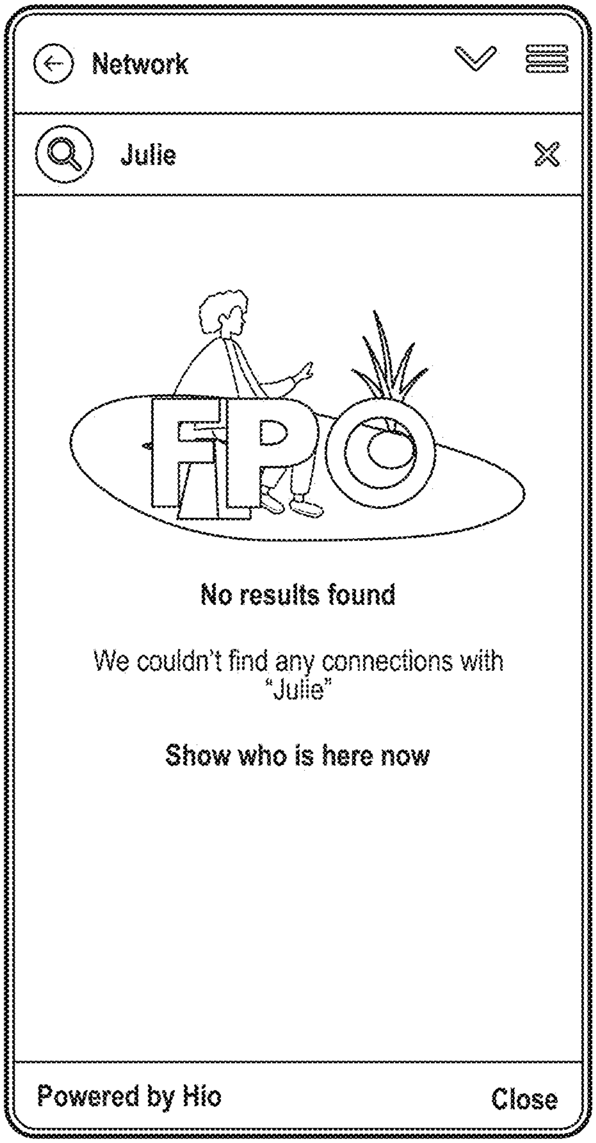

FIG. 6H illustrates the search network user interface of FIG. 6G, except in this example, the user interface reports that no matches have been found, and provides a link which when activated causes a user interface to be displayed listing who is currently on line.

Figure 7A:
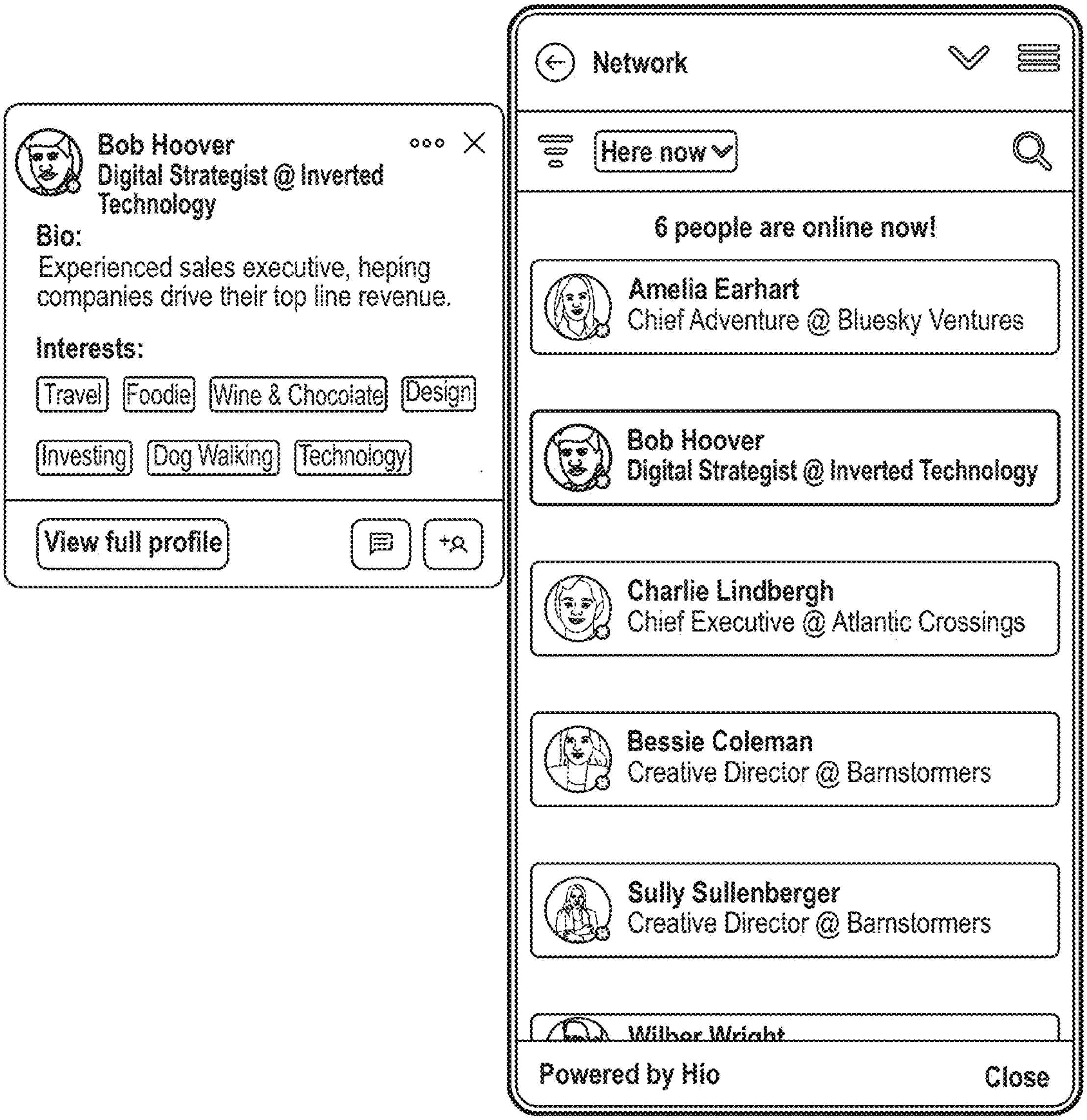

FIG. 7A illustrates an example profile user interface that may be displayed in response to the user hovering a cursor or otherwise pointing at an entry in a listing of user's that are currently online (and may similarly be displayed with responding to other listings of users). The profile may pop-up over or adjacent to the listing and may include an "X" control that when activated by the user will cause the profile to be closed so that it is no longer displayed.

Figure 7B:
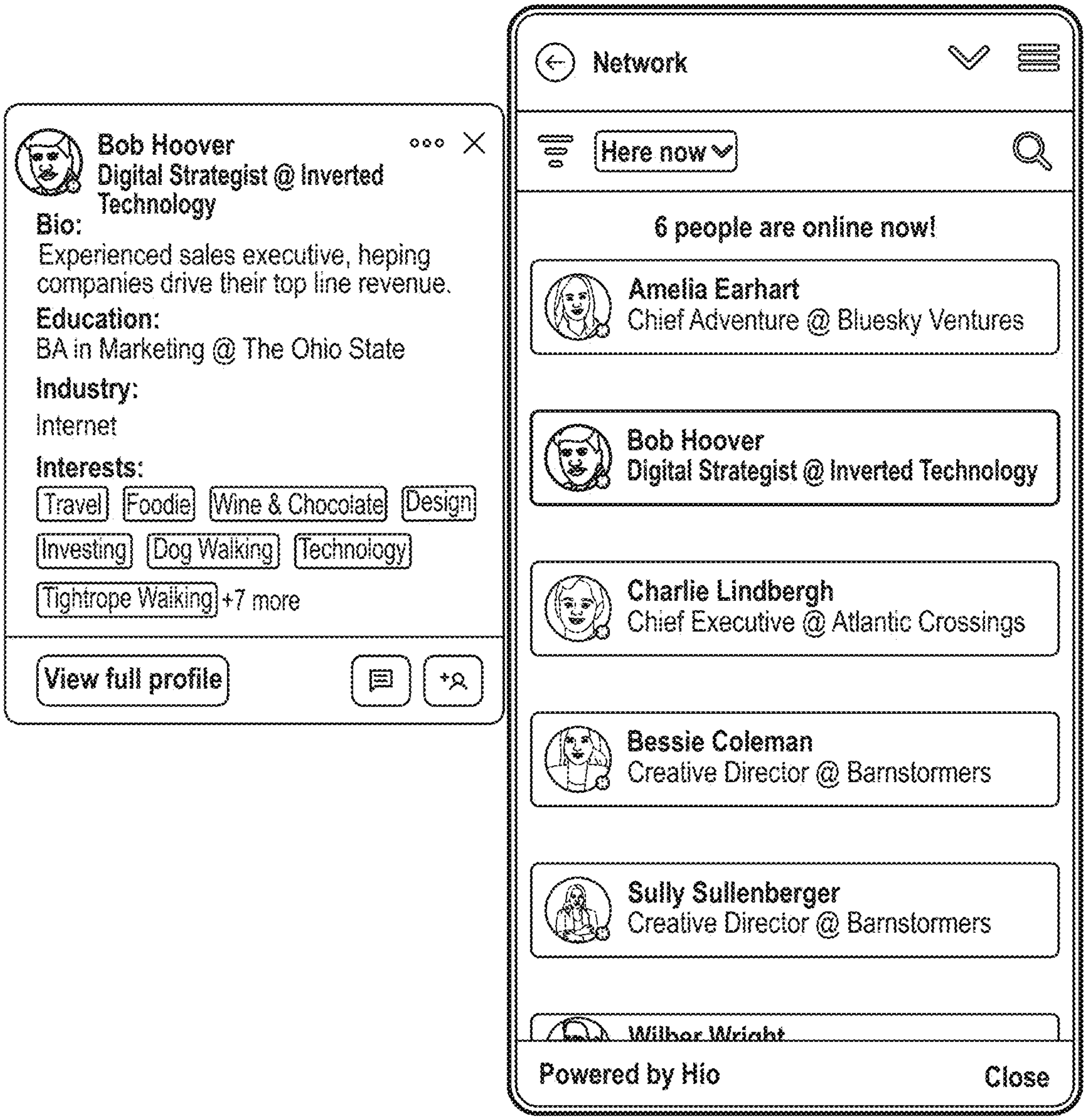

The example profile user interface provides user data including name, job title, company name, social media link, phone number, biography, industry-field, and interests. Controls may be provided via which the user can chat (e.g., video, audio, and/or text chat) with the user whose profile is presented or make a connection with such user. A view full profile control is provided which when activated, causes the full profile, an example of which is illustrated in FIG. 7B to be presented. In this example, in addition to the information provided via the profile in FIG. 7A, the full profile may include educational accomplishments, industry, and additional interests.

Figure 8A:
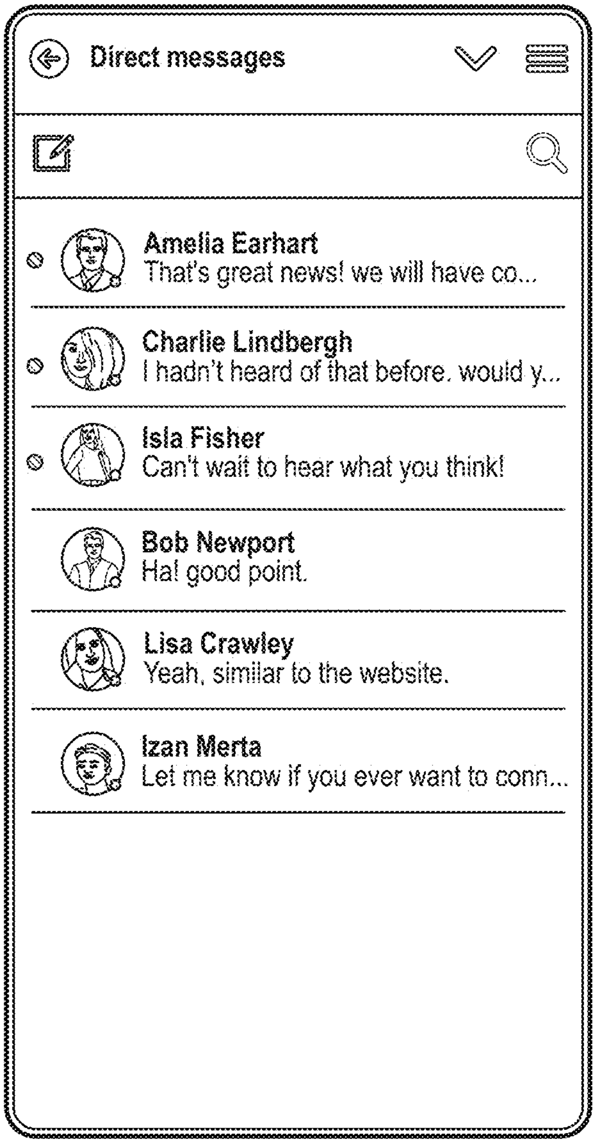

FIG. 8A illustrates an example direct messaging user interface (e.g., which may be accessed via a direct messaging module interface or menu). The direct messaging user interface may list a certain number of the most recent direct messages to the user (using a selected communication channel (e.g., text, video, audio)), optionally via a scrollable user interface via which the user can scroll down (or up) to view additional direct messages. A given direct message entry may include the name and/or image or avatar of the user that transmitted the message, an initial portion or all of the message, and an indication as to whether the message is new (e.g., via a filled in circle or other indicator) or that the user has already viewed the message. A control is provided via which the user can draft and transmit a direct message to another user.

Figure 8B:
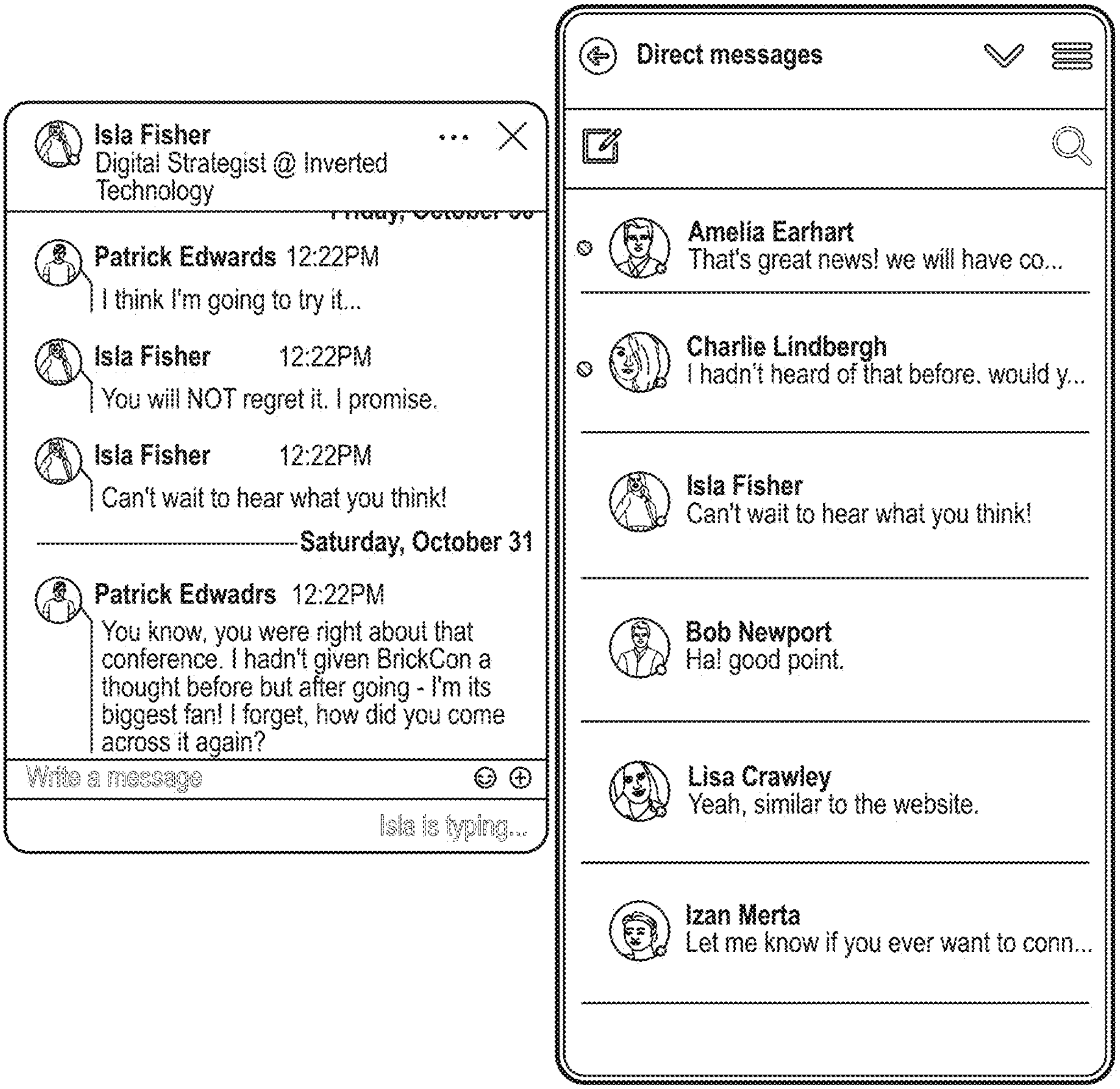

As illustrated in FIG. 8B, in response to a user selecting a user in the direct messaging list of FIG. 8A, a corresponding message thread may be displayed (e.g., as a pop-up overlaying the messaging list in whole or in part, or displayed alongside the message list). A control may be provided (e.g., an "X" control) which when activated causes the thread user interface to close. The thread user interface may display some or all of the messages in the thread, the user name, user image/avatar, a portion or all of the message, and the date and/or time the message was transmitted or received. A field is provided configured to receive a user message which will then be transmitted to others in the thread and which will be included in the thread display.

Figure 8C:

If there are no direct messages yet, the user interface illustrated in FIG. 8C may be displayed. The user interface includes an indication that no direct messages have been received yet, and a link/control is provided via which the user can initiate a direct message conversation with other users in the user's network.

Figure 8D:
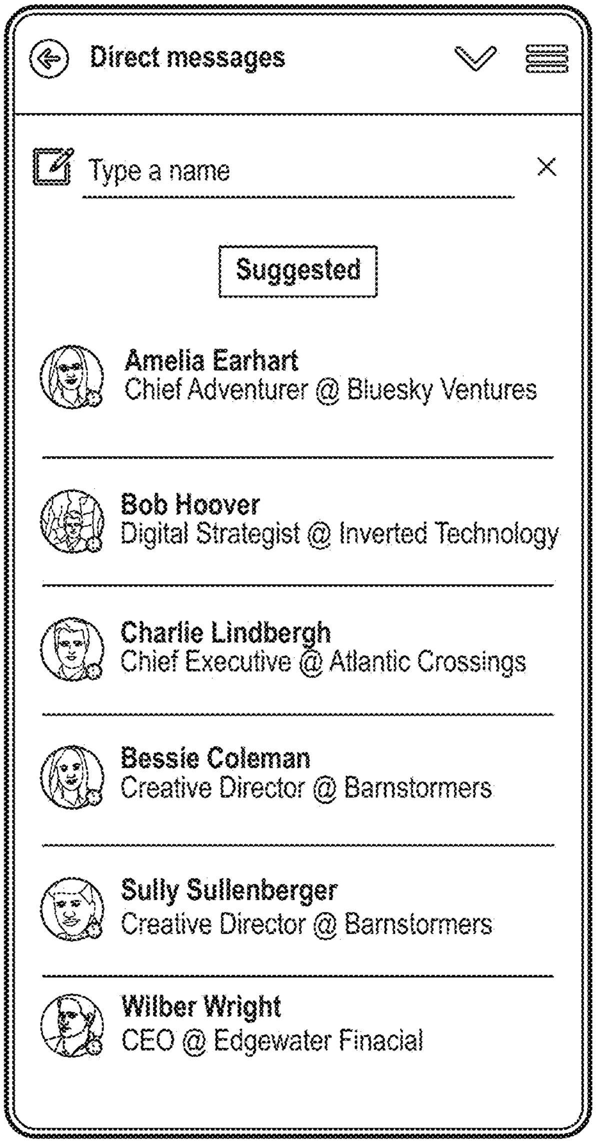

The system may suggest potential targets for direct messages from the user via a suggestions user interface, such as that illustrated in FIG. 8D. The suggested potential targets may be identified based on a commonality of identified interests, common other users with whom the user and the potential target have exchanged direct messages, common other users with whom the user and the potential target are in networks with, and/or using other information discussed herein. A given suggested target user for a direct message may include the name and/or image or avatar of the suggested target user, a job title, and a company name. A field is provided via which the user can enter the name of another user, and the system may utilize a search engine to search for, identify and return matching users.

Figure 8E:
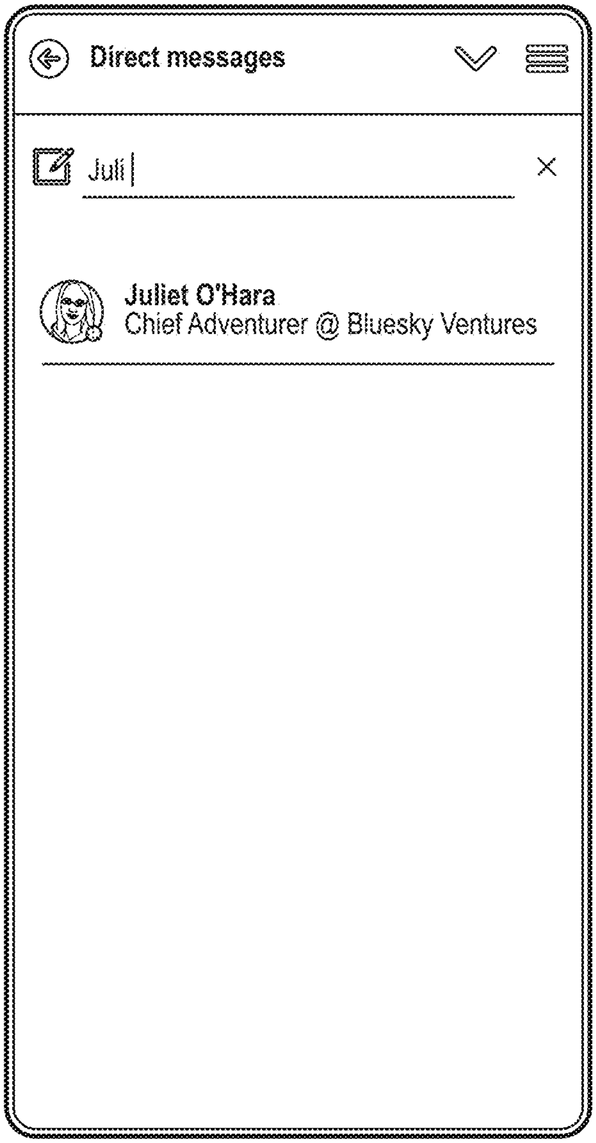

FIG. 8E illustrates a search direct messages user interface that enables a user to submit a search query term, which is received by a search engine which identifies matching users that have sent to and/or received from the user one or more direct messages, and returns search results comprising the matching users, optionally ranked in accordance with the closeness of the match. Optionally, the search engine may perform an incremental search, where, as the user is typing search term characters the search engine identifies matches in real time and presents search results, where the search results may be modified with each character entered by the user. In the illustrated example, a single search result is found, and the search result includes the name, job title, company, and a photograph or avatar of the matching user.

Figure 8F:

FIG. 8F illustrates an example user interface prompting the user to initiate a conversation (e.g., via text, audio, video) with one or more other users, including the name, job title, company, and a photograph or avatar of the suggested user. A field is provided via which the user can enter a message (e.g., a text message, where a text message may comprise one or more emojis) to the user.

Figure 9A:
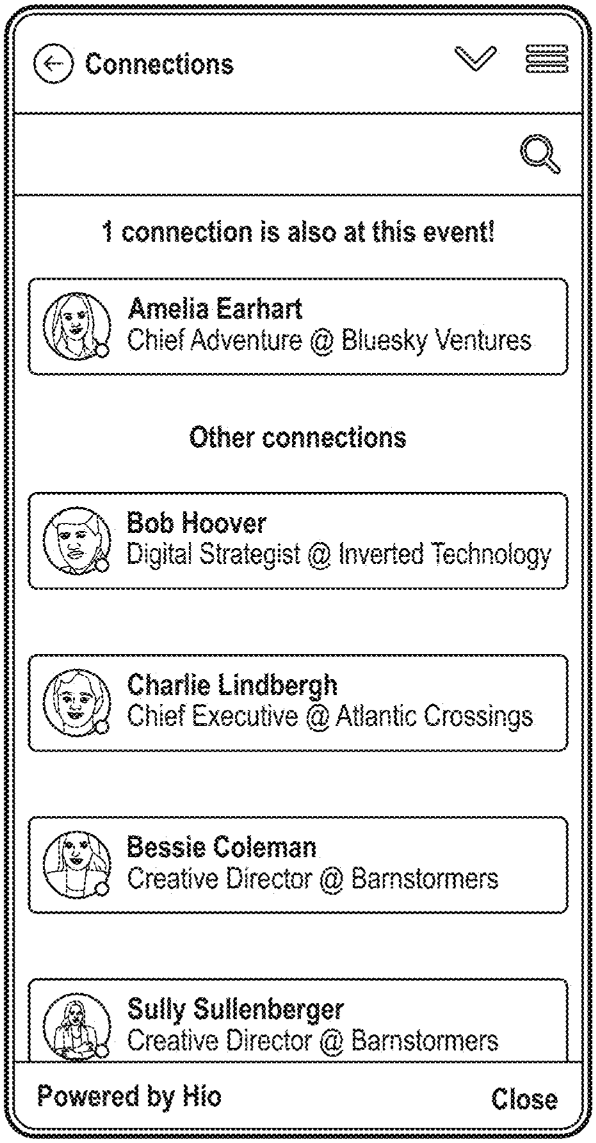

FIG. 9A illustrates an example connections user interface. The system determines which of the user's connections are currently at an online event at which the user is an attendee, identifies the user's connections that are not currently at the online event, and populates the connections user interface accordingly. In the illustrated example, the user interface presents the number of the user's connections that are attending the online event, and provides the name, job title, company, and a photograph or avatar of the attendee. In addition the user interface displays connections of the user that are not attending the online event.

Figure 9B:
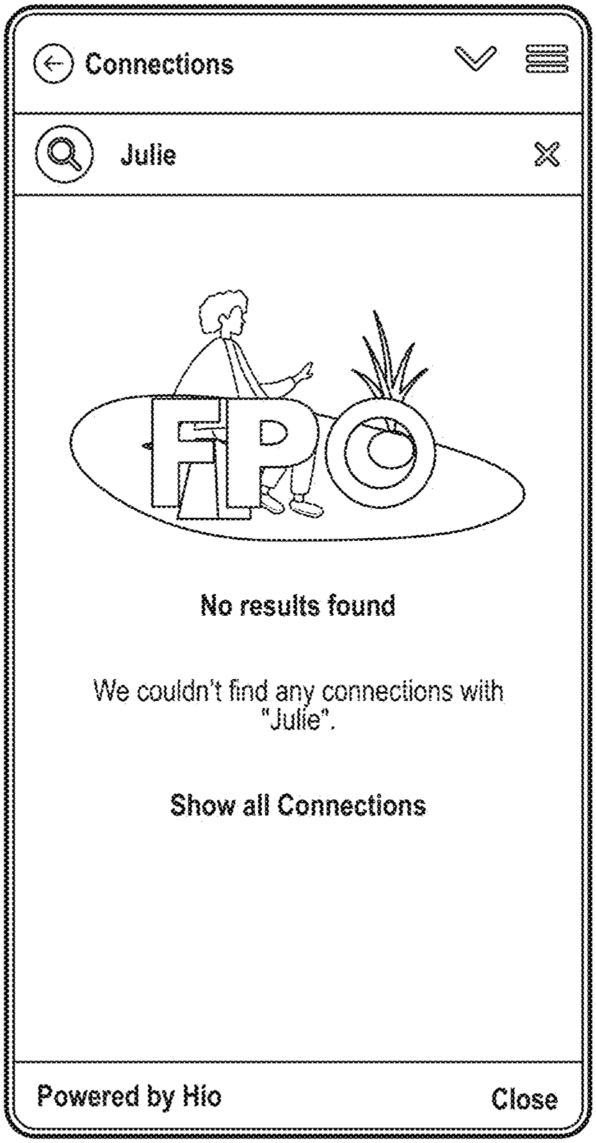

FIG. 9B illustrates a search direct messages user interface that enables a user to submit a search query term, which is received by a search engine which identifies matching users that are connected with the user, and returns search results comprising the matching users, optionally ranked in accordance with the closeness of the match. Optionally, the search engine may perform an incremental search, where, as the user is typing search term characters the search engine identifies matches in real time and present search results, where the search results may be modified with each character entered by the user. In the illustrated example, no matches are found.

Figure 9C:
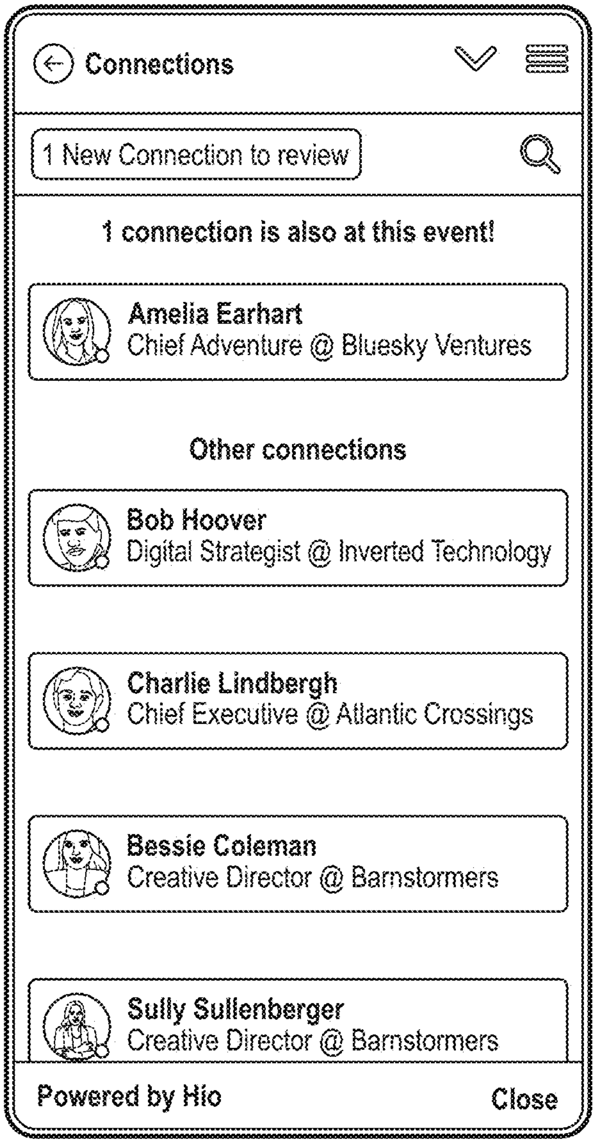
Figure 9D:
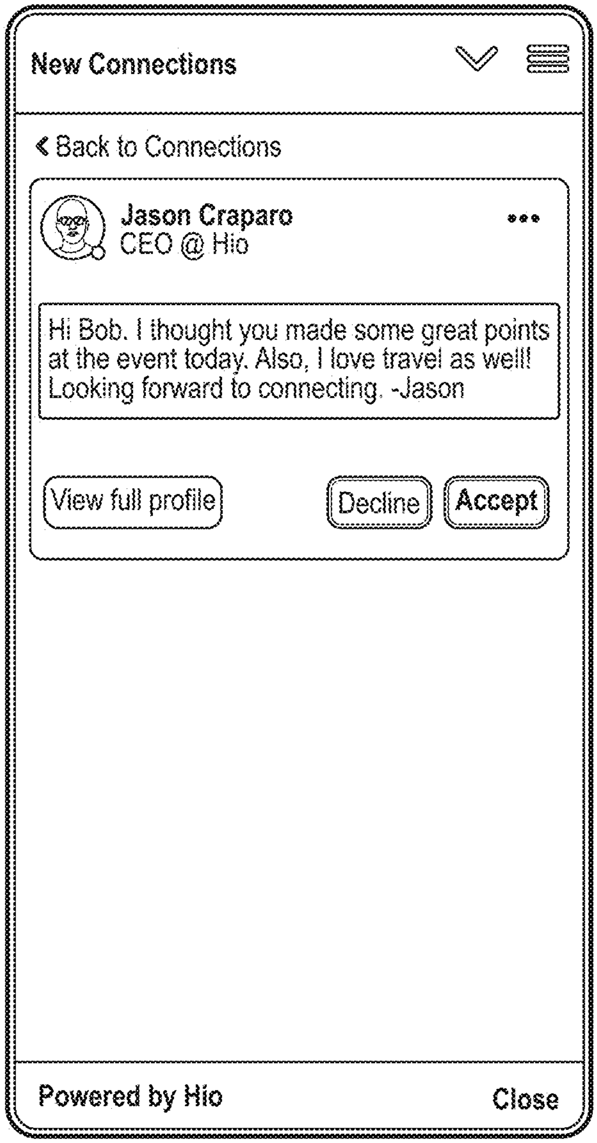
Figure 9E:

FIG. 9C illustrates the connection user interface, but in this example, the user interface is populated by the system to identify the number of connection requests (corresponding to requests by other users to become a connection) for the user to review. In response to the user selecting the new connection entry, a new connections user interface, such as that illustrated in FIG. 9D, may be presented. As illustrated in FIG. 9D, the name, job title, company, and a photograph or avatar of the new connection may be presented, with a message from the new connection to the user. Controls are provided via which the user can accept or decline the connection request, and the acceptance or declining of the request may be stored in memory in association with a user record. A view full profile control is provided, which when activated, causes the full profile of the user to be presented, such as that illustration in FIG. 9E.

Figure 10A:
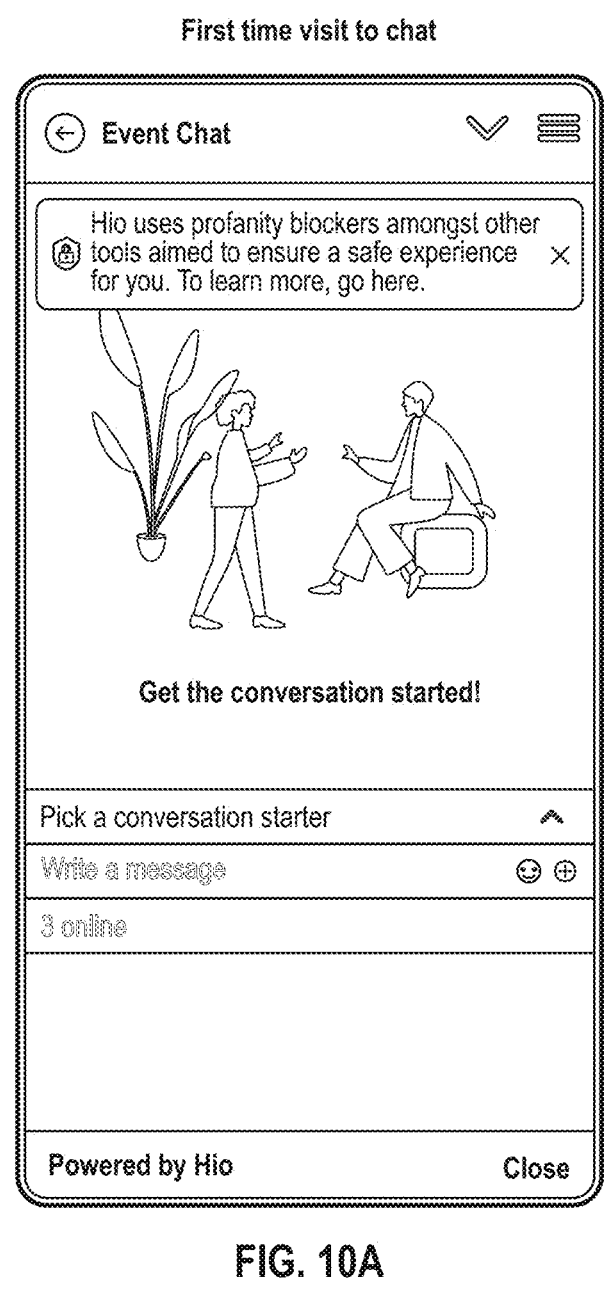

FIG. 10A illustrates an example channels user interface. The user interface may be presented if the system detects that this is the first time the user has visited to chat (e.g., in a particular forum). The disclosed system may include or utilize a profanity blocker that detects profanities and other potential offensive language. For example, the system may use a blacklist of certain words, scan text or other messages for blacklisted words, and if such words are detected, deletes such words from the message (and optionally replaces such words with comparable or other phrases from a list). The user interface illustrated in FIG. 10A includes a notice regarding the use of such profanity blockers, where a control is provided via which the user can close the notice. The user is prompted to start a conversation with other users. A control is provided via which the user can pick a conversation starter from a list of conversation starter messages (where a control is provided via which the user can cause a list of conversation starter messages to be displayed). A field is provided via which the user can enter a custom, user-drafted message. The user interface may be populated by the system with the number of users currently online.

Figure 10B:
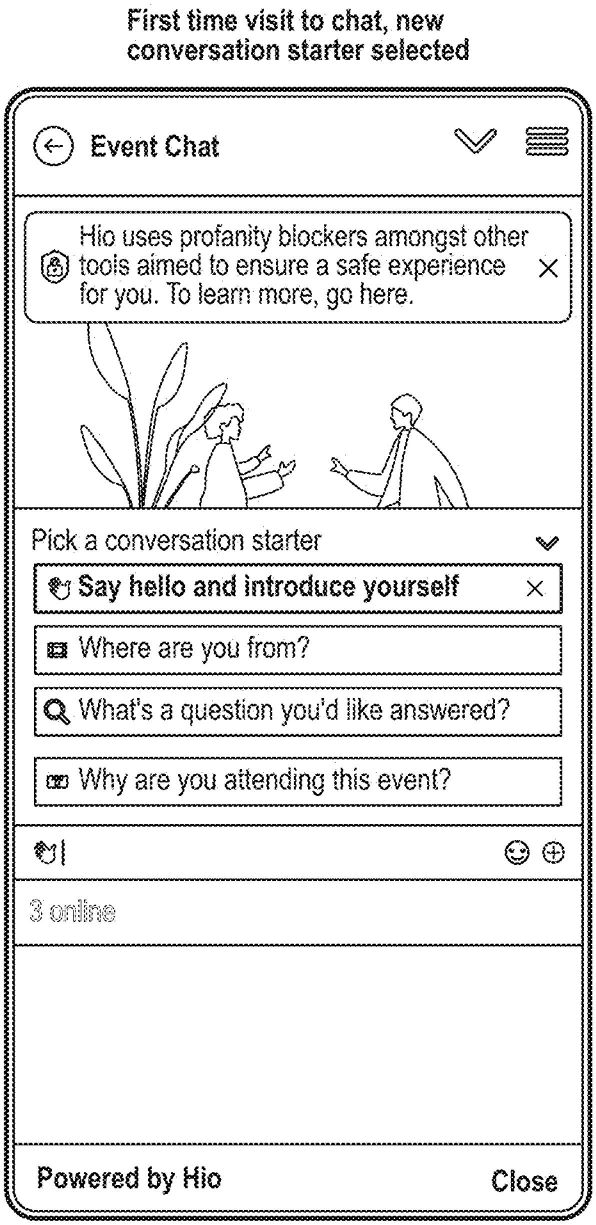

FIG. 10B illustrates the user interface of FIG. 10A where the user has activated the control that causes the list of conversation starter messages. Optionally, if the user selects a conversation starter message, the other prospective conversation starter messages are no longer displayed.

FIG. 10C illustrates a user interface which may be presented after at least one message has been sent. The user interface may present the message in the thread and the message timing. A hand wave icon may be displayed indicating how many other users have transmitted an electronic hand wave indication to the user. The user interface may be populated with the number of replies received to the user's messages.

FIG. 10D illustrates a user interface displaying, for a selected subject forum, the chat messages in the forum, including the message dates and times. The available forums may be displayed alongside the forum messages.

Figure 10E:
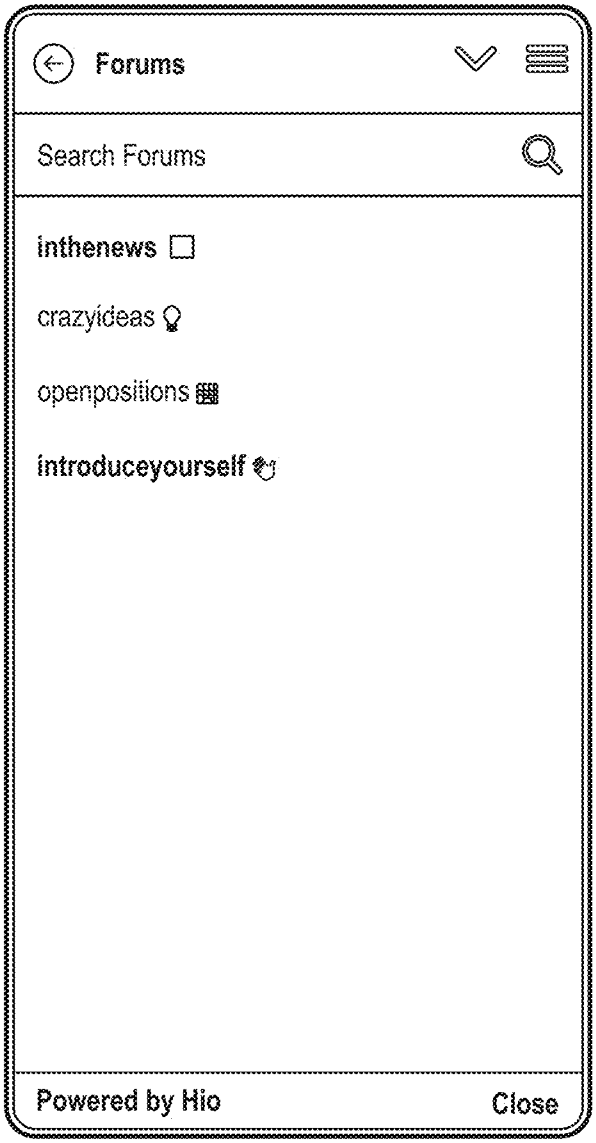
Figure 10F:
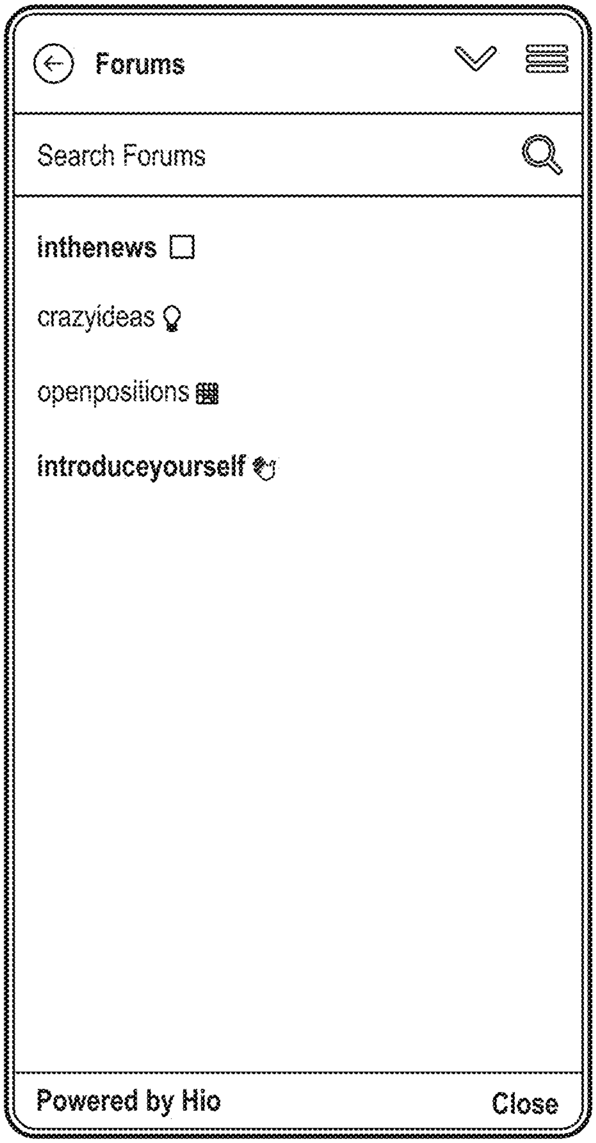

FIGS. 10E and 10F illustrate an example search forum user interface that enables a user to submit a search query term, which is received by a search engine which identifies matching forums, users, topics, and/or text in the forums, and returns search results comprising the matching users, ranked in accordance with the closeness of the match. Optionally, the search engine may perform an incremental search, where, as the user is typing search term characters the search engine identifies matches in real time and present search results, where the search results may be modified with each character entered by the user. In the illustrated example, a single search result is found, and the search result includes the name, job title, company, and a photograph or avatar of the matching user.

Figure 11A:
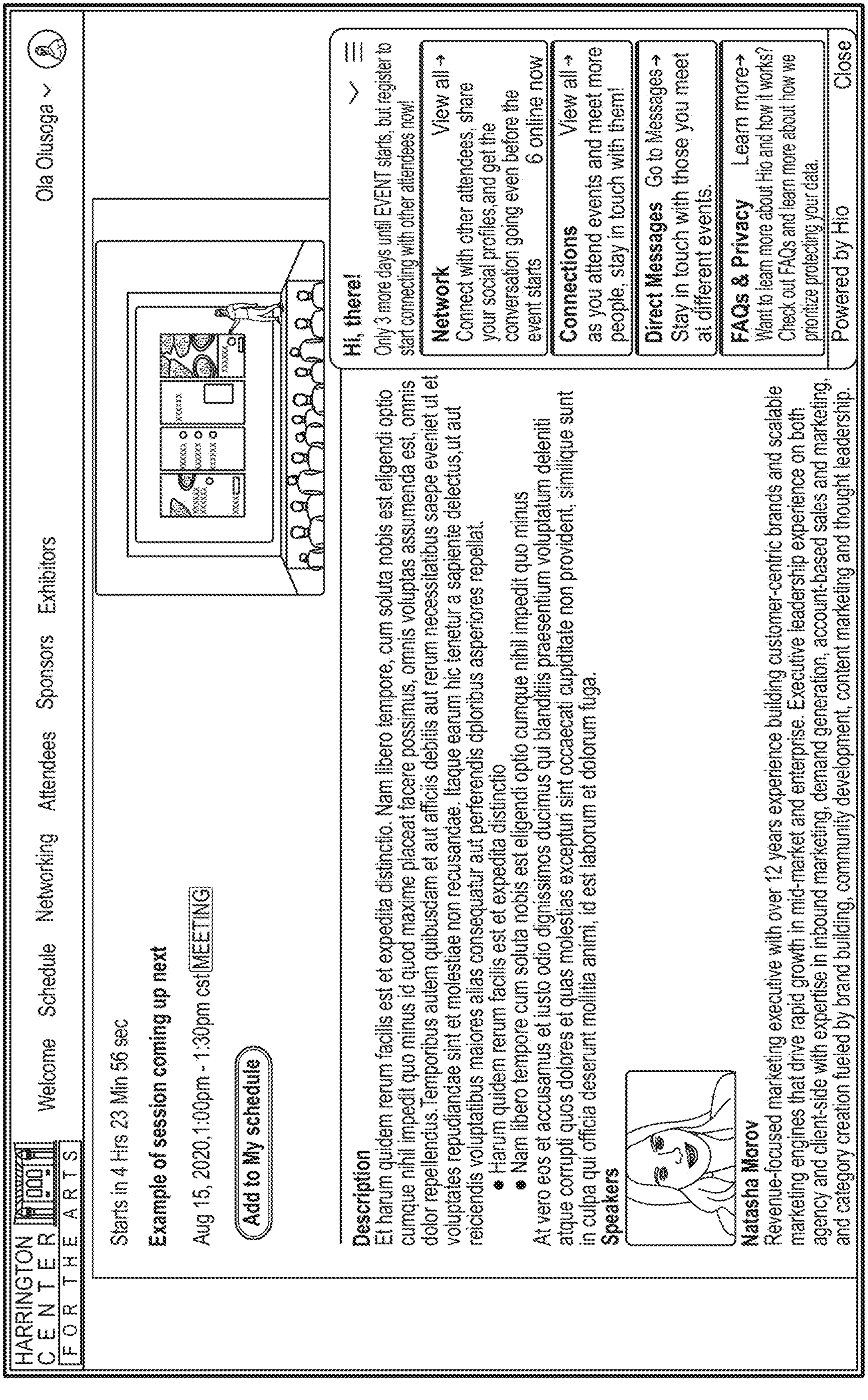

Example user interfaces that enable a user to register for an online event will now be described. Referring to FIG. 11A, a notification is presented regarding an upcoming online event. The notification may include the event name, the type of event (e.g., meeting, party, lecture, etc.), the event date, the event time, and the time (e.g., days, hours, and/or minutes) until the event begins (e.g., via a countdown timer that continuously updates with a time decrement, such as every second, minute or hour). \o my schedule" control is provided, which when activated, may add the event to the user's calendar at the corresponding date and time. Once the user registers for the event, the user may be enabled to chat with other users/attendees registered for the event, even before the event takes place. Network, connections, direct messages, and FAQs & privacy modules are provided, which are described elsewhere herein.

Figure 11B:
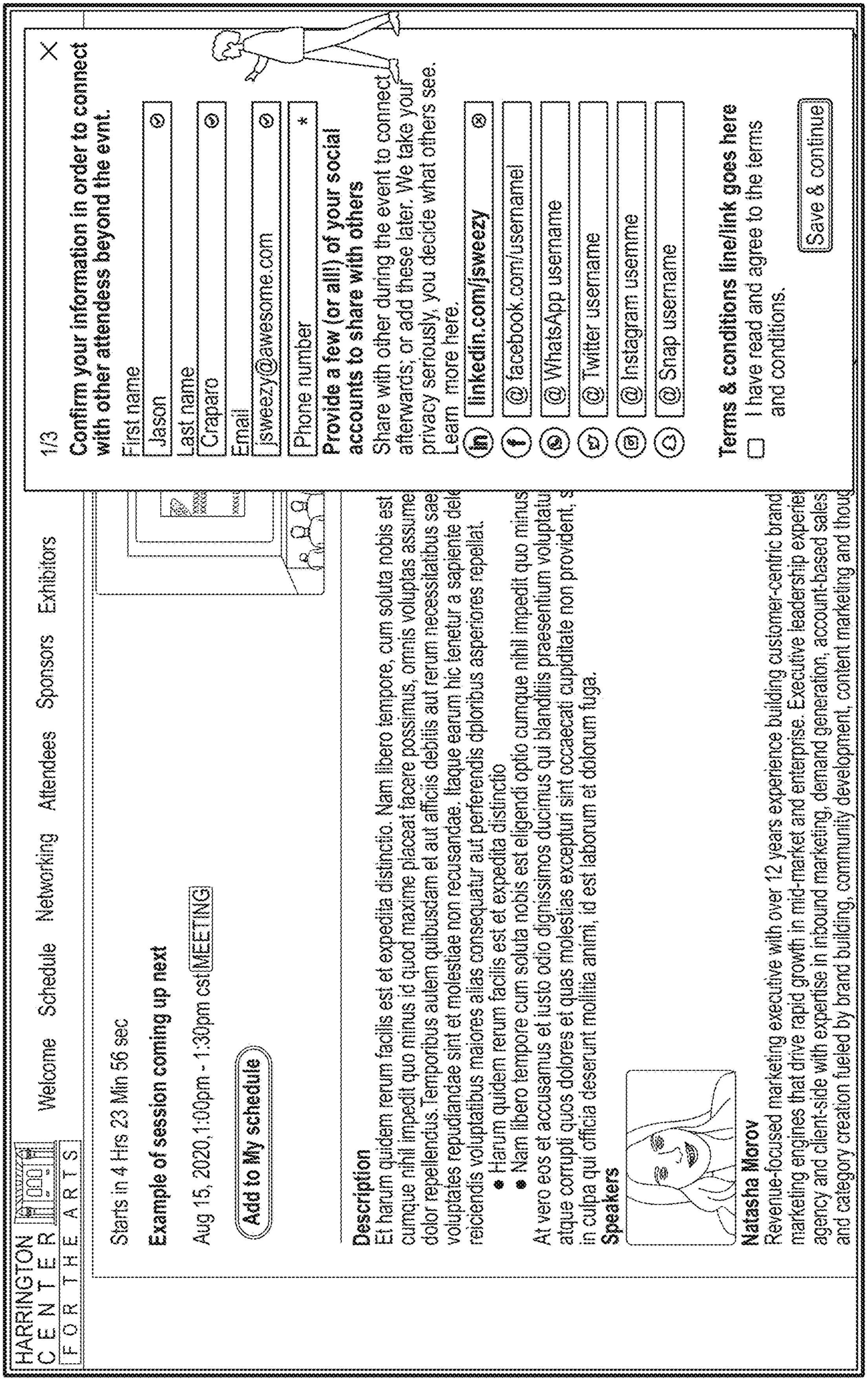

In response to the user activating the "add to my schedule" control or a "register for this event" control, the example registration user interface illustrated in FIG. 11B is presented. The user interface may include fields configured to receive the user's first and last names, email address, and phone number (e.g., mobile phone number of a phone configured to receive text messages). A list of social networking platforms may be provided. The user interface may be configured to receive a user selection of one or more of the listed social networking platforms to share during the online event (e.g., to enable other attendees to connect with the user (e.g., during or after the event). Corresponding fields are provided via which the user can enter a link to a given social network page of the user. Optionally, the user may be able to select such social networking platforms at a later time (e.g., before, during or after the online event) via a corresponding user interface.

Figure 11C:
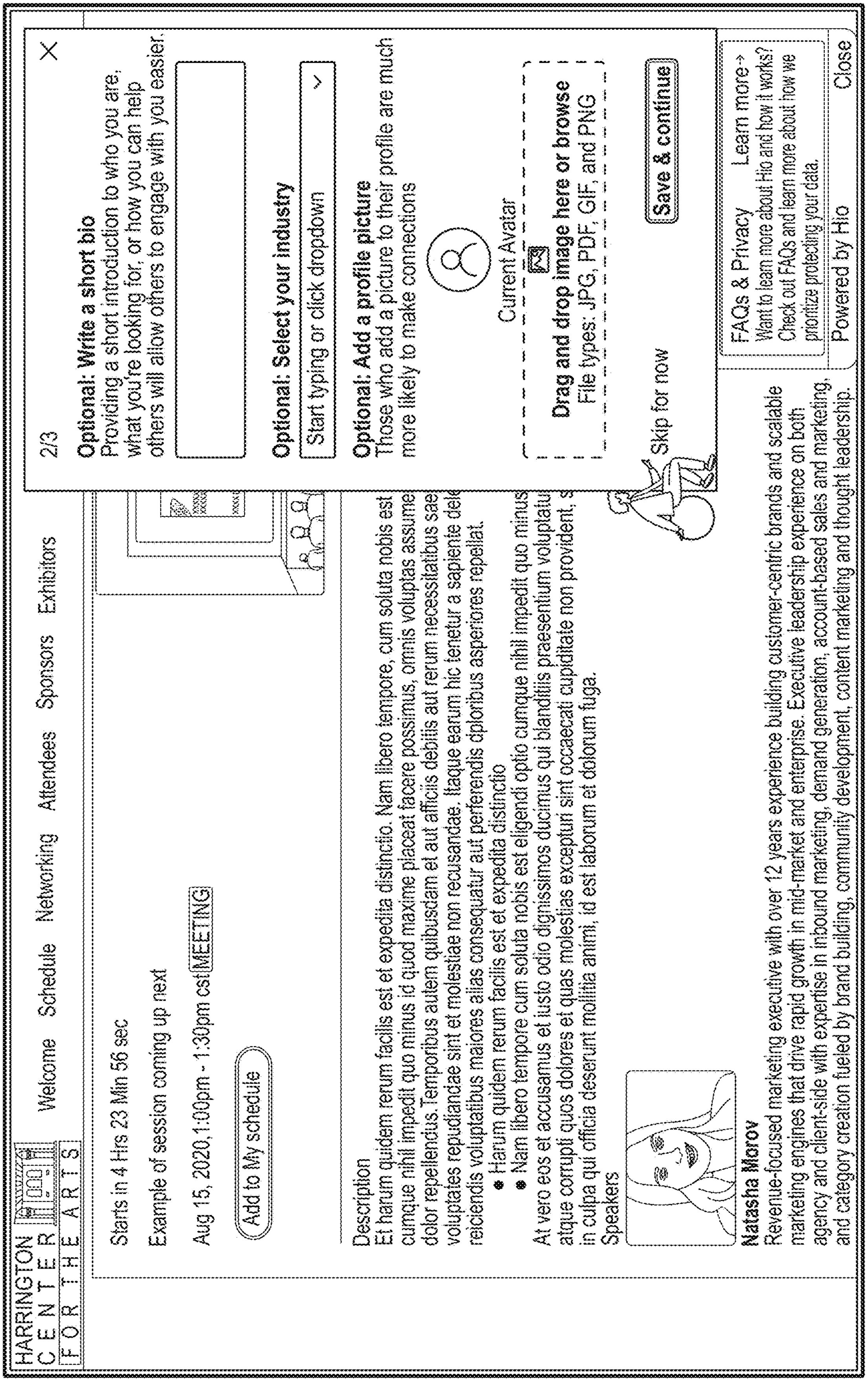

FIG. 11C includes fields configured to receive a user biography from the user, a field configured to receive a profile photograph or avatar selection from the user, and a drop down menu of predefined industries via which the user can select an industry the user is engaged in. Optionally, a field is provided via which the user can type in an industry type, which is received by a search engine which identifies matching industries, and returns search results comprising the matching industries, ranked in accordance with the closeness of the match. Optionally, the search engine may perform an incremental search, where, as the user is typing search term characters the search engine identifies matches in real time and present search results, where the search results may be modified with each character entered by the user.

Figure 11D:
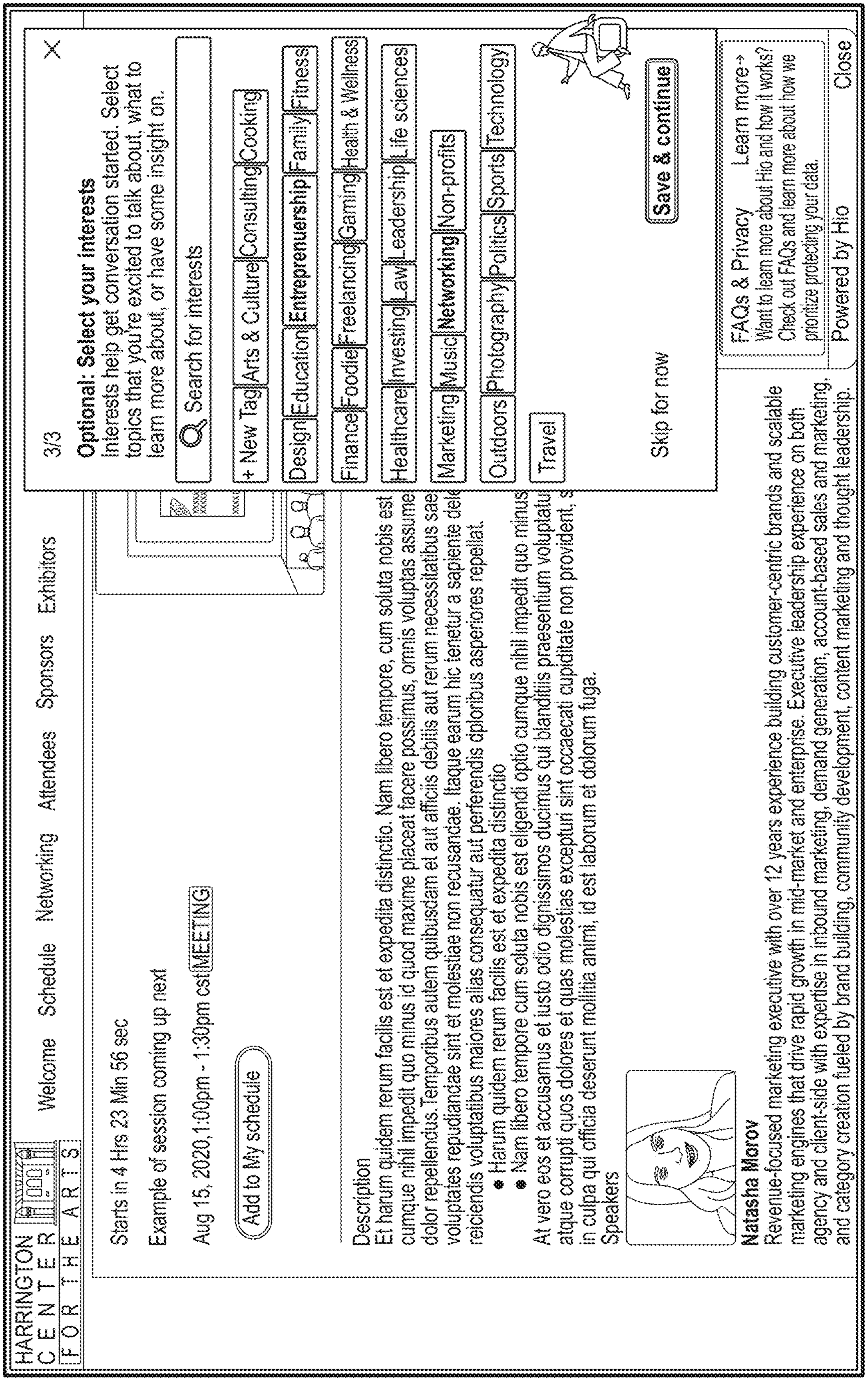

FIG. 11D illustrates an example user interface via which the user can select one or more predefined interests to be associated with the user. Optionally, the interests may be categorized (e.g., arts & culture, consulting, cooking, etc.), where in response to the user selecting category, corresponding interests that fall under the category may be displayed. In addition, a new tag control is provided via the user can add a user-defined tag. A save control is provided via which the user can save the interest selections.

Optionally, in order to authenticate the user, a code may be transmitted to the user's phone number or email address. The user then needs to enter the correct code into a code field in order to enable one or more features (e.g., registration to the event, the ability to chat with other attendees, etc.).

As discussed above, the system may enable a user to quickly and accurately specify which features discussed herein are activated or deactivated and to configure the operations of features. The system may then automatically generate code enabling/disabling and configuring the features accordingly. The generated code may then be embedded on the website/webpage and provided and execute the features accordingly via a customized widget (also referred to herein as access detection and communication code). The disclosed technology may advantageously reduce the amount of computer process, memory, and network resources that would otherwise be necessary if each website operator had to develop their own widget.

Example user interfaces that will now be described enable the user to create a widget for the user's website, including the configuration, branding, features layout, and chat channels, as well as to define collaborators.

Figure 12A:
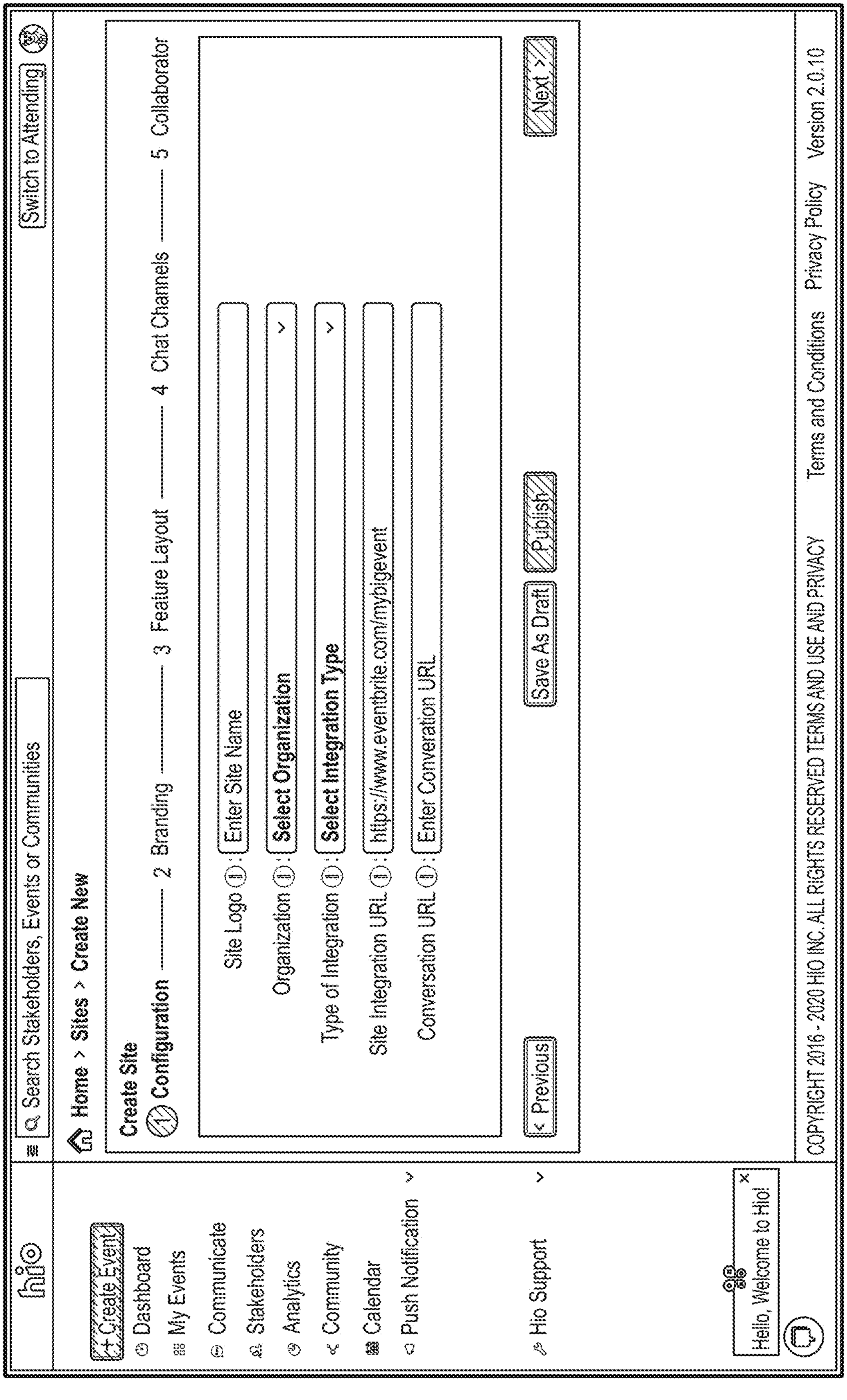

Referring to FIG. 12A, an example user interface indicates the current access detection and communication widget customization stage (e.g., configuration, branding, features layout, chat channels, collaborators). Such stage indication may be updated to reflect the current stage in the other user interfaces described below. FIG. 12A includes fields enabling the user to specify configuration parameters for the access detection and communication widget. Fields are provided configured to receive from the user a site name, an organization selection, an integration type, a site integration URL, and a conversion URL. A conversion URL may be A subsequent URL that a site visitor may end up landing on/navigating to. Such a conversion URL may be categorized as a successful "conversion" (e.g., based on a site publisher categorization criteria). For example, a successful conversion may be a successful signup to a newsletter, the entrance to or exit by a user of a shopping checkout process, the addition of an item to an online shopping cart, the viewing of an internal blog site, and/or the like. Controls are provided via which the user can save the user entries as a draft or to publish the user entries so that they may be implemented as a access detection and communication code widget. Activating a next control may cause the example branding user interface illustrated in FIG. 12B to be presented.

Figure 12B:
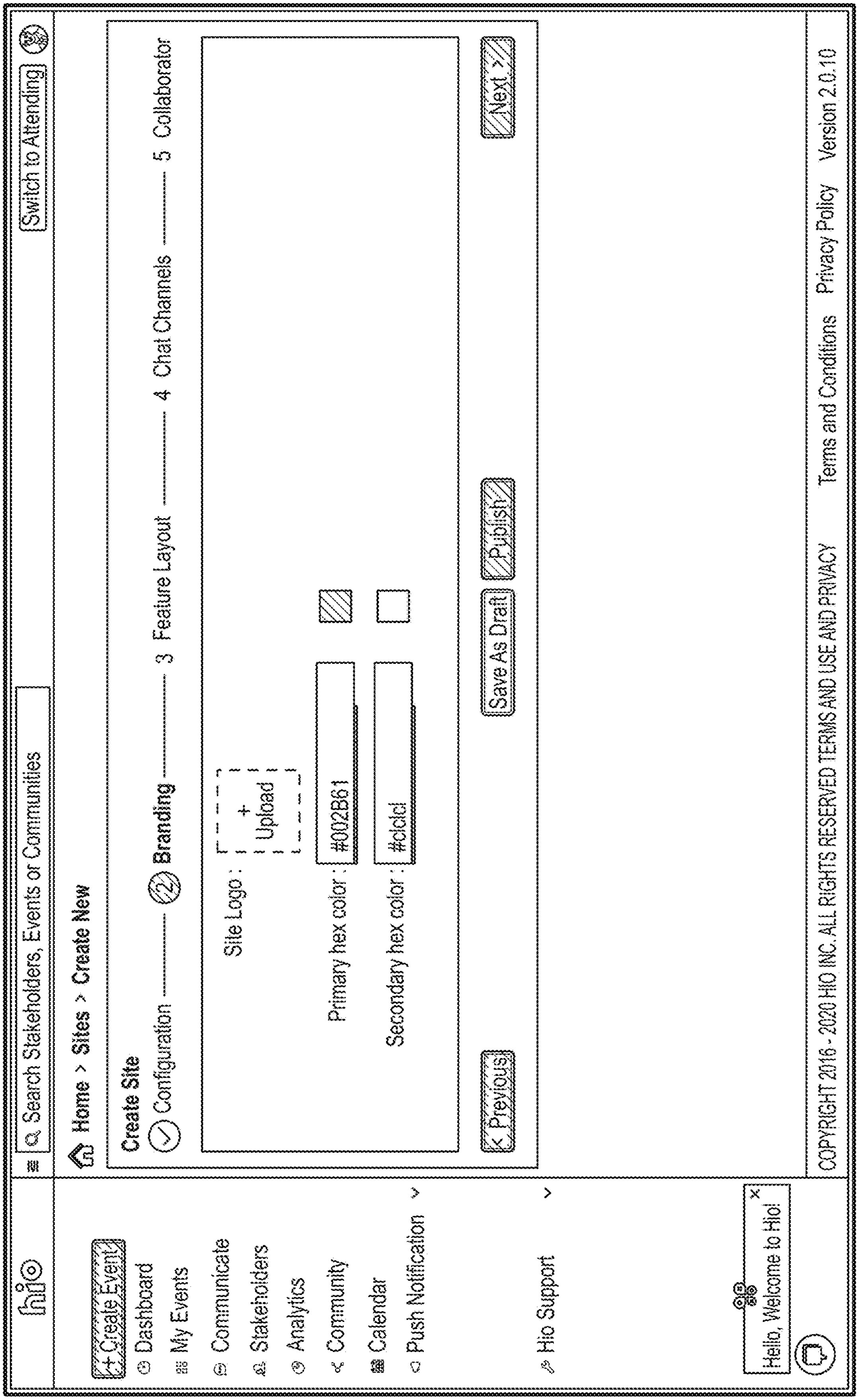

Referring to FIG. 12B, a control is provided via which the user can upload a site logo to be added to the access detection and communication code widget. A field is provided via which the user can specify a primary color (e.g., via a primary hex color value). A field is provided via which the user can specify a secondary color (e.g., via a secondary hex color value). Activating a next control may cause the example feature layout user interface illustrated in FIG. 12C to be presented.

Figure 12C:
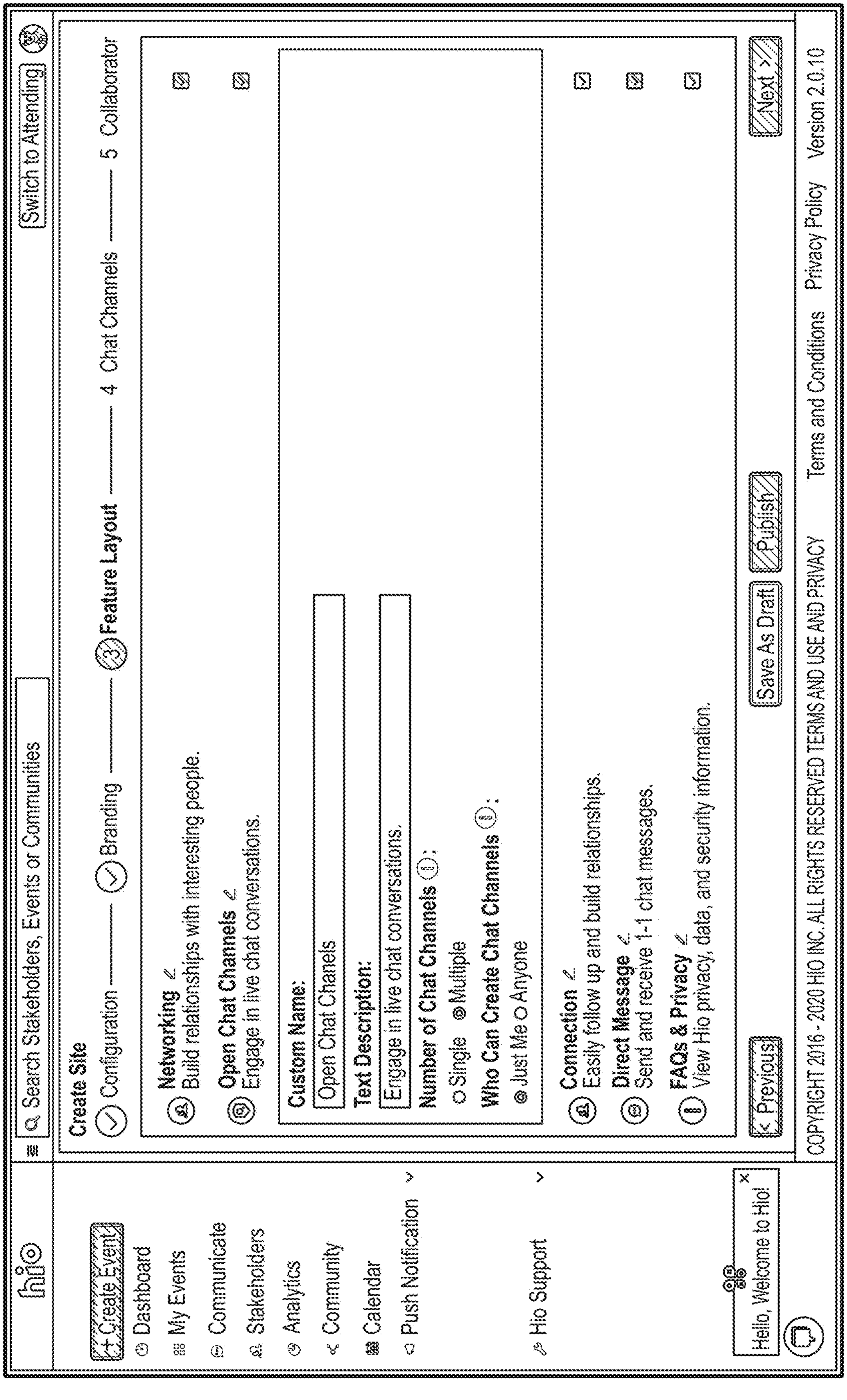

Referring to FIG. 12C, a control is provided via which the user can enable or disable the networking features described herein that enable users to build relationships with other users via online communications and content sharing (where if a feature is disabled, the corresponding module interface may not be displayed via the user interfaces described herein). A control is provided via which the user can enable or disable chat channels via which users can engage in live communications with each other. A field is provided configured to receive a custom name for a chat channel (which may be presented to users when viewing a list of chat channels). A field is provided configured to receive a text description of the chat channel (which may be presented to users when viewing a list of chat channels). A field is provided via which the user can specify whether a single chat channel or multiple chat channels are to be opened. A field is provided via which the user can specify whether only the user can create chat channels for the website (accessible via the access detection and communication code widget) or whether anyone can create chat channels for the website. A control is provided via which the user can enable or disable the ability of users to make connections. A control is provided via which the user can enable or disable direct messages. A control is provided via which the user can enable or disable the presentation of the FAQs & Privacy module. Activating a next control may cause the example chat channels user interface illustrated in FIG. 12D to be presented.

Figure 12D:
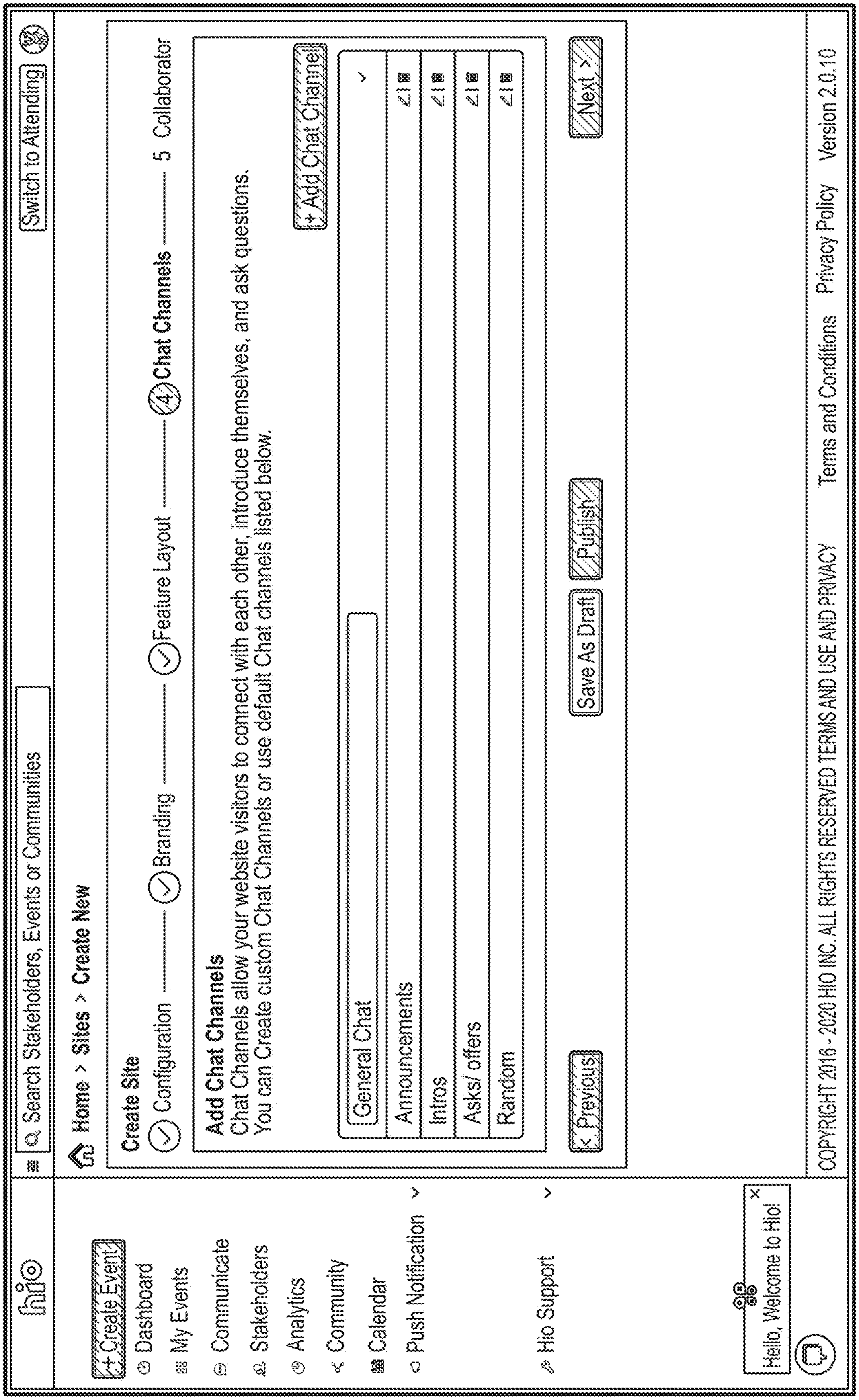

Referring to FIG. 12D, the example chat channels user interface enables one or more chat channels to be added to the access detection and communication code widget (where users can communicate via the channels, introduce themselves, ask questions, or connect). The user interface enables the user to define custom chat channels and/or add predefined channels, such as general chat, announcements, introductions, asks/offers, random, etc. Delete controls are provided that enables the user to delete a corresponding channel. Activating a next control may cause the example collaborations user interface illustrated in FIG. 12E to be presented.

Figure 12E:
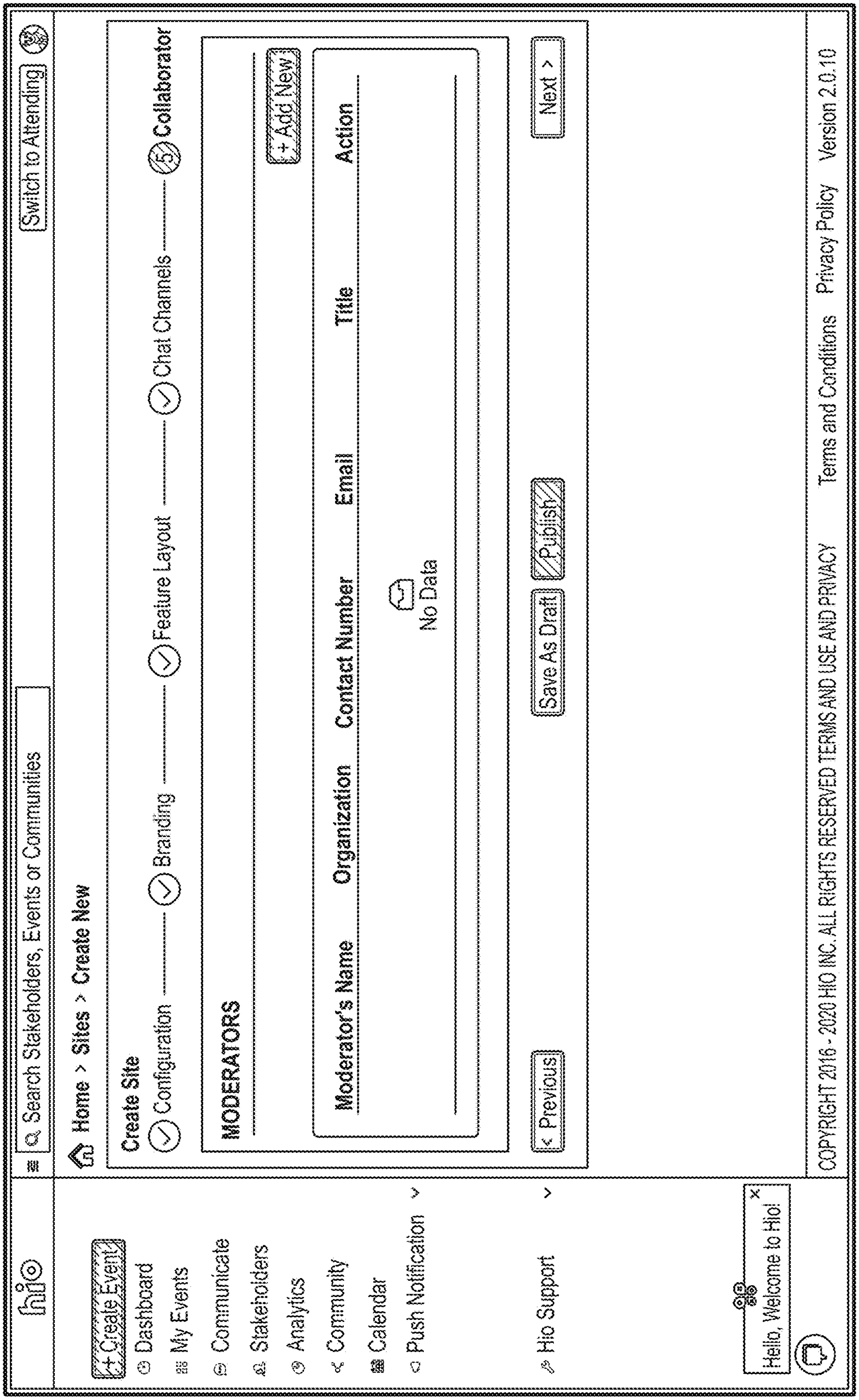

Referring to FIG. 12E, the example collaborator user interface enables the user to specify authorized chat channel/forum moderators. Fields are provided configured to receive a moderator name, organization, contact phone number, contact email, title, and action. For example, an action associated with a moderator/collaborator may be an invitation to the widget (e.g., via email and/or text message), where the moderator may be granted special permissions enabling the moderator to join a discussion as a moderator, to flag content, to engage on the brand's behalf, and/or to assist in configuring the widget itself.

Figure 13:
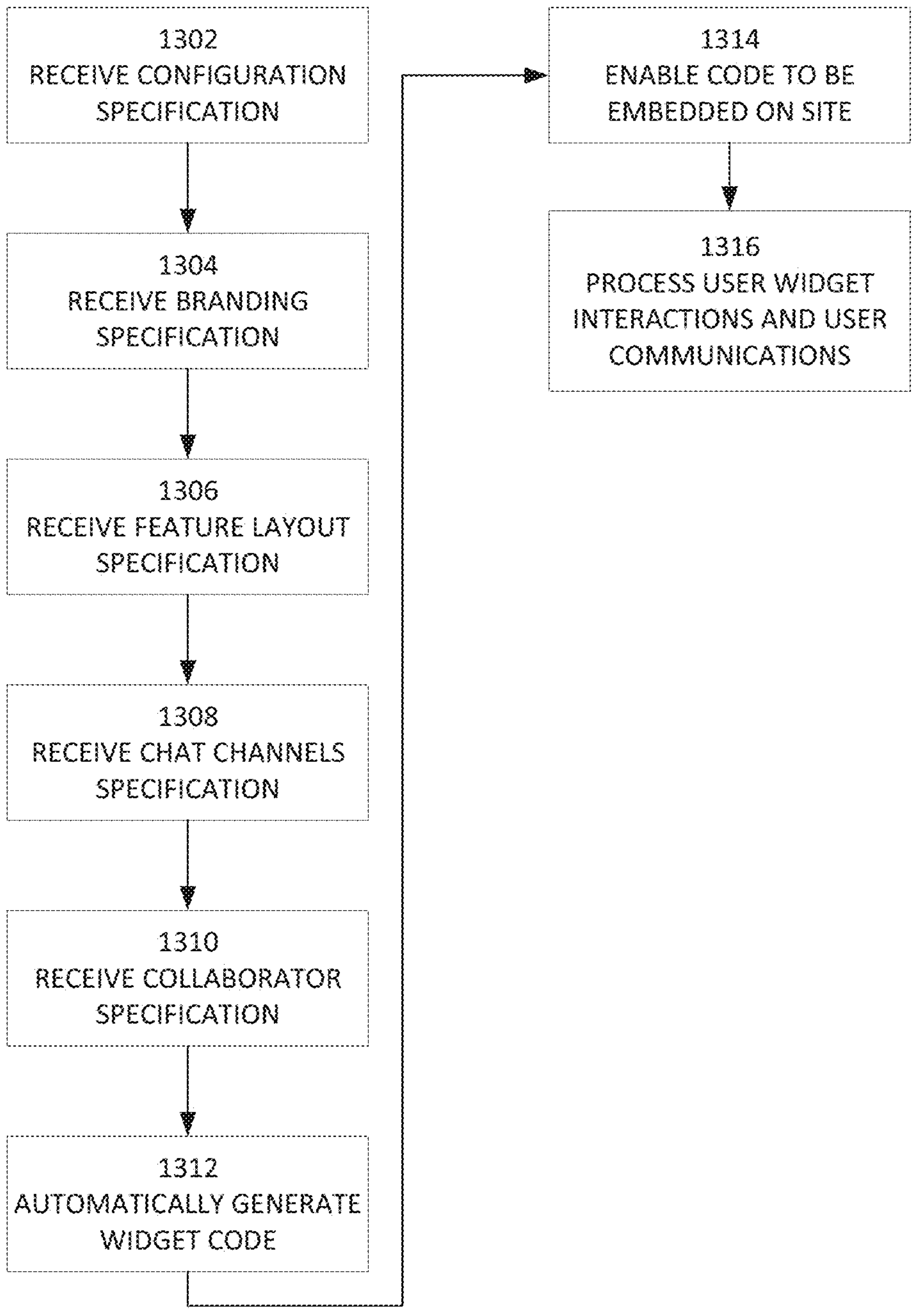
FIG. 13 illustrates an example process for defining and automatically generating a communication widget.

FIG. 13 illustrates an example process for defining and automatically generating a communication access detection and communication code widget (without requiring manual coding), and enabling the communication access detection and communication code widget to provide functions and features described herein. At block 1302, an access detection and communication code widget configuration specification is received from a user device (e.g., via the user interface illustrated in FIG. 12A). For example, the configuration specification may include site name, organization, integration type, site integration URL, and a conversion URL. As discussed elsewhere herein, the URL(s) (and/or other site identifiers) may be transmitted to the multimedia communication system to identify the website being visited by a user accessing the widget.

At block 1304, a branding specification is received from a user device (e.g., via the user interface illustrated in FIG.

12B). For example, the branding specification may include site logo(s), primary color, and/or secondary colors.

At block 1306, a feature layout specification is received from a user device (e.g., via the user interface illustrated in FIG. 12C). For example, the feature layout specification may include the configuration (e.g., enabling or disabling) of chat channels via which users can engage in live communications with each other, chat channel name (which may be presented to users when viewing a list of chat channels), chat channel description (which may be presented to users when viewing a list of chat channels), whether one or more than one chat channels are to be opened, who is permitted to create chat channels, the configuration of connections, the configuration of direct messages, and/or the configuration of a FAQs & Privacy module.

At block 1308, a chat channels specification is received from a user device (e.g., via the user interface illustrated in FIG. 12D). For example, the chat channels specification may include an identification of one or more custom or predefined channels to be added to the access detection and communication code widget (where users can communicate via the channels, introduce themselves, ask questions, connect, and/or the like).

At block 1310, a collaborator specification is received from a user device (e.g., via the user interface illustrated in FIG. 12E). For example, the collaborator specification may include an identification of one or more moderator names, organizations, contact phone numbers, contact emails, titles, and/or actions.

At block 1312, in response to a user activation of a corresponding control, the system may automatically generate corresponding access detection and communication widget code, without requiring a user to manually write the code. The code may optionally be in the form of JavaScript.

At block 1314, the access detection and communication widget code is provided to a website operator which may embed the code in a website's webpage. For example, optionally similar operational access detection and communication code may be embedded in different webpages of different websites operated by different, unrelated entities (although the code may be modified for each website in accordance with the configuration process described above and to include a unique identifier associated with the website) and may optionally provide a functionally common or similar interface with respect to the different websites (although each website may optionally have its own branding and may disable or enable certain functions via the process described herein).

At block 1316, the process detects users accessing the website via the embedded widget code, may identify such users, may enable such users to direct message each other, may enable users to post to or read selected chat forums, may enable users to connect to each other, and may provide other functions and services described herein.

As described elsewhere herein, systems and methods are disclosed that are configured to enhance network resource (e.g., website) real time engagement, content streaming, navigation, communication, and online communities. Such enhancement may be provided via one or more digital breadcrumbs (sometimes referred to herein as an anchor), associated with a webpage that may be accessed via a browser on a user device. The use of such anchors enables content to be provided to a user in the context of other content (e.g., webpage content) displayed to the user.

Optionally, a given anchor may be associated with an application programming interface (API) which pulls data from a content source, such as a social media site, microblogging site, video content sharing site, audio content sharing site, or other source specified by the authorized entity via a corresponding user interface.

As described elsewhere herein, optionally, an anchor may have a specified start time and/or end time, wherein the associated content will only be pushed and/or be accessible within the specified start time and end time, or if an end time is not specified, any time after the specified start time (or after the anchor was set even if a start time is not specified) unless such anchor is removed. Such anchor may ensure that the pushed content is provided in a useful context, such as ensuring the pushed content is directly related to webpage content currently being displayed to the user. Such context will enhance the user experience and make it more likely the user will further engage with the webpage and website. By way of example, if a user is scrolling through a recipe and reaches a cutting instruction, a video of a cutting lesson may be pushed. Optionally, the content may be pushed to the user via a user notification (e.g., a pop-up, scrolling text, highlighting of content, and/or otherwise) and/or via an automatic presentation/playing of the content to the user.

As disclosed herein, the user interfaces and functionality may be provided via code (e.g., automatically generated widget code) embedded in a webpage. The user interface may be accessed by an end user device (e.g., a desktop computer, laptop computer, smart phone, networked television, networked game console, networked wearable device, and/or the like) via a webpage of the website, where the webpage may be accessed and presented by a browser hosted on the user device. Such user interface enables the third party to stream live and/or prerecorded video, audio, and/or text via the user interface to a user accessing a preexisting webpage. The content may be pushed to the user via a user notification (e.g., a pop-up, scrolling text, highlighting of content, and/or otherwise) and/or via an automatic presentation of the content to the user.

As disclosed elsewhere herein, optionally, an anchor may be associated with one or more rules which may control which content is displayed to which viewer. Hence, a given user may be provided with a customized engagement experience when accessing a webpage.

Optionally, an anchor may be displayed (e.g., as a graphic, text, photograph, a highlighting of webpage text or graphic/image content, or otherwise) on a webpage, optionally independent of a user's interaction with the webpage. Optionally, an anchor may be displayed in response to a user hovering a cursor over or clicking on/selecting a specified area (e.g., where the anchor is positioned) or webpage HTML element.

Optionally, a user interface may be provided which enables an entity setting the anchor to specify a location on a webpage at which the anchor is to be located. Optionally, the user interface enables a user to drag and drop an anchor from an anchor menu to any desired location on the webpage. Optionally, the user interface may enable the user to drop the anchor on a webpage HTML element (e.g., an element defined by a start tag, some content, and an end tag). Optionally, the user interface may enable the user to drop the anchor on a webpage HTML element with a specified left, right, top, or bottom offset, wherein the anchor may be placed in accordance with the specified offset(s) from the HTML element.

Figure 1D:
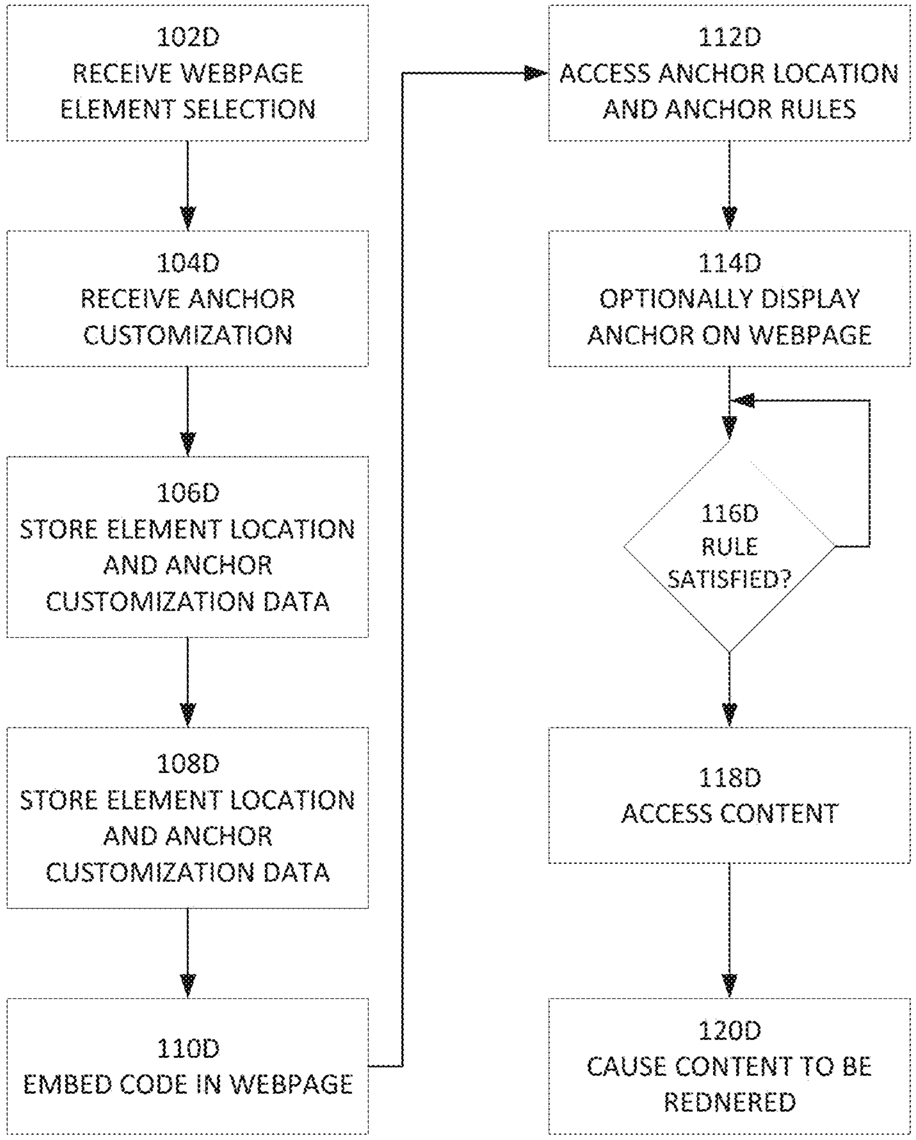

Referring now to FIG. 1D, an example process of associating an anchor with a portion of a webpage and of dynamically presenting content in context is illustrated. At block 102D, a webpage area specification is received over a network from a device of an entity (e.g., an authorized administrator or any end user is so permitted) via a corresponding user interface. For example, the user may drag and drop an anchor to a desired webpage location or may otherwise specify an anchor location. By way of illustration, the user may associate an anchor with a specified webpage HTML element (e.g., content associated with a start tag and an end tag). By way of further illustration, the user may associate an anchor with a specified webpage HTML element, wherein a positional offset is specified (e.g., an x, y offset).

At block 104D, an anchor customization is received via a user interface. For example, the customization may specify content (e.g., text, audio, still image, video, and/or graphic content) or a content source (e.g., a social media site account, an image sharing site account, a video sharing site account, an audio sharing site account) that is to be pushed to an end user. By way of further example, a user may specify one or more rules as to under what circumstances content is to be pushed. For example, a rule may specify that a given item of content is to be pushed to a user having certain subject and/or brand preferences and optionally not to other users. In addition or instead, a rule may specify that a given item of content is to be pushed to a user having certain demographics (e.g., a certain age range, certain locations, certain estimated income, certain family situation, etc.) and optionally not to other users.

At block 106D, anchor location data and anchor customization data are stored. For example, anchor location data and anchor customization data may be stored on a networked cloud-based storage system. At block 110D, code is embedded in a selected webpage (e.g., a webpage associated with a content provider, such as an online news site, a blog, an education site, a game site, etc.). For example, the code may be automatically generated and may be used to generate user interfaces that may be accessed via the webpage and provide functionality described herein.

At block 112D, in response to a user device browser requesting the webpage, the anchor location data and anchor customization data are retrieved from the storage system. At block 114, the anchor is optionally rendered in accordance with the location data.

At block 116D, a determination is made as to whether the aforementioned rule(s) that control under what circumstances content is to be pushed are satisfied. Once the rule(s) are satisfied, the process proceeds to state 118D, and the content (e.g., text, graphic, audio, video, etc.), associated with the anchor is accessed. At block 120D, the content is rendered on the user device (e.g., in line with webpage content or overlaying the webpage).

Figure 1E:
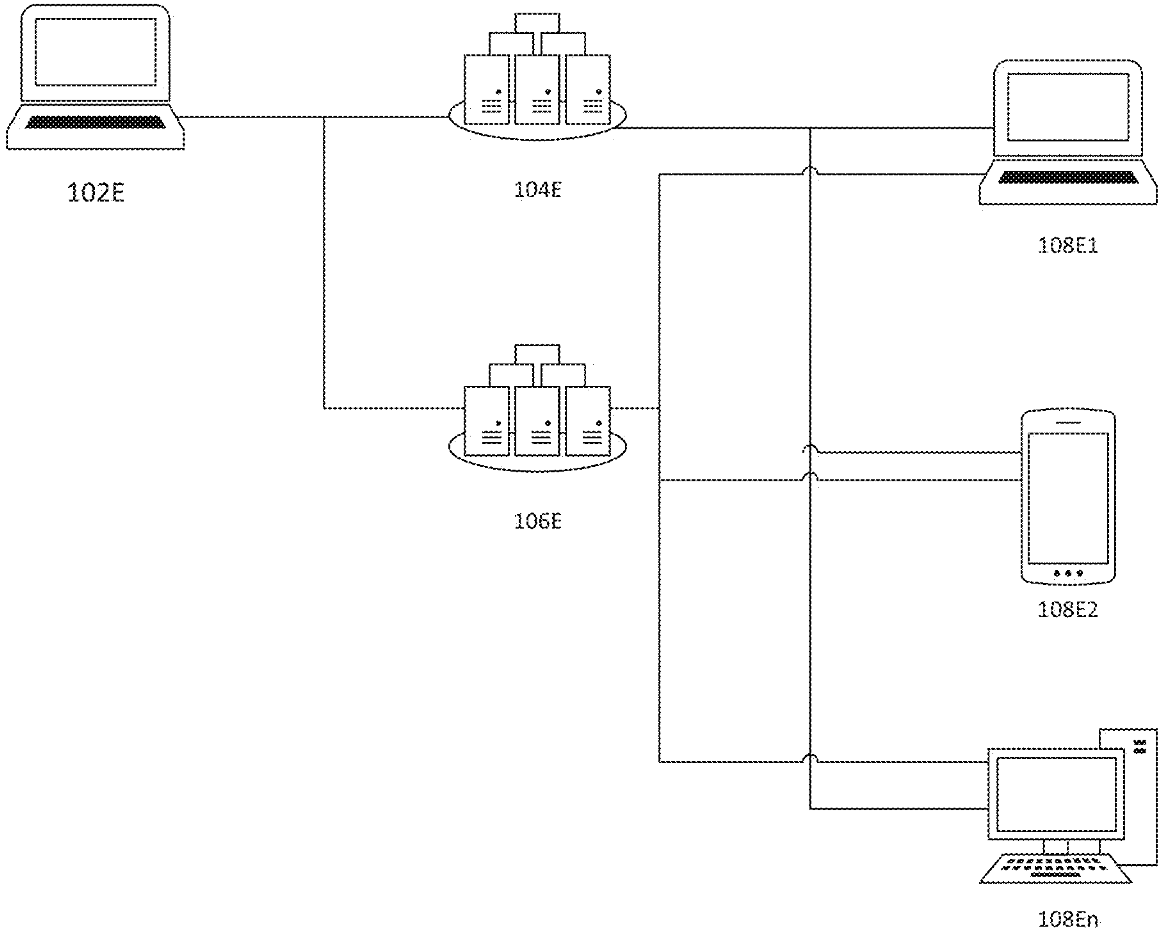
FIGS. 1E-1F illustrate example multimedia communication architectures.

FIG. 1E illustrates an example computer environment that may be utilized to stream an uploaded audio and/or video broadcast. A stream processing and distribution system 104E may be configured to ingest a video/audio file from a system 102E (e.g., the system of a host of the broadcast), create a video asset from the ingested file, and prepare the video/audio asset for streaming. The stream processing and distribution system 104E may optionally, in real or near real time (e.g., less than a 3 second delay), generate the appropriate renditions of the video asset for a given listener/viewer device 108E1, 108E2, . . . 108EN and for the available network bandwidth, thereby providing a visually enhanced rendition of the video asset and avoiding streaming stutters. The stream processing and distribution system 104E may be configured to generate a URL at which the video/audio asset may be accessed.

The file may also be stored in a storage system 106E, which is optionally a cloud-based storage system, for later access by the listener/viewer devices 108E1, 108E2, . . . 108EN. The video/audio asset may be added to a content library associated with an entity (e.g., a brand), a website, and/or a webpage, such as content libraries discussed elsewhere herein.

Figure 1F:
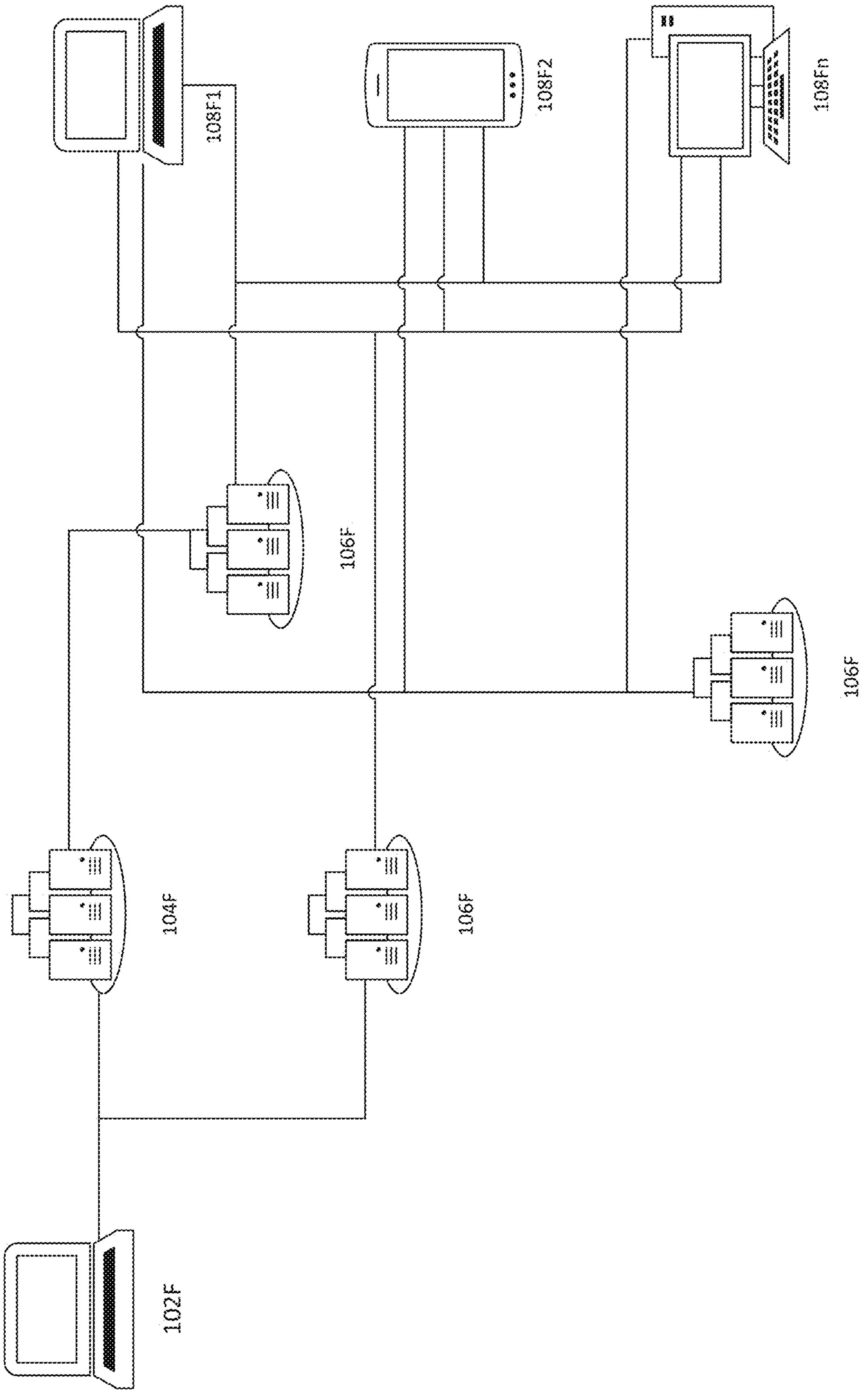

FIG. 1F illustrates an example computer environment that may be utilized to stream a live audio and/or video broadcast from a host system 102F. A host may control whose live audio/video stream is to be shared with the broadcast viewers/listeners. For example, the host may be enabled to mute or enable a microphone or camera of a given listener/viewer. The host system 102F streams the conference to a broadcast system 104F, optionally in RTC (real time communication) format. The broadcast system 104F may enable the host to control various aspects of the broadcasts (e.g., selectively muting or enabling the microphones and/or video cameras of listener/viewer devices 108F1, 108F2, . . . 108FN). Data associated with the live broadcast may be stored in a storage system 106F (which may be a cloud-based storage system).

The broadcast may be streamed from system 104F to stream processing and distribution system 106F. The stream processing and distribution system 104F may optionally, in real or near real time (e.g., less than a 3 second delay, less than a 2 second delay, or less than a 1 second delay), generate the appropriate renditions of the video asset for a given listener/viewer device 108F1, 108F2, . . . 108FN and for the available network bandwidth, thereby providing a visually enhanced rendition of the video asset. The stream processing and distribution system 106F may optionally convert the stream from RTC to RTMP (Real-Time Messaging Protocol). Advantageously, although RTMP may result in more latency (e.g., 0.3-2 seconds) than RTC (which may be less than 0.3 seconds), RTMP may be more scalable than RTC. For example, using RTMP, a live stream may be scaled to stream live audio/video content to millions of devices simultaneously. By contrast, RTC may be more suitable for streaming to a few thousand devices.

Certain example user interfaces will now be described with reference to FIGS. 14A-14CC. The user interfaces may be accessed from and/or populated by one or more of the systems and devices disclosed herein. One more of the disclosed systems and devices may execute instructions and configuration specified using the disclosed user interfaces or the like.

FIG. 14A illustrates an example administrative user interface configured to enable an administrator to control various features and content access, such as that of an activity feed. It is understood that while certain references may be made herein to an administrator or administrative user, optionally other authorized users may be enabled to perform the same functions. Optionally, the set of authorized users may include specifically specified users or may include all users.

The user interface illustrated in FIG. 14A displays the activity feed (sometimes referred to as a Hovr feed) that may include one or more tiles. The tiles may include, by way of example, news content, library content, advertisements, coupons, and/or other content as specified by an administrative user. One or more of the tiles may be customized by an administrative user (e.g., representing a brand) with respect to appearance and/or content.

Various controls may be provided which enables the administrative user to specify the appearance of the activity feed, the content included in the activity feed (e.g., publishing content, re-ordering content, unpublishing content and/or the like), and/or features provided via or in association with the activity feed. A given change made to the activity feed may optionally be reflected in the displayed activity feed in real time.

Optionally, the activity feed may be displayed in the context of the webpage with which it is associated (e.g., overlaying the webpage or in line with the webpage) to provide enhanced visualization of the end user experience. Such visualization may optionally be more "real" or authentic than a preview function, and may mirror what is actually on the webpage (what an end user would see live). However, optionally, changes to the activity feed will not be published for access by end users until the administrative user authorizes such access (e.g., by activating a publish control). Optionally, unpublished content may be deleted from the activity feed but may be maintained in a content storage system for later access/inclusion in an activity feed.

Controls are provided via which an authorized user can access a content management user interface, an upload content user interface, an update custom tiles user interface, or go live on an online presentation/conference.

Other controls enable the user to access user interfaces via which the user can specify and/or view settings for features, notifications, design, registered users, and/or "specify Hovr" settings. The features user interface may enable the user to select and/or create/upload icons, enable the user to specify direct messaging settings (e.g., enable/disable direct messaging for a given website or webpage), enable the user to specify connection settings (e.g., for users that are connected as described elsewhere herein), enable the user to specify which users can view who is online and/or accessing the website, and/or enable the user to select and/or upload content to be included in a content library to be accessible via a library interface display on a designated website webpage.

The notifications user interface enables the user to specify in-browser end user notifications correlated with particular actions. For example, if direct messaging is enabled, a notification regarding an incoming direct message may be provided to the end user. By way of further example, if "connections" are enabled, an end user may receive a notification of a content request from another, connected end user. By way of yet further example, a notification may be provided in connection with an anchor on the webpage. By way of illustration, if the user scrolls the webpage and reaches a certain anchor (or a certain threshold distance before or after an anchor), a specified notification may be provided to the user.

Optionally, content (e.g., text, graphic, video, and/or audio content) for a given specified notification may be specified for all end users, a specified subset of end users, or may be customized for an individual end user. For example, the disclosed system may determine which end users are currently accessing the webpage, historical user interactions (or lack of actions) with the webpage and/or website, user demographics, and use some or all of the foregoing information to select and/or generate a notification for the user.

The design user interface may enable, by way of example, the user to specify a navigation bar color, headers, typefaces, font sizes, font colors, line spacing, and/or the like.

The registered users interface enables the user to specify for registered users (e.g., end users that have provided their name or alias, email address, mobile phone address, user interest preferences, user content preferences, user brand preferences, and/or other user data) gated content and/or features (e.g., for a given item of content or page as a whole), wherein access to such gated content and/or features is restricted to registered users (where non-registered end users are inhibited from accessing such content and features). Optionally, the registered users interface lists some or all registered users, and the administrative user is enabled to delete users, transport user data, export user data to a customer relationship management system, and/or the like. The registered users interface optionally enables the administrative user to specify when access to such content and/or features or to be provided to a given end user (e.g., based on website or webpage access frequency, on the number of clicks on a given webpage or item of webpage content, and/or the like).

The Hovr settings user interface enables the user to specify where and/or how the activity feed window opens/renders (e.g., left, right, float, drawer, partial screen, expanded, minimized, and/or the like). Optionally, the Hovr settings user interface enables settings to be separately set by device/display type (e.g., mobile phone, tablet, laptop, desktop display, etc.) so that the activity feed user interface is optimized based on the display size or category.

A menu bar 1402A on the right side of the user interface provides additional controls. Such a menu bar may be displayed on various user interfaces discussed herein.

Activation of a home control in the menu bar 1402A causes the activity feed to be displayed. The user interface illustrated in FIG. 14A displays the activity feed in response to an activation of the home control.

Activation of an antenna control in the menu bar 1402A causes the content (e.g., video, audio, text, and/or graphic content) of the activity feed to be displayed.

Activation of a hashtag control in the menu bar 1402A causes a channels and content library user interface to be displayed via which the user may select channels and content to be displayed by a given activity feed tile.

A face user interface in the menu bar 1402A displays a face or avatar of the person currently logged-in to the administrative account. Optionally, the person is authenticated or not authenticated.

FIG. 14B illustrates an example user interface configured to enable a user to specify data and code for an activity feed. A basic information section includes a name field configured to receive a name for the activity feed. A URL field is configured to receive a URL where the activity feed is to appear/be rendered. A type field is configured to receive a type specification for the activity feed (e.g., billing plan, engagement (community+content), community (networking), content, and/or the like). The type may be selected from a menu generated or presented based on a user/subscription package selection. A brand color field is configured to enable the user to select a brand color to be used in conjunction with the activity feed user interface (e.g., sharing brand content). A code snippet field figure is configured to receive and/or display code text to be used to embed the activity feed at the corresponding URL. The code may include a script ID, an src (a URL for an external script file), and a data-id that specifies a unique id for an HTML element.

FIG. 14C illustrates an example features user interface via which an administrative user can edit, delete or add features and modify a content carousel. The user interface illustrates a library content interface 1402C displayed in response to the user activating the antenna control menu entry. The content library may be highlighted and related features are displayed if the user enters edit mode. The user interface enables the user to add or delete content from the displayed content carousel, to reorder the content displayed on the content carousel, to control the content carousel rotation rate, to specify how long in time a given item of carousel will be displayed, and/or the like. In addition, the user interface enables one or more navigation tabs to be added (e.g., corresponding to one or more content libraries added by the user, where the content and/or content libraries may be grouped as desired by the user).

FIG. 14D illustrates an example user interface via which an administrative user can specify where on the webpage the activity feed will load and the state the activity feed load in (e.g., render in a minimized state if the webpage is rendered by a mobile device with a relatively small display, render in a maximized state if webpage is rendered by a desktop or laptop display). An edit control is provided via which the user can edit what tiles are displayed and the tile content.

FIG. 14E illustrates an example user interface, which may be accessed in response to activation of the edit control illustrated in the user interface depicted in FIG. 14D. The user interface enables an administrative user to edit a tile, such as the title headline/header, a descriptive subtitle, an action (e.g., a URL via which tile content is to be accessed, tab), and a tile image. Controls are provided via which the user can replace the tile image or remove the tile image. Tiles that are not being edited may be blurred in the user interface so as to better emphasize the tile that is being edited. A save changes control may be provided which when activated causes the edits to be saved in memory. Optionally when published, the system may track, aggregate, and store the number of end user clicks, selections and previews of tiles, which may then be displayed in an analytics user interface, such as that illustrated in FIG. 14F.

FIG. 14F illustrates an example analytics user interface that provides, in textual and graphic form, various aspects of tracked, aggregated, and analyzed data generated and provided by the system. For example, the user interface may display the number of unique visitors, the number of new signups/user registrations, the number of returning visitors, the number of unauthenticated visitors, the average number items of content viewed, a percentage of changes in one or more of the displayed metrics from a prior period (e.g., the prior week, month, year), activity time on site (rendered via a graph over a period of calendar time), number of impressions, number of clicks, number of completions (e.g., conversions of website visitor to a customer or the achievement of other specified goal), average time on website, and/or the like.

FIG. 14G-1 illustrates an example user interface with a push notification in the form of a popup window 1402G1. The notification in this example, indicates how long until a live broadcast is to take place (optionally in the form of a continuously updated countdown timer), provides a title for the live broadcast, provides a brief description of the live broadcast, provides an image relevant to the live broadcast, and includes a control via which the end user can indicate that the user intends to view/participate in the live (optionally interactive) broadcast.

FIG. 14G-2 illustrates an example user interface 1402G2 prompting to the user to set up a live broadcast, and via which an administrative user can define a broadcast notification (such as the one illustrated in FIG. G-2), upload content to a content library of an entity (e.g., a brand) or stream content (e.g., a live broadcast). For example, the user can add a title, description, and image to be displayed in a push notification regarding the broadcast and/or otherwise in association with the broadcast. A control is provided via which the administrative user can initiate the actual live broadcast.

Figure 14H:
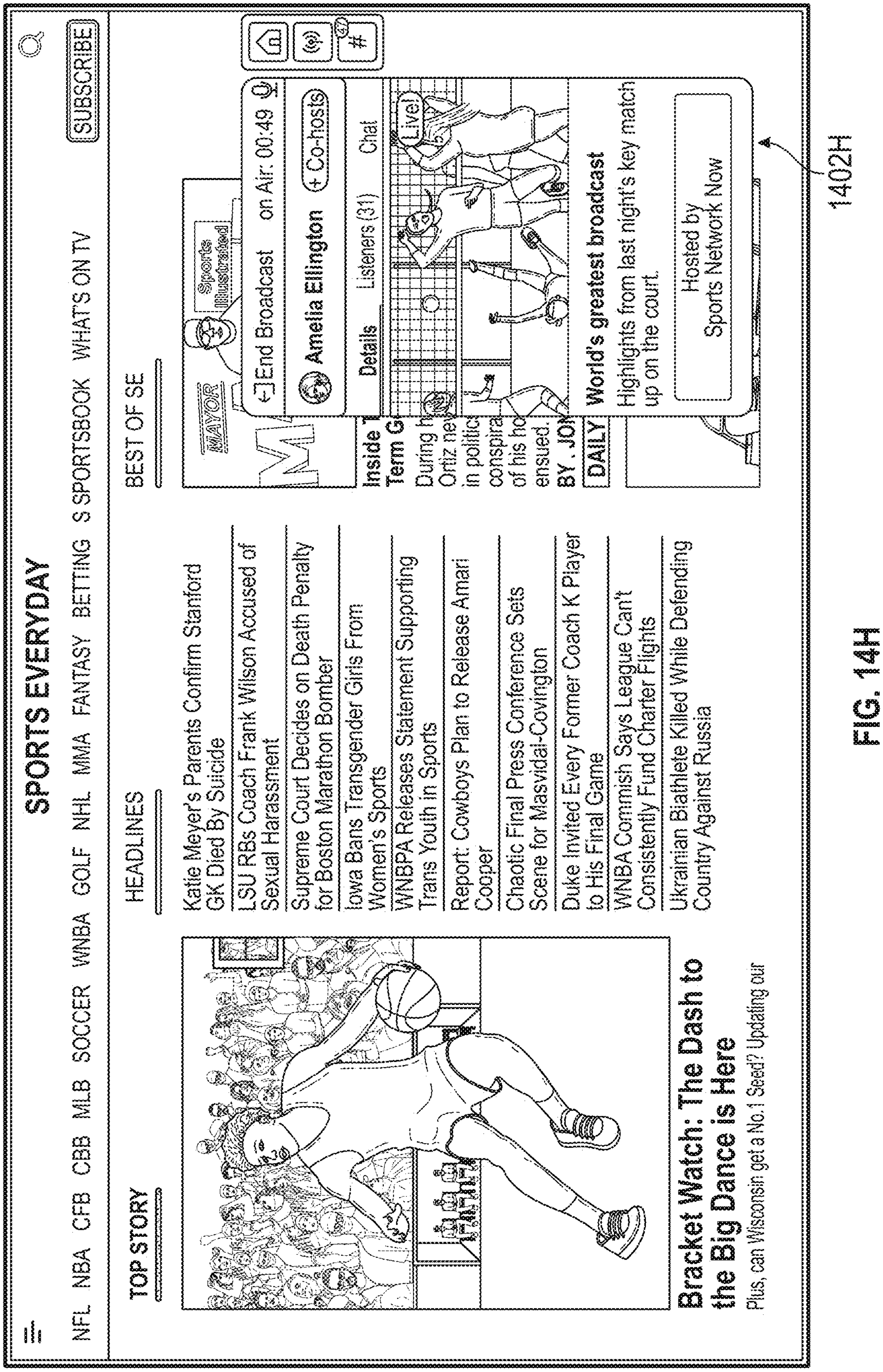

FIG. 14H illustrates an example user interface 1402H of an actual live broadcast. The user interface displays a broadcast host name. A control is provided via which the existing host and/or other administrative user may add one or more co-hosts (where a host can control the microphone-who is speaking in the broadcast). A header may display an indication that the broadcast is live, and how long the broadcast has been live (via a count up timer). A panel may display the broadcast name, the broadcast description, and an identification of the hosting entity. A details control is provided which when activated will cause additional details regarding the broadcast to be presented. A listeners control is provided in association with an indication as to the number of people currently viewing the live broadcast. Activation of the listeners control may cause a list or gallery of some or all of the listeners to be presented. A chat control is provided via which a listener can initiate a chat with the host and/or one or more other listeners.

Figure 14I:
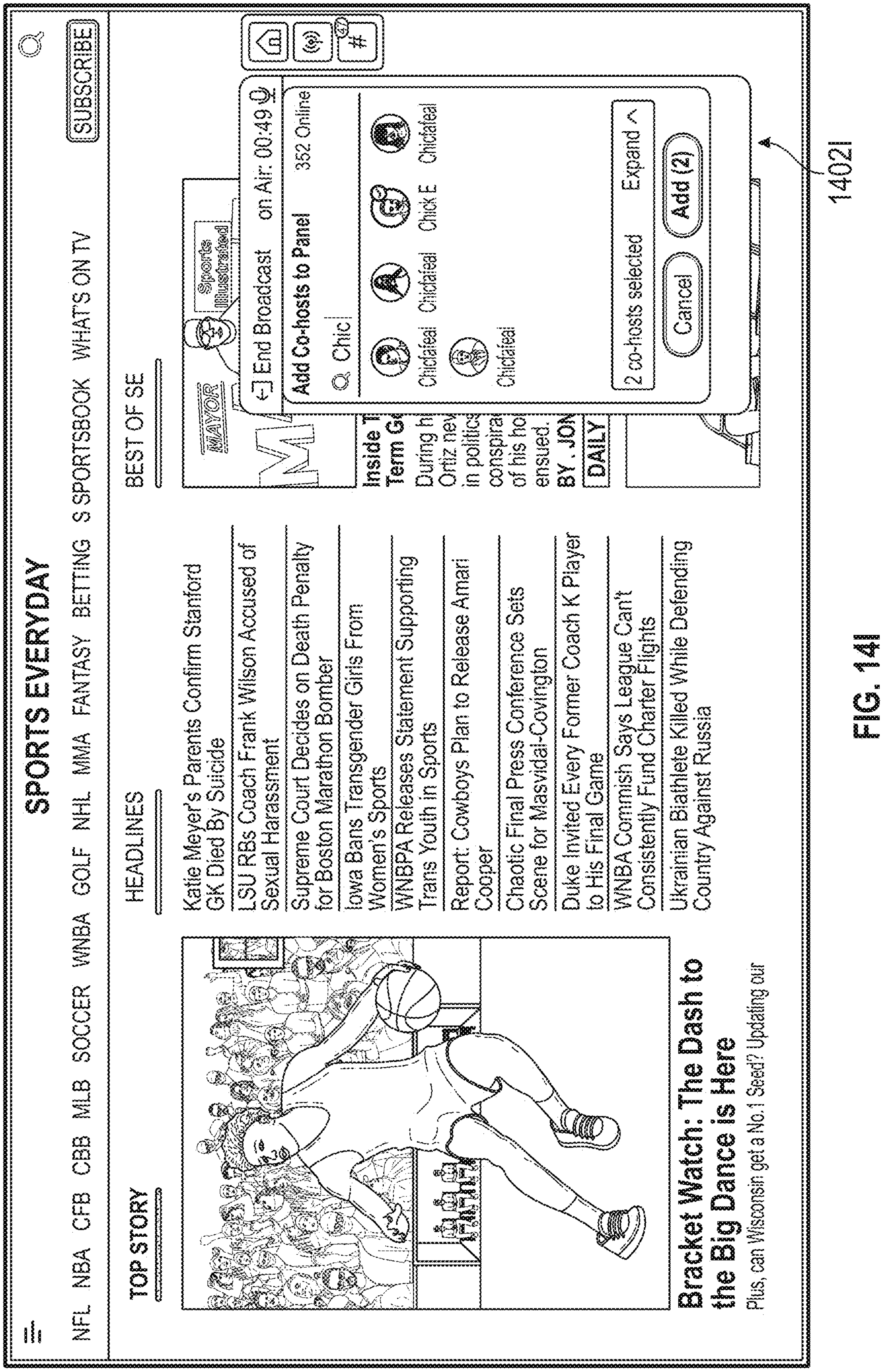

FIG. 14I illustrates an example user interface 1402I displayed in response to activation of the add host control discussed above with respect to the user interface depicted in FIG. 14H. The user interface lists listeners who may be added as a host. A search field is provided via which the host can search for a specific listener to add as a host. A search engine may receive the text entered into the search field and incrementally provide the corresponding search results (e.g., as each character is entered the search results are further filtered to display only those listener names that match the entered characters). The number of potential co-hosts selected may be displayed. A control may be provided via which the host can confirm that the selected potential co-hosts are to be added as co-hosts.

Figure 14J:
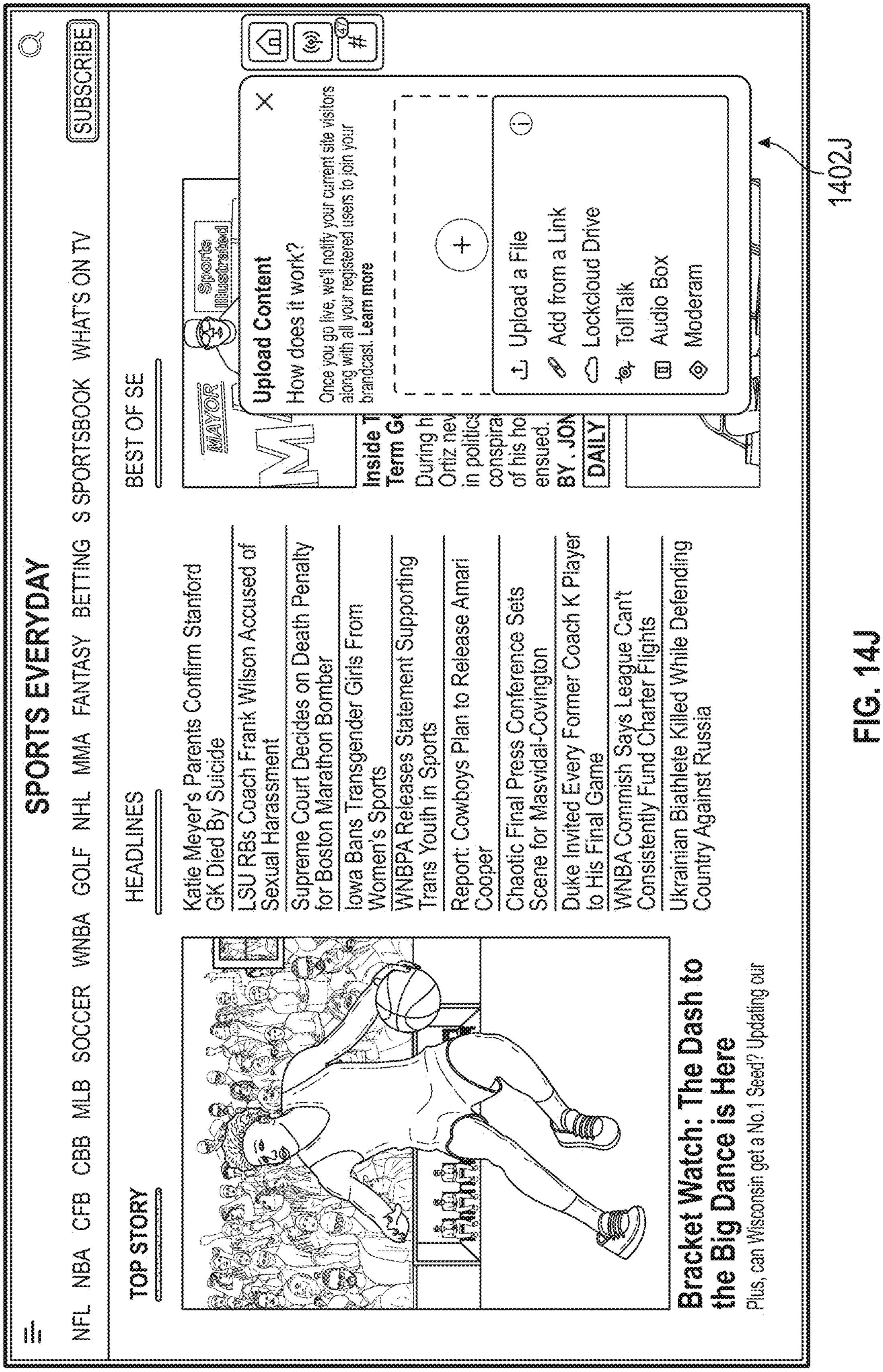

FIG. 14J illustrates an example user interface 1402J displayed in response to the user activating an upload content control. Controls are provided via which the user may upload a file (e.g., by dragging and dropping prerecorded content to a corresponding field or by navigating to and selecting the file). A control is provided via which the user can add a link to the content. Controls are provided via which the user can specify various social networking and content sharing sites via which the content is to be accessed.

Figure 14K:
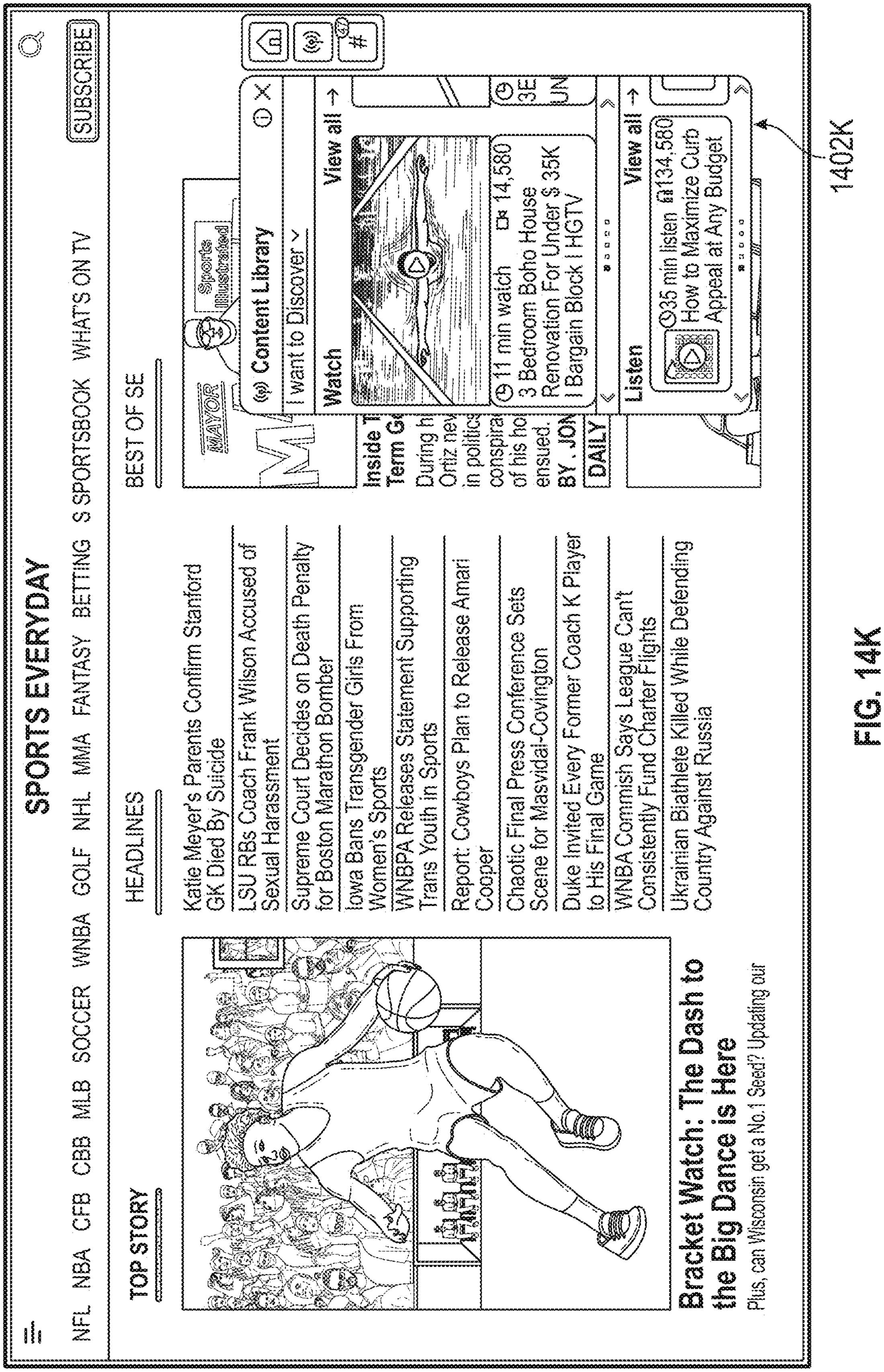

FIG. 14K illustrates an example content library user interface 1402K via which an end user can discover content of interest. Optionally, a menu of content categories may be provided, wherein in response to a user selecting a category, corresponding content items are accessed from memory and displayed (e.g., if the content items comprise video content, a representative image or frame may be displayed). The user may select an item of content and if the content is playable (e.g., video or audio content) the content may be played back. Optionally, a search field may be provided via which the user may enter a textual search term, and a search engine will identify matching content (e.g., by comparing the search terms with tags associated with content items in the library), and display the matching content in ranked order (e.g., where the ranking is based on the closeness of the match, on the popularity of the items of content as measured by views or like indications, and/or other criteria).

Figure 14L:
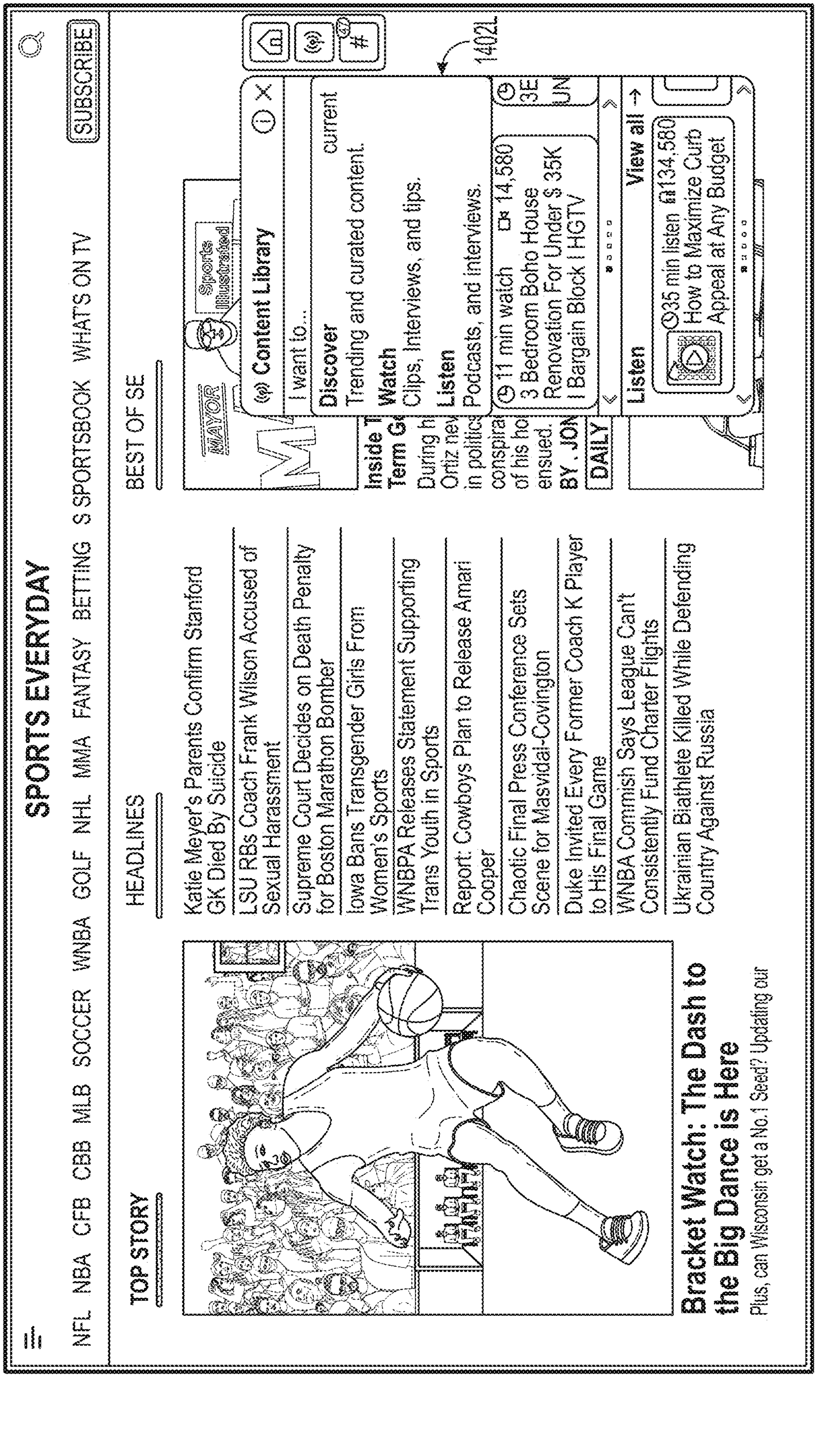

FIG. 14L illustrates the example content library user interface with the category menu 1402L expanded. In this example, the category menu includes "Discover" (curated and trending content), "Watch" (clips, interviews, and tips), and "Listen" (podcasts and interviews).

Figure 14M:
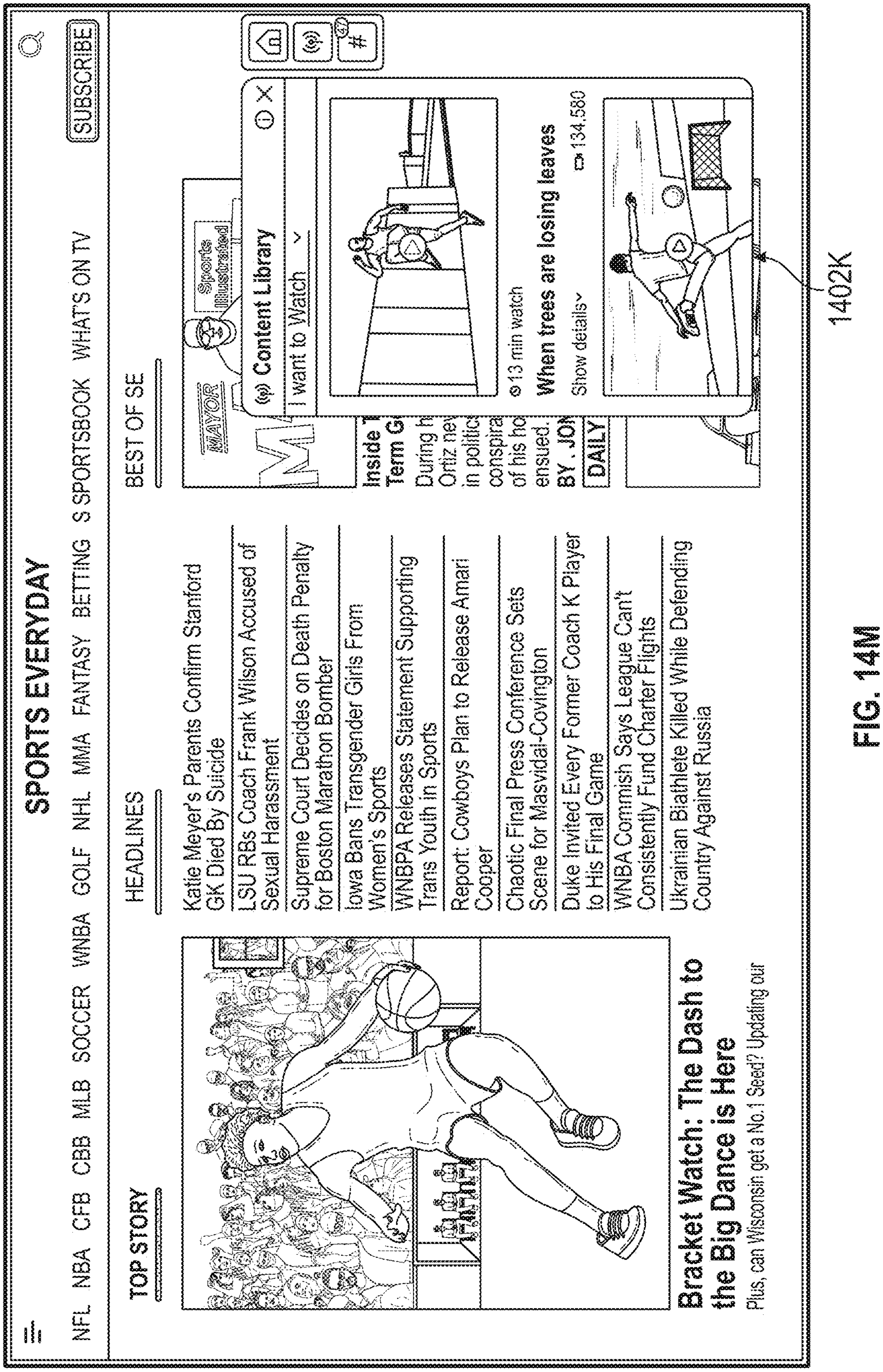

FIG. 14M illustrates the example content library user interface 1402K with content items displayed. In this example, the content items are streaming from different sources (e.g., different content sharing websites) but are normalized so that they have the same appearance (e.g., are of the same size and/or have the same framing).

Figure 14N:
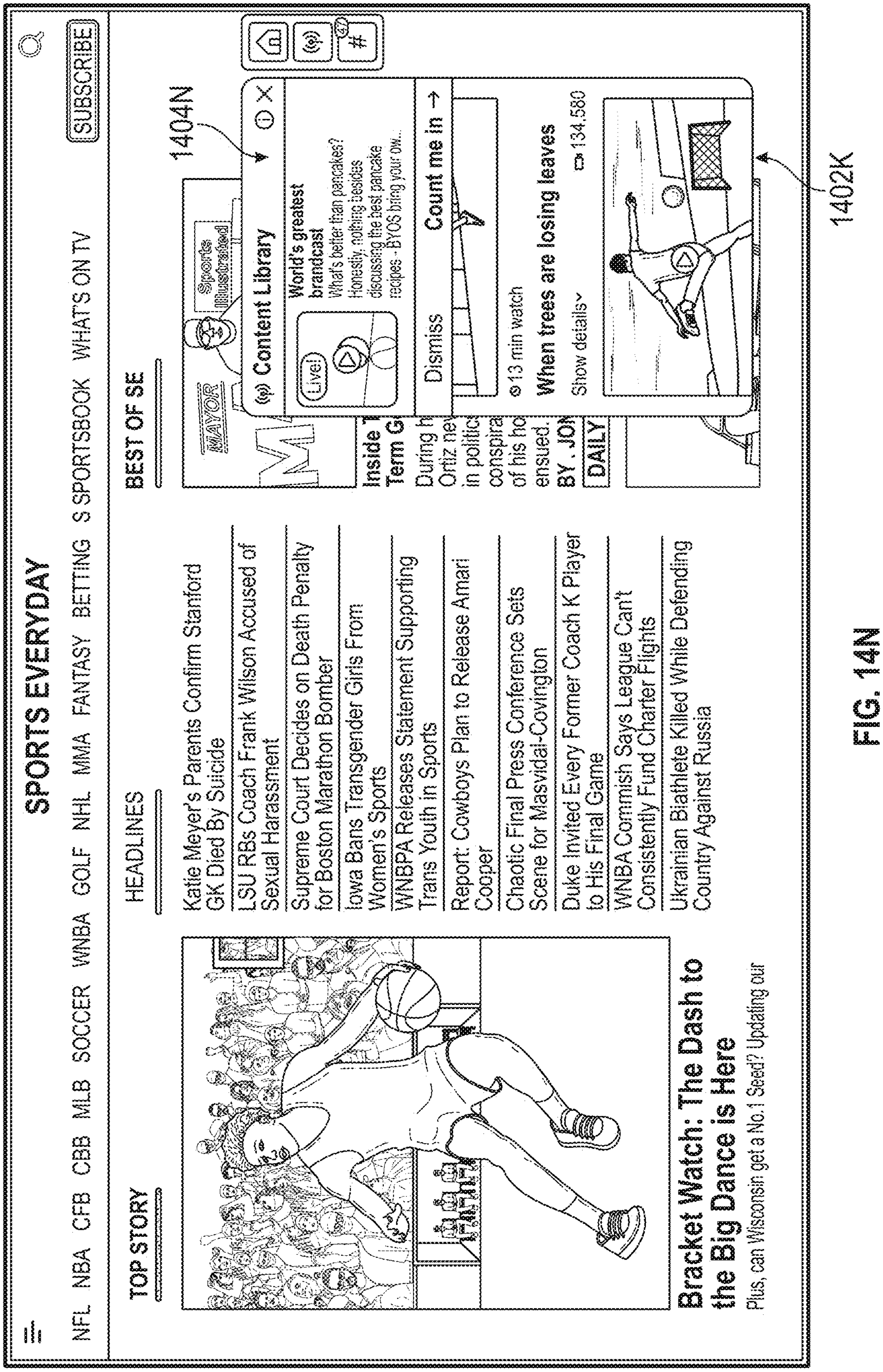

FIG. 14N illustrates the example content library user interface 1402K with a notification 1404N that a live streaming broadcast is going to take place, with a control via which the user can join (view and optionally participate via chat or as a co-host) the broadcast.

Figure 14O:
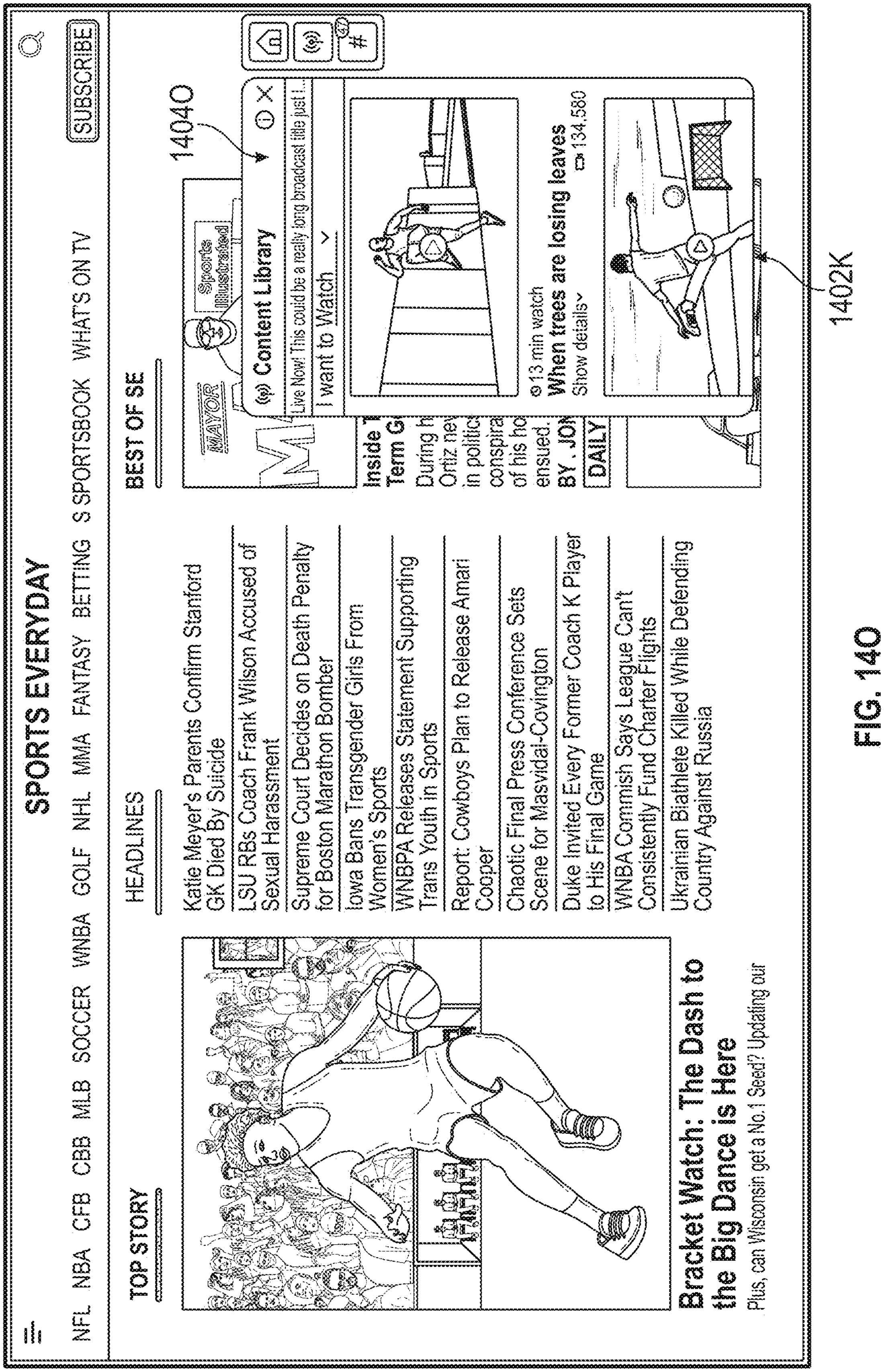

FIG. 14O illustrates the example content library user interface 1402K with a notification 1404O that a live streaming broadcast is taking place, optionally with an indication as to the broadcast length.

Figure 14P:
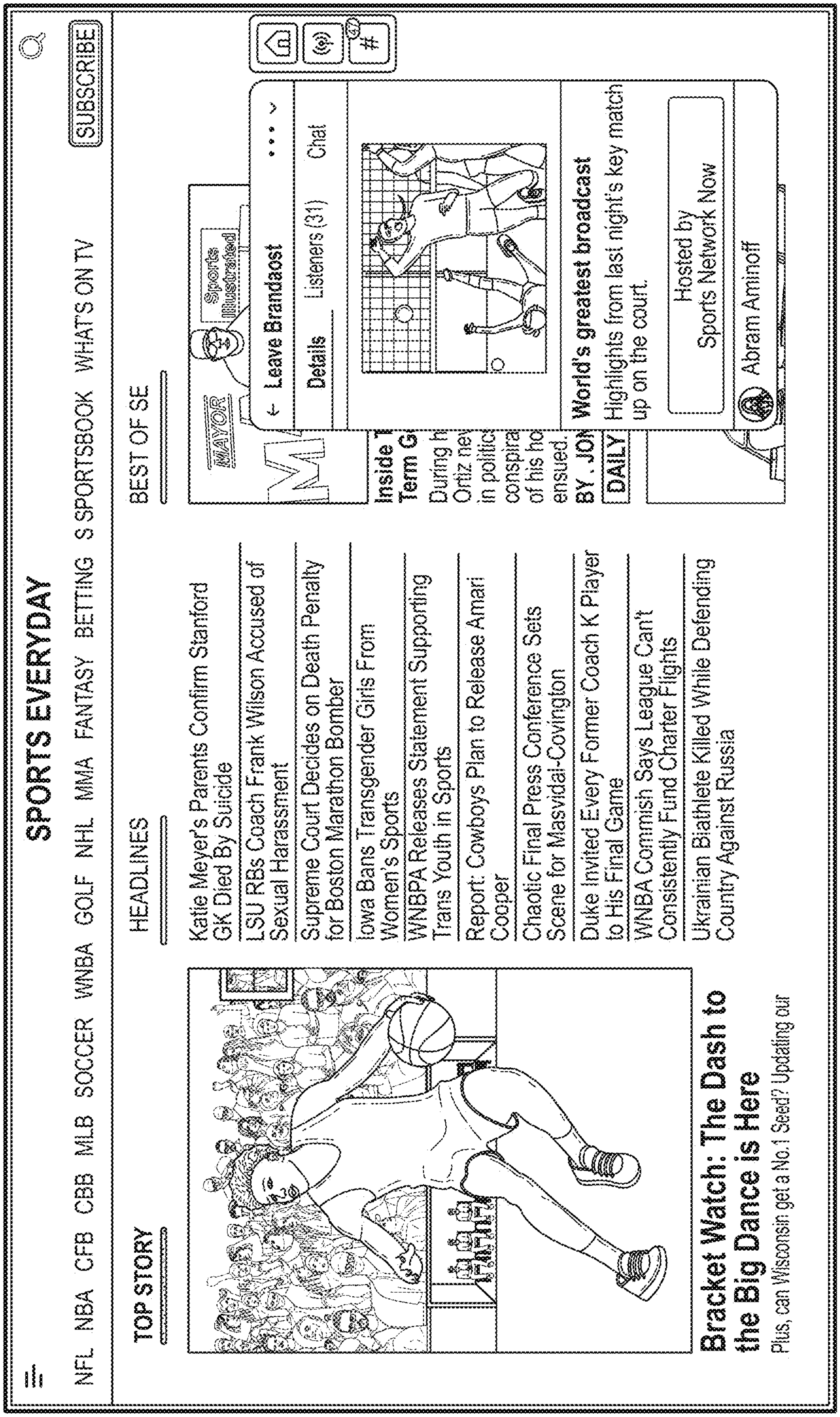

FIG. 14P illustrates a details user interface with a live streaming broadcast being presented. The title and description of the live broadcast are displayed. An image and name of the current host is displayed. If another host (a co-host) takes over the microphone/is speaking, the image and name will change to the new host. The user interface includes tabs for the details user interface, a listeners user interface, and a chat user interface.

Figure 14Q:
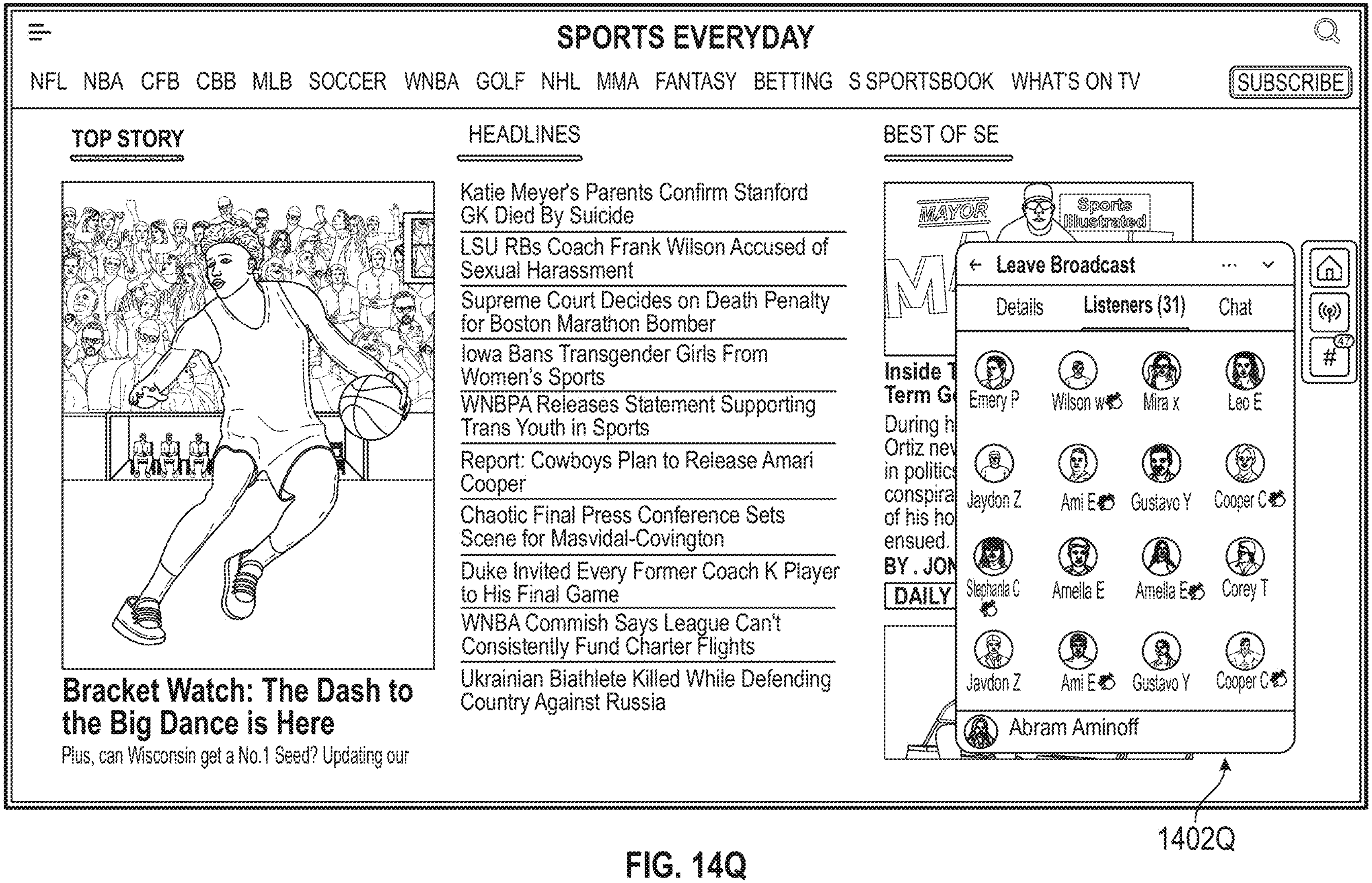

FIG. 14Q illustrates an example listeners user interface 1402Q depicting images (e.g., photographs or avatars) and/or names of some or all listeners to the live broadcast. Optionally, the listener image or name is only displayed for registered users, while for non-registered users a randomized name and/or avatar may be displayed. In addition, an image and name of the current host is displayed.

Figure 14R:
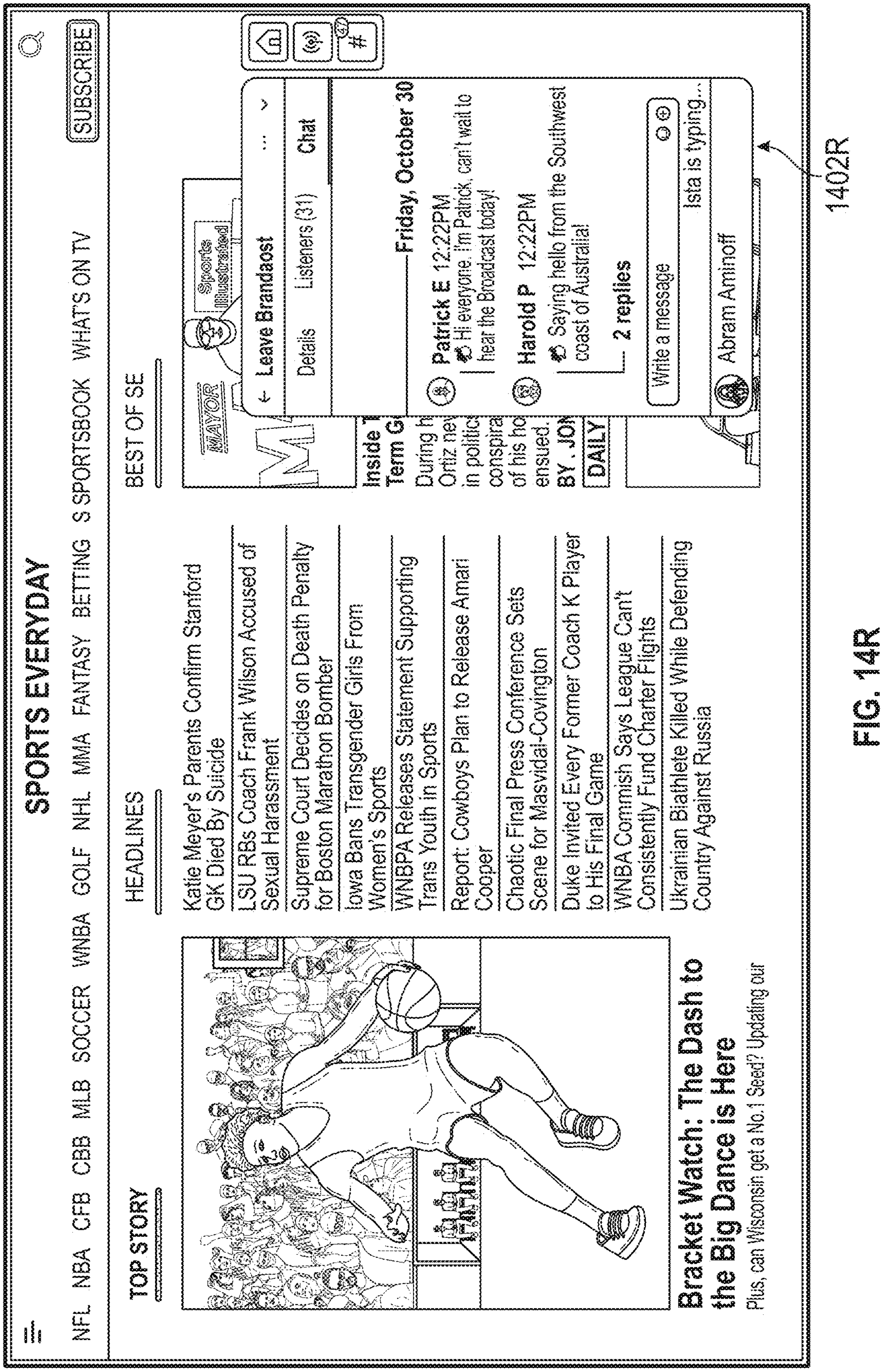

FIG. 14R illustrates an example broadcast chat user interface 1402R. The name and/or image of a chat participant are displayed in association with the corresponding user's chat entry. Optionally, the time of the chat entry is displayed. A chat entry field is provided via which the user can enter text, emojis, audio content, and/or video content to be communicated with all or a subset of the broadcast listeners specified by the user. Optionally, a control is provided via which the user can leave the broadcast and the chat session. Optionally, the name and/or image of the host are displayed. Optionally, the chat session for the broadcast may be recorded for later access by authorized users or by any user depending on the access configuration setting.

Figure 14S:
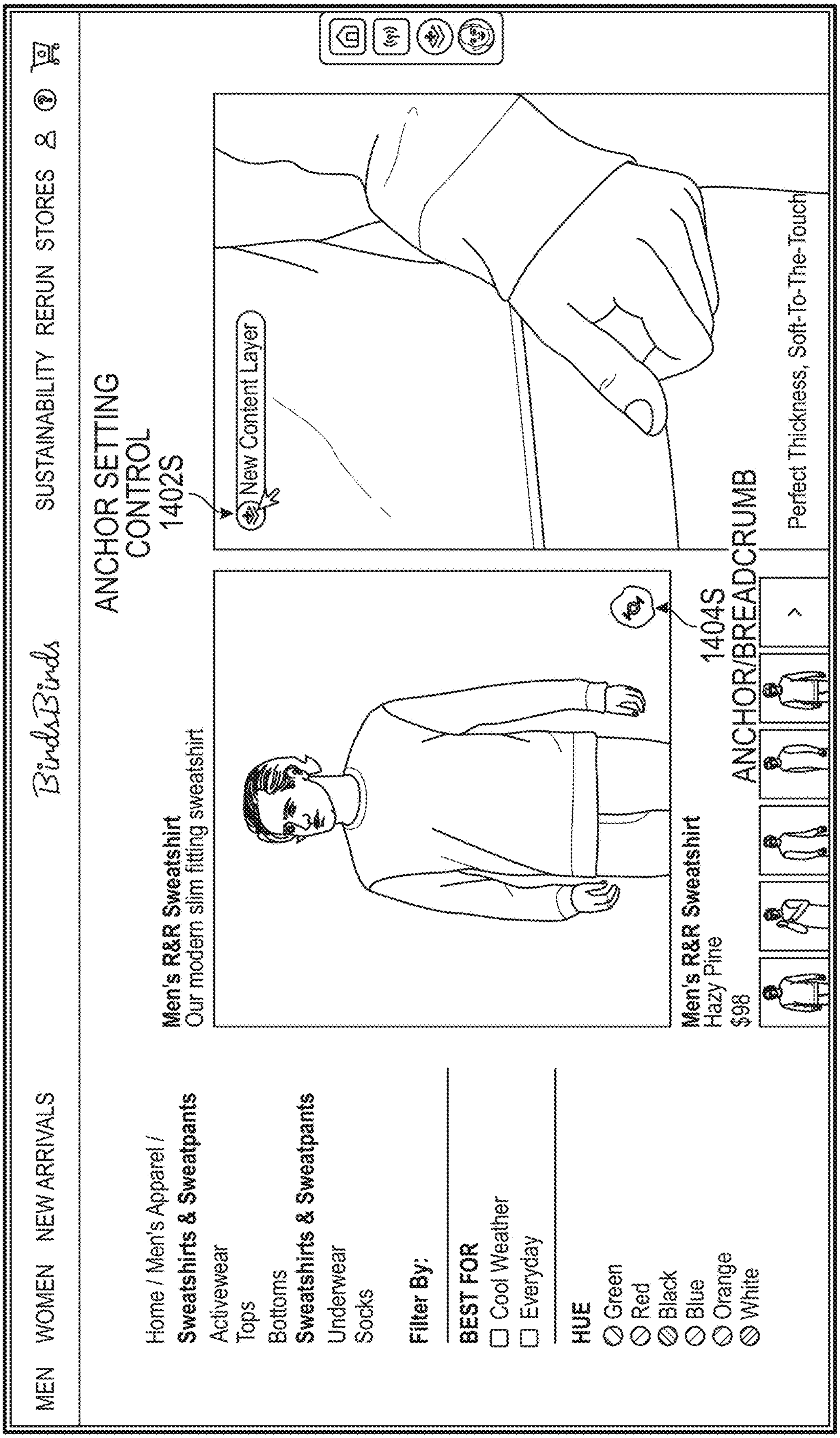

FIG. 14S illustrates an example user interface including an anchor setting control 1402S (which enables an anchor to be added to a desired location on an anchor layer) and an example anchor 1404S.

Figure 14T:
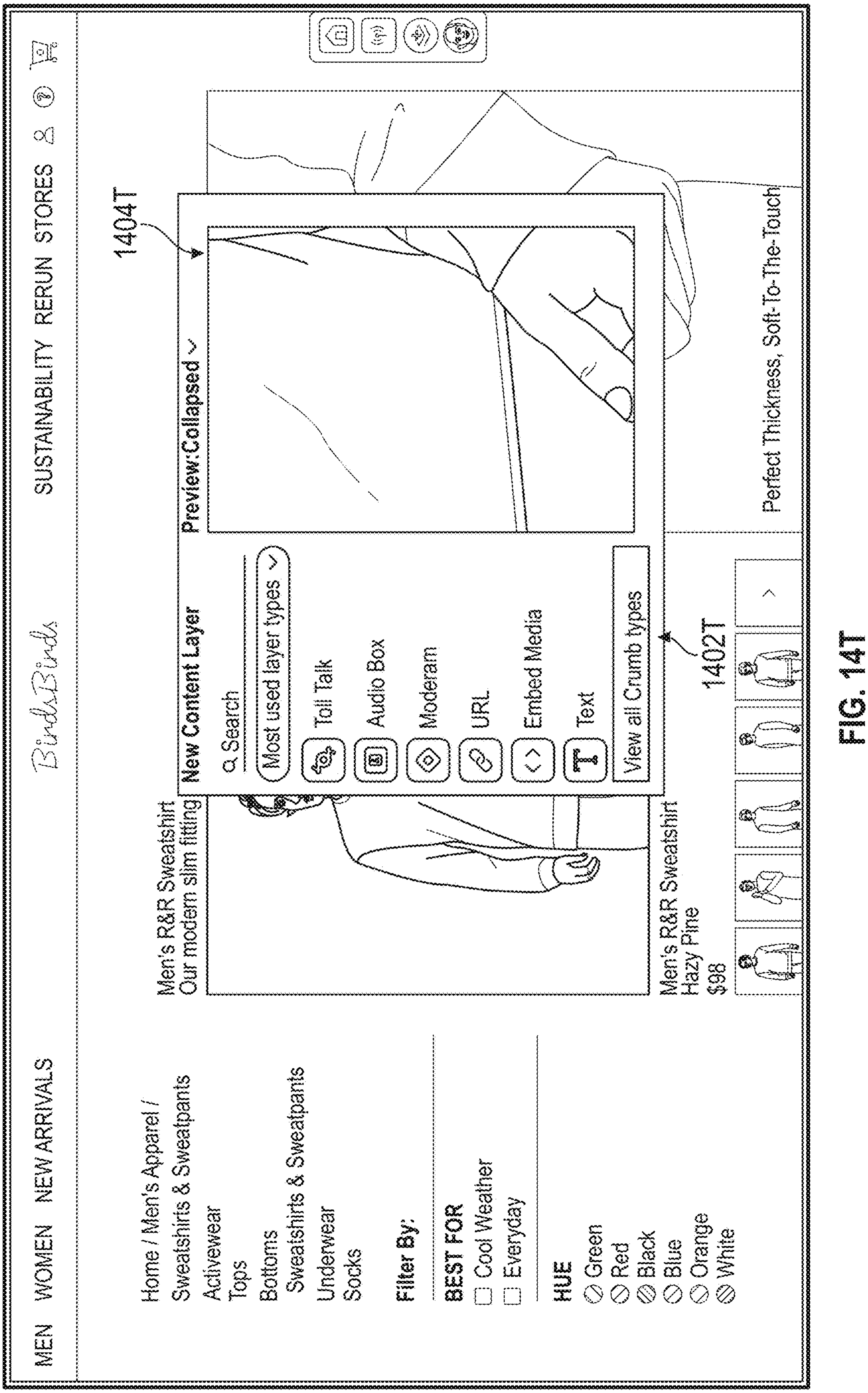

FIG. 14T illustrates an example user interface including the anchor setting control in expanded form 1402T. A menu of available types of anchors/breadcrumbs are displayed. The menu entries may include sources for content to be associated with the anchor, such as social media sites, content sharing sites, content management systems, URLs (a URL menu entry via which the user can enter a URL where the content is located), uploaded media (where the user can embed a specific item of uploaded content by activating an embed control), text (where the user can enter text into a text field accessed by activating a text control), and/or other content source entries. For example, a given source may be a social media account/presence of a brand associated with the webpage.

Optionally, the content may be dynamically changed (e.g., to display the latest posting on the source site, such as on a brand social media account; to display a highest rated/most liked item of content from the source; to display the most viewed item of content from the source in a specified period of time, etc.). Optionally, the sources are ranked based on their frequency of use over a period of time (such as the past 24 hours, the past week, the past month, etc.). The user interface may enable the user to drag and drop an anchor to a desired location (e.g., on or offset from an HTML element). Optionally, a preview of the webpage is provided which will show the location of a dropped anchor 1404T.

Optionally, performance data associated with a given content source may be displayed (e.g., how many followers or links, how many likes, how many reshares, etc.). The user interface enables the user to view and approve the anchor and associated content prior to publishing the crumb to the actual webpage.

Figure 14U:
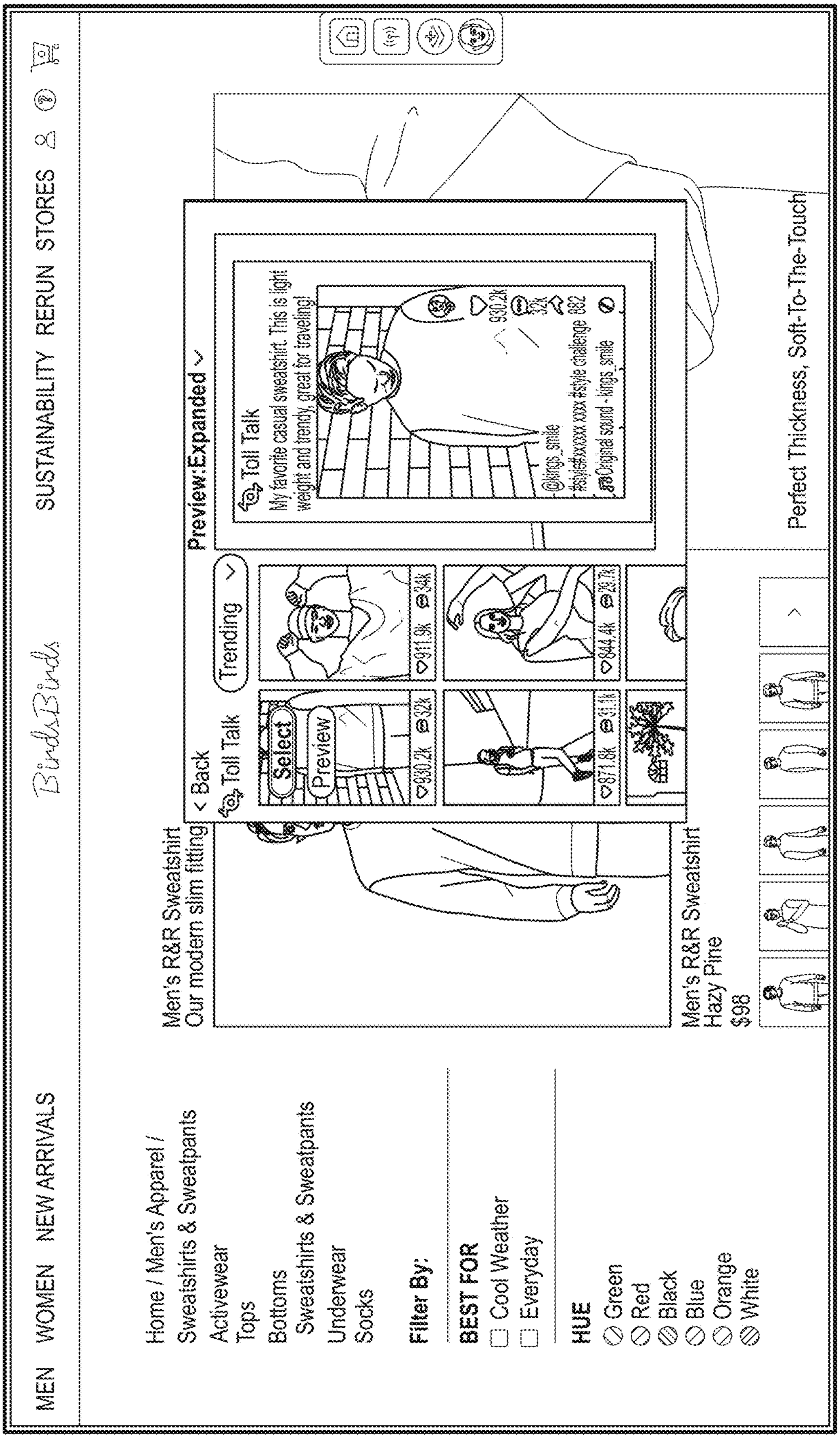

FIG. 14U illustrates the example user interface illustrated in FIG. 14T, with 1404T depicted in expanded form in the preview pane. The user interface indicates the source of the content as well as the content itself. Optionally, user interface controls 1404CC from the content source are provided as well (e.g., a following control (that enables the user to follow the creator of the content), a like control (that enables the user to indicate that they like the content), a commenting control (that enables the user to leave comments regarding the content), a sharing control (that lets the user forward a link to one or more destinations via email, text messages, or other messaging service), and a scroll to next post control). A call-to-action text 1406CC may be displayed, which when clicked on or otherwise selected causes the user browser to be navigated to another destination (e.g., another URL).

Figure 14V:
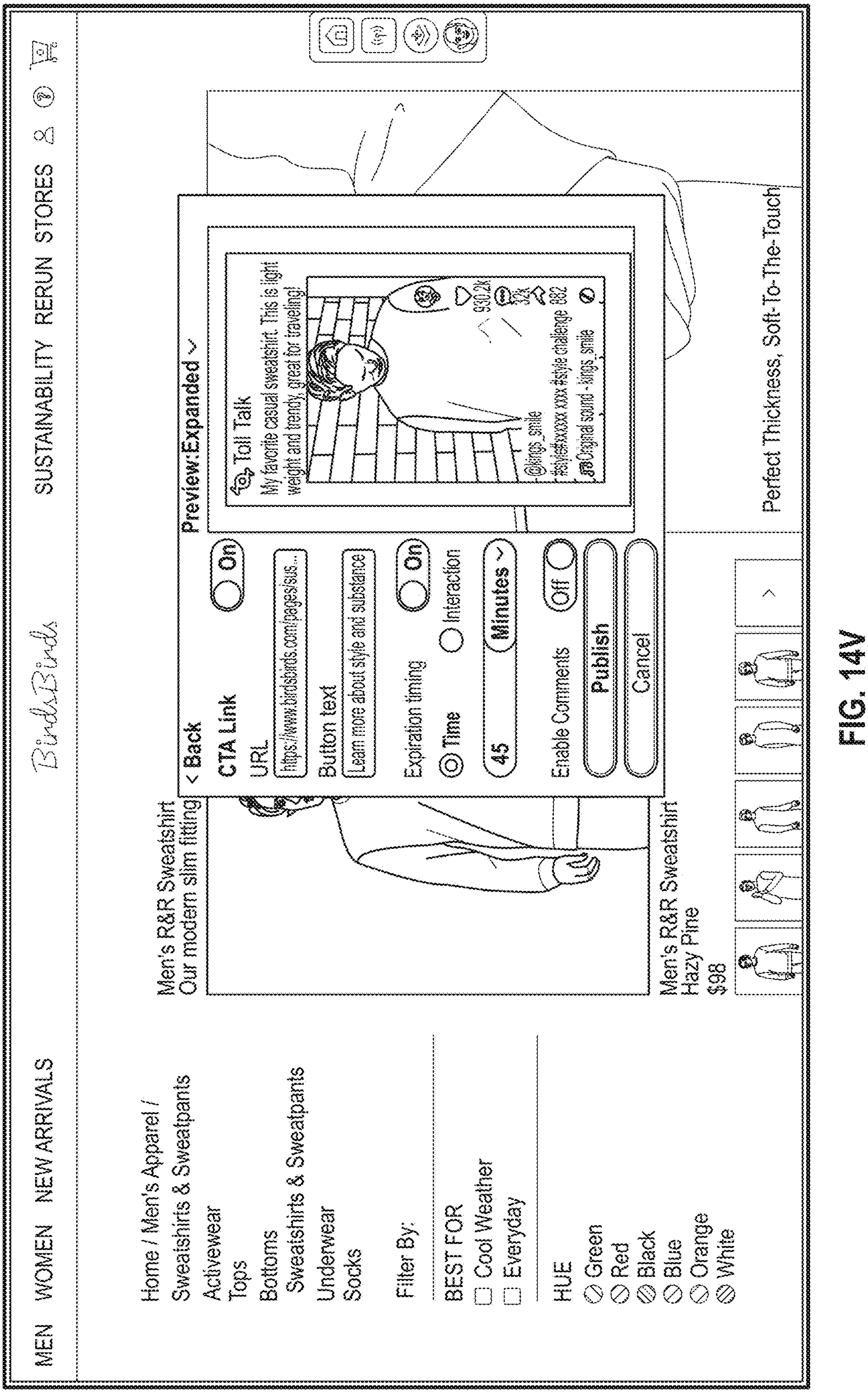

FIG. 14V illustrates the example user interface illustrated in FIG. 14U, with various anchor-related setting controls illustrated. For example, a call to action (CTA) URL field is depicted populated by the corresponding URL that links to another site or webpage. A button text field is configured to receive user-provided text to be displayed in association with the anchor (e.g., in response to a cursor being hovered over the anchor). An expiration control and field enable the user to specify an expiration time associated with the anchor, after which the anchor will no longer appear on the webpage. An interaction controls enables the user to enable/specify user interactions. A comments control enables comments to be enabled or disabled. If comments are enabled, viewers may be permitted to leave comments with respect to content associated with the anchor. A publish control, when activated, causes the anchor to be published on the webpage so users accessing the webpage can view and interaction with the anchor and anchor-related content.

Figure 14W:
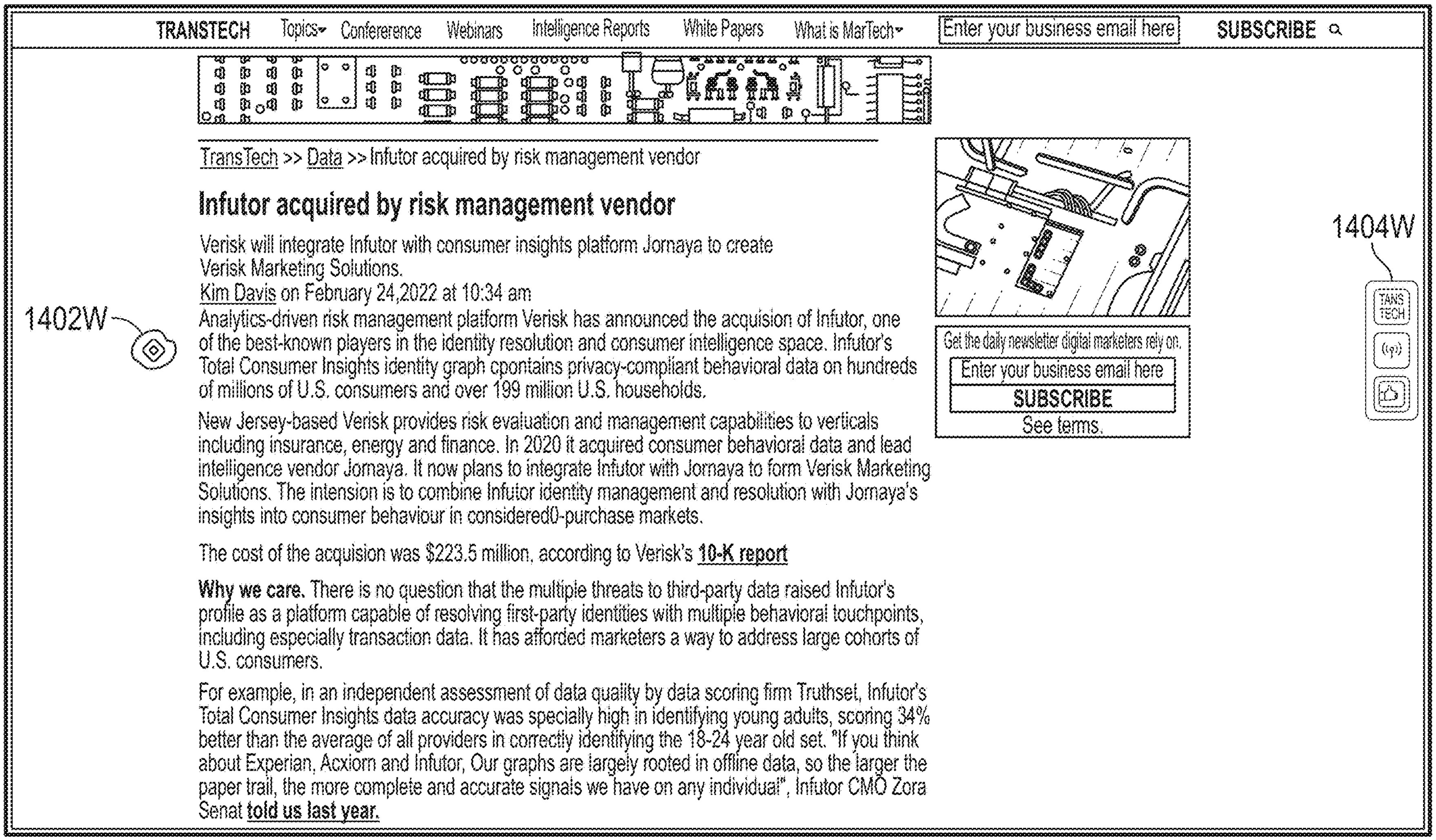

FIG. 14W illustrates an example webpage with a published anchor 1402W and an activity feed menu 1404W (with a home button, an antenna control (that causes the activity feed and content to be displayed), and/or a hashtag control (that causes a channels and content library user interface to be displayed).

Figure 14X:
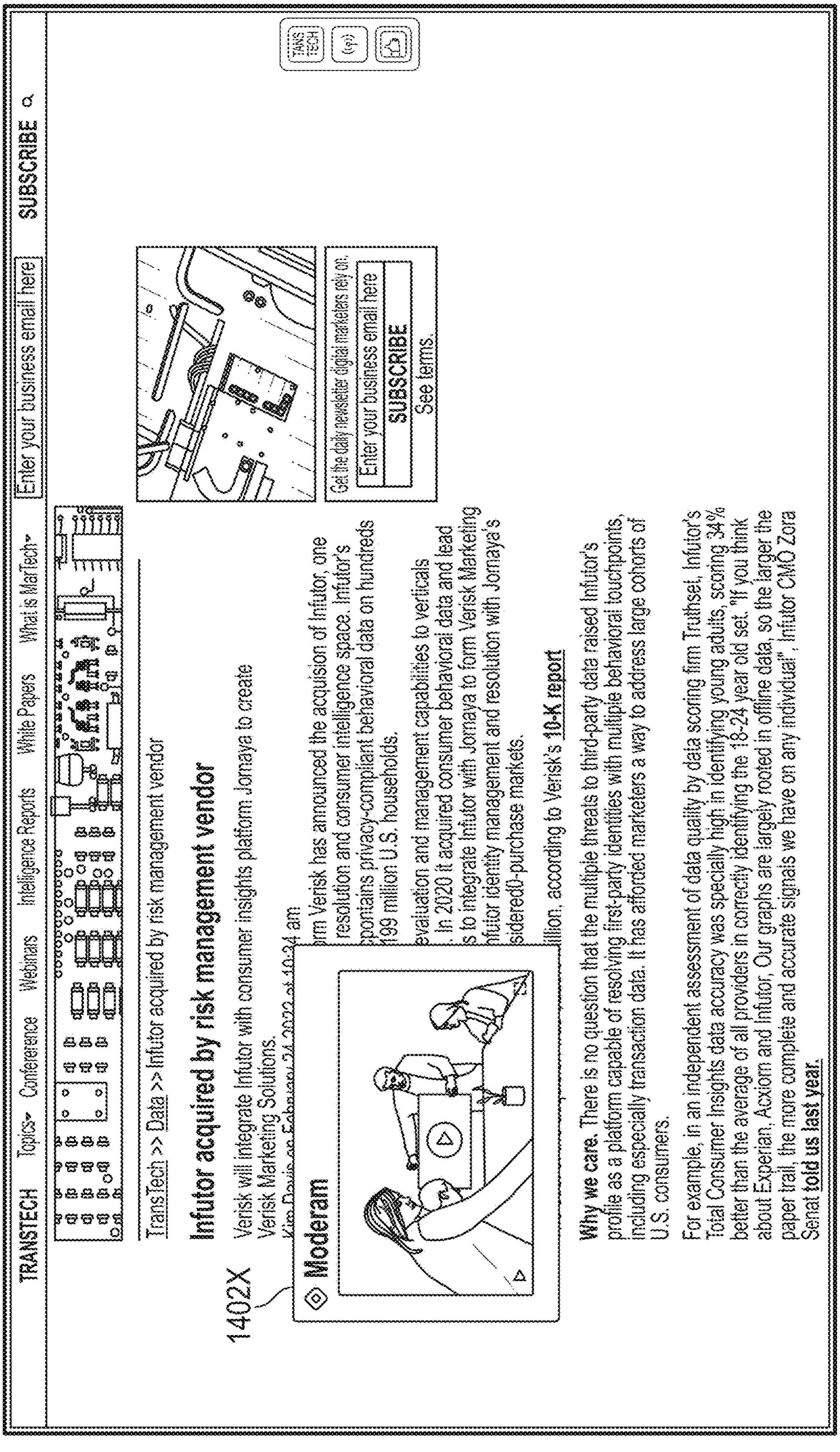

FIG. 14X illustrates the example webpage illustrated in FIG. 14W, wherein in response to a user focusing on the anchor (e.g., touching or hovering a cursor over the anchor or scrolling the webpage until the anchor is reached), the corresponding associated content 1402X is displayed, with the associated title and a play control overlaying the content.

Figure 14Y:
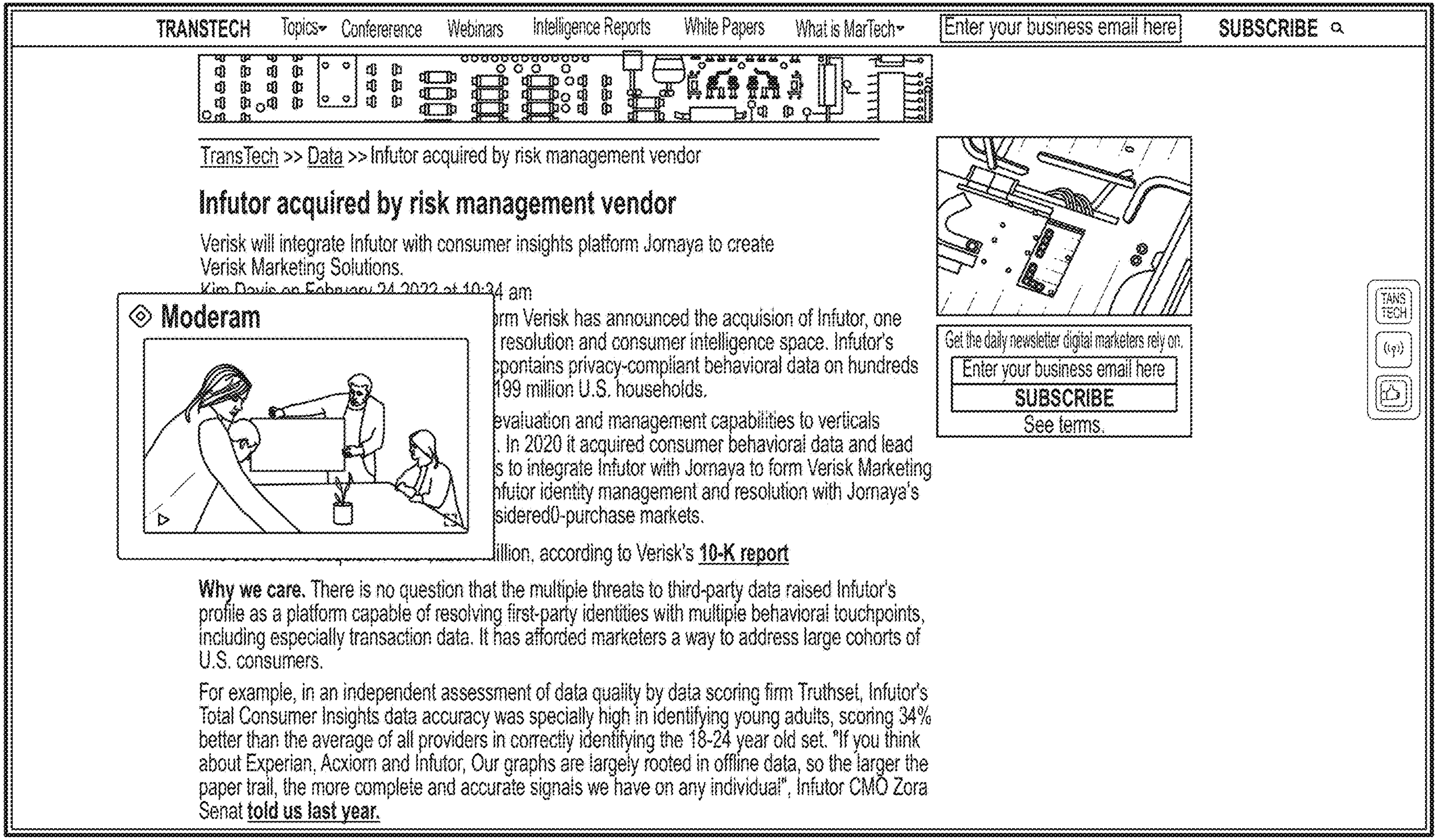

FIG. 14Y illustrates the example webpage illustrated in FIG. 14X, wherein in response to a user activating the play control, the content (video content in this example) begins playing and associated controls (e.g., a like control, a chat control, a replay control, and/or a download control) are displayed.

Figure 14Z:
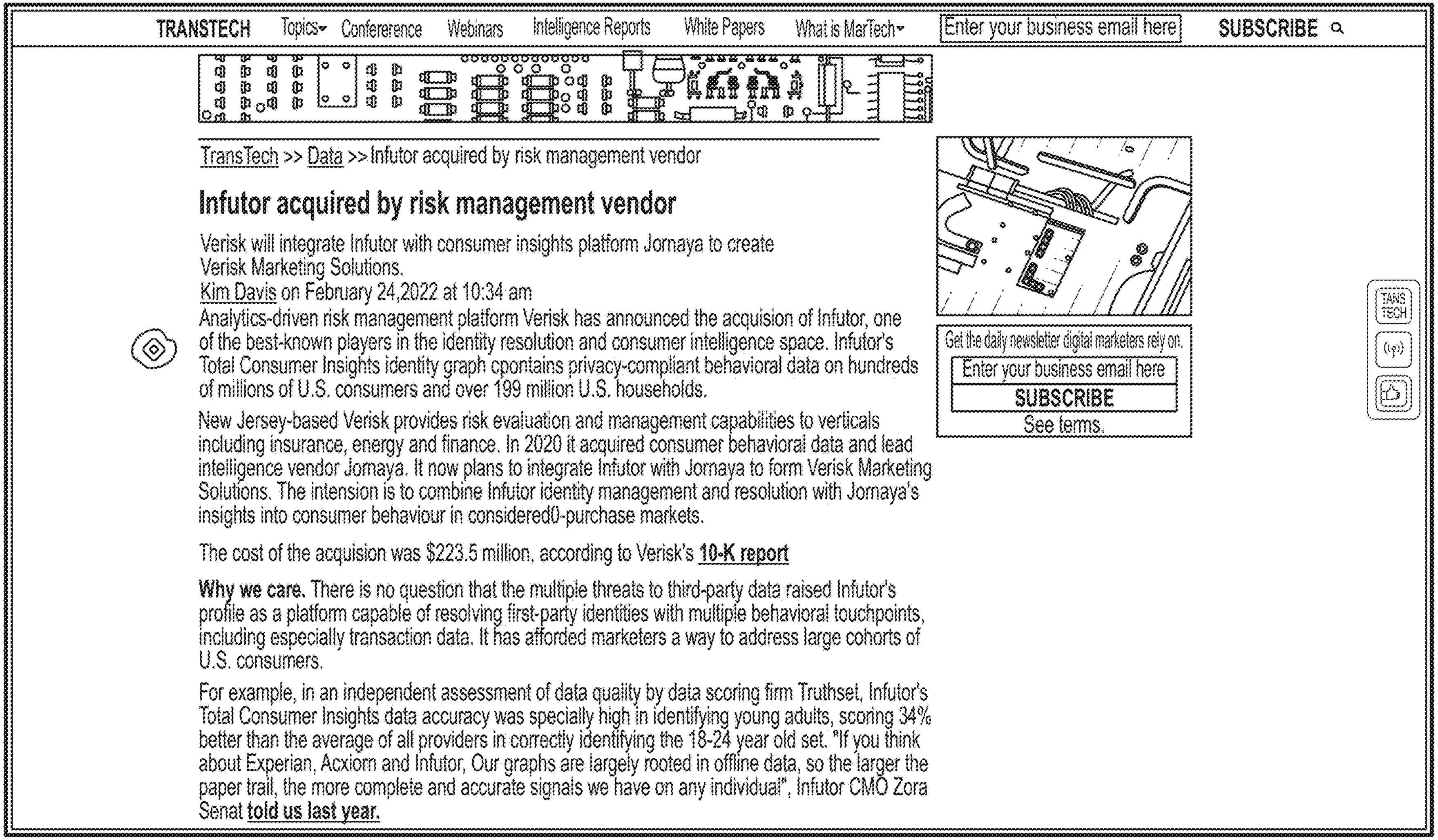
Figure 14A:
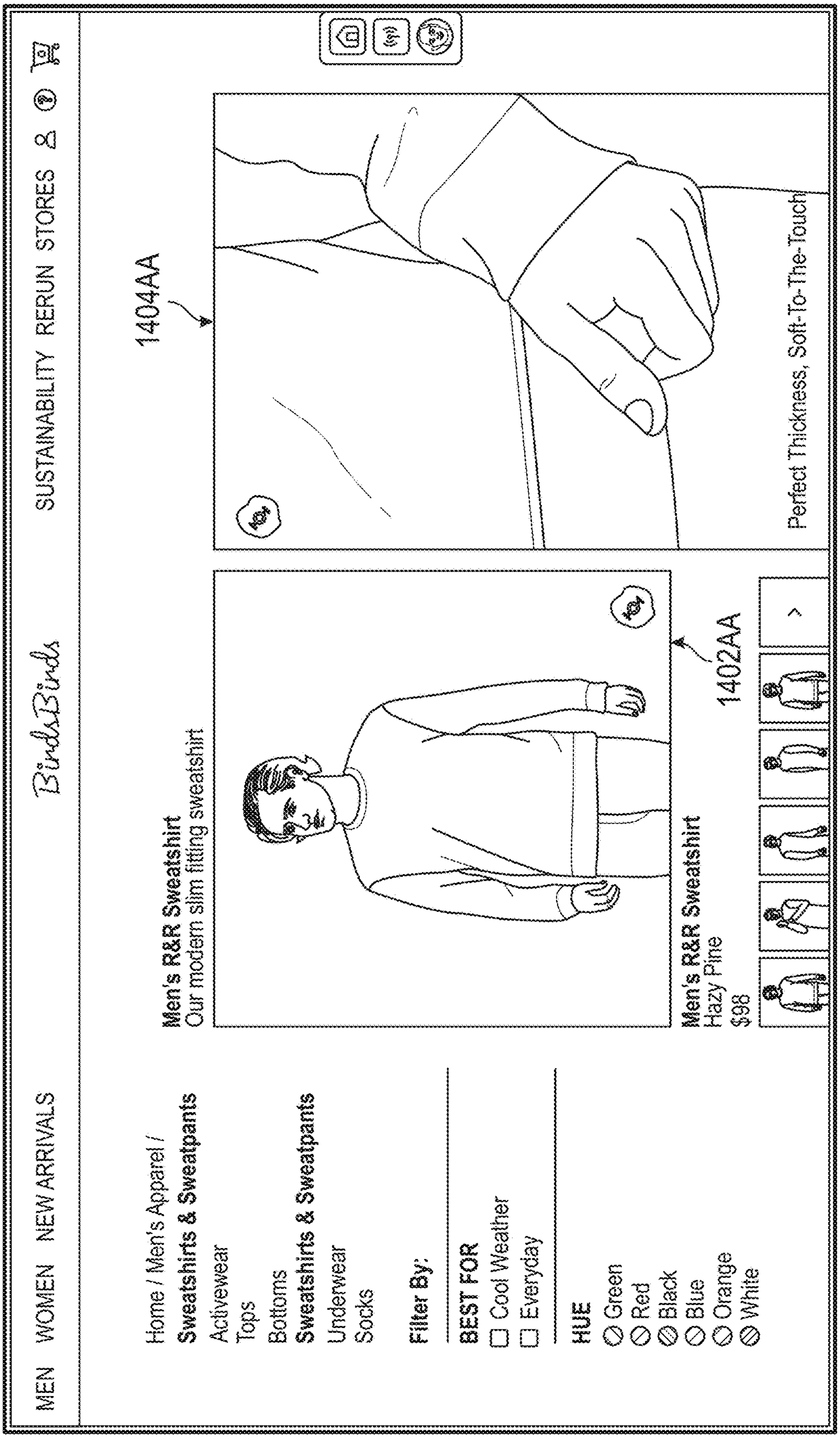
Figure 14B:
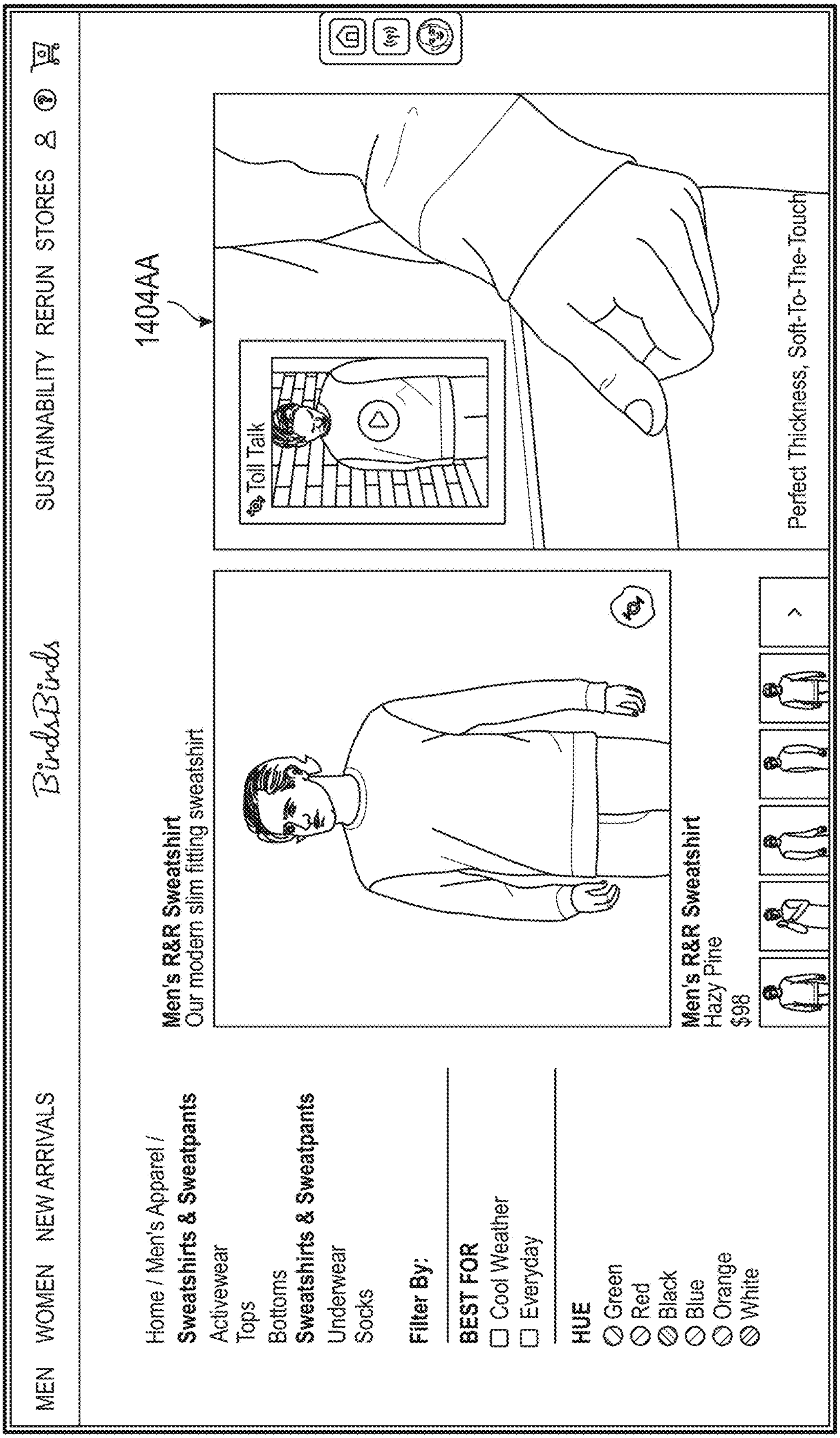
Figure 14C:
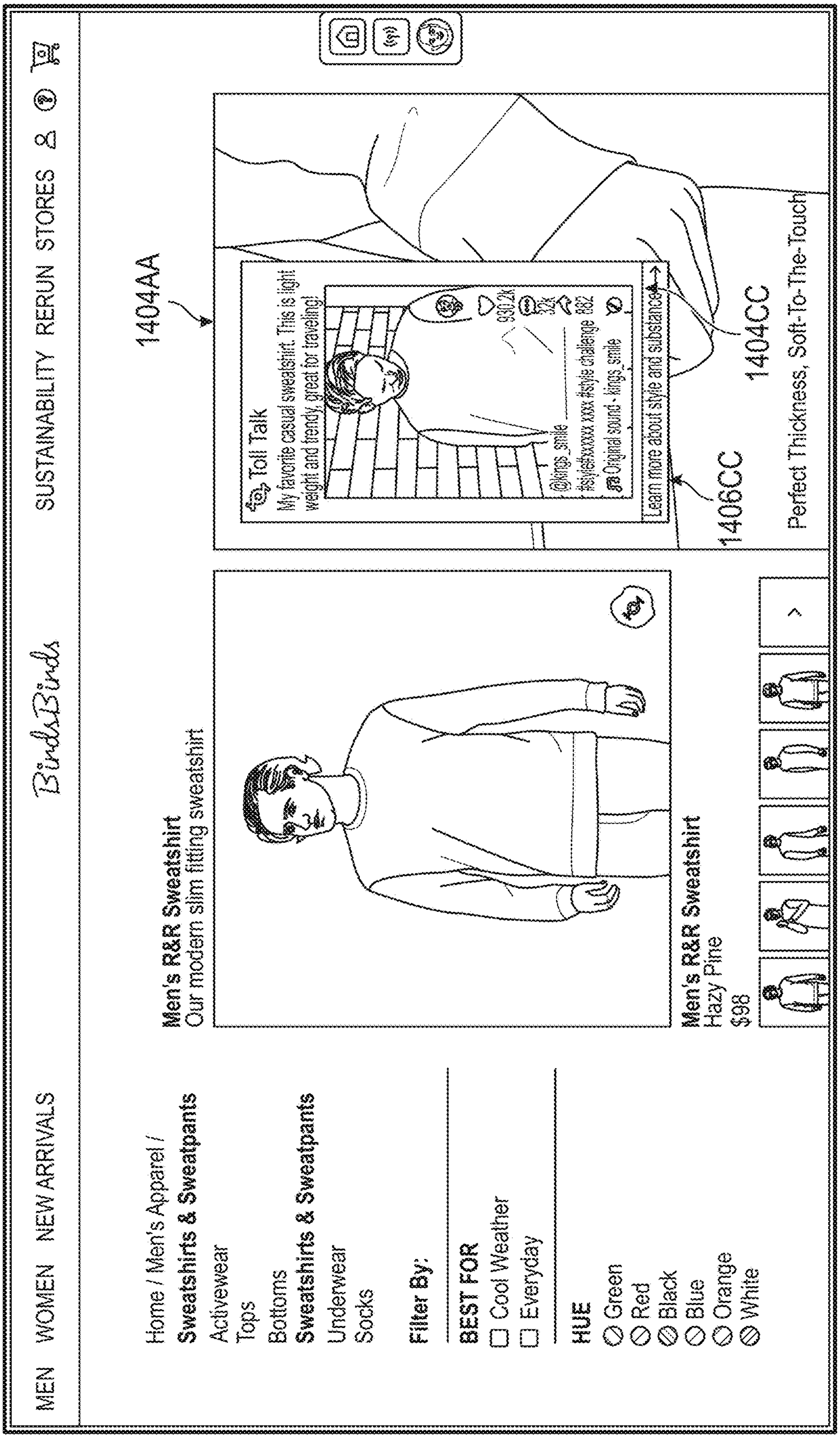

FIG. 14Z illustrates the example webpage illustrated in FIG. 14Y, wherein in response to the user activating an exit control and/or in response to the video content completed playing, the anchor content may be minimized, and the anchor is displayed again.

FIG. 14AA illustrates the example webpage illustrated in FIG. 14S, with two anchors 1402AA, 1404AA at respective locations (e.g., overlaying two images of two different products).

FIG. 14BB illustrates the example webpage illustrated in FIG. 14AA with the anchor 1404AA expanded to show an image of the associated content (e.g., in response to the user hovering over or pointing at the anchor).

FIG. 14CC illustrates the example webpage illustrated in FIG. 14BB with anchor 1404AA still further expanded in response to the user clicking on or otherwise selecting the image illustrated in FIG. 14BB. The expanded display include a content description, an enlarged image, text and controls from the source (e.g., a following control (that enables the user to follow the creator of the content), a like control (that enables the user to indicate that they like the content), a commenting control (that enables the user to leave comments regarding the content), a sharing control (that lets the user forward a link to one or more destinations via email, text messages, or other messaging service), and a scroll to next post control). A call-to-action text may be displayed, which when clicked on or otherwise selected causes the user browser to be navigated to another destination (e.g., another URL).

As discussed above, various edit user interfaces and editing functions may be provided (e.g., for use by an administrative user to add a moment, such as a general-purpose anchor, underline anchor, product anchor, slide, and/or the like). The edits (e.g., the addition and positioning of moments and the association of content with moments) may be stored locally and/or on a remote server for later access and use. Optionally, some or all of the edit user interfaces and functions may be provided via code embedded in the webpage being edited, where the webpage may be accessed and presented via a browser. Thus, optionally, advantageously, the editing functions may be provided to a user without the user having to add a web browser extension and/or without having to download an editing application.

For example, the embedded code can be used in a webpage to enable editing by providing dynamic and interactive functionality. As similarly discussed elsewhere herein, optionally, this may be accomplished via a scripting language (e.g., JavaScript), which may be embedded within the webpage's HTML. For example, the code written using the scripting language may be stored in a separate file with the appropriate file extension (e.g., .js for JavaScript). A corresponding script tag (a script src specifying a URL for an external script file) may be added to the webpage HTML, and the source attribute may be specified that points to the file containing the embedded code. For example, the following example tag may be used:

```
<head>
  <script src="path/the/editing/script.js"></script>
</head>
```

For example, where the code is written in JavaScript, a browser JavaScript engine that provides a JavaScript runtime environment may be utilized to execute the JavaScript to provide the described functionality. The browser's built-in interpreter searches for <script> tag or .js file linked with an HTML file while loading the web page, and then interpretation and execution of the code is performed.

Once the code is embedded into the webpage, it may be utilized to add interactive elements (e.g., moments, such as anchors) to the webpage and/or to format such elements. Optionally, the embedded code may be utilized to dynamically manipulate webpage content, such as by changing the text or images displayed based on user input. Optionally, the user may be enabled to drag (e.g., from an anchor menu or other tool interface) and drop a moment to a desired webpage location. Optionally, a user may be enabled to designate existing text in the webpage as an anchor (e.g., by underlining text, by highlighting text, by bolding text, by italicizing text, by changing the text font, and/or otherwise). Optionally, the text underlining, highlighting, bolding, italicizing, color change, and/or font change may be visible to an end user when rendered via an end user browser. Optionally, the moment is in the form of a hotspot is not visible on the webpage when rendered via an end user browser. Optionally, the editor may enable the user to specify that the anchor is not to be visible to an end user (e.g., where the anchor will act as a hotspot), and can specify the size (e.g., the dimensions, such as the length and/or height in pixels or units of measurement) of the anchor/hotspot.

Optionally, the editor may enable the user to specify what user action will cause content associated with the anchor/hotspot to be rendered. Example user actions that may trigger the rendering of anchor-associated content may include scrolling to or past an anchor, hovering a cursor over an anchor, clicking or tapping on an anchor, otherwise focusing on an anchor, and/or the like.

Optionally, the editor may enable the user to specify a location offset relative to a webpage element (e.g., webpage text, graphic, image, or video) at which an anchor/hotspot is to be placed. The offset may be specified in pixels or as a unit of measurement (e.g., inches, millimeters, centimeters, etc.). For example, the editor may enable the user to select a webpage element, and specify that an anchor is to be placed a specified number of millimeters or pixels above, below, to the left, or to the right of the selected webpage element. Optionally, a horizontal offset slider and/or vertical offset slider is provided which can be manipulated by a user to set a horizontal and/or vertical offset.

Optionally, the embedded code may be utilized to generate a form that enables users to enter new content or edit existing content. The form can then submit the data back to a server, which can process the data and update the webpage using or based on the processed data.

As discussed above, the editor can be configured to enable a user to selectively place anchors (e.g., general purpose anchors, underline anchors, product anchors, non-visible hotspots) and associated content (e.g., video content, audio content, slides, graphics, text, PDF documents, and/or other content, which may include a call to action, a link/URL, and/or the like) with a given anchor.

Optionally, the editor may enable to reformat a webpage, including anchors and associated content for different device types, screen sizes, and/or screen configurations, and have the reformatted webpage displayed as a preview of what an end user will view via a corresponding device type. For example, controls may be provided that enable a user to specify that the webpage is to be formatted for a mobile device (e.g., a smartphone), a laptop, or a desktop display, or displays of specified ratios (e.g., 4:3, 16:9).

A publish control may be provided that enables an edited webpage to be published and available to end users. Optionally, until the publish control is activated, the webpage will be stored and maintained as a draft webpage and will not be made available to end users.

Optionally, the content associated with or available to be associated with respective anchors may be displayed to one side of, or overlaying the webpage. Optionally, a user interface may be provided that enables a user to specify whether or not a given anchor and/or item of content (e.g., associated with a moment, such as an anchor or hotspot) is to be rendered or not on a given specified type of end user device (e.g., mobile device/smartphone, laptop, desktop, etc.). For example, the user interface may include a listing of device types (e.g., mobile device, desktop device, television, smart wearable), where the user can select for which device types a given anchor and/or associated content is to be provided via a webpage or disabled for a given webpage. Optionally, a plurality of content items (e.g., all of the content items) associated with respective anchors of a given webpage may be displayed in pane or other area of the user interface, and controls are provided via which the user can selectively or as a group enable or disable the display of the content items for a given device type.

Optionally, analytics may be displayed via a user interface in association with a given moment and/or webpage (e.g., where the webpage has previously been published with the given moment). The analytics may be rendered in textual and/or graphic form and may provide various aspects of tracked, aggregated, and analyzed data (e.g., generated and provided by the system). For example, a user interface displayed in association with a given item of content associated with an anchor may display the number of unique views of the content item, the number of returning viewers viewing the content item, a percentage of changes in one or more of the displayed metrics from a prior period (e.g., the prior week, month, year), activity time on the corresponding webpage and/or website (rendered via a graph over a period of calendar time), number of impressions, number of clicks, number and/or completions (e.g., conversions of website visitor to a customer or the achievement of other specified goal, such as responses to call to action), average time on website, and/or the like.

Figure 16:
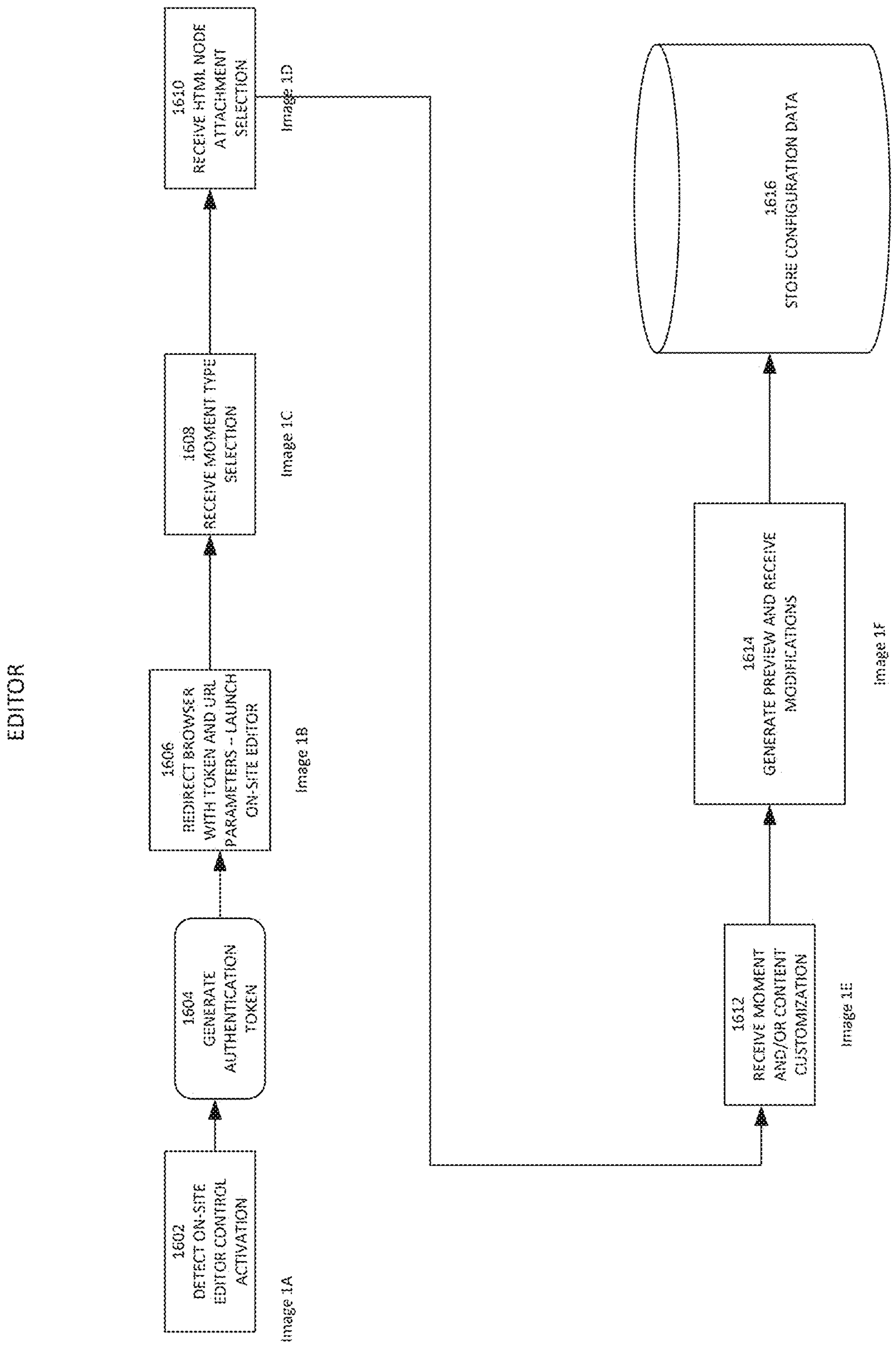
Figure 24A:
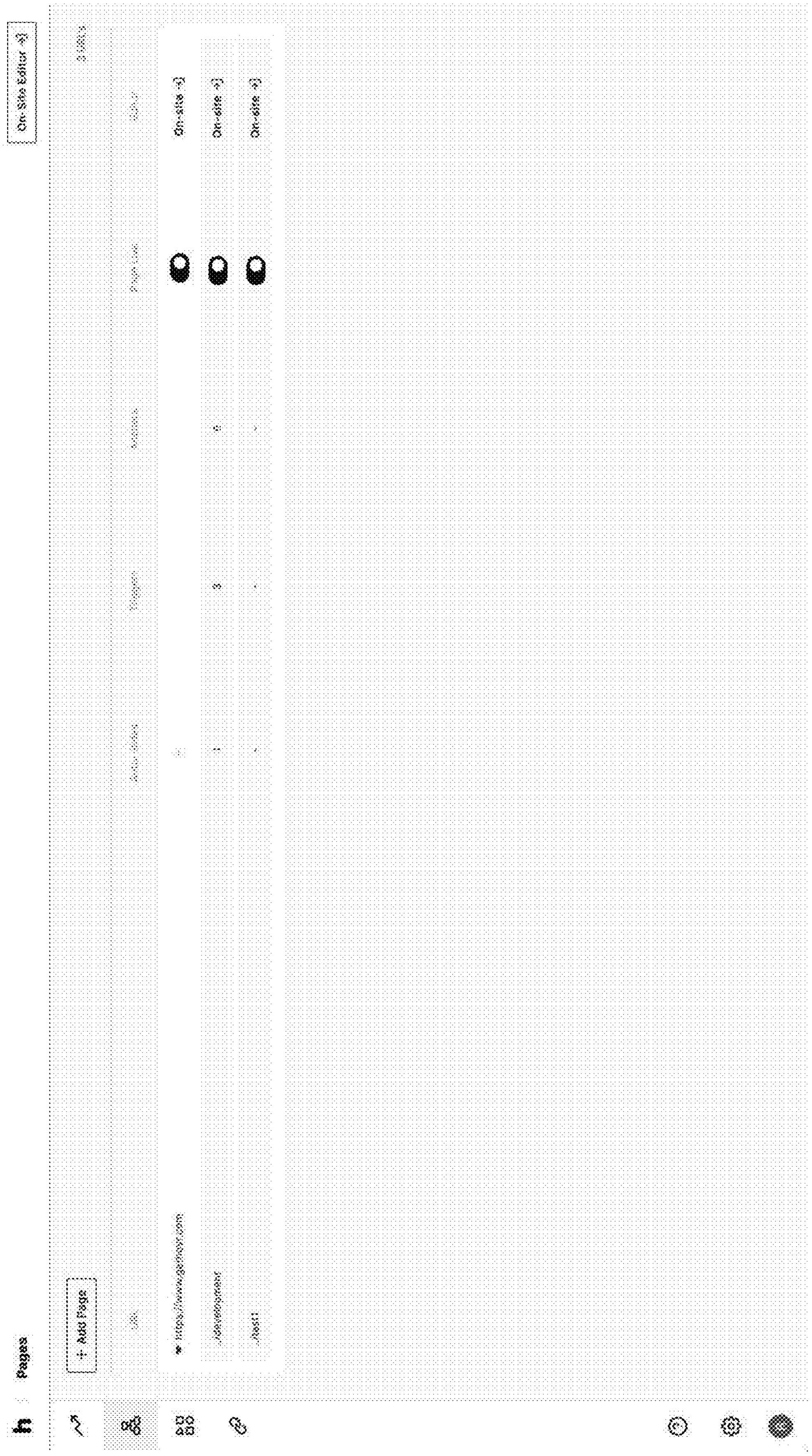

Certain example figures will now be discussed with respect to certain example processes and example user interfaces. Referring to FIG. 16, at block 1602, a user (e.g., an administrator) activates an on-site editor control. For example, with reference to FIG. 24A, a user may access a user interface that lists webpages available for editing and the associated URLs. The user interface may also access and display the number of auto-slide elements, triggers, and anchors currently associated with the webpage. A control may be provided in association with a given webpage that enables a user to set the webpage as live (available to end users) or unpublished (not available to end users). In addition, an on-site editor control is provided which when activated causes the corresponding user interface to be displayed in a web browser in edit mode.

Figure 24B:
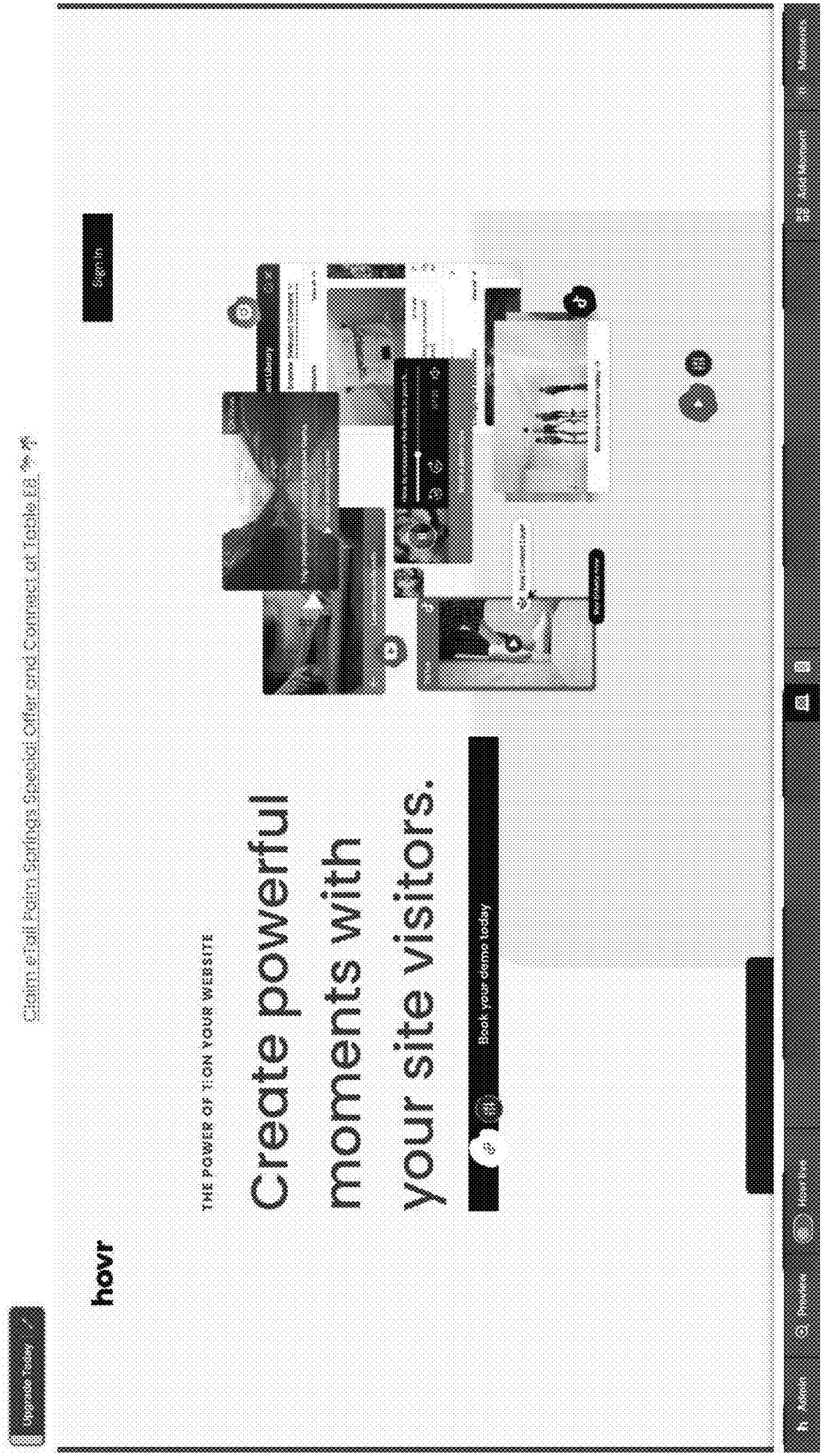
Figure 24C:
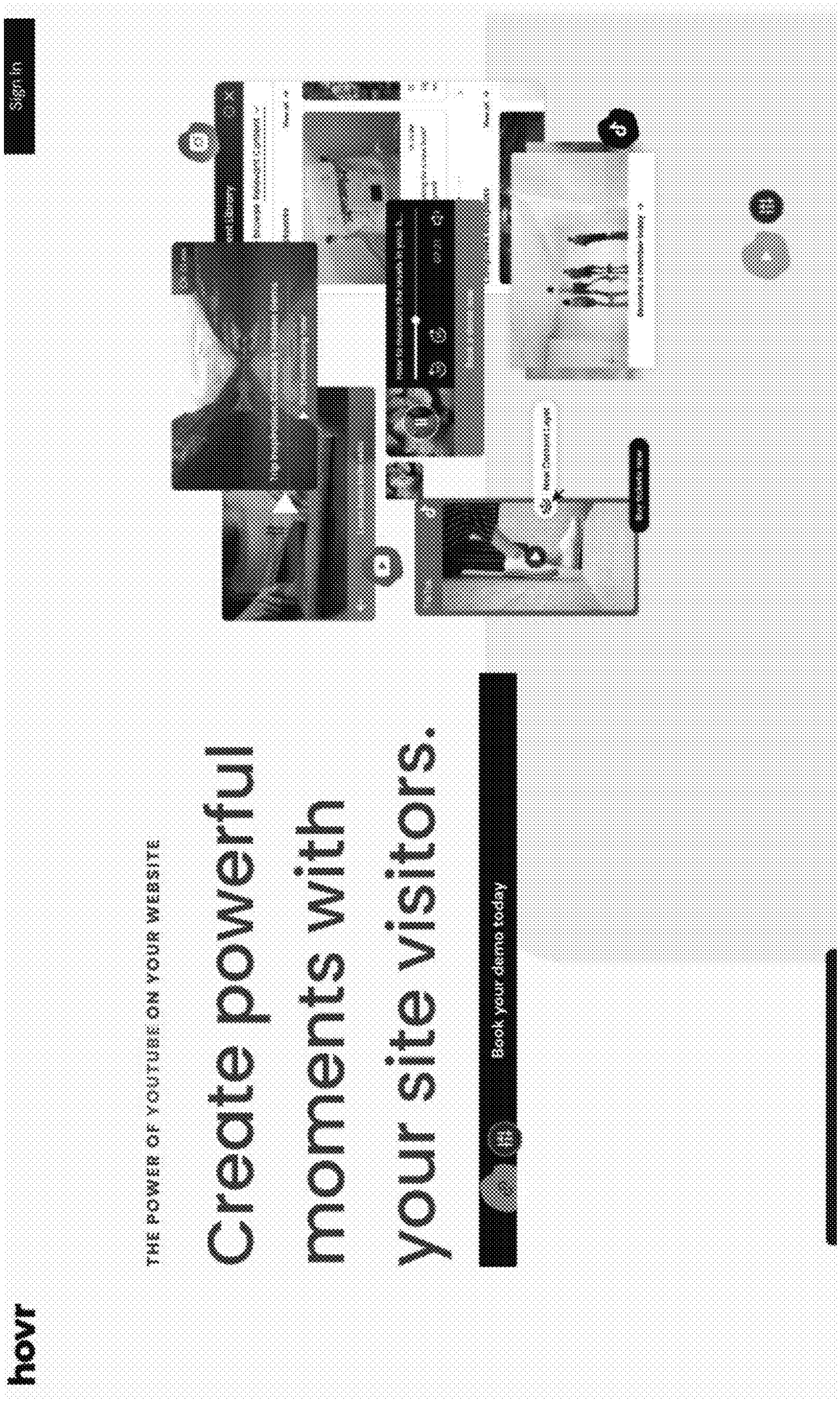

At block 1604, an authentication token is generated. At block 1606, the user browser is redirected to a corresponding website with the authentication token and URL parameters to launch the on-site editor. The selected webpage is displayed in the browser (see, e.g., FIG. 24B). Previously added anchors may be rendered on the webpage. Controls may be provided that enable the webpage to be previewed, set to live or unpublished, or displayed in mobile format or desktop format. A moment (e.g., an anchor) may be added to the webpage (see, e.g., FIG. 24C).

Figure 24D:
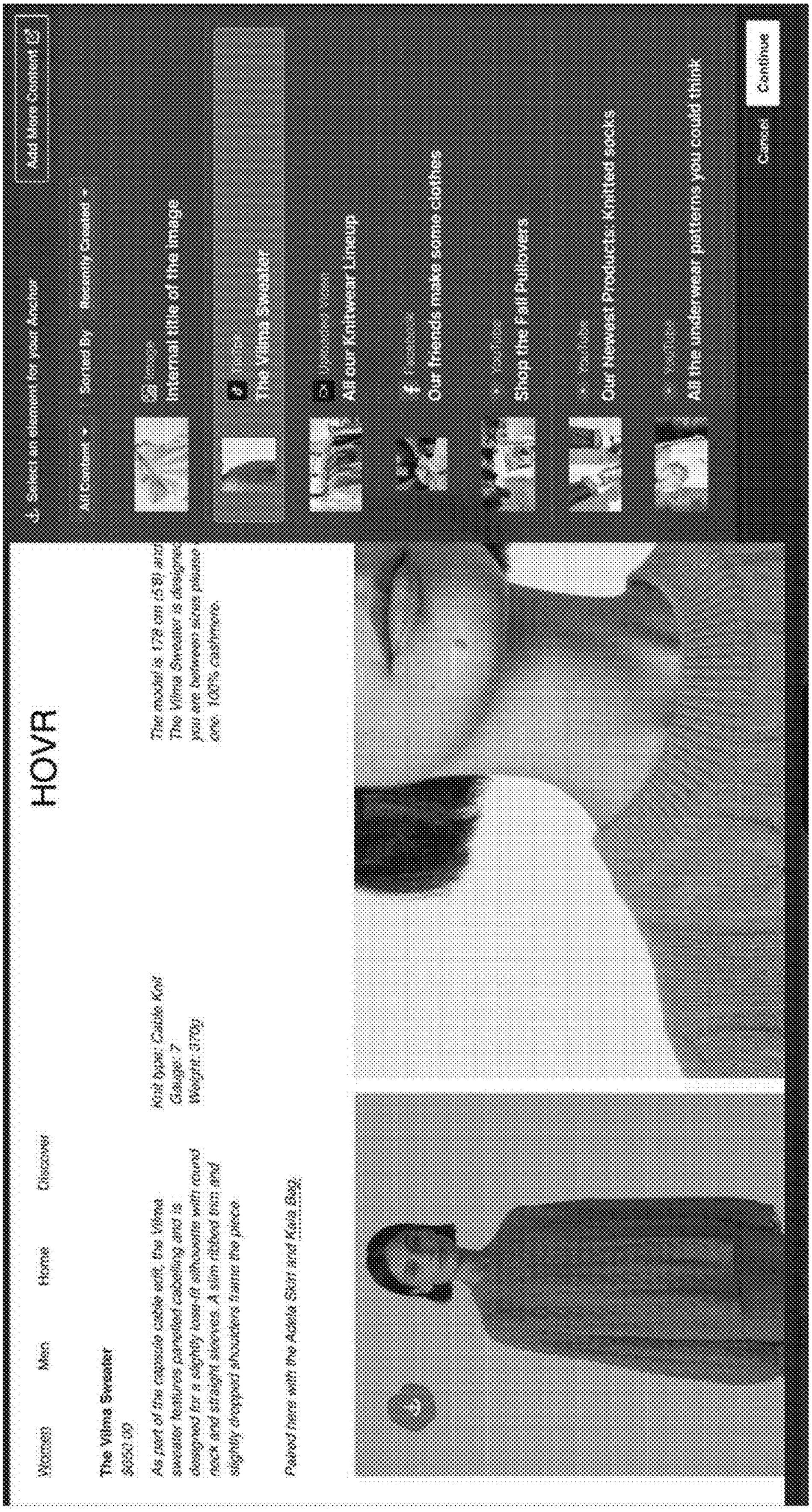

At block 1608, the user may select a desired moment type. For example, with reference to FIG. 24D, a menu is presented of moment types, such as anchor, highlight, and slide. The user may select a desired moment type, and a set of available moments are displayed in a moments pane, and a user selection of a given content item is received by the editor. For example, a content item may include video content, audio content, slides, graphics, text, PDF documents, and/or other content, which may include a call to action (examples of which are discussed elsewhere herein), a link/URL, and/or the like.

At block 1610, a user selection of an HTML node (e.g., an HTML element, such as a text element, an image, or other element, which may be associated with a corresponding position in the webpage) is received with which the moment is to be attached.

Figure 24E:
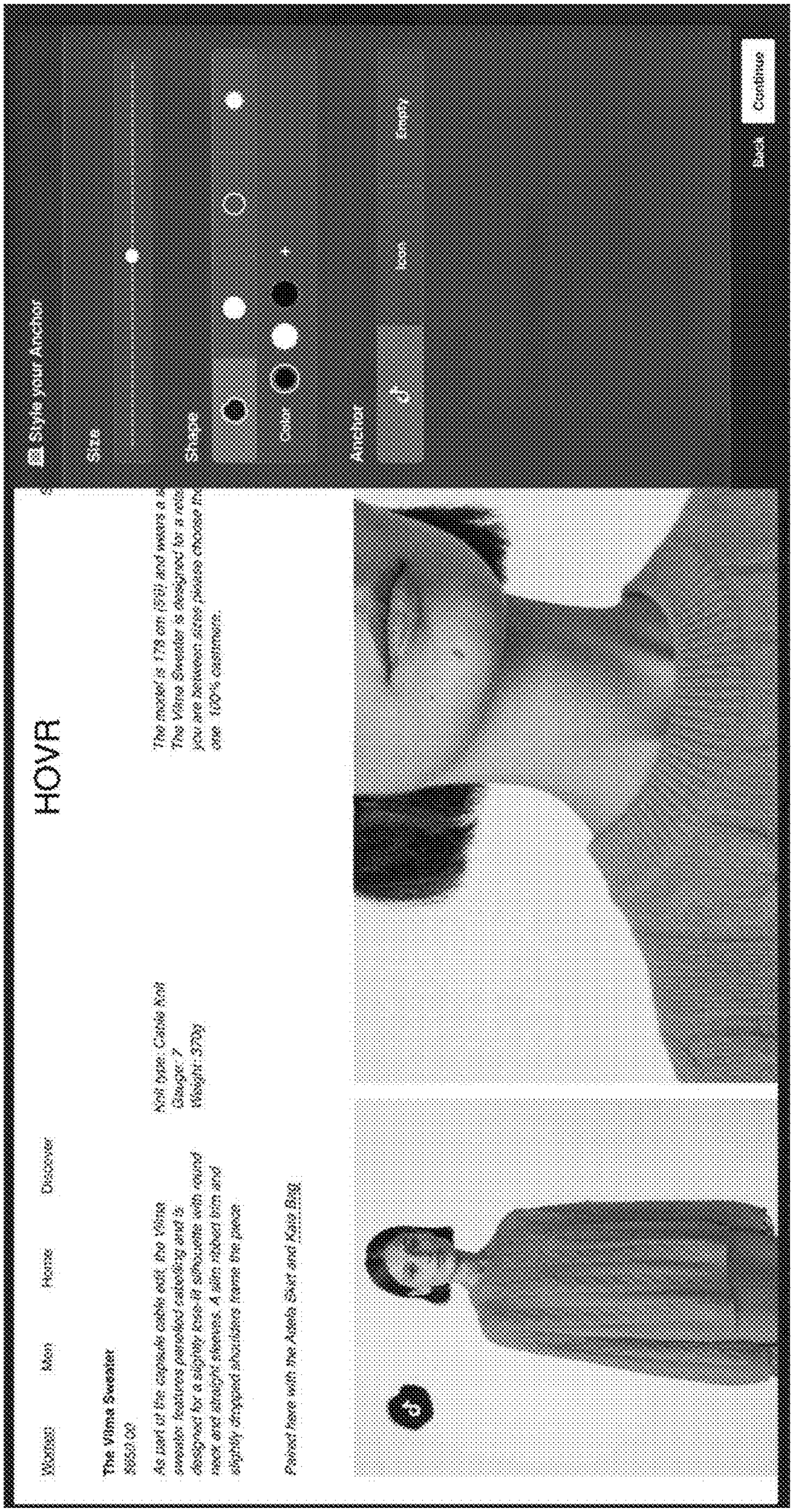
Figure 24F:
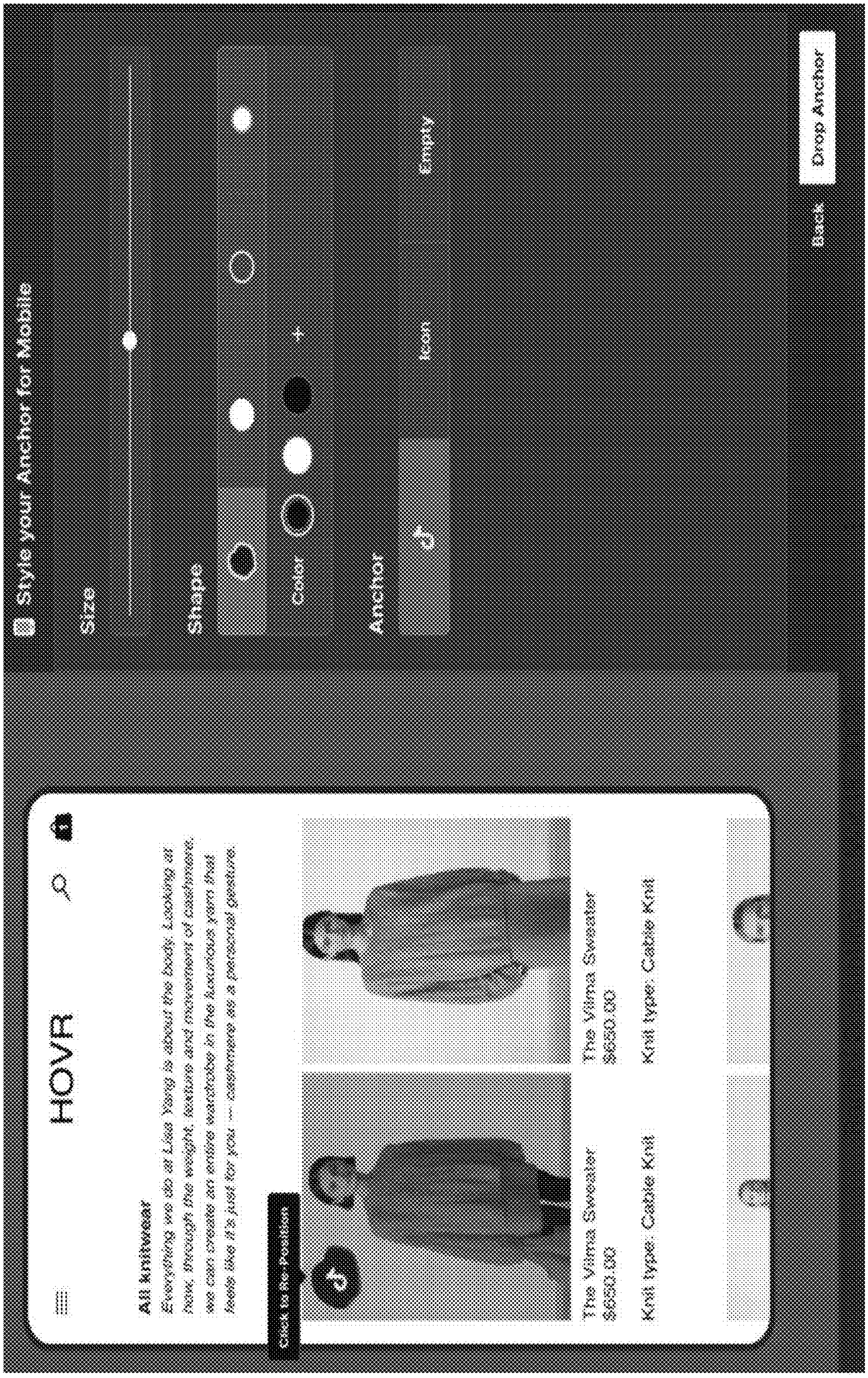

At block 1612, customizations of the moment (e.g., anchor) are received. For example, the customization may involve setting the color, the color saturation, color hue, the color lightness, the size, the font of included text, animations (e.g., pulsing), shadowing, and/or other customizations. The editor may enable the user to offset the moment or anchor from a given HTML node. FIG. 24E illustrates an example anchor customization user interface configured for a desktop display via which the user can set the anchor size, shape, color, and icon user to represent the anchor. FIG. 24F illustrates an example anchor customization user interface configured to enable anchor to be customized mobile devices (e.g., mobile phone) via which the user may set the size, shape, and icon used to represent the anchor, and via which the user may drop and/or move the anchor. Thus, advantageously, a given anchor may be customized differently for different device types (e.g., mobile devices, desktop/laptop devices, networked televisions, etc.).

At block 1614, the user may select a target device type (e.g., a mobile device with a relatively small display, a desktop with a relatively large display, etc.), and the webpage may render a view formatted for the selected target device. The user may confirm the previous user edits or may modify the edits. The editor may optionally enable the user to make different edits for different specified target device types.

At block 1616, the user customizations (e.g., HTML node attributes, position, offsets, expressions, etc.) may be saved in a datastore for later access. Optionally, the datastore may comprise a NoSQL document database configured for automatic scaling and high performance. The database may enable data to be stored, synced, and queried for mobile and web applications.

For example, upon a future loading of the webpage, the correct element and anchor/moment positioning can be recalled and utilized to correspondingly position the moment/anchor.

Figure 17:
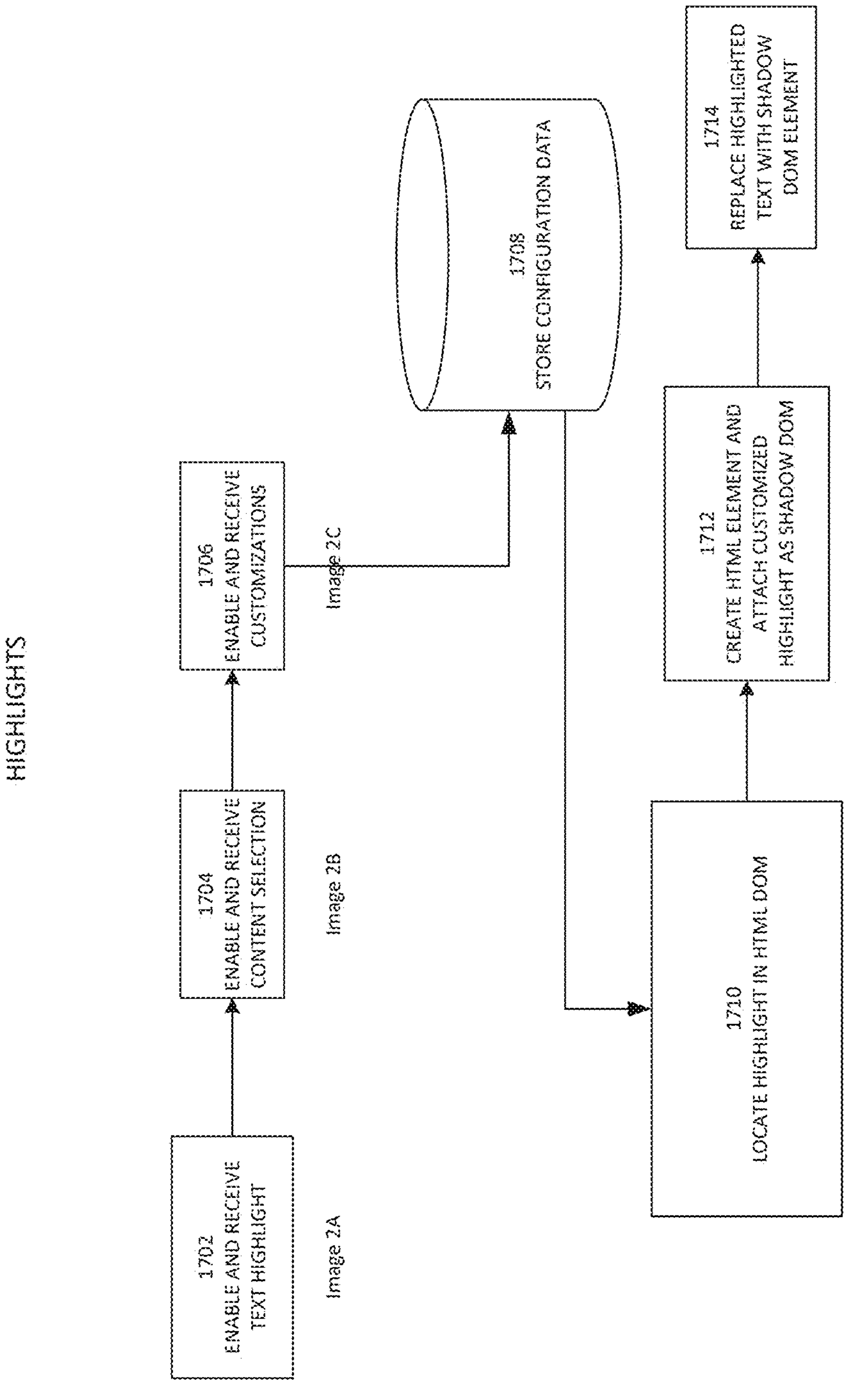
Figure 25A:
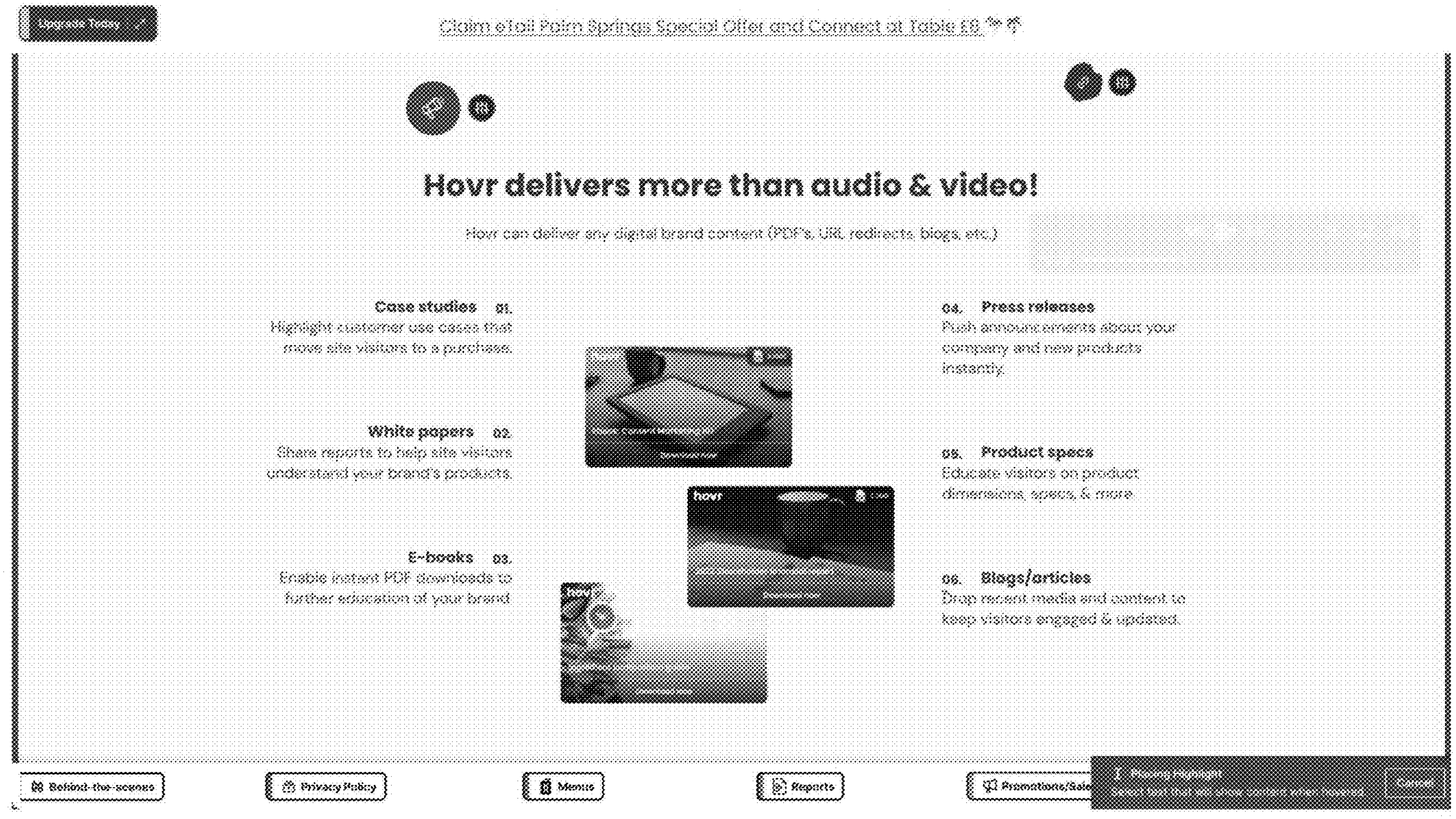

Referring now to FIG. 17, an example process for setting and configuring an anchor using highlighting is illustrated. At block 1702, a user (e.g., an administrator) selects and highlights webpage text to be converted to an anchor (e.g., wherein when an end user interacts with the anchor (highlighted text in this example), such as by hovering a cursor over the highlighted text or tapping on the highlighted text via a touch screen, associated content will be displayed). For example, as illustrated in FIG. 25A, a user may be prompted to place a highlight selecting corresponding text, which will be used as an anchor.

Figure 25B:
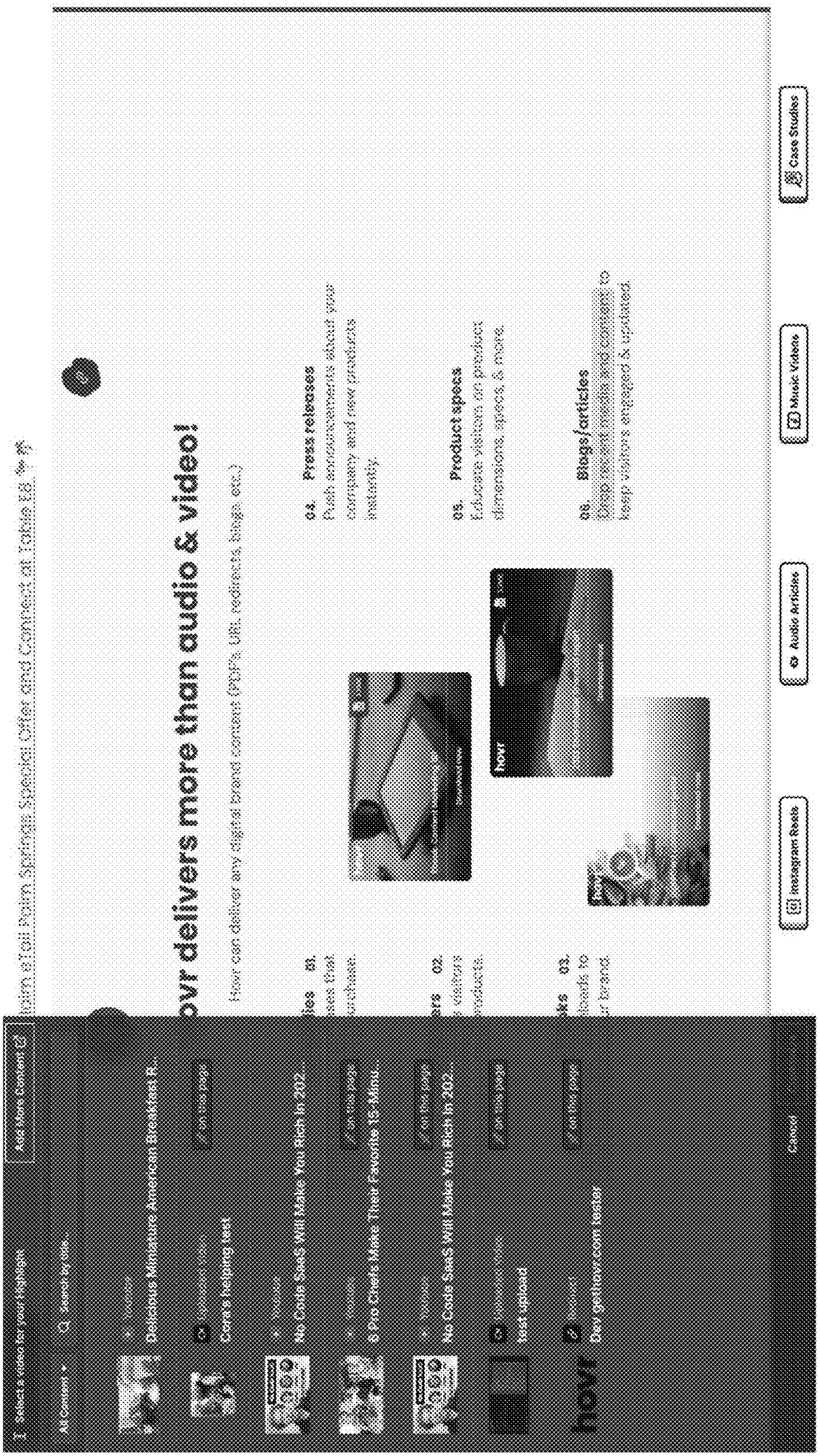

At block 1704, a user interface may be displayed on a pane or pop-up window that depicts content (e.g., video content, animations, graphics, audio, and/or other content, such as that described elsewhere herein) that may be selected and associated with the highlighted text/anchor. For example, FIG. 25B illustrates such a user interface. A search field may be provided via which the user may enter a content search query, which will be executed by a search engine which will return corresponding search results, optionally ranked in order of the closeness of the match of tags associated with the content with the search query.

Figure 25C:
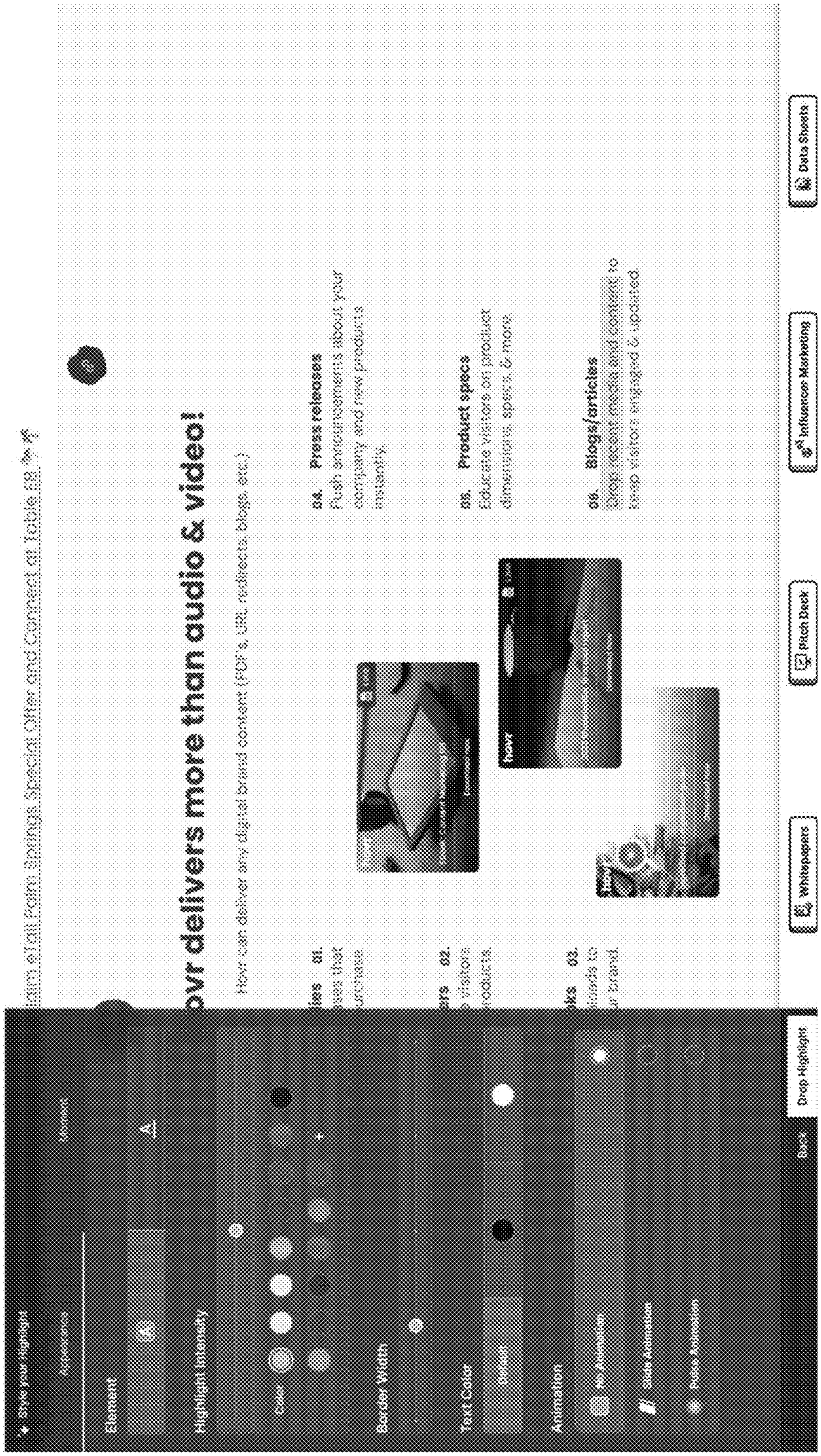
Figure 25D:
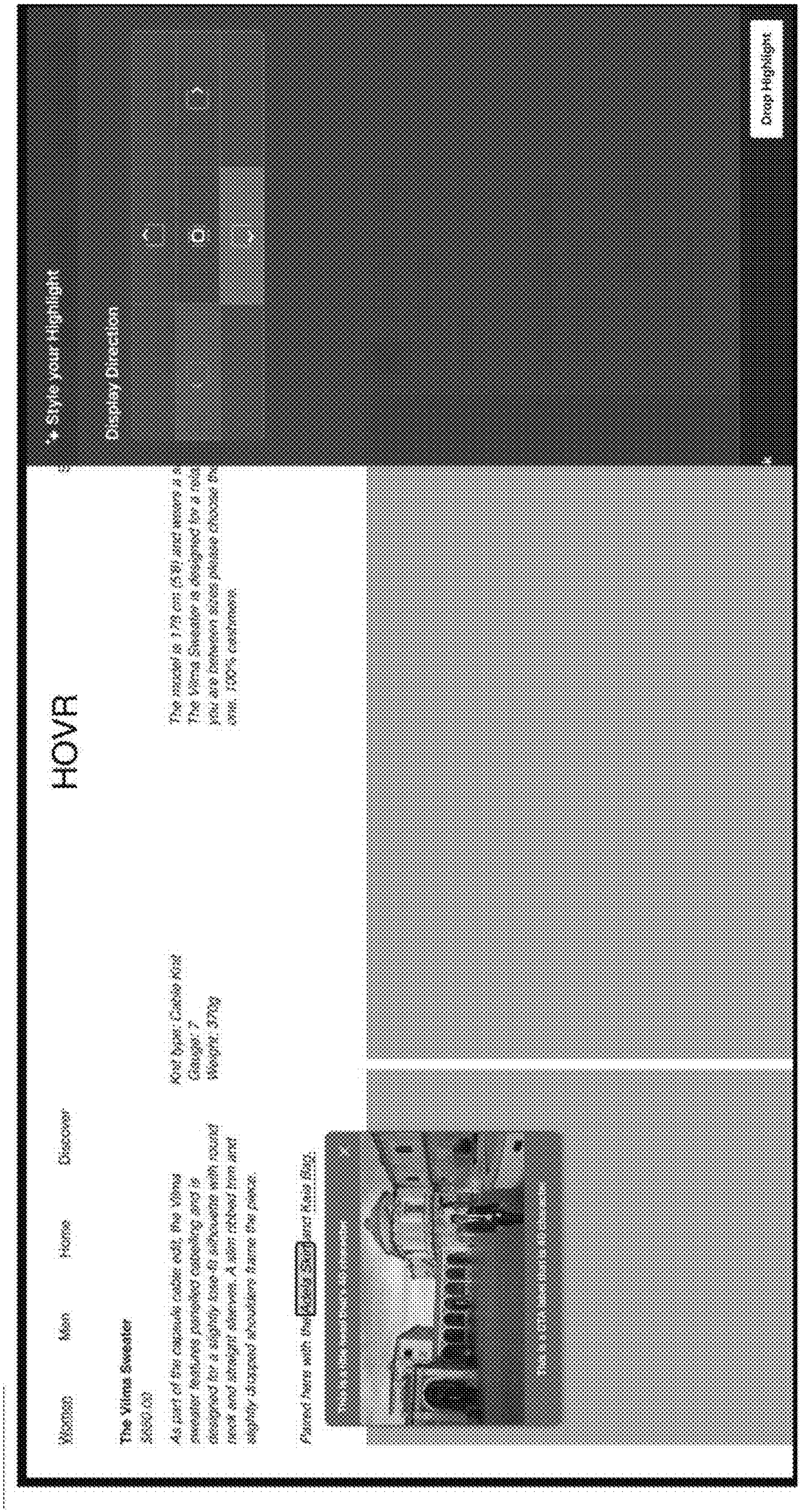
Figure 25E:
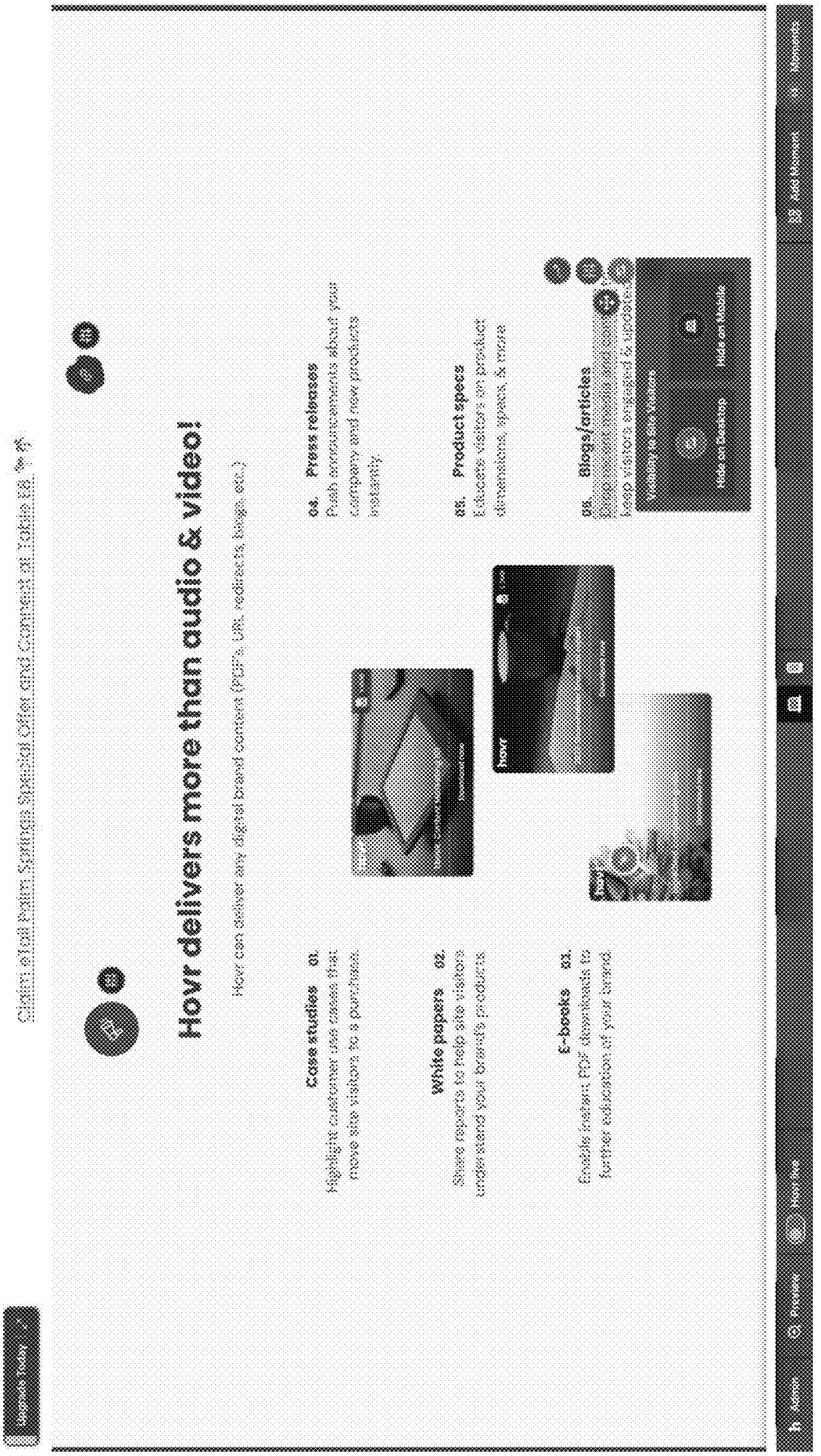

At block 1706, a user interface may be presented via which the user can customize the highlight. For example, with reference to the example customization user interface illustrated in FIG. 25C, controls may be provided via which the user can specify a highlight intensity/translucence, a highlight color, a highlight border width, a color of the highlighted text, animation (e.g., no animation, slide animation, pulse animation, etc.), and/or other customizations. With reference to the example customization user interface illustrated in FIG. 25D, controls may be provided via which the user can specify a positioning of the content to be used when displayed in response to a user interaction with the highlighted text/anchor (e.g., display above, below, to the left, to the right or over the highlighted text). Referring to FIG. 25E, a user interface may be displayed that enables the user to suppress the display of the highlight and associated anchor functionality on a specified user device type (e.g., a mobile device, a desktop device, etc.).

At block 1708, the foregoing user-specified highlight configurations are stored in a datastore for later access and use. As similarly discussed above, the datastore may comprise a NoSQL document database configured for automatic scaling and high performance. The database may enable data to be stored, synced, and queried for mobile and web applications.

At block 1710, based on the user-specified highlight configuration, corresponding highlight code may be generated and inserted into the corresponding webpage DOM (Document Object Model that represents a document with a logical tree). At block 1712, a new HTML element is created, and the customized highlight is attached to the new element as a shadow DOM.

Disadvantageously, using a conventional DOM, when a new HTML id/class is used in a page, it may conflict with an existing name used by the page. Other complications may similarly result. Advantageously, the use of a shadow DOM may overcome such technical challenges by enabling compartmentalized DOM and CSS for web components to be created.

Thus, for example, self-contained components may be generated using JavaScript. Further, advantageously, CSS defined within the shadow DOM is limited to the shadow DOM, preventing style rules from leaking out and preventing page styles from bleeding in.

At block 1714, the original highlighted text is replaced in the HTML with the new shadow DOM element.

Figure 26A:
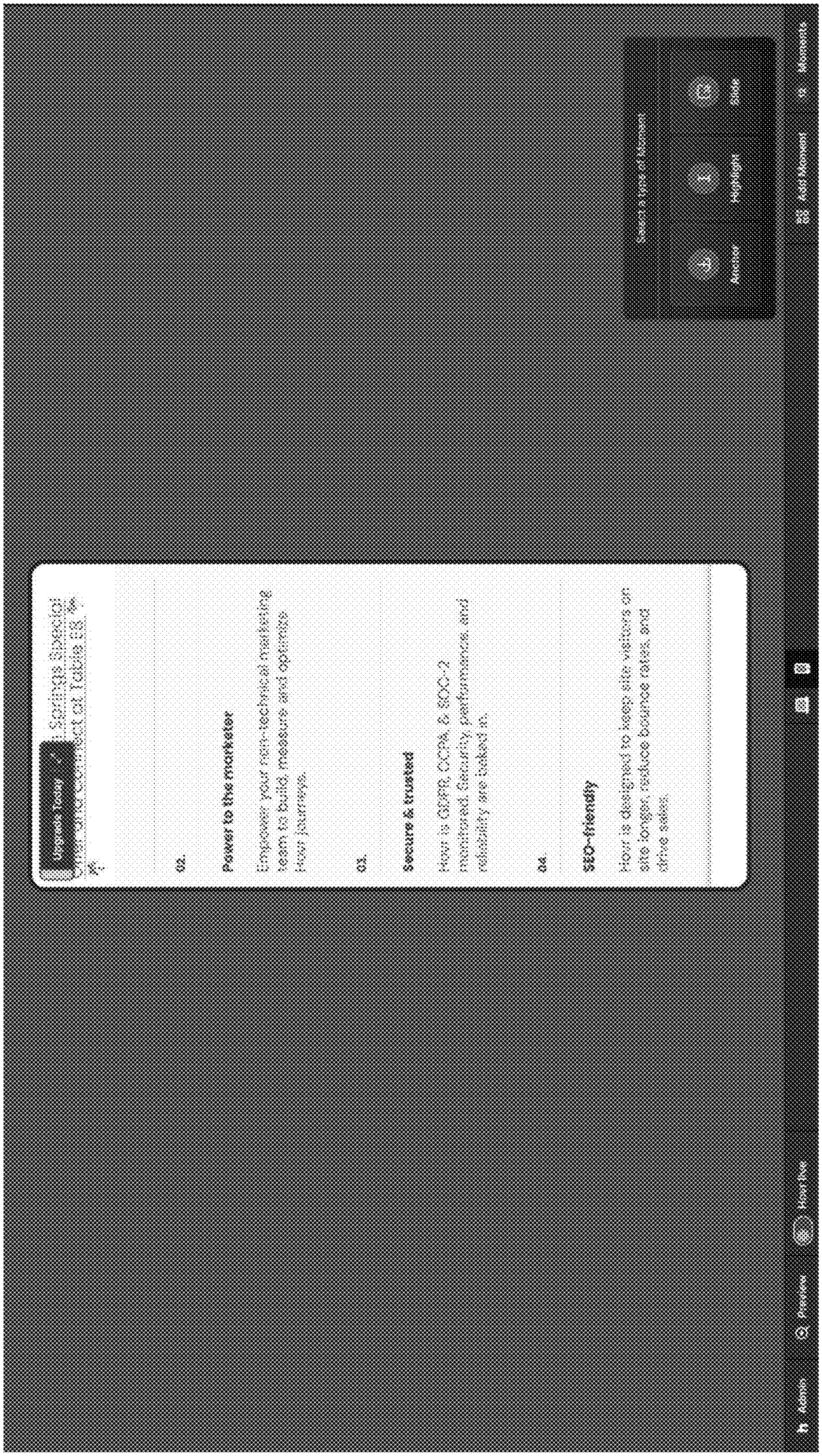
Figure 26B:
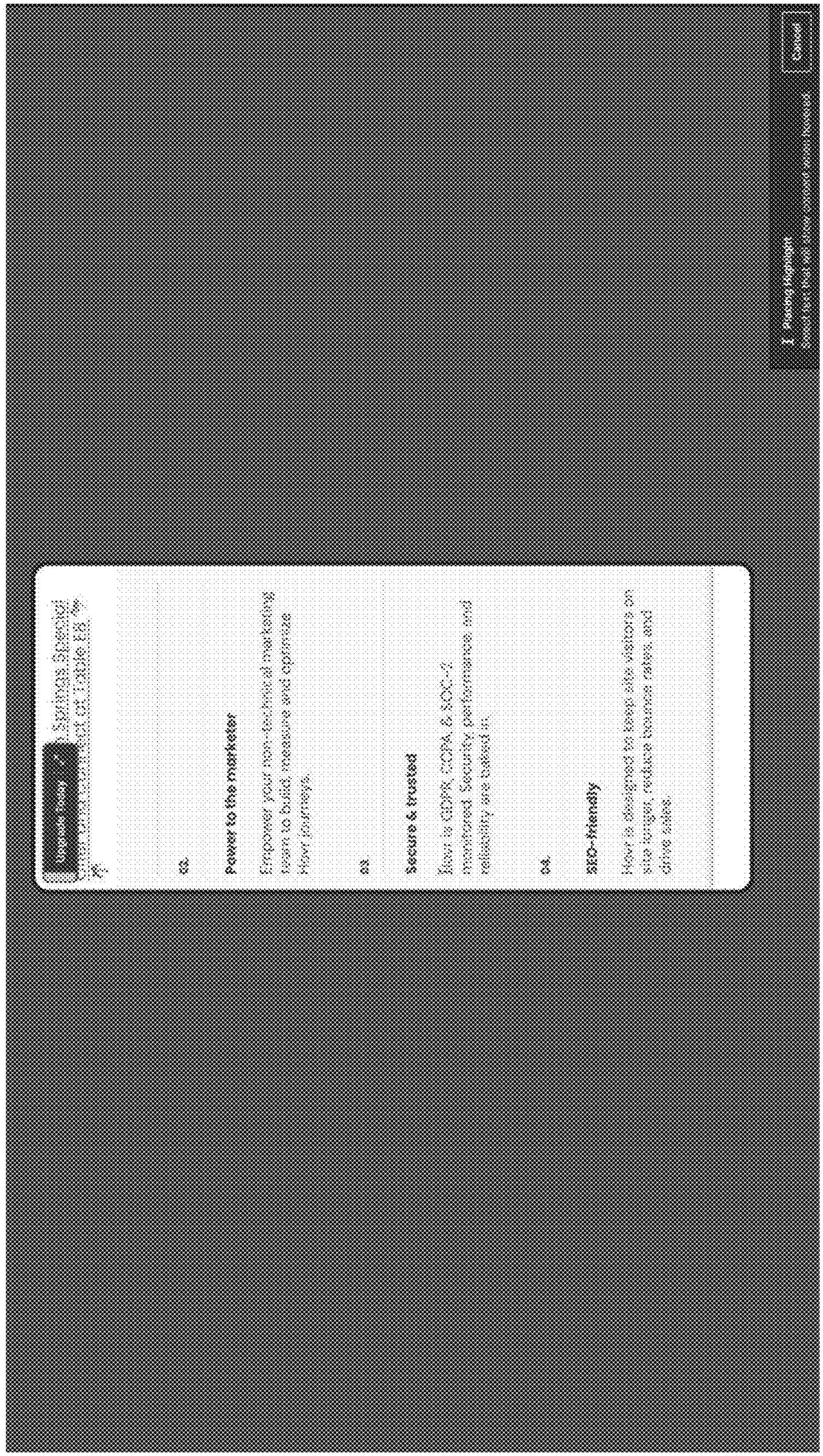
Figure 26C:
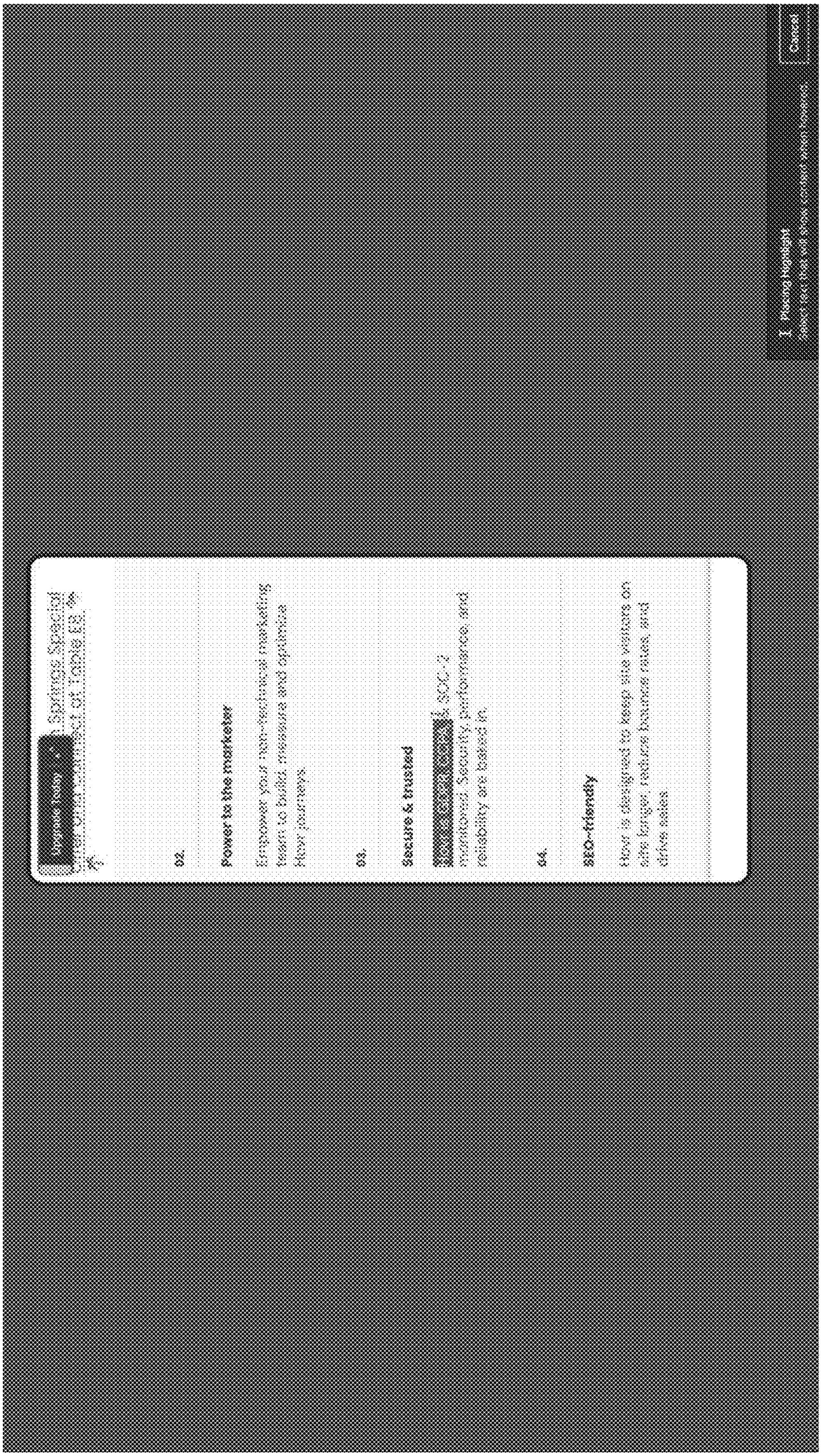
Figure 26D:
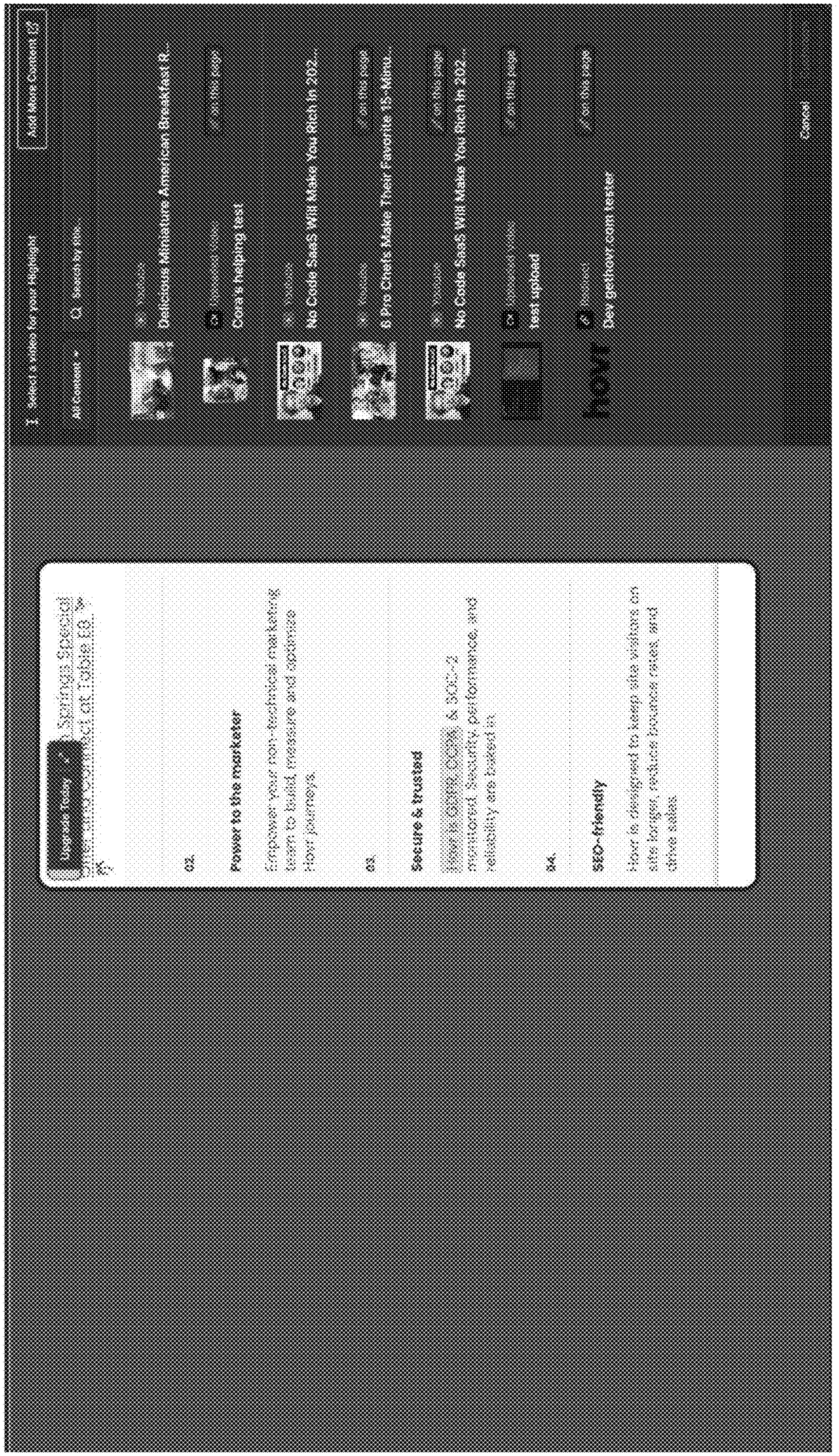

FIG. 26A illustrates an example user interface configured for a mobile device that enables a user to select a moment type (e.g., an anchor, highlight, slide). FIG. 26B illustrates an example user interface configured for a mobile device that enables a user to place a highlight by selecting text. FIG. 26C illustrates the example user interface of FIG. 26B with selected text highlighted in response to a user selection. FIG. 26D illustrates an example user interface that presents content that the user can select to associate with the highlighted text.

Figure 18:
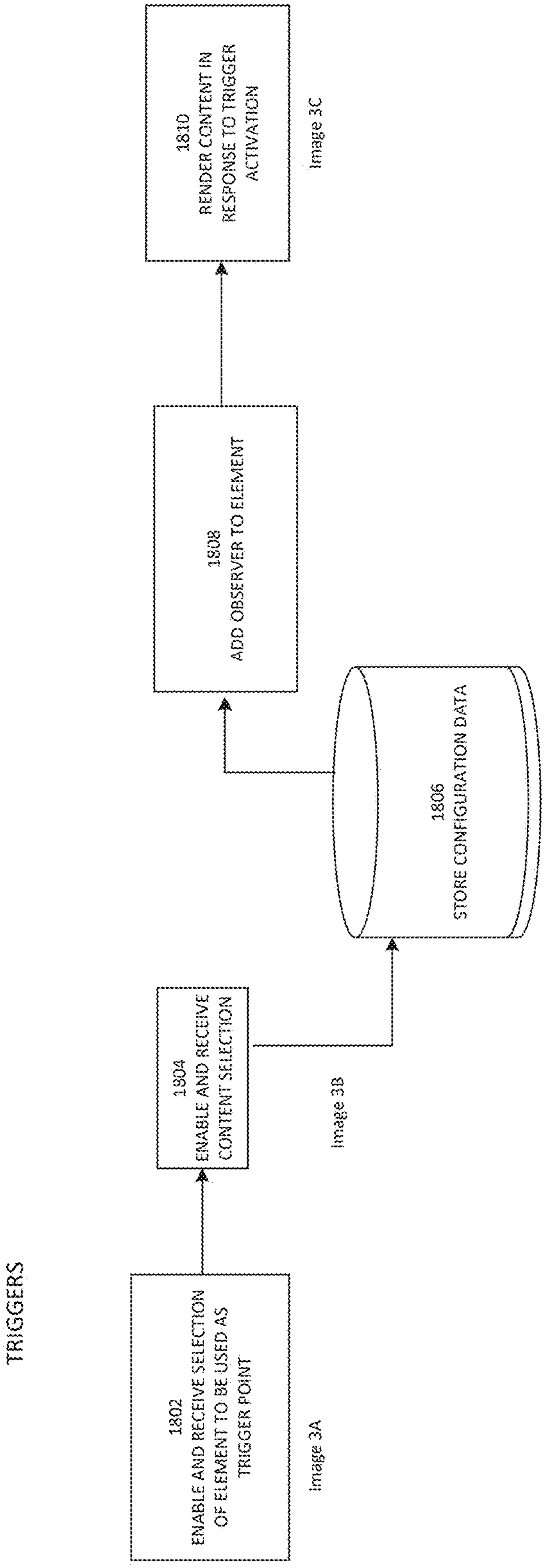
Figure 27A:
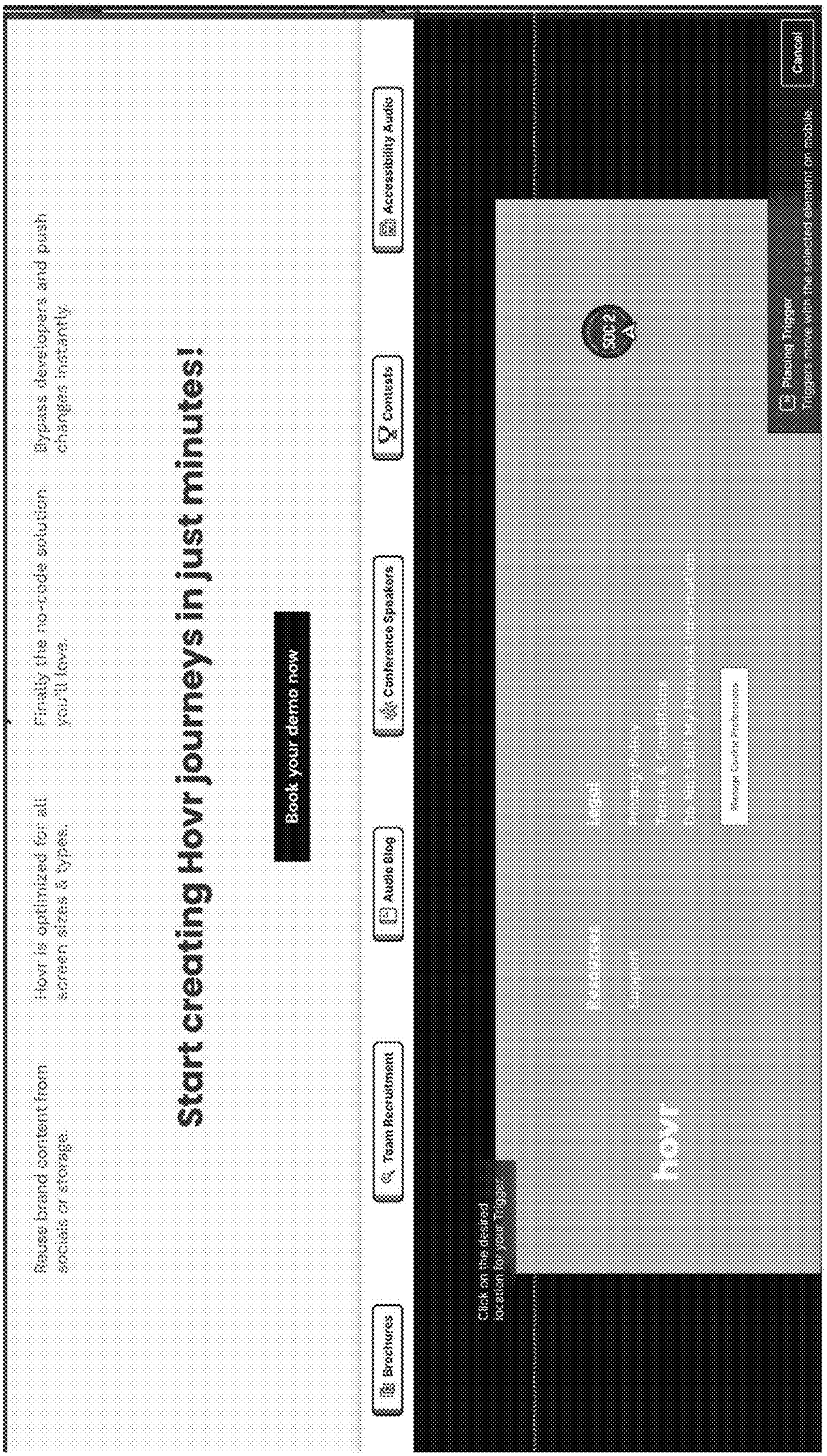

FIG. 18 illustrates an example process of setting and configuring triggers in a webpage. For example, when a webpage is scrolled to a trigger point, associated content may be automatically accessed and displayed. At block 1802, a user selects a HTML node (e.g., an HTML element) of a webpage that is to be used as a trigger point. In response to the element selection, when an end user accessed the webpage and when the selected element is rendered, a corresponding associated notification comprising content will be rendered (e.g., to one side of the element or the webpage). For example, with reference to FIG. 27A, an element may be selected.

Figure 27B:
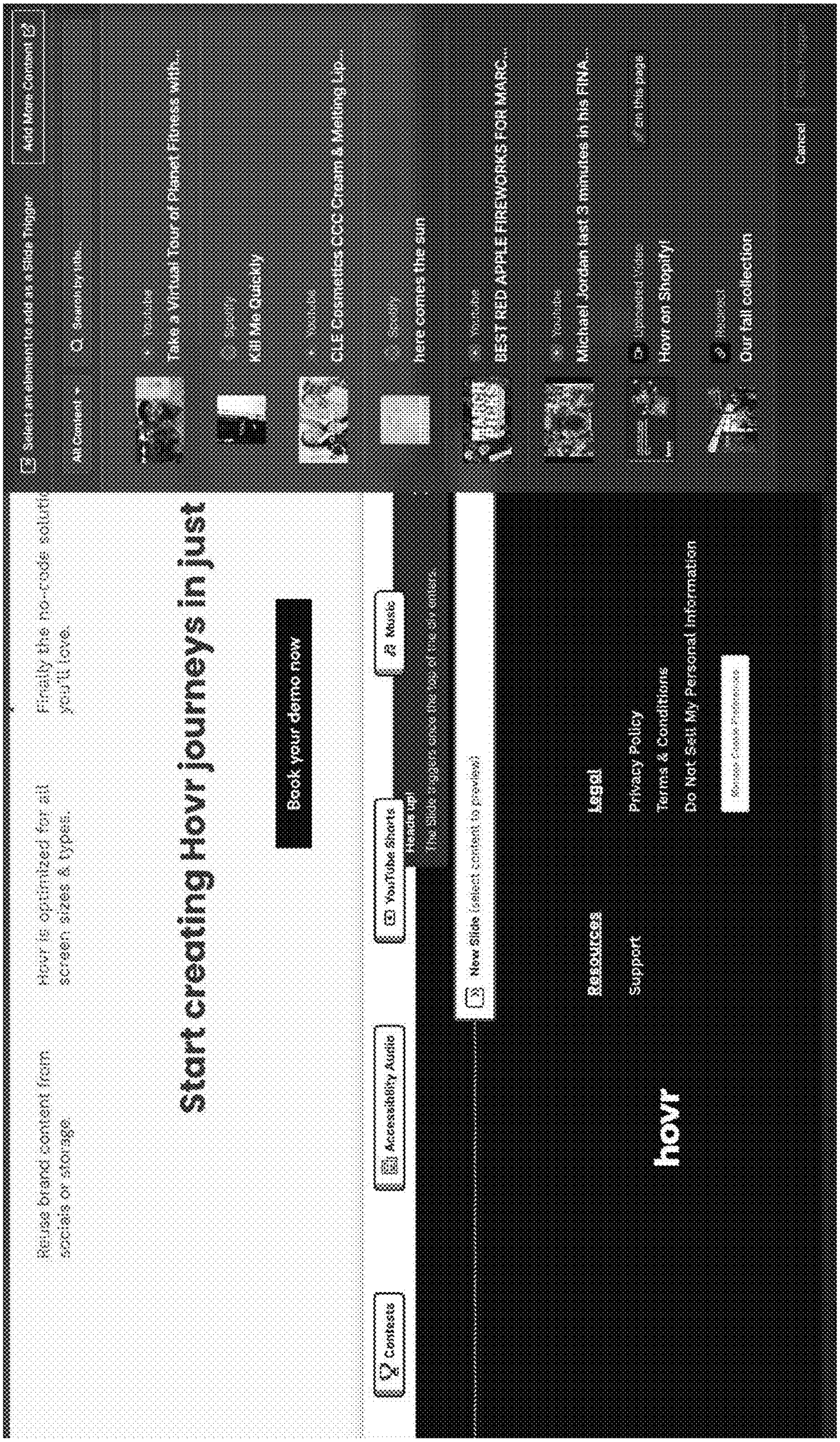

At block 1804, a user interface is presented displaying a set of content. The user may select an item of content (e.g., a slide) via the user interface to be associated with the trigger. For example, FIG. 27B illustrates such a user interface. A search field may be provided via which the user may enter a content search query, which will be executed by a search engine which will return corresponding search results, optionally ranked in order of the closeness of the match of tags, associated with the content, with the search query.

At block 1806, the trigger configuration is stored in a datastore. For example, as similarly described elsewhere herein, optionally, the datastore may comprise a NoSQL document database configured for automatic scaling and high performance. The database may enable data to be stored, synced, and queried for mobile and web applications.

Figure 27C:
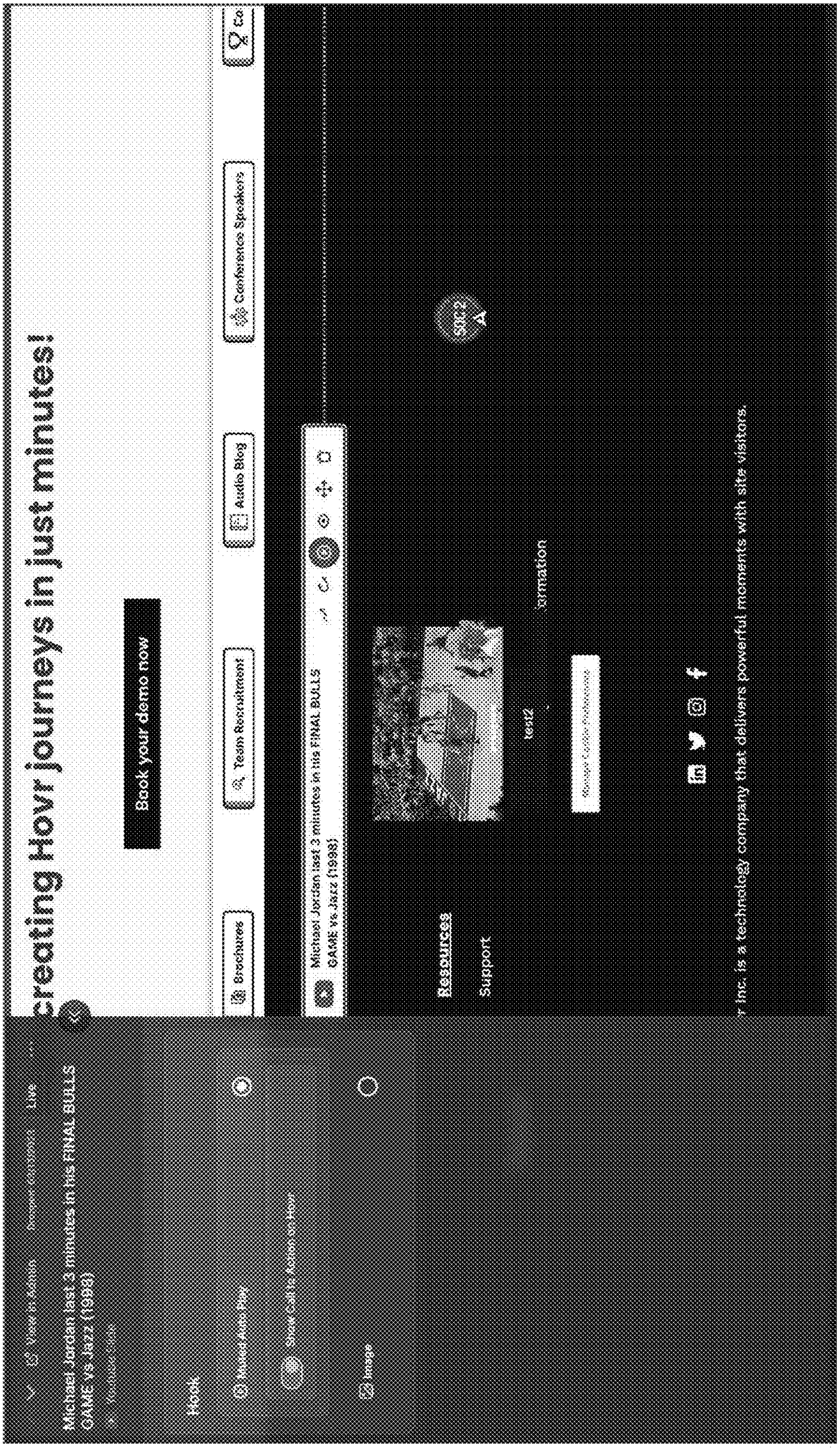

At block 1808, based on the selected node, a mutation observer is added to the desired element to monitor and detect when that node (e.g., element) is being displayed on the user's device display. For example, the mutation observer object observes a DOM element and fires a callback when it detects a change. At block 1810, the notification comprising the selected content may be displayed via the user browser when the trigger is activated. For example, the slide notification may comprise video content that is automatically played in response to the selected element being on-screen or may comprise a static image '(which may be a frame of video content, where the video content is played in response to the user activating a play control). FIG. 27C illustrates an example webpage with a slide notification rendered. A control is provided via which the user can specify that autoplay of the content is to be inhibited or enabled. A control is provided via which the user can specify whether a call to action is to be presented in response to an end user interaction (e.g., hovering a cursor over the content or clicking on a play button).

Figure 19:
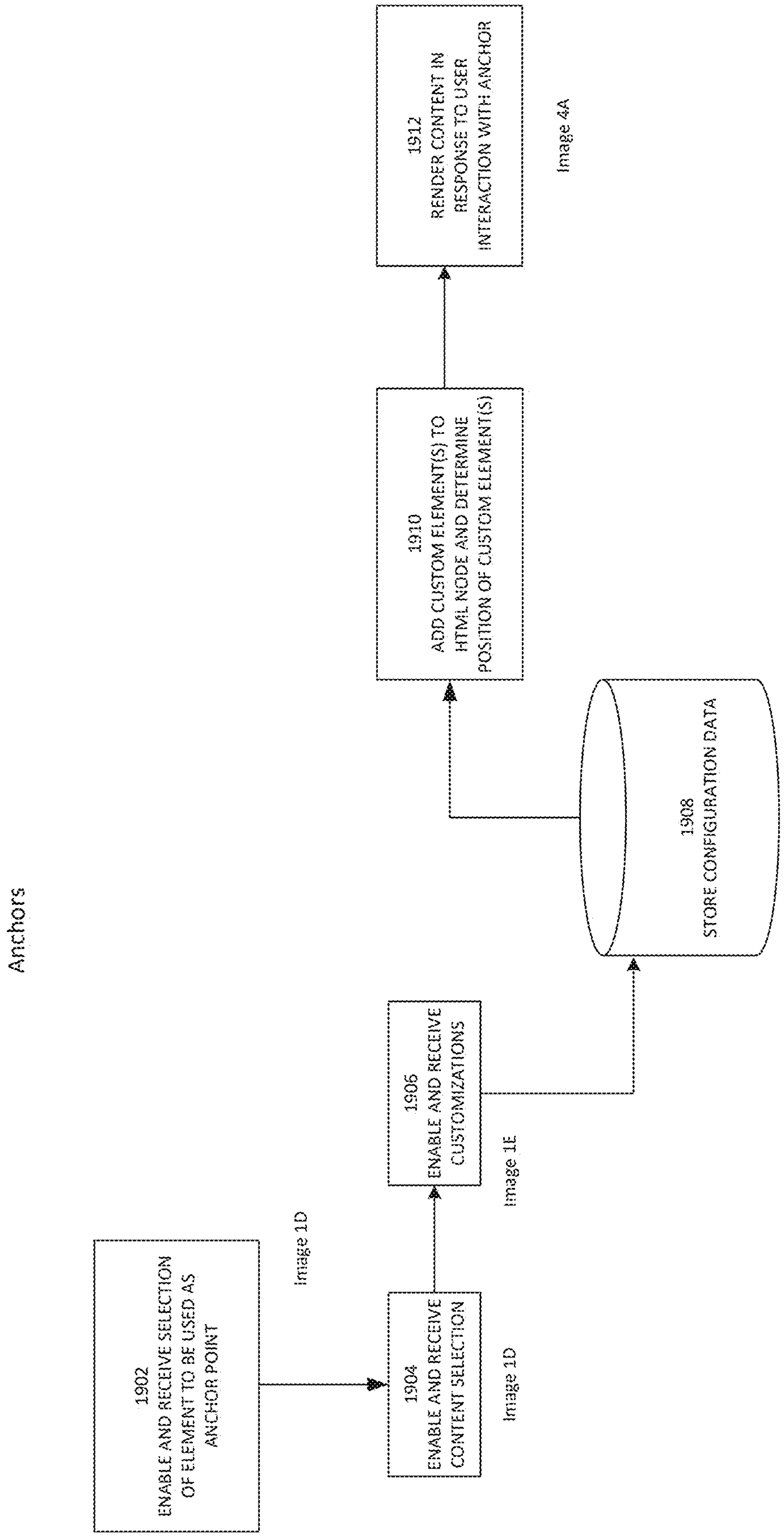
Figure 28A:
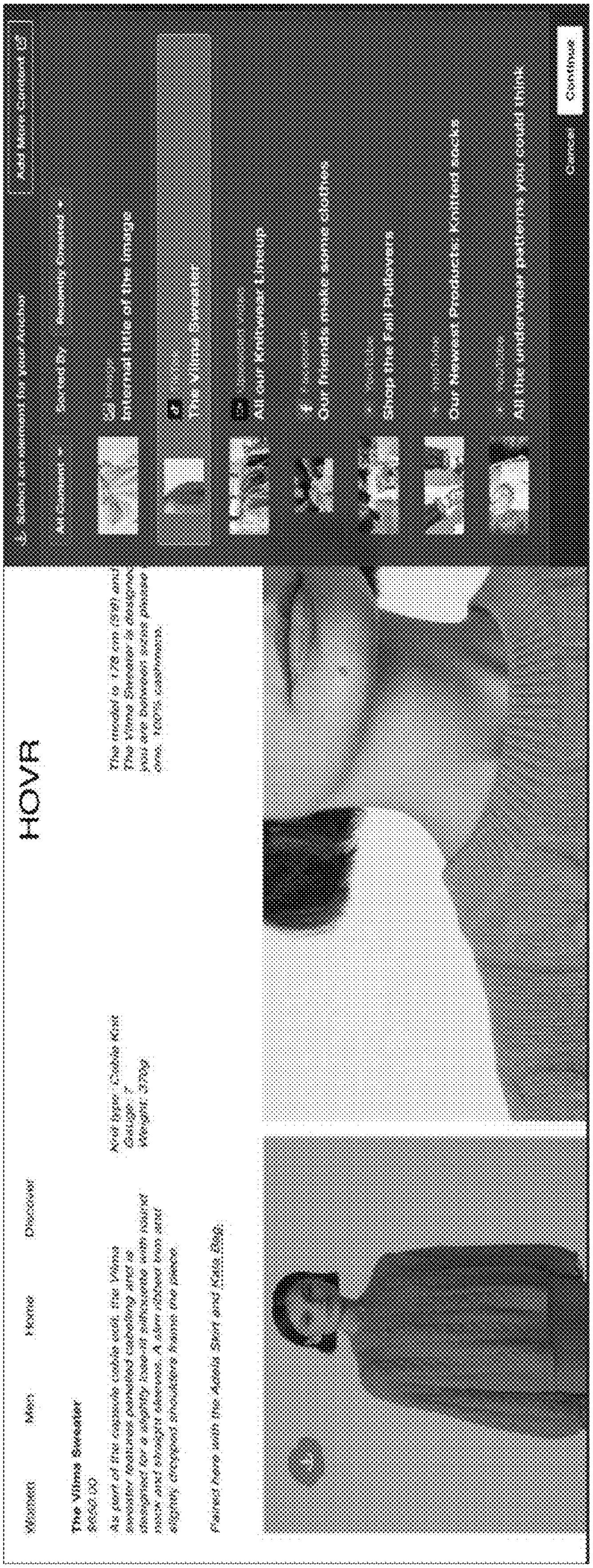

FIG. 19 illustrates an example process of setting and configuring anchors, such as a general purpose anchor. At block 1902, a webpage is presented (e.g., via a browser with the editor instantiated, which may be referred to as an in-site editor). The editor enables the user to select an element to be used as an anchor point for an anchor. Referring to FIG. 28A, an example webpage and user interface are illustrated that enables a user (e.g., an administrator) to select an element to be associated with an anchor. At block 1904, a user interface is presented displaying a set of content. The user may select an item of content via the user interface to be associated with the anchor. For example, FIG. 28A illustrates such a user interface. A search field may be provided via which the user may enter a content search query, which will be executed by a search engine which will return corresponding search results, optionally ranked in order of the closeness of the match of tags associated with the content with the search query.

Figure 28B:
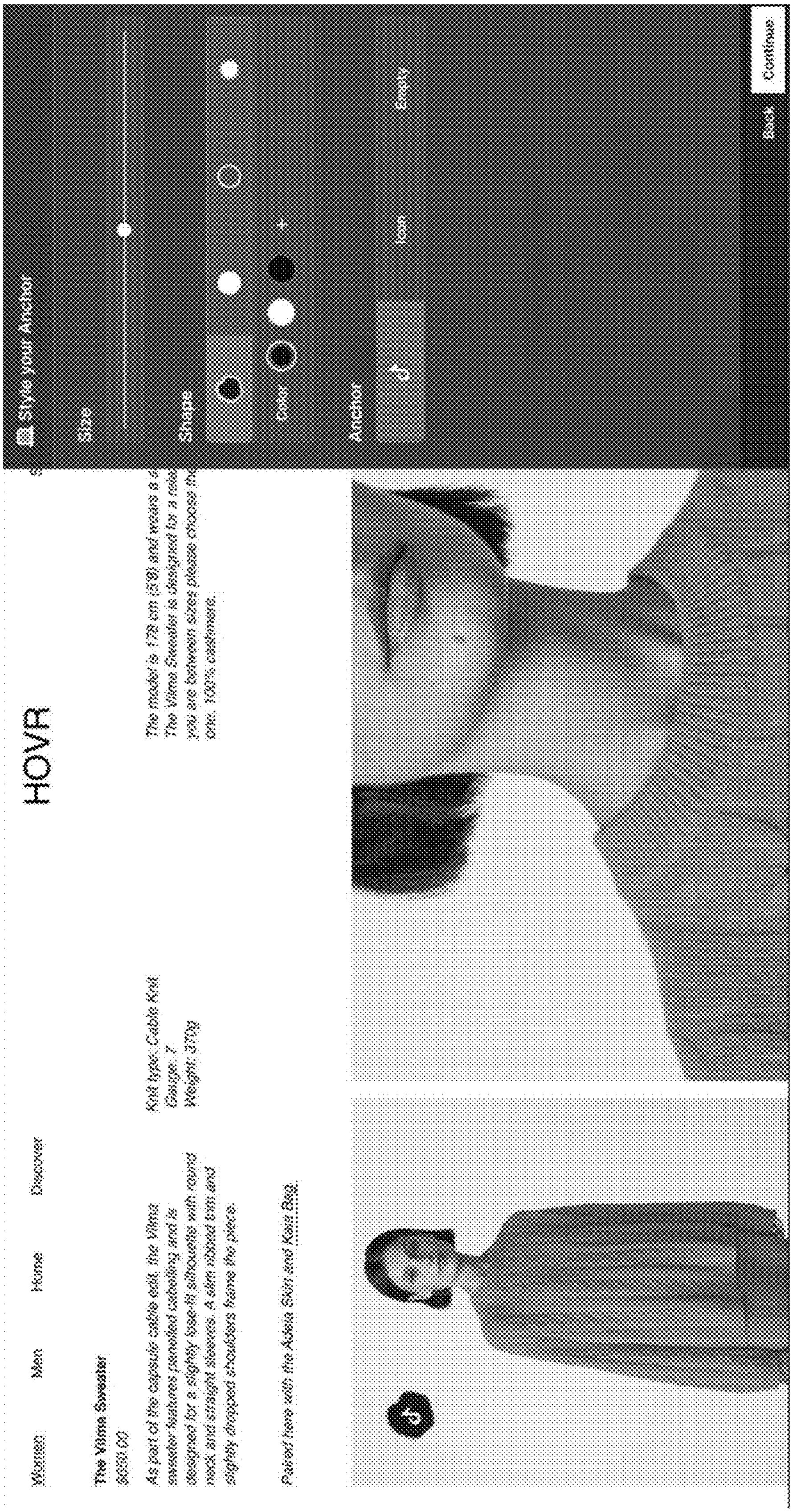

At block 1906, a user interface may be presented via which the user can customize the anchor. For example, with reference to the example customization user interface illustrated in FIG. 28B, controls may be provided via which the user can specify an anchor size, shape, color, and anchor representation (e.g., an icon). Optionally, controls may be provided via which the user can specify a positioning of the content to be used when displayed in response to a user interaction with the/anchor (e.g., display above, below, to the left, to the right or over the anchor). A user interface may be displayed that enables the user to suppress the display of the anchor and associated anchor functionality on a specified user device type (e.g., a mobile device, a desktop device, etc.).

At block 1908, the anchor configuration is stored in a datastore. For example, as similarly described elsewhere herein, optionally, the datastore may comprise a NoSQL document database configured for automatic scaling and high performance. The database may enable data to be stored, synced, and queried for mobile and web applications.

At block 1910, based on the selected node, the custom element/anchor is added to the corresponding HTML node (e.g. using a positioning engine). The positioning engine is utilized to calculate one or more offsets used to precisely position the new element (corresponding to the anchor) relative to the element selected at block 1902.

Figure 28C:
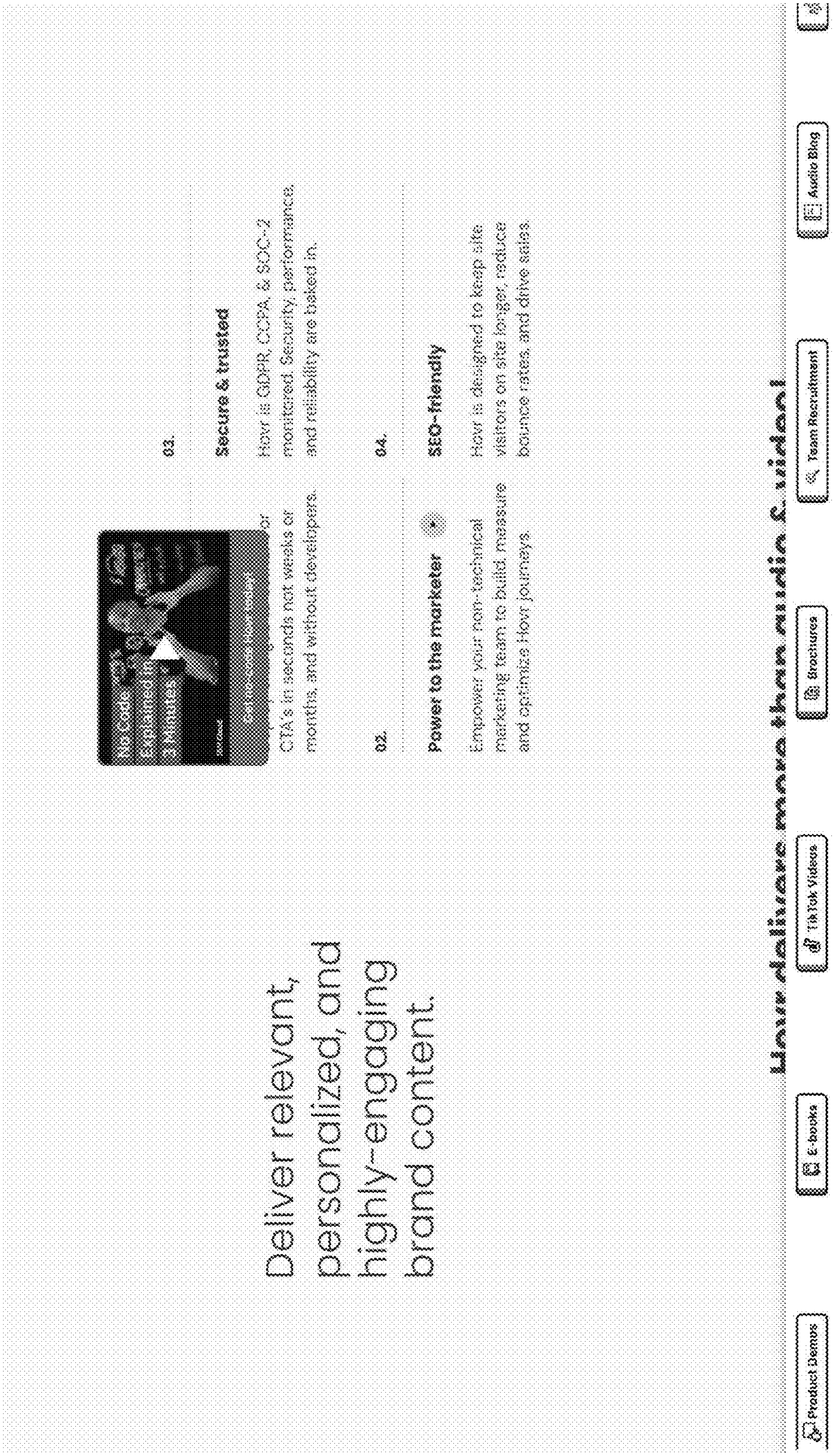

At block 1912, when a user browser (e.g., an end user browser) accesses the webpage and interacts with the custom element (e.g., the anchor), the user may optionally be presented the opportunity to interact with the associated content (e.g., play the content, click on the content and have the user's browser navigated to another website via a URL associated with the content). By way of example, the user may interact with the anchor by hovering a cursor over the anchor or clicking on the anchor. FIG. 28C illustrates an example of video content being displayed in response to a user hovering a cursor over an anchor.

FIG. 20 illustrates an example process of viewing a webpage modified using one or more of the techniques described herein (e.g., via an addition of one or more anchors, highlight anchors, triggers, hotspots, and/or the like) at it would appear on a mobile device (e.g., a device with a relatively small display, such as less than 10 inches in diagonal, or having certain types of screen ratios (e.g., 9:16, 4:5, 2:3)), such as a mobile device of an end user.

At block 2002, a user (e.g., an administrator) activates a mobile device preview control. At block 2004, an API call is made to a server backend to execute a puppeteer (e.g., a library) to server-side render a webpage being accessed by a user device browser. For example, the puppeteer may utilize a headless Chrome (a Chrome web browser without a graphical user interface, which can be controlled via a command-line interface or with an automated script.), as a companion, executing on a web server. The puppeteer can be configured to emulate a mobile device by specifying a user agent and a viewport size.

At block 2006, the mobile device HTML code for the webpage generated by the puppeteer may be copied and served to a URL that is accessible by the frontend user device browser.

Figure 29:

At block 2008, the URL is passed to the frontend browser executing on the user (e.g., administrator) device. The frontend browser accesses the HTML code at the URL for the mobile device. The frontend browser may then render the webpage formatted for a mobile device via an iFrame whose source is set to the URL, as illustrated in FIG. 29. The foregoing process enables user agents to emulate the display of certain device types and provides a workaround with respect to websites that prevent iFrames.

Figure 21:
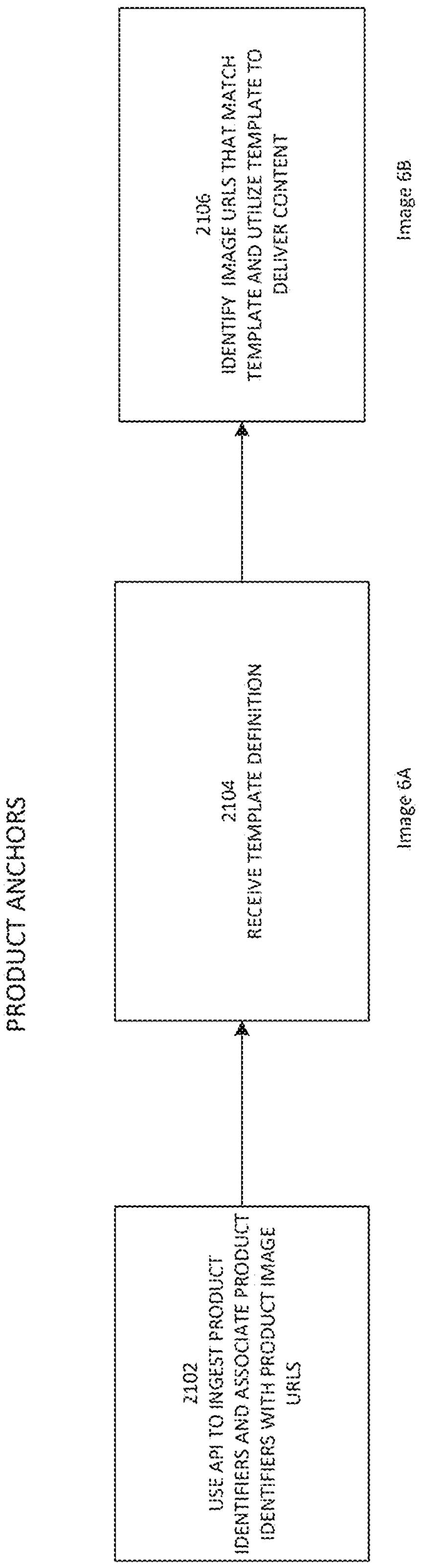

An example process of setting and configuring product anchors will now be described with reference to FIG. 21. A product anchor is a special type of anchor that is associated with a product identifier, such as a SKU (shop keeping unit) or Product ID, and that enables the anchor to follow a corresponding HTML element (e.g., an image of a product) even when the HTML element is moved to a different location on the webpage, overcoming the technical challenges presented by dynamically changing webpages. For example, a webpage of an online store may be updated daily to position an image and link of the bestselling product for the previous 24 hours at the top of the page, which may thereby change the position of one or more other product images (which may be associated with respective anchors) in the webpage. By way of further example, a given product entry (e.g., a product image) may appear on multiple locations on the website, where each entry is to be associated with the same anchor and anchor content.

At block 2102, product identifiers, such as SKUs or Product IDs specified by manufacturers or retailers are accessed from one or more databases. In addition, other data associated with the product identifiers may be accessed as well (e.g., the src/URLs of images associated with the products and product identifiers, metadata describing aspects of the product, and/or other data).

Figure 30A:
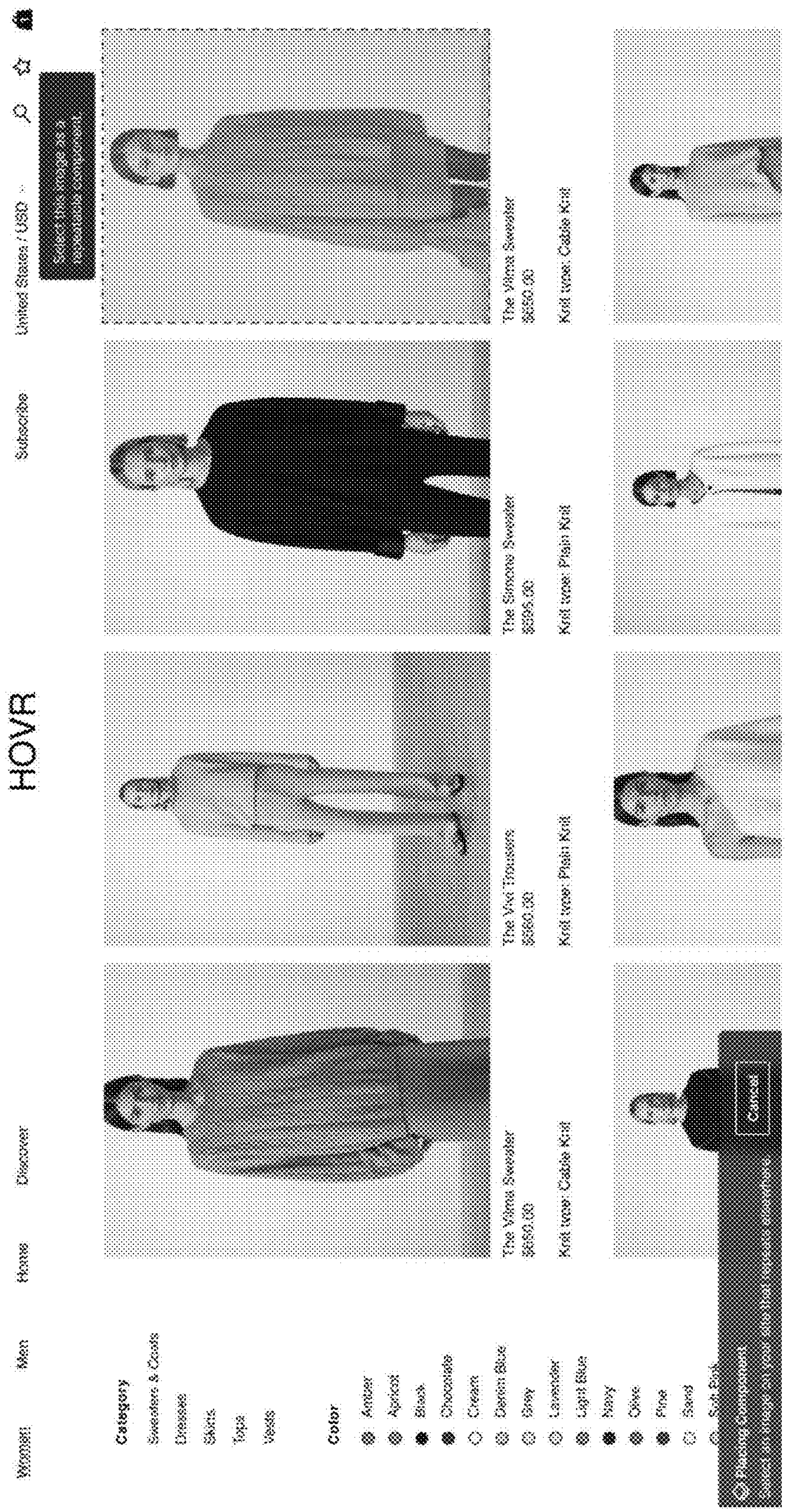
Figure 30B:
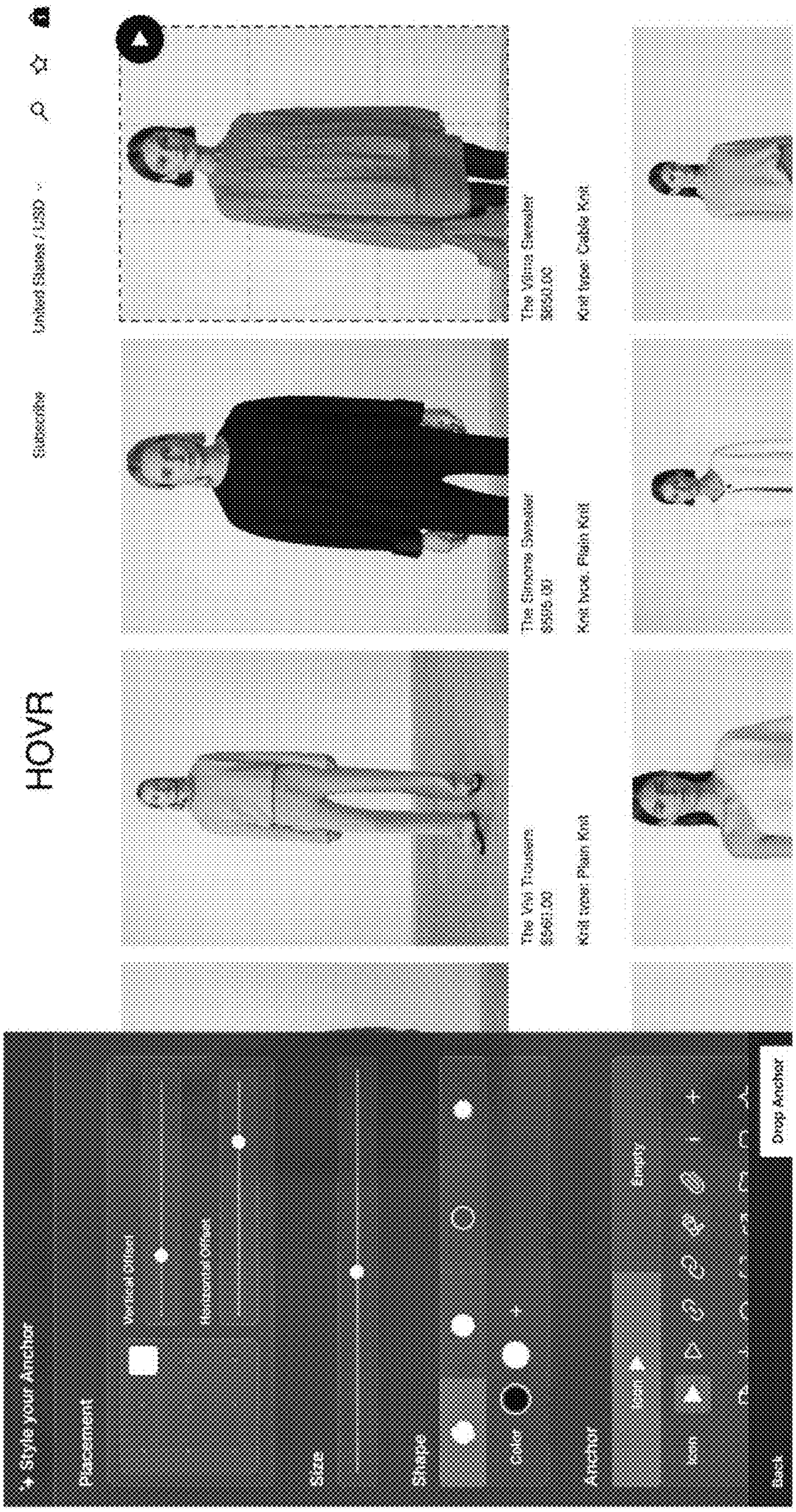

At block 2104, the on-site editor enables a user (e.g., an administrator) to create a component template for a given product associated with a product identifier. The component template may be utilized in response to detecting that the corresponding product has an entry on a website webpage, such as by detecting the URL of the product image (e.g., the URL associated with an IMG tag used to embed a product image). The component template may associate the product identifier with content that is to be associated with the product. The component template may specify how custom elements (e.g., anchors) are to be rendered (e.g., size, shape, representation, offset, etc.). For example, with reference to FIG. 30A, a user interface may be provided via which a user is enabled to select a product image to be used as a repeatable component and to place the repeatable component at other website webpages. With reference to FIG. 30B, a customization user interface is provided via which the user can set the placement of the anchor (e.g., a vertical and/or horizontal offset with respect to a center of the element/image), the size of the anchor, the shape of the anchor, and the icon to be used to represent the anchor (e.g., a play control, a link, a paperclip, etc.). The placement may be enabled via horizontal and vertical offset sliders. The offset may be previewed in an offset preview element.

Figure 30C:
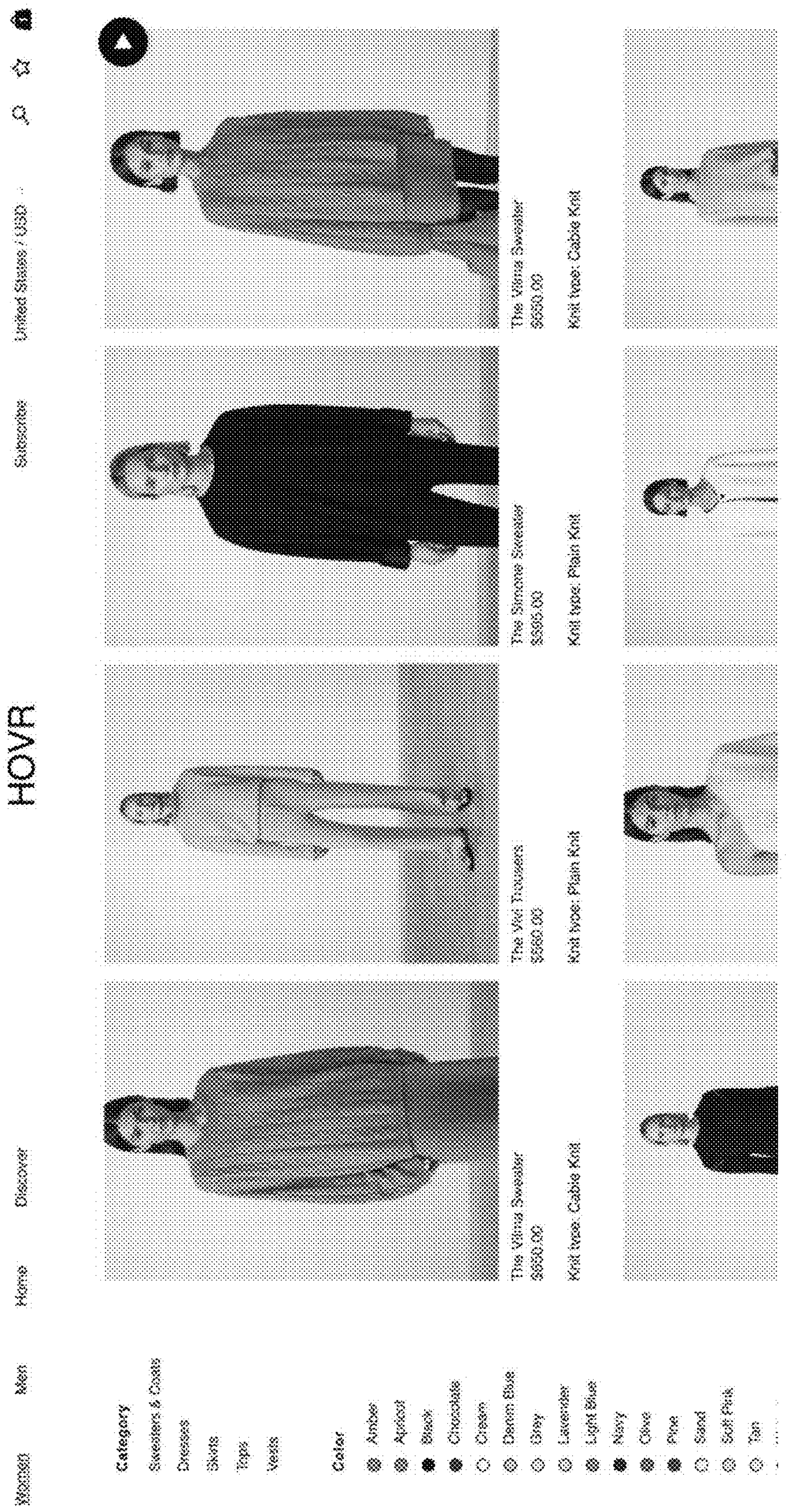
Figure 30D:
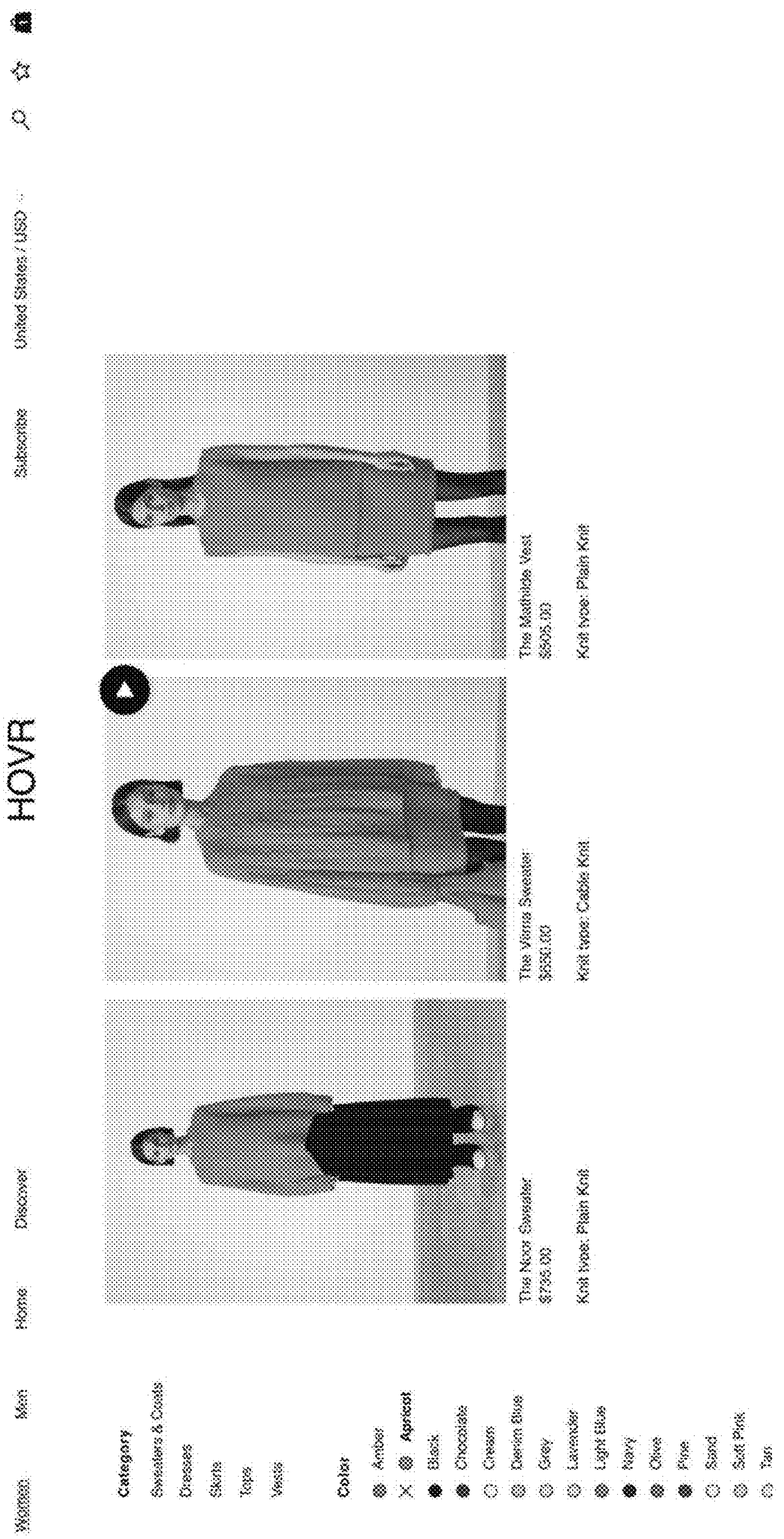

At block 2106, when a webpage is rendered in a browser, a search is performed through the HTML code for IMG HTML tags to identify SRCs (URLs) that match that of a product associated with an anchor. The component template may thus be utilized to deliver the anchor and associated content in the same manner, regardless of the location of the product image in the webpage. FIG. 30C illustrates an anchor (represented by a play control) on an image of a product located in the top right hand corner of the webpage. In FIG. 30D, the same product image is presented in the middle of the top row of product images in the webpage. Regardless of the placement of the product image, the anchor icon is located at the same position relative to the product image, and will act in the same way when interacted with by a user.

Figure 22A:
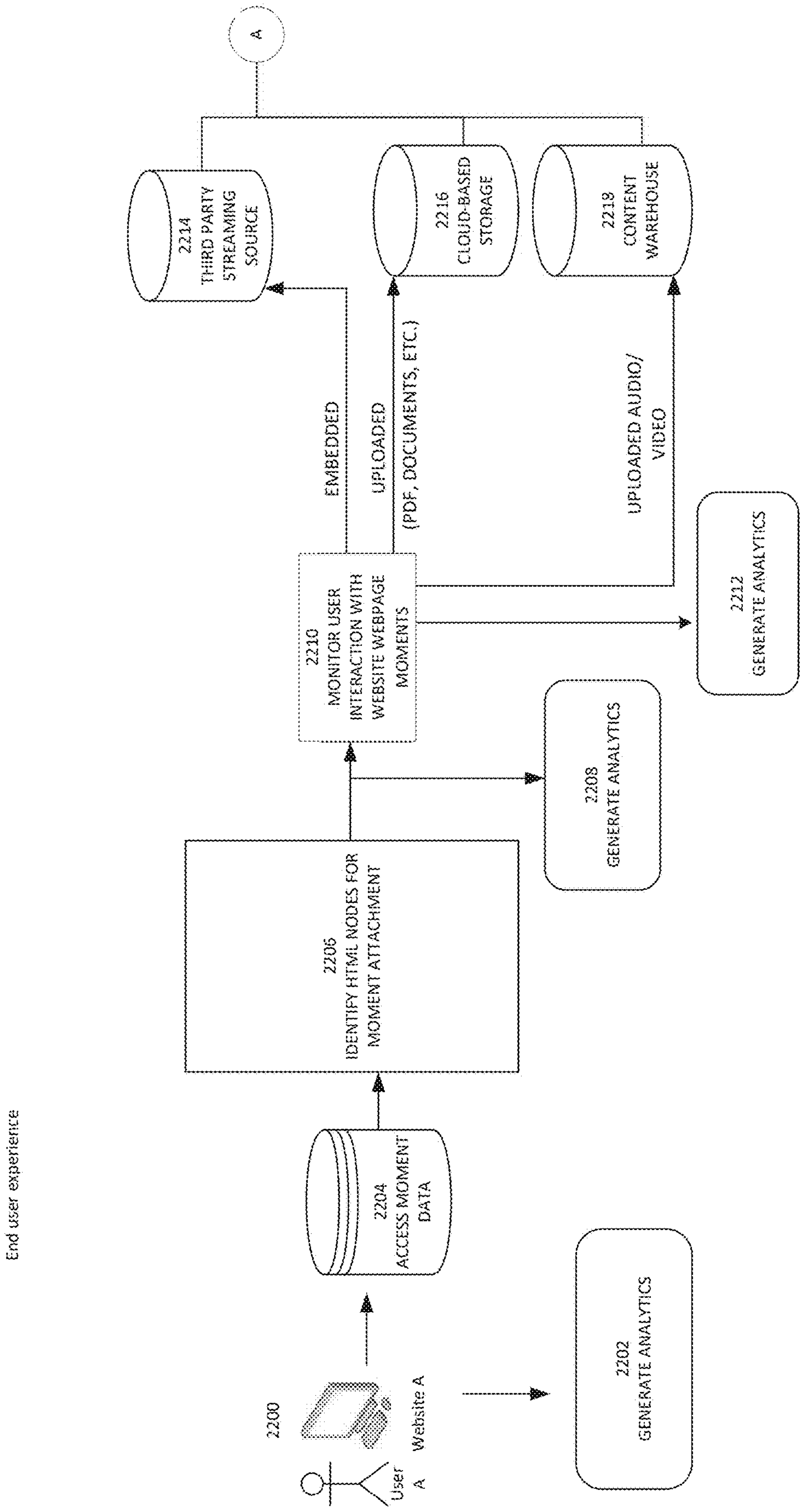
Figure 22B:
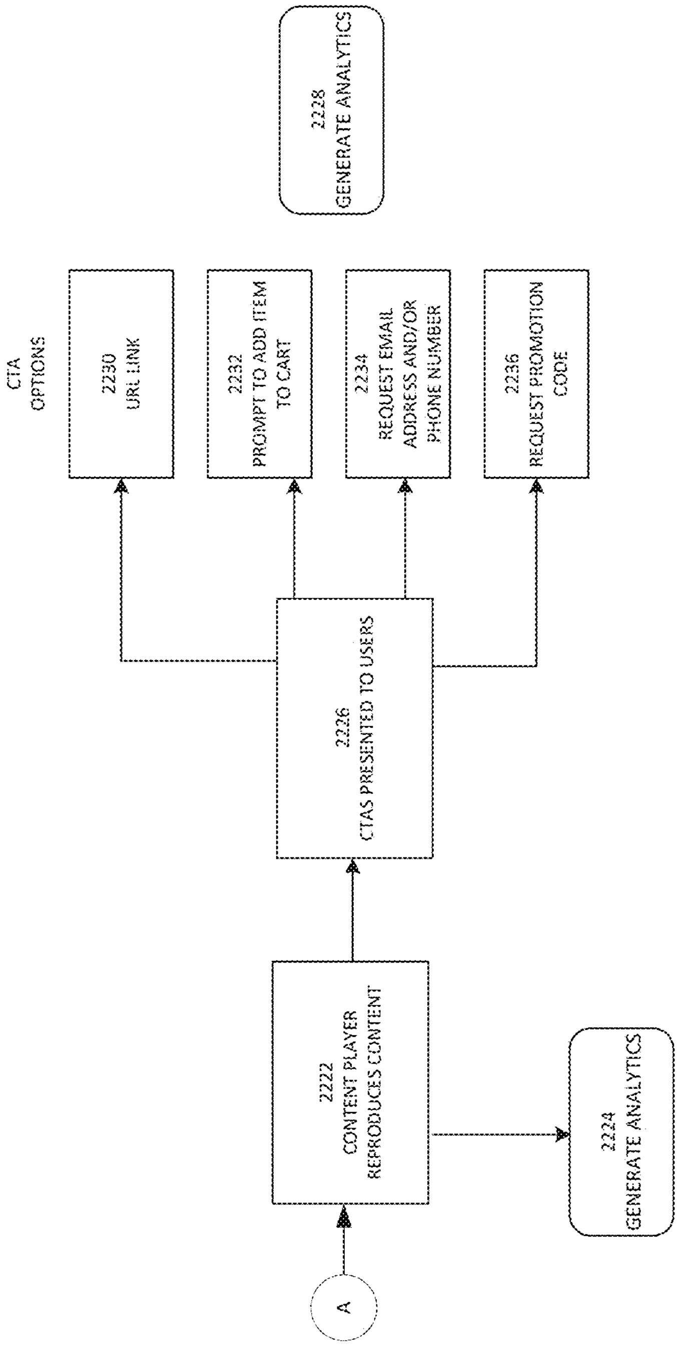

Referring now to FIG. 22A and FIG. 22B, an example process is illustrated with respect to an end user accessing and interacting with a webpage on which one or more anchors and associated content have been added. A user device 2200 accesses a webpage. At block 2202, analytics related to the page load are generated (e.g., with respect to page load time, the number of anchors, other moments, etc.) and reported (e.g., via an electronic document, such as a spreadsheet and/or a text document). Optionally, the page load analytics are filtered before reporting to exclude pages that do not have moments added to them to thereby ensure that only analytics that are relevant to the moments are reported, reducing display space utilization and memory utilization.

At block 2204, anchor configurations and HTML attributes are accessed from a data store, such as a NoSQL database, as described elsewhere herein. The foregoing data may be utilized to place anchors at the appropriate HTML nodes. At block 2206, the HTML nodes are identified. For example, the HTML attributes accessed from the data store may be used to search for matching nodes, and to identify parent and sibling elements, to locate the HTML nodes on the webpage that the moments are to be attached to.

For example, query selectors, querySelectorAll, and/or getElementById may be utilized in JavaScript to find and access specific nodes in the HTML DOM. By way of example, getElementById may be used to retrieve an element from the DOM based on its unique ID. It takes a single argument, which is the ID of the element to be retrieved, and returns the element node. The querySelector method may be utilized to retrieve the first element that matches a specified CSS selector (used to select the content based on name, or, class). The querySelector method takes a single argument, which is a CSS selector, and returns the first matching element node. The querySelectorAll method returns a list of all elements that match the specified CSS selector. The querySelectorAll method takes a single argument (a CSS selector), and returns a NodeList object containing the matching element nodes.

Anchors may be placed at the appropriate HTML nodes in accordance with the configuration data accessed from the datastore.

At block 2208, analytics are generated and reported related to the placement of anchors. For example, the analytics may indicate if no anchor was placed (e.g., because an HTML element node was not located that has an anchor associated with it). If no anchors are placed, optionally the process may terminate.

At block 2210, user interactions with website webpage moments (e.g., anchors) are monitored. For example, the process may detect and track when a user has hovered over or clicked on an anchor. At block 2212, analytics are generated and reported related to the user interactions with the moment. For example, the analytics may report on the number of times the user hovered over a moment, the length of time the user hovered over a moment, the number of times a user clicked on a moment, and/or the like.

Content (e.g., video content, audio content, still images, PDF documents, graphics documents, etc.) associated with an anchor interacted with by the user may be accessed from a third party content site 2214 (e.g., that streams video content (which may optionally include an audio track) and/or audio content (e.g., music or a podcast)) that is to be embedded in the accessed webpage, may be accessed from a cloud-based datastore 2216, may be accessed from a warehouse 2218 of audio/video content via an API, and/or may be accessed from other datastores. The content may have been embedded or uploaded to a given datastore.

At block 2222, the content associated with the moment (e.g., accessed from a datastore) is presented to the user. For example, a video player may be used to present video content. The content playback may be tracked and analyzed, and corresponding analytics may be generated and reported at block 2224. For example, the analytics may track and report the beginning of the media playback (e.g., which may have automatically begun playing or may have begun playing in response to a user activation of a play control associated with the content). By way of further, the analytics may report on the number and type of calls to actions (CTA) to be presented to the user (e.g., prompting the user to take a certain action, such as the activation of a button, link, subscribing to promotional content, copying a promotion code, entering a promotion code, providing an email address, adding an item to an electronic shopping cart, etc.).

At block 2226, the calls to action are present to the user. For example, at block 2230, a link to a URL/website to drive traffic to the corresponding destination may be presented, at block 2232 the user may be prompted to add a specific product to an electronic shopping cart, at block 2234 the user may be prompted to enter the user's email address (and/or phone number/messaging address) into a corresponding field, and/or at block 2236 the user may be prompted to enter a promotion code into a corresponding field. At block 2228, the user responses to the calls to action are monitored, and an analytics report is generated.

Figure 23A:
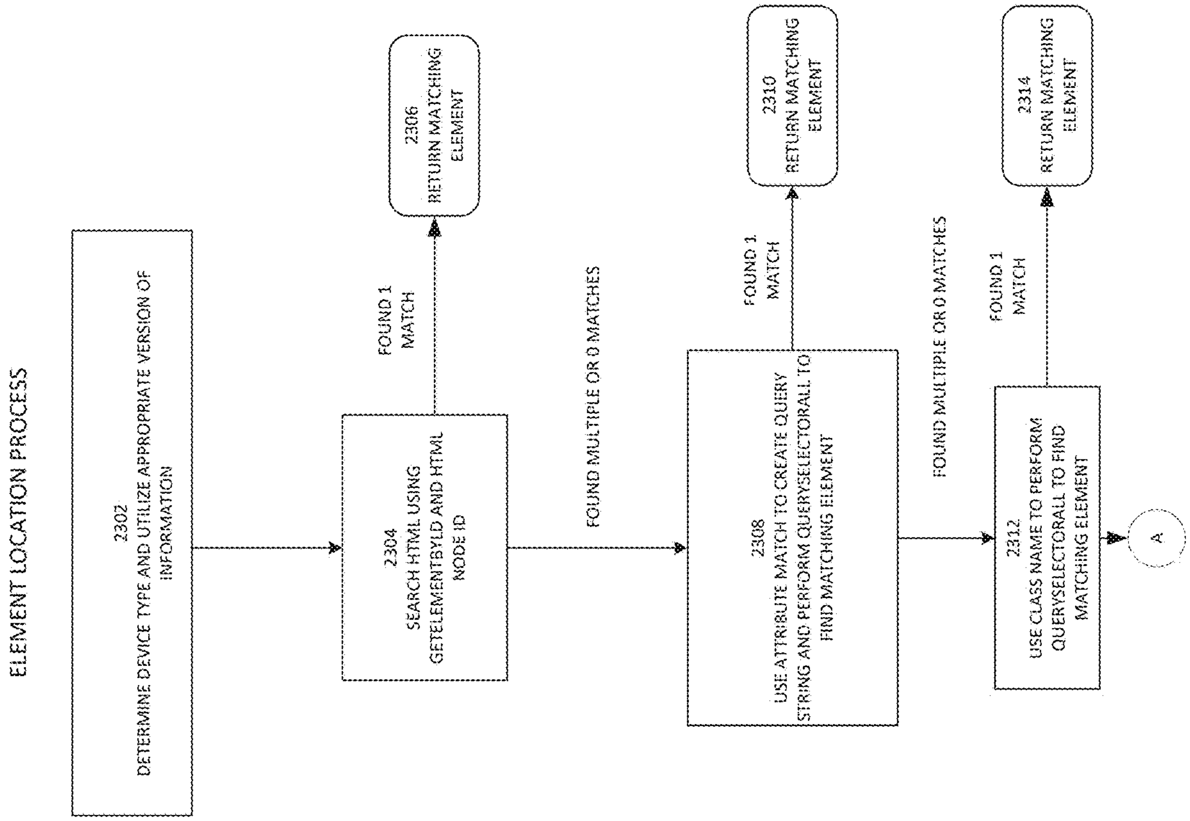
Figure 23B:
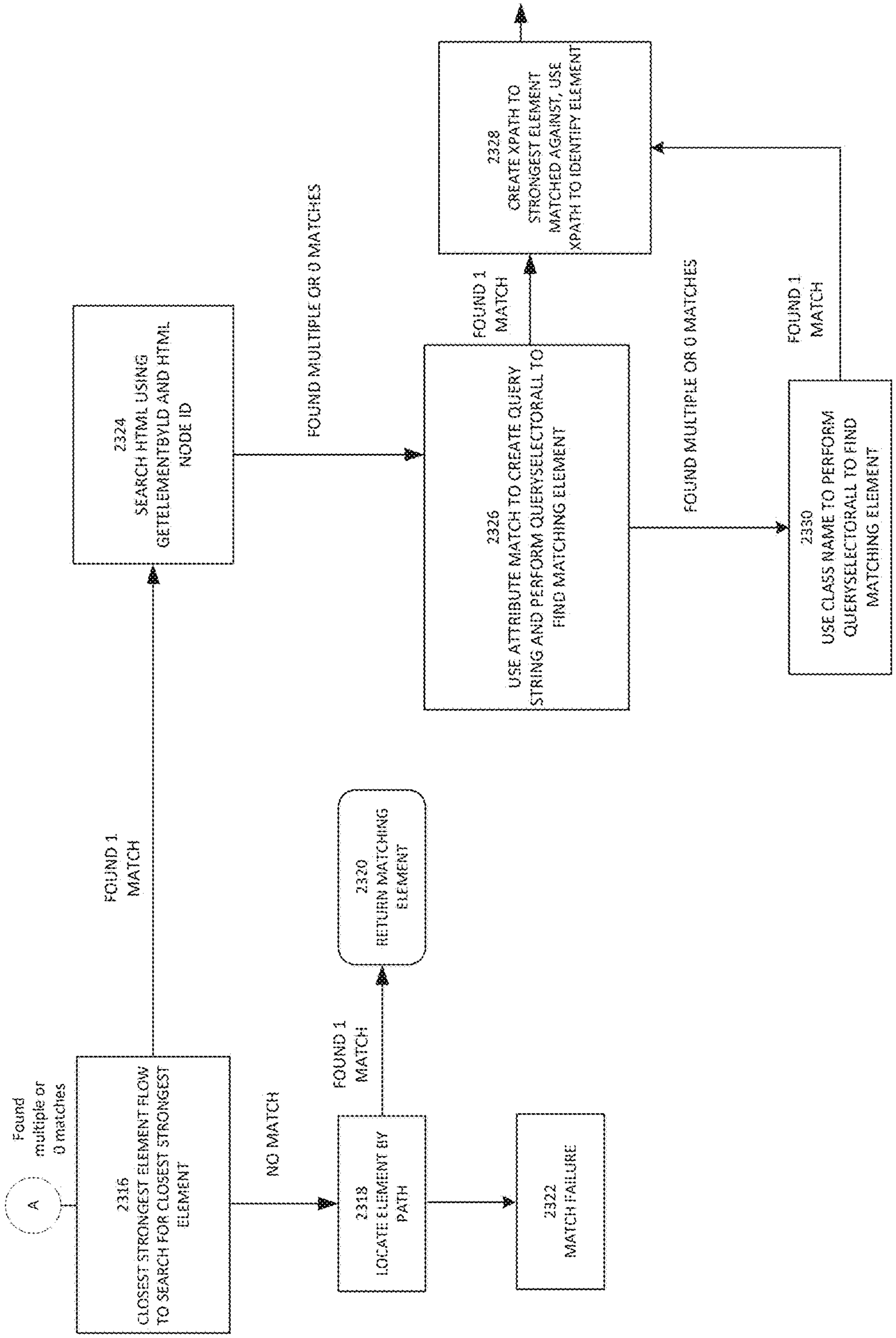

As discussed above, it may be desirable to locate a webpage element associated with an HTML node. FIG. 23A and FIG. 23B illustrate an example process for locating an element. FIG. 15A and FIG. 15B provide examples of information captured to locate an element on a webpage load.

At block 2302, a determination is made as to whether the user device loading a given webpage is a mobile device (with a relatively small screen and/or a screen of certain ratio set) or a desktop/laptop device. Depending on the device-type, the corresponding version of information will be utilized (e.g., the appropriate attribute map). Once the appropriate information to be used is determined, the remainder of the process may be the same or similar for both a mobile device and a desktop/laptop device, although different attribute maps may be utilized. At block 2304, the HTML node ID is utilized, if one is available, in locating the desired element. For example, the getElementById may be used to retrieve an element from the webpage DOM based on the node's unique ID. The getElementById method takes a single argument, which is the ID of the desired element, and if a single match is found, the getElementById method returns the element node at block 2306 to attach the element to.

If a match is not found, or if multiple matches are found, at block 2308, a query string is generated using the corresponding stored attribute map (which comprises a map of HTML attributes for a user selected HTML node that a moment is to be attached to) of the combined attributes, and the querySelectorAll method may be utilized that returns a list of all elements that match the specified CSS selector. If a single match is found, the getElementById method returns the element node at block 2310 to attach the element to.

If a match is not found at block 2308, or if multiple matches are found, at block 2312, the querySelectorAll method is utilized with the class name (where the HTML class attribute specifies one or more class names for an element). The elements returned by the querySelectorAll method are compared against the desired tagName to determine if there is a match. If a single match is found, the getElementById method returns the element node at block 2314 to attach the element to.

If a match is not found, or if multiple matches are found, at block 2316, the closest strongest element values are used to find a match. The closest method searches up the DOM tree for elements which match a specified CSS selector. Blocks 2304-2312 may be repeated as needed, except a match for the strongest element values is sought, which may be easier to locate than the original searched—for element.

If a matching element is not found, at block 2318, an attempt may be made to find a matching element using xPath. If a match is found, the matching element is returned to attach to. If a match is not found, at block 2322, a match failure may be logged.

If a single match is found at block 2316 and if the desired HTML node ID is available, at block 2324, the webpage HTML is searched using the getElementById method to retrieve an element from the DOM based on its unique ID.

If a match is not found, or if multiple matches are found, at block 2326, a query string is generated using the corresponding stored attribute map of the combined attributes, and the querySelectorAll method may be utilized that returns a list of all elements that match the specified CSS selector (the query string). If a single match is found, at block 2328, an xPath is generated to the strongest matching element. Then using the xPath from the closest strongest element (see the table illustrated in FIGS. 15A, 15D) the two strings are combined to provide the element.

If a match is not found at block 2326, or if multiple matches are found, at block 2330, the querySelectorAll method is utilized with the class name (where the HTML class attribute specifies one or more class names for an element). The elements returned by the querySelectorAll method are compared against the desired tagName to determine if there is a match. If a single match is found, the process proceeds to block 2328.

Certain optional aspects will now be described that may be utilized in any combination.

An aspect of the present disclosure relates to systems and methods configured to receive an indication that a moment (e.g., a general purpose anchor, a highlight anchor, a product anchor, a hotspot, a slide, a trigger, etc.) is to be positioned at a first location on a webpage, via code embedded in the webpage. A content specification associated with the moment is received. An interaction rule associated with the moment is received that specifies that content specified by the content specification is to be displayed at least partly in response to a specified user interaction with the webpage. Code is automatically generated configured to cause the moment to be located at the first location when accessed by a user browser, wherein, at least partly in response to a user browser accessing the first webpage, and the first user interacting with the webpage in a manner that satisfies the interaction rule, the content specified by the content specification is rendered.

Thus, an optional aspect of the present disclosure is a system comprising a network interface at least one processing device operable to: provide a user interface enabling one or more anchors to be added to an existing first webpage via a browser, without utilizing a browser extension, via code embedded in the first webpage; receive, via the user interface enabling one or more anchors to be added to the first webpage, an addition of a first anchor at a first location of the first webpage; receive a content specification associated with the first anchor; receive an interaction rule associated with the first anchor, wherein the interaction rule comprises a rule that content specified by the content specification is to be displayed at least partly in response to a specified user interaction with the first webpage; store an association of the first anchor, the interaction rule, and the content specified by the content specification; automatically generate code configured to cause the anchor to be located at the first location of the first webpage when accessed by a first user browser; and at least partly in response to activation of a publication control, enable the automatically generated code to be accessible in the first webpage by a plurality of user browsers, wherein, at least partly in response to a first user browser of a first user device accessing the first webpage, and the first user interacting with the first webpage in a manner that satisfies the interaction rule, the content specified by the content specification is rendered.

Optionally, the addition of the first anchor at the first location of the first webpage is performed at least in part by visually emphasizing text in the first webpage. Optionally, the addition of the first anchor at the first location of the first webpage is performed, at least in part, by defining a size of the first anchor, wherein the first anchor comprises a hotspot. Optionally, the specified user interaction with the first webpage comprises scrolling to or past the first location. Optionally, the specified user interaction with the first webpage comprises hovering a cursor over the first location.

Optionally, the system is configured to provide a user interface via which the user can enable or disable a display of a given anchor and/or content specified by a given content specification associated with the given anchor for a first user device type when the first webpage is accessed by a user device of the first user device type; receive, via the user interface via which the user can enable or disable the display of the given anchor and/or content specified by the given content specification associated with the given anchor for the given user device, an instruction to disable the display of the given anchor and/or content specified by the given content specification associated with the given anchor for the specified user device type; enable the first webpage to be rendered by the user device of the first user device type without the given anchor and/or content specified by the given content specification associated with the given anchor being rendered in the first webpage; enable the first webpage to be rendered by a user device of a second user device type, different than the first user device type, with the given anchor and/or content specified by the given content specification associated with the given anchor being rendered in the first webpage.

Optionally, the code embedded in the first webpage that enables the user interface enabling one or more anchors to be added to the existing first webpage comprises a script tag including a locator of a file that stores code enabling the one or more anchors to be added to an existing first webpage. Optionally, the system is configured to enable the user to add the first anchor via a user interface that enables the user to highlight webpage text. Optionally, the first anchor comprises a hotspot, emphasized text, or a product anchor. Optionally, the system is configured to enable the user to customize the first anchor via a user interface that enables the user to set an anchor size, shape, color, and/or icon representation.

An optional aspect relates to a computer implemented method, the method comprising: providing a user interface enabling one or more moments to be added to an existing first webpage via a browser; receiving, via the user interface enabling one or more moments to be added to the first webpage, an addition of a first moment at a first location of the first webpage; receiving a content specification associated with the first moment; receiving an interaction specification associated with the first moment, wherein the interaction specification comprises a rule that content specified by the content specification is to be displayed at least partly in response to a specified user interaction with the first webpage; automatically generating code configured to cause the moment to be located at the first location of the first webpage; and wherein, at least partly in response to a first user browser of a first user device accessing the first webpage, and the first user interacting with the first webpage in a manner that satisfies the interaction specification, the content specified by the content specification is provide via the first user browser.

Optionally, the addition of the first moment at the first location of the first webpage is performed at least in part by visually emphasizing text in the first webpage. Optionally, the addition of the first moment at the first location of the first webpage is performed, at least in part, by defining dimensions of the first moment, the first moment comprising a hotspot. Optionally, the specified user interaction with the first webpage comprises scrolling to or past the first location. Optionally, the specified user interaction with the first webpage comprises hovering a cursor over the first moment.

Optionally, the method further comprises: providing, via a computer system, a user interface via which the user can enable or disable a display of a given moment and/or content specified by a given content specification associated with the given moment for a first user device type when the first webpage is accessed by a user device of the first user device type; receiving, via the user interface via which the user can enable or disable the display of the given moment and/or content specified by the given content specification associated with the given moment for the given user device, an instruction to disable the display of the given moment and/or content specified by the given content specification associated with the given moment for the specified user device type; enabling the first webpage to be rendered by the user device of the first user device type without the given moment and/or content specified by the given content specification associated with the given moment being presented via the first webpage; and enabling the first webpage to be rendered by a user device of a second user device type, different than the first user device type, with the given moment and/or content specified by the given content specification associated with the given moment being presented via the first webpage.

Optionally, the code embedded in the first webpage that enables the user interface enabling one or more moments to be added to the existing first webpage comprises a script tag including a locator of a file that stores code enabling the one or more moments to be added to an existing first webpage. Optionally, the method further comprises enabling the user to add the first moment via a user interface that enables the user to highlight webpage text. Optionally, the first moment comprises a hotspot, emphasized text, or a product anchor. Optionally, the method further comprises providing a user interface enable a moment type to be selected from a plurality of moment types, the plurality of moment types comprising an anchor represented by an icon and a highlight anchor. Optionally, the method further comprising enabling the user to customize the first moment via a user interface that enables the user to set an moment size, shape, color, and/or icon representation. Optionally, the user interface enabling one or more anchors to be added to the existing first webpage via the browser is generated without utilizing a browser extension, via code embedded in the first webpage. Optionally, the content specified by the content specification comprises image content and a URL.

Optionally, the method further comprises providing for display a user interface comprising a plurality of content items from which a given content item may be selected to be associated with a given moment added to a given webpage, the user interface, comprising the plurality of content items from which a content item may a given content item may be selected to be associated with the given moment added to the given webpage, displayed at a same time as the given webpage.

Thus, certain systems and methods are described herein that enable users concurrently accessing network resources to communicate and share content, securely and selectively. Certain systems and methods are described herein that enable moments, such as anchors, to be associated with webpage elements, thus enabling moments to be easily added to a webpage and enabling end users to intuitively access content associated with such moments.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a network interface;
at least one processing device operable to:
provide a user interface enabling one or more anchors to be added to an existing first webpage via a browser, without utilizing a browser extension, via code embedded in the first webpage;
receive, via the user interface enabling one or more anchors to be added to the first webpage, an addition of a first anchor at a first location of the first webpage;
receive a content specification associated with the first anchor;
receive an interaction rule associated with the first anchor, wherein the interaction rule comprises a rule that content specified by the content specification is to be displayed at least partly in response to a specified user interaction with the first webpage;
store an association of the first anchor, the interaction rule, and the content specified by the content specification;
automatically generate code configured to cause the first anchor to be located at the first location of the first webpage when accessed by a first user browser and to be rendered as a visually emphasized item of content in the first webpage; and
enable the automatically generated code to be accessible in the first webpage by a plurality of user browsers,
wherein, at least partly in response to a first user browser of a first user device accessing the first webpage, and the first user interacting with the first webpage in a manner that satisfies the interaction rule, the content specified by the content specification is rendered.

2. The system as defined by claim 1, wherein the automatically generated code is inserted into a DOM (Document Object Model) of the first webpage.

3. The system as defined by claim 1, wherein the addition of the first anchor at the first location of the first webpage is performed, at least in part, by defining a size of the first anchor.

4. The system as defined by claim 1, wherein the specified user interaction with the first webpage comprises scrolling to or past the first location.

5. The system as defined by claim 1, wherein the specified user interaction with the first webpage comprises hovering a cursor over the first location.

6. The system as defined by claim 1, wherein the system is configured to:

provide a user interface via which a given user can enable or disable a display of a given anchor or enable or disable a display of content specified by a given content specification associated with the given anchor, or enable or disable a display of a given anchor and enable or disable a display of content specified by a given content specification associated with the given anchor, for a given user device type when the first webpage is accessed by a user device of the given user device type;

receive, via the user interface via which the given user can enable or disable the display of the given anchor or enable or disable a display of content specified by the given content specification associated with the given anchor for the given user device, or enable or disable a display of a given anchor and enable or disable a display of content specified by a given content specification associated with the given anchor, an instruction to disable the display of at least one of the given anchor and content specified by the given content specification associated with the given anchor for the given user device type;

enable the first webpage to be rendered by the user device of the given user device type without the given anchor or content specified by the given content specification associated with the given anchor being rendered in the first webpage, or enable the first webpage to be rendered by the user device of the given user device type without the given anchor and without content specified by the given content specification associated with the given anchor being rendered in the first webpage; and enable the first webpage to be rendered by a user device of a second user device type, different than the given user device type, with at least one of the given anchor and content specified by the given content specification associated with the given anchor being rendered in the first webpage.

7. The system as defined by claim 1, wherein the code embedded in the first webpage that enables the user interface enabling one or more anchors to be added to the existing first webpage comprises a script tag including a locator of a file that stores code enabling the one or more anchors to be added to an existing first webpage.

8. The system as defined by claim 1, wherein the system is configured to enable a user to add the first anchor via a user interface that enables the user to highlight webpage text.

9. The system as defined by claim 1, wherein the system is configured to enable a user to customize a given anchor via a user interface that enables the user to set an anchor size, shape, color, or icon representation, or any combination of anchor size, shape, or color.

10. A method comprising:

determining that a first anchor is to be added to an existing first webpage;

determining that a first item of text in the existing first webpage is to be associated with a first anchor;

determining an interaction rule associated with the first anchor, wherein the interaction rule comprises a rule that a first item of content is to be displayed at least partly in response to a specified user interaction with the first webpage;

storing an association of the first anchor, the interaction rule, and the first item of content;

automatically generating code configured to cause the first anchor to be indicated by an emphasis of the first item of text in the existing first webpage when accessed by a first user browser; and enabling the automatically generated code to be accessible in the first webpage by a plurality of user browsers, wherein, at least partly in response to a first user browser of a first user device accessing the first webpage, and the first user interacting with the first webpage in a manner that satisfies the interaction rule, the first item of content is rendered on the first user device.

11. The method as defined by claim 10, wherein the automatically generated code is inserted into a DOM (Document Object Model) of the first webpage.

12. The method as defined by claim 10, wherein the specified user interaction with the first webpage comprises scrolling to or past the first item of text.

13. The method as defined by claim 10, wherein the specified user interaction with the first webpage comprises hovering a cursor over the first item of text.

14. The method as defined by claim 10, the method further comprising:

providing a user interface via which a given user can enable or disable a display of a given anchor or enable or disable a display of content specified by a given content specification associated with the given anchor, or enable or disable a display of a given anchor and enable or disable a display of content specified by a given content specification associated with the given anchor, for a given user device type when a specified webpage is accessed by a user device of the given user device type;

receiving, via the user interface via which the given user can enable or disable the display of the given anchor or enable or disable a display of content specified by the given content specification associated with the given anchor for the given user device, or enable or disable a display of a given anchor and enable or disable a display of content specified by a given content specification associated with the given anchor, an instruction to disable the display of at least one of the given anchor and content specified by the given content specification associated with the given anchor for the given user device type;

enabling the specified webpage to be rendered by the user device of the given user device type without the given anchor or content specified by the given content specification associated with the given anchor being rendered in the specified webpage, or enable the specified webpage to be rendered by the user device of the given user device type without the given anchor and without content specified by the given content specification associated with the given anchor being rendered in the specified webpage; and enabling the specified webpage to be rendered by a user device of a second user device type, different than the given user device type, with at least one of the given anchor and content specified by the given content specification associated with the given anchor being rendered in the specified webpage.

15. The method as defined by claim 10, wherein the emphasis of the first item of text in the existing first webpage comprises a highlight of the first item of text in the existing first webpage.

16. The method as defined by claim 10, the method further comprising providing a user interface configured to enable a user to customize at least one anchor by specifying an anchor color.

* * * * *